US011805091B1

(12) United States Patent
Rapaport et al.

(10) Patent No.: US 11,805,091 B1
(45) **Date of Patent: *Oct. 31, 2023**

(54) SOCIAL TOPICAL CONTEXT ADAPTIVE NETWORK HOSTED SYSTEM

(71) Applicant: Jeffrey Alan Rapaport, Ho Chi Minh (VN)

(72) Inventors: Jeffrey Alan Rapaport, Ho Chi Minh (VN); Seymour Rapaport, Los Altos, CA (US); Kenneth Allen Smith, Fremont, CA (US); James Beattie, San Ramon, CA (US); Gideon Gimlan, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,588

(22) Filed: Oct. 22, 2022

Related U.S. Application Data

(63) Continuation of application No. 17/714,802, filed on Apr. 6, 2022, now Pat. No. 11,539,657, which is a (Continued)

(51) Int. Cl.
*G06Q 30/00* (2023.01)
*H04L 51/52* (2022.01)
(Continued)

(52) U.S. Cl.
CPC ............ *H04L 51/52* (2022.05); *G06Q 10/10* (2013.01); *H04L 12/1818* (2013.01); (Continued)

(58) Field of Classification Search
None
See application file for complete search history.

(56) References Cited

U.S. PATENT DOCUMENTS 1,996,516 A * 4/1935 Kinkead ............ H04L 12/1818 178/2 R
2,870,026 A 1/1959 Keller
(Continued)

FOREIGN PATENT DOCUMENTS

AU 2017200893 A1 * 3/2017 ....... G06F 16/24578
AU 2017200893 B2 * 6/2018 ....... G06F 16/24578
(Continued)

OTHER PUBLICATIONS

Mark-Shane Scale. "Facebook as a Social Search Engine and the Implications for Libraries in the 21st Century." (Nov. 2008). Retrieved online Jun. 14, 2022. https://www.researchgate.net/publication/235322898_Facebook_as_a_social_search_engine_and_the_implications_for_libraries_in_the_twenty-first_century (Year: 2008).*
(Continued)

*Primary Examiner* — James A Reagan
(74) *Attorney, Agent, or Firm* — ROARK IP

(57) ABSTRACT

Disclosed is a Social-Topical Adaptive Networking (STAN) system that can inform users of cross-correlations between currently focused-upon topic or other nodes in a corresponding topic or other data-objects organizing space maintained by the system and various social entities monitored by the system. More specifically, one of the cross-correlations may be as between the top N now-hottest topics being focused-upon by a first social entity and amounts of focus 'heat' that other social entities (e.g., friends and family) are casting on the same topics in a relavant time period.

21 Claims, 39 Drawing Sheets

Related U.S. Application Data continuation of application No. 16/196,542, filed on Nov. 20, 2018, now abandoned, which is a continuation of application No. 14/192,119, filed on Feb. 27, 2014, now Pat. No. 10,142,276, which is a continuation of application No. 13/367,642, filed on Feb. 7, 2012, now Pat. No. 8,676,937.

(60) Provisional application No. 61/551,338, filed on Oct. 25, 2011, provisional application No. 61/485,409, filed on May 12, 2011.

(51) Int. Cl.

| | |
|---|---|
| ***H04N 21/8358*** | (2011.01) |
| ***H04L 12/18*** | (2006.01) |
| ***G06Q 10/10*** | (2023.01) |
| ***H04L 67/306*** | (2022.01) |
| *H04L 67/02* | (2022.01) |

(52) U.S. Cl.

CPC ....... *H04L 67/306* (2013.01); *H04N 21/8358* (2013.01); *H04L 67/02* (2013.01)

(56) References Cited

U.S. PATENT DOCUMENTS 3,180,760 A 4/1965 Rauter
3,676,937 A 7/1972 Janson
3,749,870 A 7/1973 Oakes
5,047,363 A 9/1991 Hickernell
5,337,233 A * 8/1994 Hofert ................ G06F 17/2217 715/234
5,659,742 A 8/1997 Beattie
5,754,939 A 5/1998 Herz et al.
5,793,365 A 8/1998 Tang et al.
5,828,839 A 10/1998 Moncreiff
5,848,396 A 12/1998 Gerace
5,873,076 A 2/1999 Barr
5,890,152 A 3/1999 Rapaport et al.
5,930,474 A 7/1999 Dunworth et al.
5,950,200 A 9/1999 Sudai et al.
5,961,332 A * 10/1999 Joao ...................... G16H 10/20 434/236
6,041,311 A 3/2000 Chisienko
6,047,363 A * 4/2000 Lewchuk ........... G06F 12/0862 711/137
6,061,716 A 5/2000 Moncrieff
6,064,971 A 5/2000 Hartnett
6,081,830 A 6/2000 Schindler
6,154,213 A 11/2000 Rennison
6,180,760 B1 1/2001 Takai et al.
6,229,542 B1 5/2001 Miller
6,256,633 B1 7/2001 Dharap
6,272,467 B1 8/2001 Durand et al.
6,425,012 B1 7/2002 Trovato et al.
6,442,450 B1 * 8/2002 Inoue ...................... B25J 13/00 318/565
6,446,113 B1 9/2002 Ozzie et al.
6,480,885 B1 11/2002 Olivier
6,496,851 B1 12/2002 Morris
6,577,329 B1 6/2003 Flickner et al.
6,611,881 B1 8/2003 Gottfurcht
6,618,593 B1 9/2003 Drutman et al.
6,633,852 B1 * 10/2003 Heckerman ........ G06Q 30/0631 705/26.7
6,651,086 B1 11/2003 Manber et al.
6,745,178 B1 6/2004 Emens et al.
6,757,682 B1 6/2004 Naimark et al.
6,766,374 B2 7/2004 Trovato et al.
6,873,314 B1 3/2005 Campbell
6,879,994 B1 4/2005 Matsliach et al.
6,978,292 B1 12/2005 Murakami et al.
6,981,021 B2 12/2005 Takakura et al.
6,981,040 B1 12/2005 Konig
7,034,691 B1 4/2006 Rapaport
7,219,303 B2 5/2007 Fish
7,386,796 B1 6/2008 Simpson et al.
7,394,388 B1 7/2008 Light et al.
7,395,507 B2 7/2008 Robarts et al.
7,401,098 B2 7/2008 Baker
7,424,541 B2 9/2008 Bourne
7,430,315 B2 9/2008 Yang et al.
7,472,352 B2 12/2008 Liversidge et al.
7,610,287 B1 10/2009 Dean et al.
7,630,986 B1 12/2009 Herz et al.
7,640,304 B1 12/2009 Goldscheider
7,647,098 B2 * 1/2010 Prichep ................... A61B 5/38 600/544
7,720,784 B1 5/2010 Froloff
7,730,030 B1 6/2010 Xu
7,788,260 B2 8/2010 Lunt et al.
7,848,960 B2 12/2010 Rampeli et al.
7,853,881 B1 12/2010 Aly Assal et al.
7,860,928 B1 12/2010 Anderson
7,865,553 B1 1/2011 Anderson
7,870,026 B2 1/2011 Krishnan et al.
7,878,390 B1 2/2011 Batten
7,881,315 B2 2/2011 Haveson et al.
7,899,915 B2 3/2011 Reisman
7,904,500 B1 3/2011 Anderson
7,945,861 B1 5/2011 Karam
7,966,565 B2 6/2011 Dawson et al.
8,024,328 B2 9/2011 Dolin et al.
8,150,868 B2 4/2012 Richardson et al.
8,180,760 B1 * 5/2012 Carver .............. G06Q 30/0241 707/708
8,249,898 B2 8/2012 Schoenberg
8,274,377 B2 9/2012 Smith et al.
8,380,902 B2 2/2013 Howard
8,484,191 B2 * 7/2013 Maghoul ............ G06F 16/9535 707/769
8,572,094 B2 * 10/2013 Luo ....................... G06Q 10/10 707/769
8,583,617 B2 * 11/2013 Stemeseder .......... G06F 16/951 707/706
8,676,937 B2 * 3/2014 Rapaport ............... H04L 51/32 709/219
8,732,605 B1 5/2014 Falaki
8,743,708 B1 6/2014 Robertson
8,843,835 B1 9/2014 Busey et al.
8,874,477 B2 * 10/2014 Hoffberg ............... G06Q 20/40 705/37
8,949,250 B1 * 2/2015 Garg .................... G06F 16/248 707/751
9,015,093 B1 4/2015 Commons
9,081,823 B2 * 7/2015 Luo .................... G06F 16/2291
9,135,663 B1 9/2015 Heiferman
9,183,285 B1 11/2015 Brown
9,251,500 B2 * 2/2016 Cathcart .......... G06F 16/24578
9,367,629 B2 * 6/2016 Garg .................... G06F 3/0482
9,460,215 B2 * 10/2016 Garg .................. G06F 3/04842
9,712,457 B2 * 7/2017 Stemeseder .......... G06F 16/951
9,749,870 B2 * 8/2017 Kadel .................. H04W 28/26
9,959,320 B2 * 5/2018 Garg ................ G06F 16/24578
10,169,390 B2 * 1/2019 Luo ........................ G06F 16/23
10,268,733 B2 * 4/2019 Garg .................... G06F 16/248
10,303,696 B2 * 5/2019 Cathcart .............. G06F 16/248
10,360,227 B2 * 7/2019 Garg ................ G06F 16/24578
11,539,657 B2 * 12/2022 Rapaport ........... H04L 12/1818
2001/0053694 A1 * 12/2001 Igarashi ................. H04L 63/08 455/433
2002/0072955 A1 6/2002 Brock
2003/0037110 A1 2/2003 Yamamoto
2003/0052911 A1 3/2003 Cohen-solal
2003/0055897 A1 3/2003 Brown et al.
2003/0069900 A1 4/2003 Hind
2003/0076352 A1 * 4/2003 Uhlig ................... G06F 17/241 715/738
2003/0078972 A1 4/2003 Tapissier
2003/0092428 A1 * 5/2003 Awada ............. H04M 1/72572 455/414.1
2003/0154186 A1 8/2003 Goodwin

(56) References Cited

U.S. PATENT DOCUMENTS

2003/0160815 A1 8/2003 Muschetto
2003/0195928 A1 10/2003 Kamijo et al.
2003/0225833 A1 12/2003 Pilat et al.
2003/0234952 A1 12/2003 Dawson et al.
2004/0075677 A1* 4/2004 Loyall .................... G06F 3/011 715/706
2004/0076936 A1 4/2004 Horvitz
2004/0078432 A1 4/2004 Manber et al.
2004/0174971 A1* 9/2004 Guan .................... H04M 3/436 379/201.02
2004/0205651 A1 10/2004 Dutta et al.
2004/0228531 A1 11/2004 Fernandez et al.
2005/0004923 A1 1/2005 Park
2005/0054381 A1 3/2005 Lee
2005/0086610 A1 4/2005 MacKinlay et al.
2005/0149459 A1 7/2005 Kofman et al.
2005/0154693 A1 7/2005 Ebert
2005/0246165 A1 11/2005 Pettinelli
2005/0259035 A1 11/2005 Iwaki et al.
2006/0020662 A1* 1/2006 Robinson ................ G06F 15/16 709/203
2006/0026111 A1 2/2006 Athelogou
2006/0026152 A1* 2/2006 Zeng .................. G06F 17/3071
2006/0080613 A1 4/2006 Savant
2006/0093998 A1 7/2006 Vertegaal
2006/0156326 A1 7/2006 Goronzy et al.
2006/0161457 A1 7/2006 Rapaport
2006/0176831 A1 8/2006 Greenberg et al.
2006/0184566 A1* 8/2006 Lo .......................... G06F 16/48 707/999.102
2006/0213976 A1 9/2006 Inakoshi et al.
2006/0224593 A1 10/2006 Benton et al.
2006/0270419 A1 11/2006 Crowley
2007/0005425 A1 1/2007 Bennett
2007/0013652 A1 1/2007 Kim
2007/0016585 A1 1/2007 Nickell et al.
2007/0036292 A1 2/2007 Selbie et al.
2007/0094601 A1 4/2007 Greenberg
2007/0100938 A1 5/2007 Bagley et al.
2007/0112719 A1 5/2007 Reich
2007/0113181 A1* 5/2007 Blattner .................. G06F 3/011 715/706
2007/0149214 A1* 6/2007 Walsh ................. H04L 12/1859 455/456.1
2007/0150281 A1 6/2007 Hoff
2007/0150916 A1 6/2007 Begole et al.
2007/0168446 A1 7/2007 Keohane et al.
2007/0168448 A1 7/2007 Garbow et al.
2007/0168863 A1 7/2007 Blattner
2007/0171716 A1* 7/2007 Wright .................. G06T 11/206 365/185.12
2007/0214077 A1* 9/2007 Barnes ................... G06Q 40/02 705/38
2007/0239566 A1 10/2007 Dunnaboo et al.
2007/0265507 A1 11/2007 de Lemos
2007/0273558 A1* 11/2007 Smith .................. G08G 1/0962 340/995.1
2007/0282724 A1* 12/2007 Barnes ................... G06Q 40/00 705/35
2008/0005252 A1* 1/2008 Della Pasqua ......... G06Q 10/10 709/206
2008/0034040 A1* 2/2008 Wherry ................ G06Q 10/107 709/204
2008/0034309 A1 2/2008 Louch et al.
2008/0040474 A1 2/2008 Zuckerberg
2008/0052742 A1 2/2008 Kopf et al.
2008/0065468 A1 3/2008 Berg et al.
2008/0082548 A1 4/2008 Betts
2008/0091512 A1 4/2008 Marci et al.
2008/0097235 A1 4/2008 Ofek et al.
2008/0114737 A1 5/2008 Neely et al.
2008/0114755 A1 5/2008 Wolters et al.
2008/0133664 A1 6/2008 Lentz
2008/0154883 A1 6/2008 Chowdhury
2008/0168376 A1* 7/2008 Tien ................. G06Q 10/06375 715/772
2008/0183750 A1* 7/2008 Lee ........................ G06Q 10/10
2008/0189367 A1 8/2008 Okumura
2008/0209343 A1 8/2008 Macadam et al.
2008/0209350 A1 8/2008 Sobotka et al.
2008/0222295 A1 9/2008 Robinson
2008/0234976 A1 9/2008 Wittkowski
2008/0262364 A1 10/2008 Aarts
2008/0266118 A1 10/2008 Pierson et al.
2008/0281783 A1 11/2008 Papkoff et al.
2008/0288437 A1 11/2008 Siregar
2008/0313108 A1 12/2008 Carrabis
2008/0319827 A1* 12/2008 Yee ........................ G06Q 30/02 705/7.29
2008/0320082 A1 12/2008 Kuhike et al.
2009/0037443 A1* 2/2009 Athale ................ G06F 16/2246 707/E17.05
2009/0070700 A1* 3/2009 Johanson ............... G06Q 10/10 715/776
2009/0077064 A1 3/2009 Daigle
2009/0089296 A1* 4/2009 Stemeseder ........... H04L 47/822
2009/0089678 A1 4/2009 Sacco et al.
2009/0094088 A1 4/2009 Chen
2009/0100469 A1 4/2009 Conradt et al.
2009/0112696 A1 4/2009 Jung et al.
2009/0112713 A1 4/2009 Jung et al.
2009/0119173 A1 5/2009 Parsons et al.
2009/0119584 A1 5/2009 Herbst
2009/0164916 A1 6/2009 Jeong
2009/0179983 A1 7/2009 Schindler
2009/0198566 A1* 8/2009 Greenberg ......... G06Q 30/0236 707/999.005
2009/0204714 A1 8/2009 Ferrara
2009/0215469 A1 8/2009 Fisher
2009/0216773 A1* 8/2009 Konopnicki ........ G06F 16/9535
2009/0233623 A1 9/2009 Johnson
2009/0234727 A1 9/2009 Petty
2009/0234876 A1 9/2009 Schigel et al.
2009/0249244 A1 10/2009 Robinson et al.
2009/0254662 A1* 10/2009 Lee ......................... H04L 67/30 709/227
2009/0260060 A1 10/2009 Smith et al.
2009/0276705 A1* 11/2009 Ozdemir ................ G06V 40/20 715/708
2009/0288012 A1 11/2009 Hertel et al.
2009/0325615 A1* 12/2009 McKay ................... H04L 63/02 455/466
2009/0327417 A1 12/2009 Chakra et al.
2010/0030734 A1 2/2010 Chunilal
2010/0037277 A1 2/2010 Flynn-Ripley et al.
2010/0057857 A1 3/2010 Szeto
2010/0058183 A1* 3/2010 Hamilton, II .......... G06Q 30/02 715/706
2010/0063993 A1 3/2010 Higgins
2010/0070448 A1 3/2010 Omoigui
2010/0070758 A1 3/2010 Low et al.
2010/0070875 A1 3/2010 Turski
2010/0073133 A1* 3/2010 Conreux ............. G07C 9/00111 340/5.67
2010/0094797 A1 4/2010 Monteverde
2010/0114684 A1 5/2010 Neged
2010/0138452 A1 6/2010 Henkin
2010/0153453 A1 6/2010 Knowles
2010/0159909 A1 6/2010 Stifelman
2010/0164956 A1 7/2010 Hyndman et al.
2010/0169766 A1 7/2010 Duarte et al.
2010/0180217 A1 7/2010 Li
2010/0191727 A1 7/2010 Malik
2010/0191741 A1 7/2010 Stefik
2010/0191742 A1 7/2010 Stefik
2010/0198633 A1 8/2010 Guy et al.
2010/0205541 A1* 8/2010 Rapaport ............... G06Q 10/10 715/753
2010/0217757 A1* 8/2010 Fujioka ............... G06F 16/9535 705/26.1
2010/0223157 A1 9/2010 Kalsi
2010/0250497 A1 9/2010 Redlich

(56) References Cited

U.S. PATENT DOCUMENTS

2010/0293104 A1 11/2010 Olsson et al.
2010/0306249 A1* 12/2010 Hill ..................... G06F 16/9535 707/769
2011/0016121 A1* 1/2011 Sambrani .......... G06F 17/30702 707/734
2011/0022602 A1* 1/2011 Luo ....................... G06Q 10/10 707/723
2011/0029898 A1 2/2011 Malik
2011/0040155 A1 2/2011 Guzak
2011/0041153 A1 2/2011 Simon
2011/0047119 A1 2/2011 Kaplan
2011/0047487 A1 2/2011 DeWeese et al.
2011/0055017 A1* 3/2011 Solomon ................ G06Q 30/02 705/14.66
2011/0055734 A1 3/2011 Borst et al.
2011/0055735 A1 3/2011 Wood et al.
2011/0070758 A1 3/2011 Low et al.
2011/0082907 A1 4/2011 Anderson
2011/0087540 A1 4/2011 Krishnan et al.
2011/0087735 A1 4/2011 Anderson
2011/0125661 A1 5/2011 Hull et al.
2011/0137690 A1 6/2011 Louch et al.
2011/0137921 A1* 6/2011 Inagaki ............... G06F 17/3069 707/749
2011/0137951 A1 6/2011 Baker
2011/0142016 A1 6/2011 Chatterjee
2011/0145570 A1 6/2011 Gressel et al.
2011/0153761 A1 6/2011 Anderson
2011/0154224 A1 6/2011 Bates et al.
2011/0161164 A1 6/2011 Anderson
2011/0161177 A1 6/2011 Anderson
2011/0179125 A1 7/2011 Lee et al.
2011/0184886 A1* 7/2011 Shoham ............. G06Q 30/0283 705/400
2011/0185025 A1 7/2011 Cherukuri et al.
2011/0197123 A1 8/2011 Caine et al.
2011/0197146 A1 8/2011 Goto et al.
2011/0201423 A1 8/2011 Borst et al.
2011/0219015 A1* 9/2011 Kim .................. G06F 17/30864 707/768
2011/0246306 A1* 10/2011 Blackhurst ............. G06Q 30/02 705/14.58
2011/0246908 A1 10/2011 Akram et al.
2011/0246920 A1 10/2011 Lebrun
2011/0252121 A1 10/2011 Borgs et al.
2011/0270618 A1* 11/2011 Banerjee ................ G06Q 30/02 705/1.1
2011/0270830 A1 11/2011 Stefik
2012/0042263 A1 2/2012 Rapaport et al.
2012/0047447 A1* 2/2012 Haq .................... G06F 3/04847 715/752
2012/0079045 A1* 3/2012 Plotkin ................... H04L 51/12 709/206
2012/0095819 A1* 4/2012 Li ......................... G06Q 30/02 705/14.23
2012/0102130 A1* 4/2012 Guyot ..................... H04L 51/12 709/206
2012/0124486 A1 5/2012 Robinson et al.
2012/0158633 A1 6/2012 Eder
2012/0158715 A1 6/2012 Maghoul et al.
2012/0166432 A1* 6/2012 Tseng .................. G06F 16/9535 707/E17.084
2012/0259240 A1* 10/2012 Llewellynn ........... G06Q 30/02 600/558
2012/0265528 A1 10/2012 Gruber et al.
2012/0284105 A1* 11/2012 Li ......................... G06Q 30/02 705/14.23
2012/0323691 A1* 12/2012 McLaughlin .......... G06Q 30/00 705/14.58
2012/0323928 A1 12/2012 Bhatia
2013/0018685 A1* 1/2013 Parnaby ................. G06Q 10/10 705/7.13
2013/0041696 A1* 2/2013 Richard ................. G06Q 30/06 705/5
2013/0079149 A1* 3/2013 Fletcher ................. G06Q 50/01 463/42
2013/0086063 A1 4/2013 Chen
2013/0110827 A1* 5/2013 Nabar .................... G06Q 10/00 707/E17.014
2013/0124626 A1* 5/2013 Cathcart ............. G06F 16/9535 709/204
2013/0196685 A1 8/2013 Griff
2013/0275405 A1* 10/2013 Maghoul ............. G06F 16/9535 707/706
2013/0325755 A1* 12/2013 Arquette ................ H04L 51/32 706/12
2014/0108428 A1* 4/2014 Luo ....................... G06F 16/955 707/748
2014/0136713 A1* 5/2014 Stemeseder ........... H04L 47/822 709/226
2014/0233472 A1* 8/2014 Kadel ................... H04W 28/26 370/329
2014/0282646 A1* 9/2014 McCoy ............. G06K 9/00597 725/12
2014/0309782 A1* 10/2014 Sharpe ................... G05D 21/02 700/266
2014/0321839 A1* 10/2014 Armstrong ............ F24H 9/2021 392/463
2015/0026260 A1 1/2015 Worthley
2015/0046588 A1* 2/2015 Martini ................... H04L 63/18 709/225
2015/0066910 A1* 3/2015 Bleach .................. G06F 16/284 707/722
2015/0121495 A1* 4/2015 Gao ...................... H04W 12/04 726/6
2015/0125147 A1* 5/2015 Zhang ................ H04Q 11/0071 398/58
2015/0178283 A1* 6/2015 Garg ...................... G06Q 50/01 707/754
2015/0178284 A1* 6/2015 Garg ...................... G06Q 50/01 707/748
2015/0178397 A1* 6/2015 Garg ...................... G06Q 50/01 707/722
2015/0220995 A1* 8/2015 Guyot ................ G06Q 30/0269 705/14.66
2015/0262430 A1* 9/2015 Farrelly ................ H04L 67/306 705/13
2015/0296369 A1* 10/2015 Berionne .............. H04W 8/183 455/418
2015/0339335 A1* 11/2015 Luo ................... G06F 16/24578 707/748
2016/0132570 A1* 5/2016 Cathcart ............. G06F 16/9535 707/730
2016/0150260 A1* 5/2016 Ovide ................ H04N 21/2668 725/12
2016/0246890 A1* 8/2016 Garg ................... G06F 16/9535
2016/0275801 A1* 9/2016 Kopardekar ......... G08G 5/0043
2016/0335270 A1* 11/2016 Garg ..................... G06F 16/248
2016/0353274 A1* 12/2016 Chichierchia ........ H04B 1/3816
2017/0034178 A1* 2/2017 Hansen .................. G06Q 10/06
2017/0083180 A1* 3/2017 Nelson .................. G06F 16/252
2017/0115992 A1* 4/2017 Krishnamurthy ..... G06F 9/4403
2017/0134948 A1* 5/2017 Gao ...................... H04W 12/06
2017/0171142 A1* 6/2017 Arquette ................. H04L 51/32
2018/0210886 A1* 7/2018 Garg ................... G06F 16/3323

FOREIGN PATENT DOCUMENTS

CA 2956463 A1 * 6/2015 ....... G06F 16/24578
CN 102004999 A * 4/2011
EP 1736902 A1 * 12/2006 ....... G06F 17/30864
EP 3232344 A1 * 10/2017 ......... G06F 16/2423
JP 200533337 A 12/2005
JP 2005333374 A * 12/2005 ....... H04L 29/12066
JP 2007004807 A * 1/2007 ....... G06F 17/30864

(56) References Cited

FOREIGN PATENT DOCUMENTS

| | | | | | |
|---|---|---|---|---|---|
| JP | 2017102950 A | * | 6/2017 | ....... | G06F 16/24578 |
| JP | 2018113049 A | * | 7/2018 | ....... | G06F 16/24578 |

OTHER PUBLICATIONS

Ioannis Arapakis et al. "Predicting User Engagement with Direct Displays Using Mouse Cursor Information." (2016). Retrieved online Jun. 14, 2022. https://iarapakis.github.io/papers/SIGIR16.pdf (Year: 2016).*

Sitecore. "Engagement Analytics Configuration Reference Guide." (Jan. 2, 2010). Retrieved online Feb. 10, 2023. https://doc.sitecore.com/xp/en/sdnarchive/upload/sitecore6/65/engagement_analytics_configuration_reference_sc65-usletter.pdf (Year: 2010).*

PCT International Preliminary Report on Patentability, PCT US2010/023731, dated Aug. 16, 2011.

Advance E-Mail. PCT Notification Transmittal of International Preliminary Report on Patentability, PCT US2010/023731, dated Aug. 25, 2011.

Joshua Schnell, Macgasm, http://www.macgasm.net/2011/06/09/apple-smartphones-smarter-patent/, Oct. 6, 2011.

PCT Search Report, PCT/US2010/023731, dated Jun. 4, 2010.

D. Bottazzi et al., "Context-Aware Middleware for Anytime, Anywhere Social Networks", IEEE Computer Society, pp. 23-32 (2007).

Miluzzo et al., "Sensing Meets Mobile Social Networks: The Design, Implement. and Evaluat. of the CenceMe Appl.", ACM, Nov. 2008, p. 337.

Mark-Shane Scale."Facebook as a Social Search Engine and the Implications for Libraries in the 21st Century". (Nov. 2008) https://www.researchgate.net/publication/235322898.

* cited by examiner

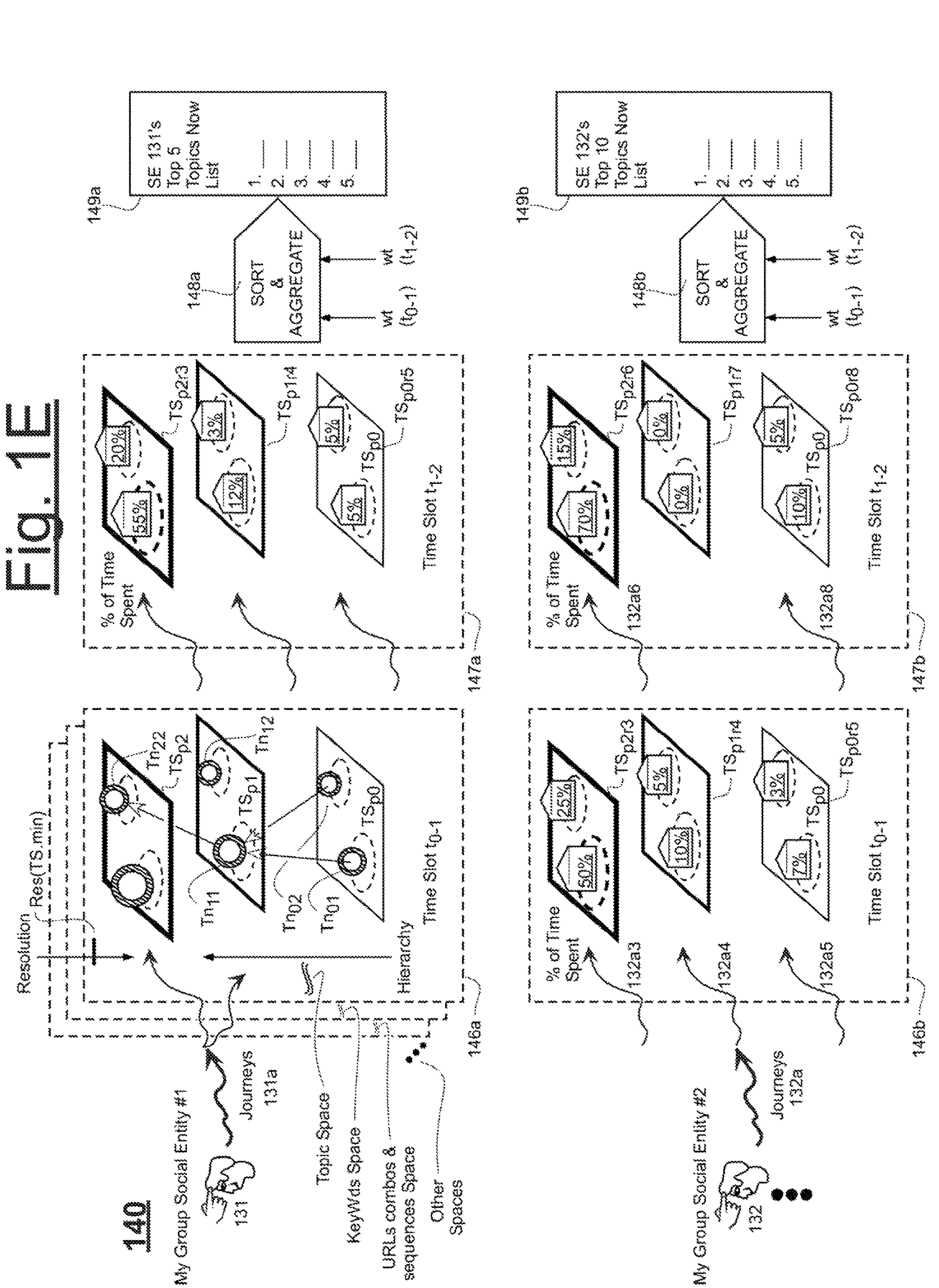
Fig. 1E
140
My Group Social Entity #1
131
Journeys
131a
Topic Space
KeyWds Space
URLs combos &
sequences Space
Other
Spaces
Resolution
Res(TS.min)
Hierarchy
Tn11
Tn02
Tn01
Tn22
Tn12
TSp2
TSp1
TSp0
Time Slot t0-1
146a
% of Time
Spent
55%
20%
12%
3%
5%
5%
TSp2r3
TSp1r4
TSp0r5
TSp0
Time Slot t1-2
147a
148a
SORT
&
AGGREGATE
wt
(t0-1)
wt
(t1-2)
149a
SE 131's
Top 5
Topics Now
List
1.
2.
3.
4.
5.
My Group Social Entity #2
132
Journeys
132a
% of Time
Spent
132a3
132a4
132a5
50%
25%
10%
5%
7%
3%
TSp2r3
TSp1r4
TSp0r5
TSp0
Time Slot t0-1
146b
132a6
132a8
70%
15%
0%
0%
10%
5%
TSp2r6
TSp1r7
TSp0r8
TSp0
Time Slot t1-2
147b
148b
SORT
&
AGGREGATE
wt
(t0-1)
wt
(t1-2)
149b
SE 132's
Top 10
Topics Now
List
1.
2.
3.
4.
5.

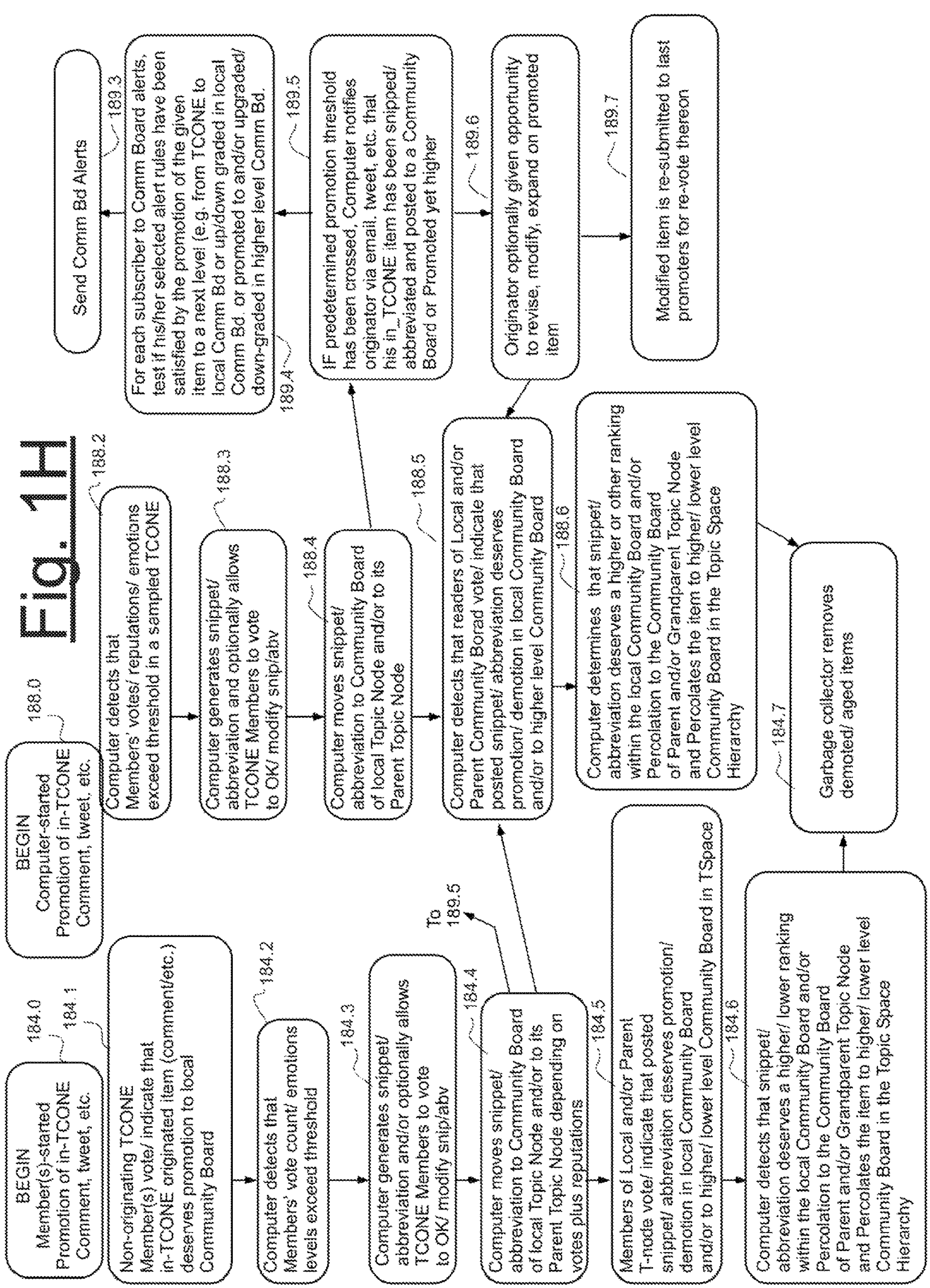

BEGIN Member(s)-started Promotion of in-TCONE Comment, tweet, etc.
184.0
184.1
Non-originating TCONE Member(s) vote/ indicate that in-TCONE originated item (comment/etc.) deserves promotion to local Community Board
184.2
Computer detects that Members' vote count/ emotions levels exceed threshold
184.3
Computer generates snippet/ abbreviation and/or optionally allows TCONE Members to vote to OK/ modify snip/abv
184.4
Computer moves snippet/ abbreviation to Community Board of local Topic Node and/or to its Parent Topic Node depending on votes plus reputations
To 189.5
184.5
Members of Local and/or Parent T-node vote/ indicate that posted snippet/ abbreviation deserves promotion/ demotion in local Community Board and/or to higher/ lower level Community Board in TSpace
184.6
Computer detects that snippet/ abbreviation deserves a higher/ lower ranking within the local Community Board and/or Percolation to the Community Board of Parent and/or Grandparent Topic Node and Percolates the item to higher/ lower level Community Board in the Topic Space Hierarchy
184.7
Garbage collector removes demoted/ aged items
BEGIN Computer-started Promotion of in-TCONE Comment, tweet, etc.
188.0
188.2
Computer detects that Members' votes/ reputations/ emotions exceed threshold in a sampled TCONE
188.3
Computer generates snippet/ abbreviation and optionally allows TCONE Members to vote to OK/ modify snip/abv
188.4
Computer moves snippet/ abbreviation to Community Board of local Topic Node and/or to its Parent Topic Node
188.5
Computer detects that readers of Local and/or Parent Community Borad vote/ indicate that posted snippet/ abbreviation deserves promotion/ demotion in local Community Board and/or to higher level Community Board
188.6
Computer determines that snippet/ abbreviation deserves a higher or other ranking within the local Community Board and/or Percolation to the Community Board of Parent and/or Grandparent Topic Node and Percolates the item to higher/ lower level Community Board in the Topic Space Hierarchy
Fig. 1H
Send Comm Bd Alerts
189.3
For each subscriber to Comm Board alerts, test if his/her selected alert rules have been satisfied by the promotion of the given item to a next level (e.g. from TCONE to local Comm Bd or up/down graded in local Comm Bd, or promoted to and/or upgraded/ down-graded in higher level Comm Bd.
189.4
189.5
IF predetermined promotion threshold has been crossed, Computer notifies originator via email, tweet, etc. that his in_TCONE item has been snipped/ abbreviated and posted to a Community Board or Promoted yet higher
189.6
Originator optionally given opportunity to revise, modify, expand on promoted item
189.7
Modified item is re-submitted to last promoters for re-vote thereon

100"

100'''

100.4

100.M

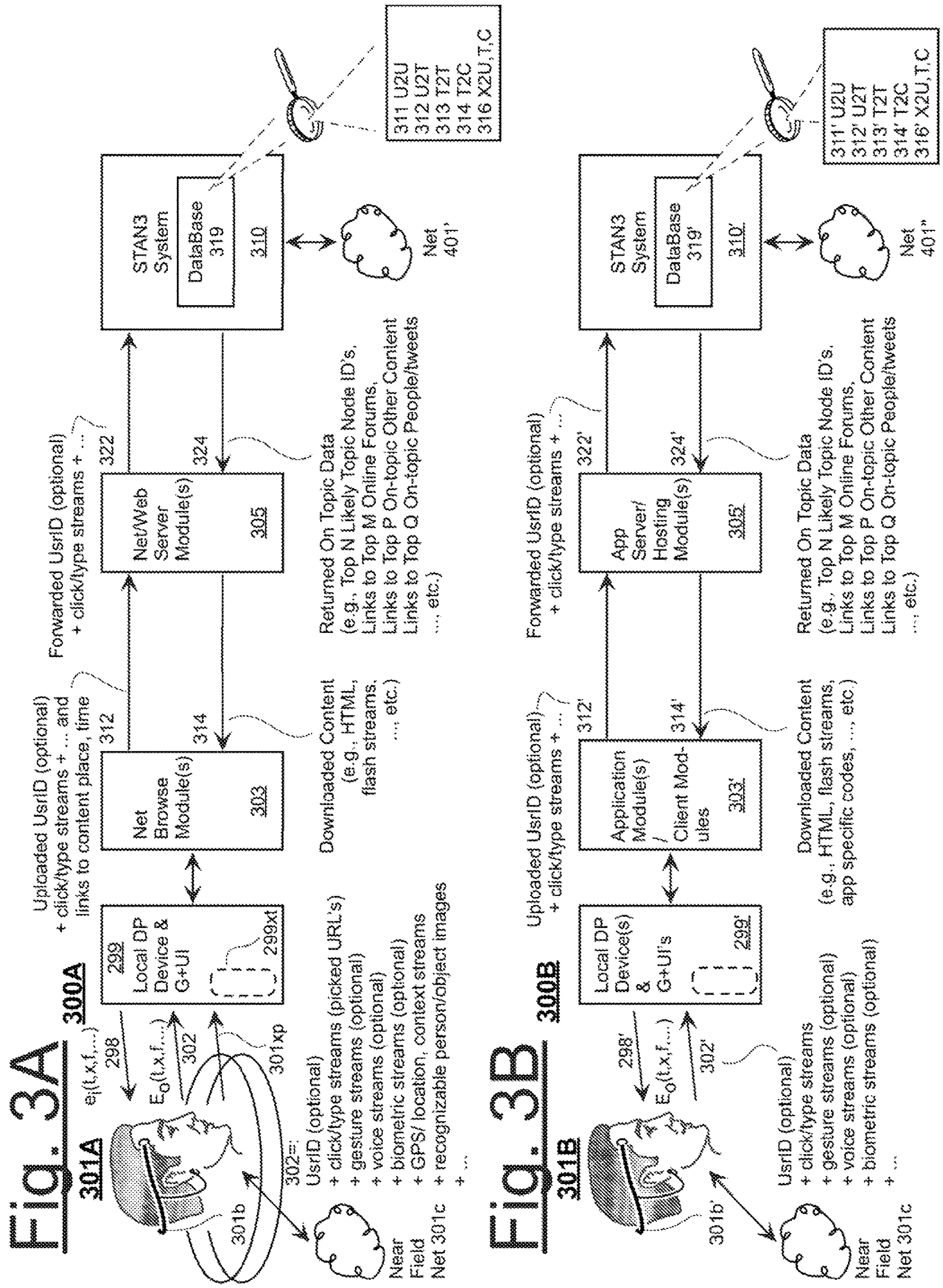
Fig. 3A
300A
301A
Local DP Device & G+UI
299
299xt
Net Browse Module(s)
303
Net/Web Server Module(s)
305
STAN3 System
DataBase 319
310
311 U2U
312 U2T
313 T2T
314 T2C
316 X2U,T,C
Net 401'
298
302
301xp
301b
Near Field Net 301c
Uploaded UsrID (optional) + click/type streams + ... and links to content place, time
312
314
Forwarded UsrID (optional) + click/type streams + ...
322
324
Downloaded Content (e.g., HTML, flash streams, ..., etc.)
Returned On Topic Data (e.g., Top N Likely Topic Node ID's, Links to Top M Online Forums, Links to Top P On-topic Other Content Links to Top Q On-topic People/tweets ..., etc.)
302=: UsrID (optional) + click/type streams (picked URL's) + gesture streams (optional) + voice streams (optional) + biometric streams (optional) + GPS/ location, context streams + recognizable person/object images + ...
Fig. 3B
300B
301B
Local DP Device(s) & G+UI's
299'
Application Module(s) / Client Modules
303'
App Server/ Hosting Module(s)
305'
STAN3 System
DataBase 319'
310'
311' U2U
312' U2T
313' T2T
314' T2C
316' X2U,T,C
Net 401"
298'
302'
301b'
Near Field Net 301c
Uploaded UsrID (optional) + click/type streams + ...
312'
314'
Forwarded UsrID (optional) + click/type streams + ...
322'
324'
Downloaded Content (e.g., HTML, flash streams, app specific codes, ..., etc.)
Returned On Topic Data (e.g., Top N Likely Topic Node ID's, Links to Top M Online Forums, Links to Top P On-topic Other Content Links to Top Q On-topic People/tweets ..., etc.)
UsrID (optional) + click/type streams + gesture streams (optional) + voice streams (optional) + biometric streams (optional) + ...

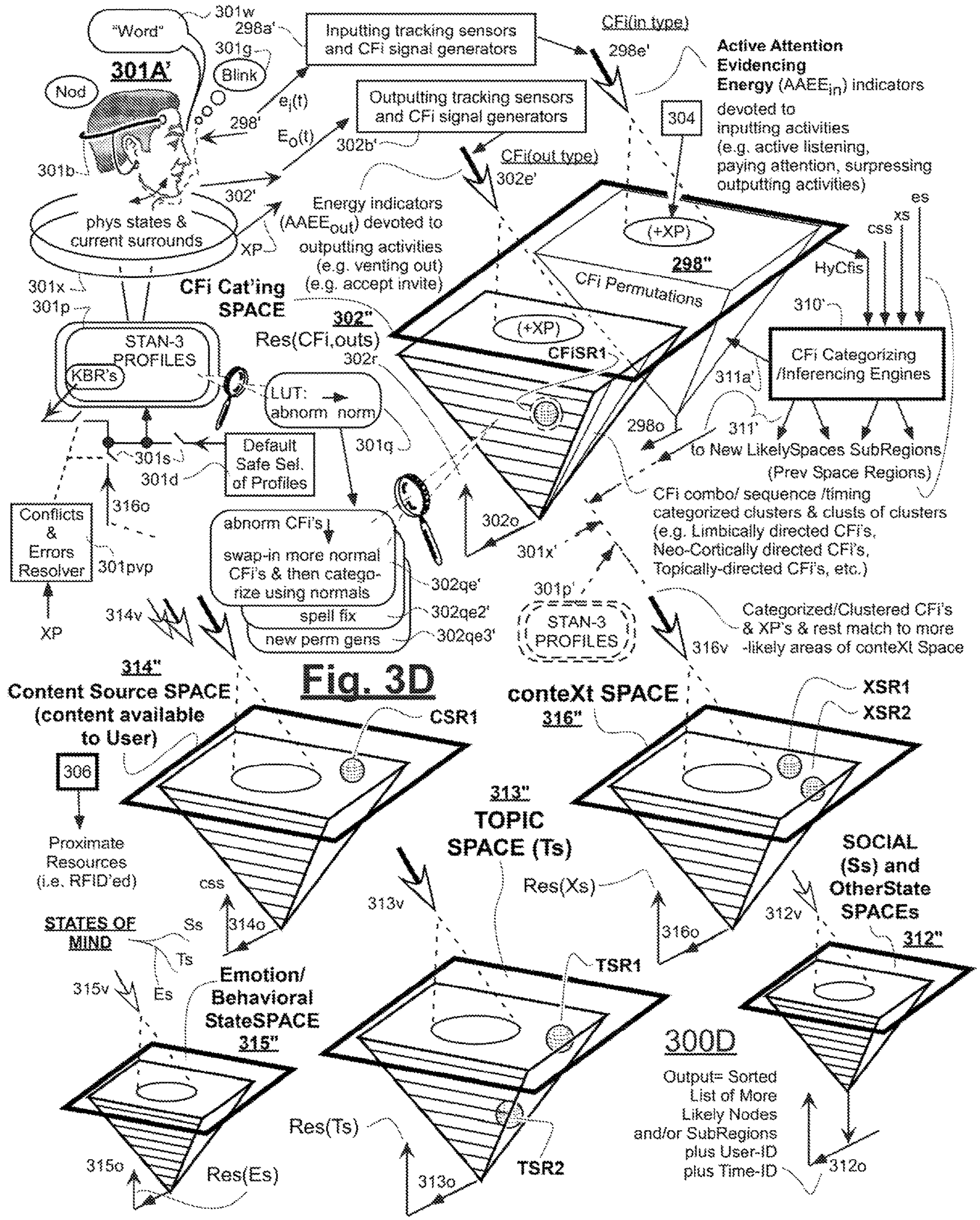

"Word"
301w
298a'
301g
Blink
Nod
301A'
Inputting tracking sensors and CFi signal generators
Outputting tracking sensors and CFi signal generators
CFi(in type)
298e'
Active Attention Evidencing Energy (AAEEin) indicators devoted to inputting activities (e.g. active listening, paying attention, surpressing outputting activities)
304
298'
302b'
CFi(out type)
302e'
301b
302'
phys states & current surrounds
XP
Energy indicators (AAEEout) devoted to outputting activities (e.g. venting out) (e.g. accept invite)
(+XP)
298"
css
xs
es
HyCfis
CFi Permutations
301x
301p
CFi Cat'ing SPACE
302"
Res(CFi,outs)
302r
(+XP)
CFiSR1
310'
CFi Categorizing /Inferencing Engines
311a'
STAN-3 PROFILES
KBR's
LUT: abnorm norm
301q
298o
311'
to New LikelySpaces SubRegions (Prev Space Regions)
301s
301d
Default Safe Sel. of Profiles
CFi combo/ sequence /timing categorized clusters & clusts of clusters (e.g. Limbically directed CFi's, Neo-Cortically directed CFi's, Topically-directed CFi's, etc.)
316o
Conflicts & Errors Resolver
301pvp
abnorm CFi's
swap-in more normal CFi's & then categorize using normals
302o
301x'
302qe'
spell fix
302qe2'
new perm gens
302qe3'
301p'
STAN-3 PROFILES
Categorized/Clustered CFi's & XP's & rest match to more -likely areas of conteXt Space
XP
314v
316v
314"
Content Source SPACE (content available to User)
Fig. 3D
conteXt SPACE
316"
XSR1
XSR2
CSR1
306
Proximate Resources (i.e. RFID'ed)
313"
TOPIC SPACE (Ts)
Res(Xs)
css
314o
313v
SOCIAL (Ss) and OtherState SPACEs
312v
312"
STATES OF MIND
Ss
Ts
Es
315v
Emotion/ Behavioral StateSPACE
315"
TSR1
316o
300D
Output= Sorted List of More Likely Nodes and/or SubRegions plus User-ID plus Time-ID
Res(Ts)
TSR2
315o
Res(Es)
313o
312o

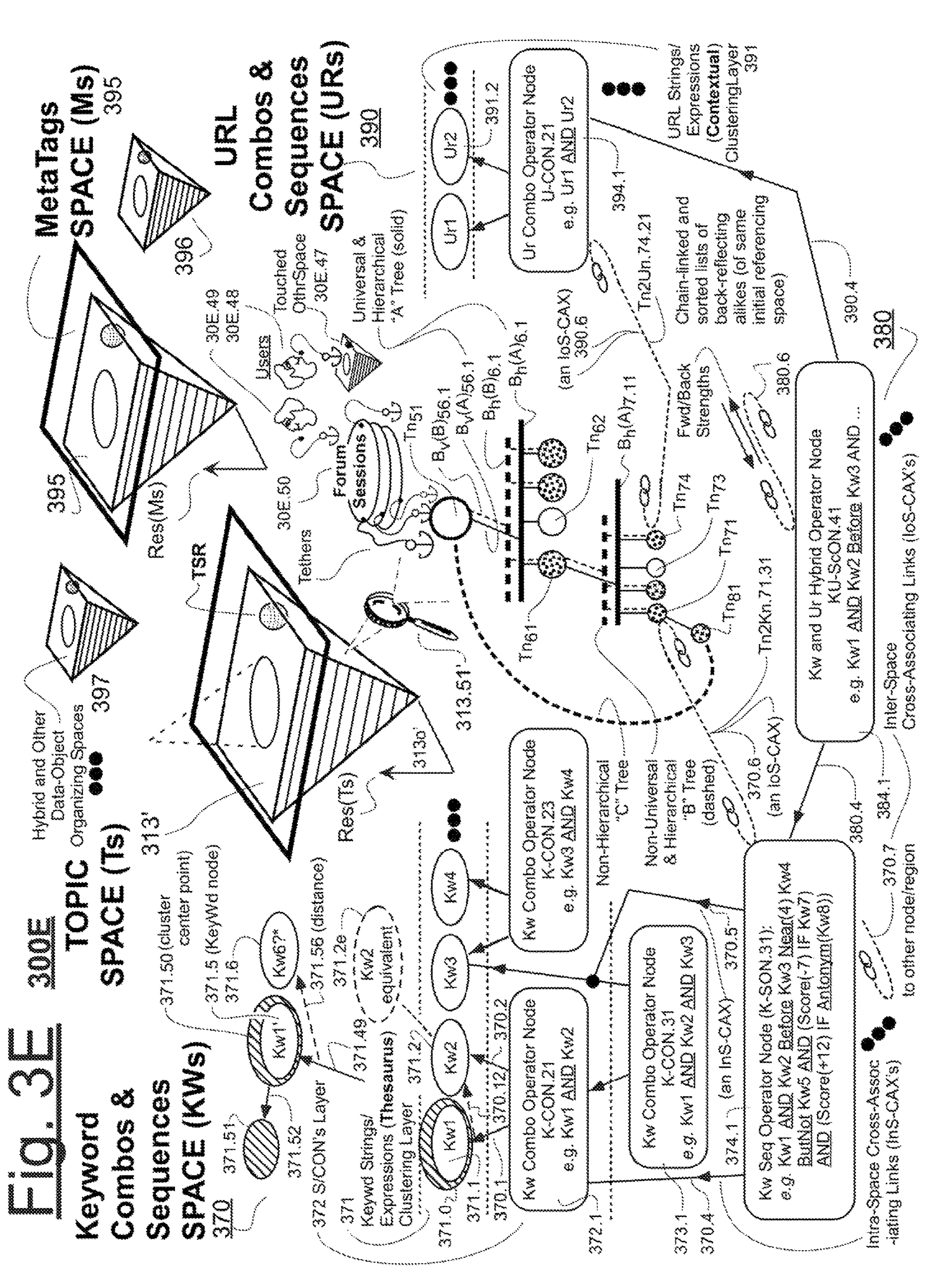
Fig. 3E
300E
Keyword Combos & Sequences SPACE (KWs) 370
TOPIC SPACE (Ts)
Hybrid and Other Data-Object Organizing Spaces
397
MetaTags SPACE (Ms)
395
396
URL Combos & Sequences SPACE (URs) 390
313'
313o'
313.51'
Res(Ts)
TSR
Res(Ms)
395
Tethers
30E.50
Forum Sessions
Users
30E.49
30E.48
Touched OthrSpace 30E.47
Universal & Hierarchical "A" Tree (solid)
Non-Hierarchical "C" Tree
Non-Universal & Hierarchical "B" Tree (dashed)
Tn51
Tn61
Tn62
Tn71
Tn73
Tn74
Tn81
Tn2Kn.71.31
Tn2Un.74.21
Fwd/Back Strengths
Chain-linked and sorted lists of back-reflecting alikes (of same initial referencing space)
(an IoS-CAX) 390.6
370.6 (an IoS-CAX)
380.6
390.4
394.1
391.2
Ur1
Ur2
Ur Combo Operator Node U-CON.21 e.g. Ur1 AND Ur2
URL Strings/ Expressions (Contextual) ClusteringLayer 391
Kw and Ur Hybrid Operator Node KU-ScON.41 e.g. Kw1 AND Kw2 Before Kw3 AND ...
380
380.4
384.1
Inter-Space Cross-Associating Links (IoS-CAX's)
372 S/CON's Layer
371 Keywd Strings/ Expressions (Thesaurus) Clustering Layer
371.51
371.52
371.50 (cluster center point)
371.5 (KeyWd node)
371.6
Kw6?*
371.56 (distance)
371.2e
Kw2 equivalent
371.49
371.2
371.0
371.1
370.1
370.12
370.2
Kw1
Kw1'
Kw2
Kw3
Kw4
Kw Combo Operator Node K-CON.21 e.g. Kw1 AND Kw2
Kw Combo Operator Node K-CON.31 e.g. Kw1 AND Kw2 AND Kw3
Kw Combo Operator Node K-CON.23 e.g. Kw3 AND Kw4
(an InS-CAX)
370.5
Kw Seq Operator Node (K-SON.31): e.g. Kw1 AND Kw2 Before Kw3 Near(4) Kw4 ButNot Kw5 AND (Score(-7) IF Kw7) AND (Score(+12) IF Antonym(Kw8))
370.7 to other node/region
372.1
373.1
370.4
374.1
Intra-Space Cross-Associating Links (InS-CAX's)

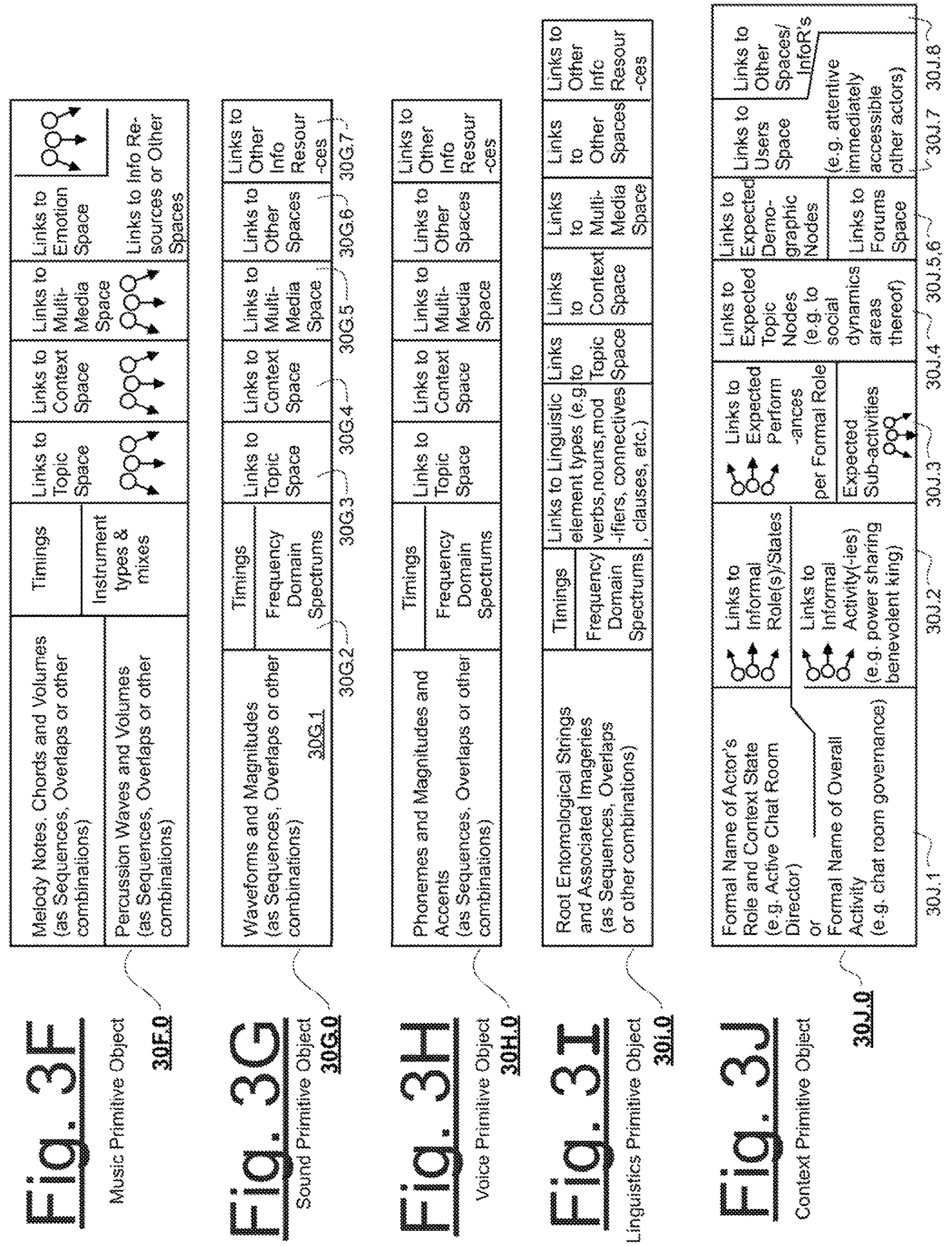

Fig. 3E
Music Primitive Object
30F.0
Melody Notes, Chords and Volumes (as Sequences, Overlaps or other combinations)
Percussion Waves and Volumes (as Sequences, Overlaps or other combinations)
Timings
Instrument types & mixes
Links to Topic Space
Links to Context Space
Links to Multi-Media Space
Links to Emotion Space
Links to Info Re-sources or Other Spaces
Fig. 3G
Sound Primitive Object
30G.0
Waveforms and Magnitudes (as Sequences, Overlaps or other combinations)
30G.1
Timings
Frequency Domain Spectrums
Links to Topic Space
Links to Context Space
Links to Multi-Media Space
Links to Other Spaces
Links to Other Info Resour -ces
30G.2
30G.3
30G.4
30G.5
30G.6
30G.7
Fig. 3H
Voice Primitive Object
30H.0
Phonemes and Magnitudes and Accents (as Sequences, Overlaps or other combinations)
Timings
Frequency Domain Spectrums
Links to Topic Space
Links to Context Space
Links to Multi-Media Space
Links to Other Spaces
Links to Other Info Resour -ces
Fig. 3I
Linguistics Primitive Object
30I.0
Root Entomological Strings and Associated Imageries (as Sequences, Overlaps or other combinations)
Timings
Frequency Domain Spectrums
Links to Linguistic element types (e.g verbs,nouns,mod -ifiers, connectives , clauses, etc.)
Links to Topic Space
Links to Context Space
Links to Multi-Media Space
Links to Other Spaces
Links to Other Info Resour -ces
Fig. 3J
Context Primitive Object
30J.0
Formal Name of Actor's Role and Context State (e.g. Active Chat Room Director) or Formal Name of Overall Activity (e.g. chat room governance)
Links to Informal Role(s)/States
Links to Informal Activity(-ies) (e.g. power sharing benevolent king)
Links to Expected Perform -ances per Formal Role
Expected Sub-activities
Links to Expected Topic Nodes (e.g. to social dynamics areas thereof)
Links to Expected Demo-graphic Nodes
Links to Forums Space
Links to Users Space (e.g. attentive immediately accessible other actors)
Links to Other Spaces/ InfoR's
30J.1
30J.2
30J.3
30J.4
30J.5,6
30J.7
30J.8

Entity Focus Defining Object (e.g., Probable Mindset of ID'd User)

Hybrid Space Objects Complex 30L.0

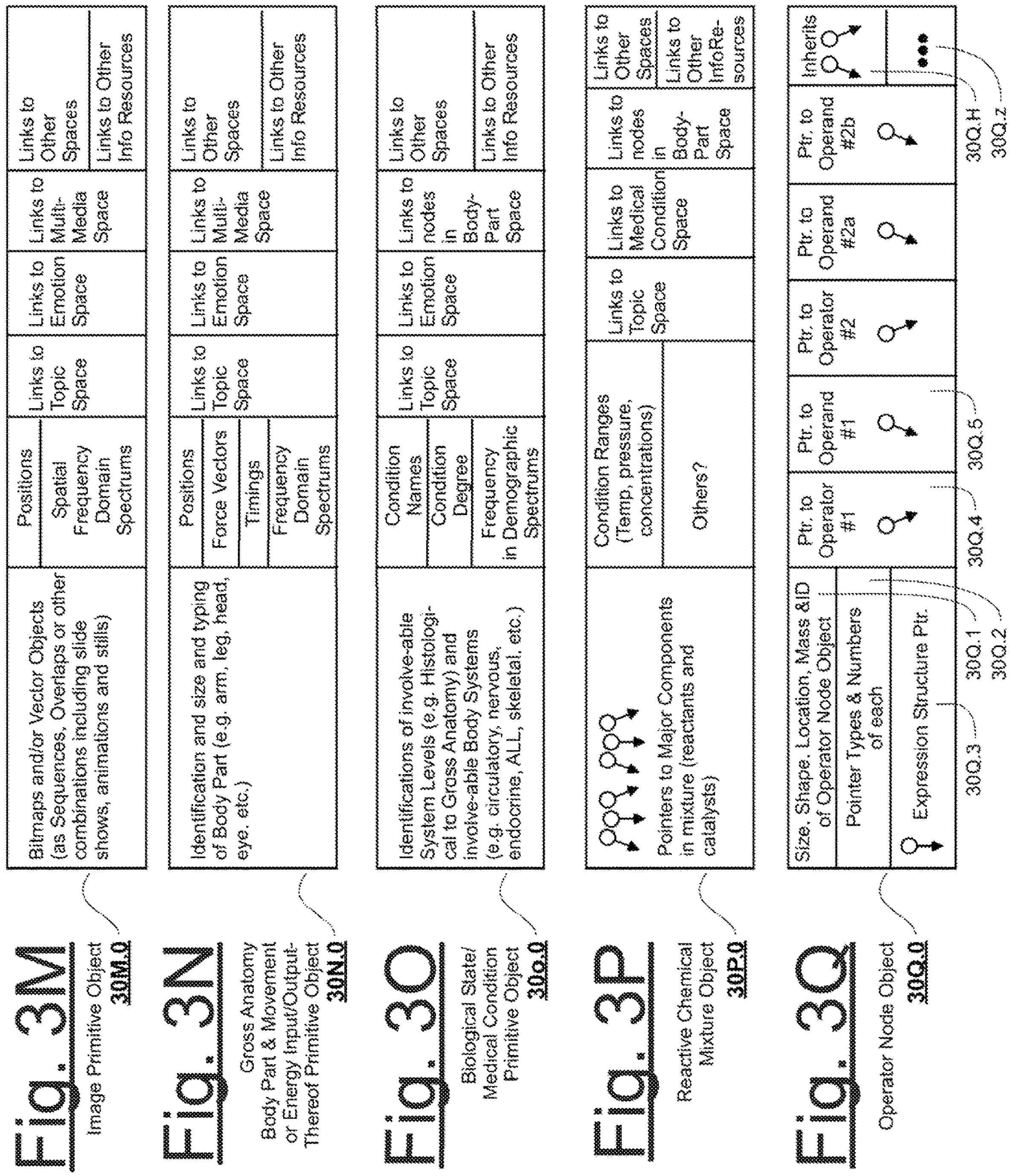
Fig. 3M
Image Primitive Object
30M.0
Bitmaps and/or Vector Objects (as Sequences, Overlaps or other combinations including slide shows, animations and stills)
Positions
Spatial Frequency Domain Spectrums
Links to Topic Space
Links to Emotion Space
Links to Multi-Media Space
Links to Other Spaces
Links to Other Info Resources
Fig. 3N
Gross Anatomy Body Part & Movement or Energy Input/Output-Thereof Primitive Object
30N.0
Identification and size and typing of Body Part (e.g. arm, leg, head, eye. etc.)
Positions
Force Vectors
Timings
Frequency Domain Spectrums
Links to Topic Space
Links to Emotion Space
Links to Multi-Media Space
Links to Other Spaces
Links to Other Info Resources
Fig. 3O
Biological State/ Medical Condition Primitive Object
30o.0
Identifications of involve-able System Levels (e.g. Histological to Gross Anatomy) and involve-able Body Systems (e.g. circulatory, nervous, endocrine, ALL, skeletal, etc.)
Condition Names
Condition Degree
Frequency in Demographic Spectrums
Links to Topic Space
Links to Emotion Space
Links to nodes in Body-Part Space
Links to Other Spaces
Links to Other Info Resources
Fig. 3P
Reactive Chemical Mixture Object
30P.0
Pointers to Major Components in mixture (reactants and catalysts)
Condition Ranges (Temp, pressure, concentrations)
Others?
Links to Topic Space
Links to Medical Condition Space
Links to nodes in Body-Part Space
Links to Other Spaces
Links to Other InfoRe-sources
Fig. 3Q
Operator Node Object
30Q.0
Size, Shape, Location, Mass &ID of Operator Node Object
Pointer Types & Numbers of each
Expression Structure Ptr.
Ptr. to Operator #1
Ptr. to Operand #1
Ptr. to Operator #2
Ptr. to Operand #2a
Ptr. to Operand #2b
Inherits
30Q.1
30Q.2
30Q.3
30Q.4
30Q.5
30Q.H
30Q.z A Cylindric Branch Region within Topic Space (and Part of the Universal "A" Tree)

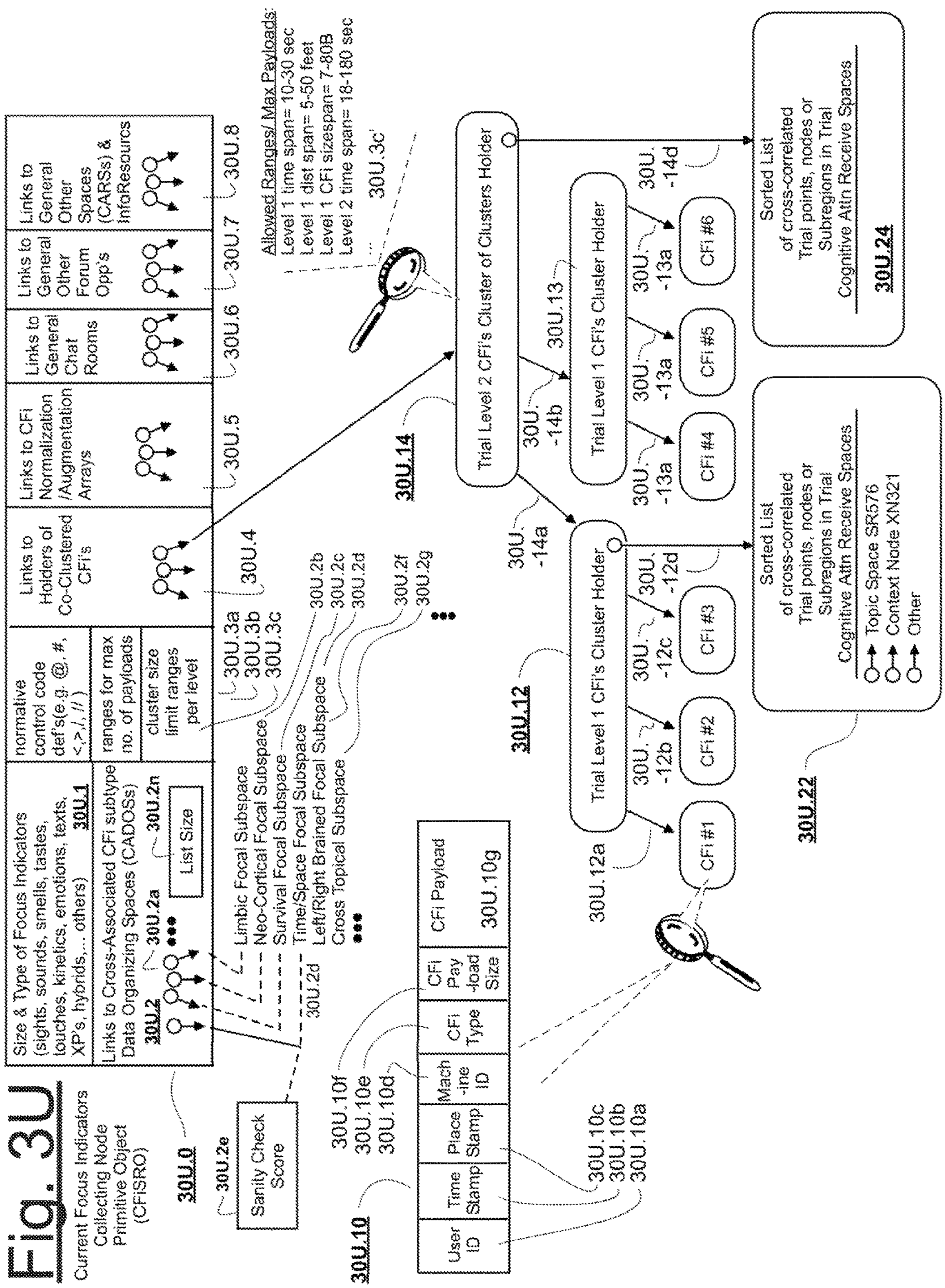
Fig. 3U
Current Focus Indicators Collecting Node Primitive Object (CFiSRO)
30U.0
Size & Type of Focus Indicators (sights, sounds, smells, tastes, touches, kinetics, emotions, texts, XP's, hybrids,... others)
30U.1
Links to Cross-Associated CFi subtype Data Organizing Spaces (CADOSs)
30U.2
30U.2a
30U.2n
List Size
normative control code def's(e.g. @, #, <,>/, //)
ranges for max no. of payloads
cluster size limit ranges per level
30U.3a
30U.3b
30U.3c
Links to Holders of Co-Clustered CFi's
30U.4
Links to CFi Normalization /Augmentation Arrays
30U.5
Links to General Chat Rooms
30U.6
Links to General Other Forum Opp's
30U.7
Links to General Other Spaces (CARSs) & InfoResourcs
30U.8
Limbic Focal Subspace
Neo-Cortical Focal Subspace
Survival Focal Subspace
Time/Space Focal Subspace
Left/Right Brained Focal Subspace
Cross Topical Subspace
30U.2b
30U.2c
30U.2d
30U.2f
30U.2g
30U.2d
30U.2e
Sanity Check Score
Allowed Ranges/ Max Payloads:
Level 1 time span= 10-30 sec
Level 1 dist span= 5-50 feet
Level 1 CFi sizespan= 7-80B
Level 2 time span= 18-180 sec
30U.3c'
Trial Level 2 CFi's Cluster of Clusters Holder
30U.14
30U.13
30U. -14a
30U. -14b
30U. -14d
Trial Level 1 CFi's Cluster Holder
30U.12
30U.12a
30U. -12b
30U. -12c
30U. -12d
30U. -13a
CFi #1
CFi #2
CFi #3
CFi #4
CFi #5
CFi #6
Sorted List of cross-correlated Trial points, nodes or Subregions in Trial Cognitive Attn Receive Spaces
Topic Space SR576
Context Node XN321
Other
30U.22
30U.24
30U.10
User ID
Time Stamp
Place Stamp
Mach -ine ID
CFi Type
CFi Pay -load Size
CFi Payload
30U.10g
30U.10a
30U.10b
30U.10c
30U.10d
30U.10e
30U.10f

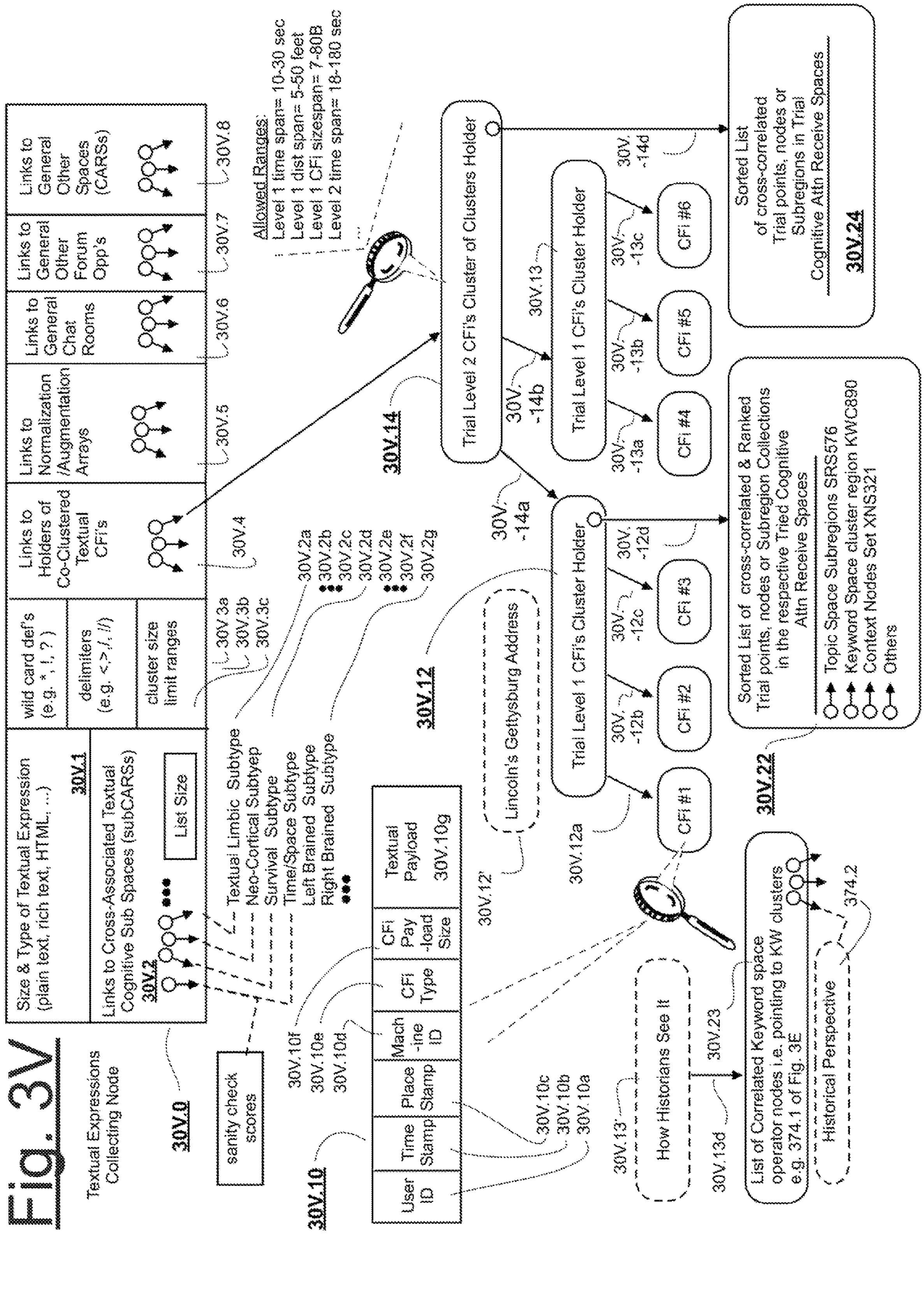
Fig. 3V
Textual Expressions Collecting Node
30V.0
Size & Type of Textual Expression (plain text, rich text, HTML, ...)
30V.1
Links to Cross-Associated Textual Cognitive Sub Spaces (subCARSs)
30V.2
List Size
wild card def's (e.g. *, !, ? )
delimiters (e.g. <,>/,.!/)
cluster size limit ranges
30V.3a
30V.3b
30V.3c
Links to Holders of Co-Clustered Textual CFi's
30V.4
Links to Normalization /Augmentation Arrays
30V.5
Links to General Chat Rooms
30V.6
Links to General Other Forum Opp's
30V.7
Links to General Other Spaces (CARSs)
30V.8
sanity check scores
Textual Limbic Subtype
Neo-Cortical Subtyep
Survival Subtype
Time/Space Subtype
Left Brained Subtype
Right Brained Subtype
30V.2a
30V.2b
30V.2c
30V.2d
30V.2e
30V.2f
30V.2g
Allowed Ranges:
Level 1 time span= 10-30 sec
Level 1 dist span= 5-50 feet
Level 1 CFi sizespan= 7-80B
Level 2 time span= 18-180 sec
30V.10
User ID
Time Stamp
Place Stamp
Mach -ine ID
CFi Type
CFi Pay -load Size
Textual Payload
30V.10g
30V.10a
30V.10b
30V.10c
30V.10d
30V.10e
30V.10f
Lincoln's Gettysburg Address
30V.12'
30V.12
Trial Level 1 CFi's Cluster Holder
30V.12a
30V.-12b
30V.-12c
30V.-12d
CFi #1
CFi #2
CFi #3
30V.14
Trial Level 2 CFi's Cluster of Clusters Holder
30V.-14a
30V.-14b
30V.-14d
30V.13
Trial Level 1 CFi's Cluster Holder
30V.-13a
30V.-13b
30V.-13c
CFi #4
CFi #5
CFi #6
Sorted List of cross-correlated Trial points, nodes or Subregions in Trial Cognitive Attn Receive Spaces
30V.24
Sorted List of cross-correlated & Ranked Trial points, nodes or Subregion Collectives in the respective Tried Cognitive Attn Receive Spaces
Topic Space Subregions SRS576
Keyword Space cluster region KWC890
Context Nodes Set XNS321
Others
30V.22
How Historians See It
30V.13'
30V.13d
30V.23
List of Correlated Keyword space operator nodes i.e. pointing to KW clusters e.g. 374.1 of Fig. 3E
Historical Perspective
374.2

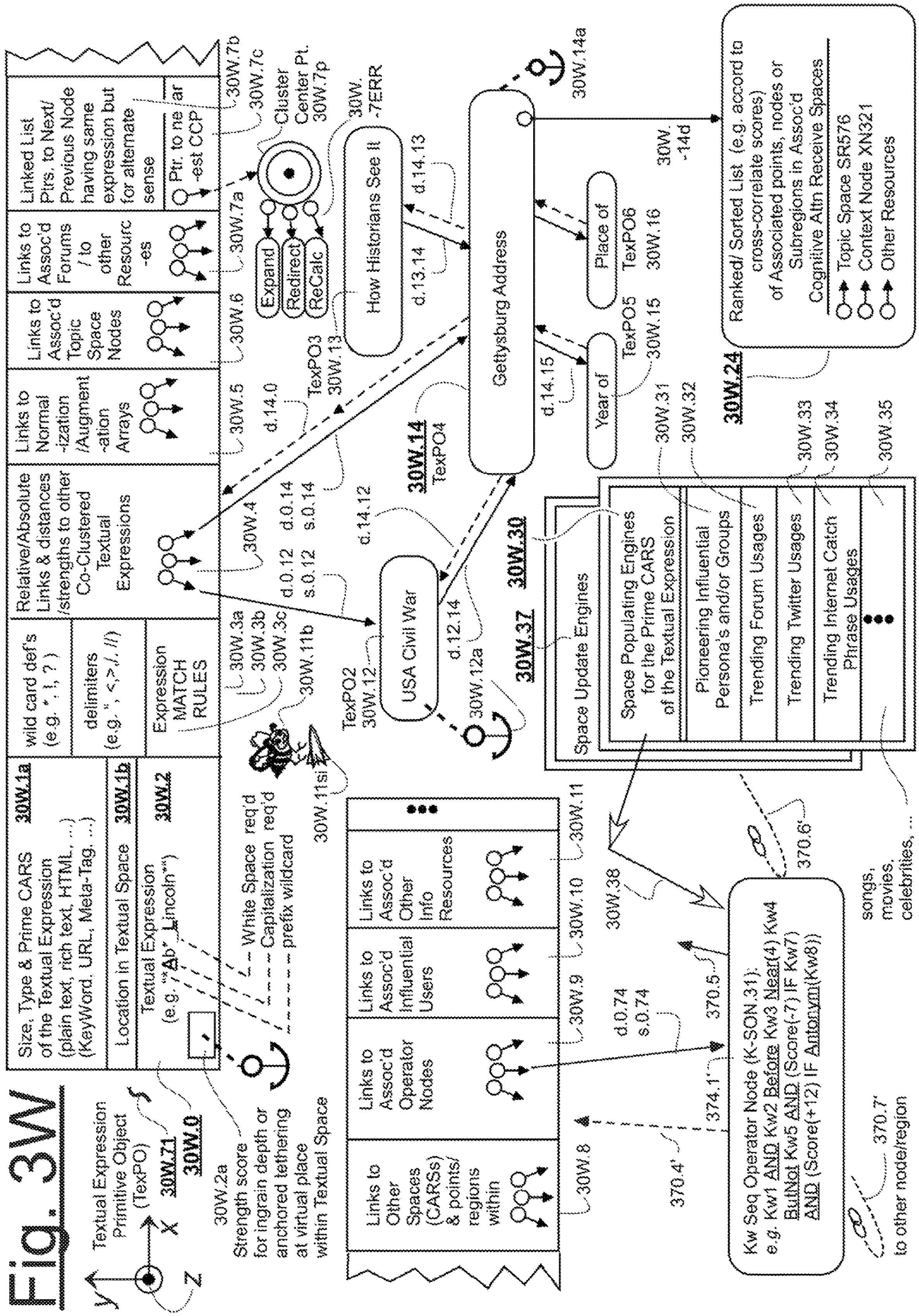
Fig. 3W
Textual Expression Primitive Object (TexPO)
30W.71
30W.0
Size, Type & Prime CARS of the Textual Express ion (plain text, rich text, HTML, ...) (KeyWord. URL, Meta-Tag. ...)
30W.1a
Location in Textual Space
30W.1b
Textual Expression (e.g. "Ab" Lincoln")
30W.2
White Space req'd
Capitalization req'd
prefix wildcard
30W.2a
Strength score for ingrain depth or anchored tethering at virtual place within Textual Space
wild card def's (e.g. *, !, ?)
delimiters (e.g. ", <>/, //)
Expression MATCH RULES
30W.3a
30W.3b
30W.3c
30W.11b
30W.11si
Relative/Absolute Links & distances /strengths to other Co-Clustered Textual Expressions
30W.4
Links to Normal -ization /Augment -ation Arrays
30W.5
Links to Assoc'd Topic Space Nodes
30W.6
Links to Assoc'd Forums / to other Resourc -es
30W.7a
Linked List Ptrs. to Next/ Previous Node having same expression but for alternate sense
Ptr. to nearest CCP
30W.7b
30W.7c
Cluster Center Pt. 30W.7p
30W. -7ERR
Expand
Redirect
ReCalc
How Historians See It
TexPO3 30W.13
d.13.14
d.14.13
d.14.0
Gettysburg Address
30W.14
TexPO4
30W.14a
30W. -14d
Place of
TexPO6 30W.16
Year of
TexPO5 30W.15
d.14.15
d.0.12 s.0.12
d.0.14 s.0.14
d.14.12
USA Civil War
TexPO2 30W.12
d.12.14
30W.12a
30W.30
30W.37
Space Update Engines
Space Populating Engines for the Prime CARS of the Textual Expression
Pioneering Influential Persona's and/or Groups
Trending Forum Usages
Trending Twitter Usages
Trending Internet Catch Phrase Usages
30W.31
30W.32
30W.33
30W.34
30W.35
Ranked/ Sorted List (e.g. accord to cross-correlate scores) of Associated points, nodes or Subregions in Assoc'd Cognitive Attn Receive Spaces
Topic Space SR576
Context Node XN321
Other Resources
30W.24
Links to Other Spaces (CARSs) & points/ regions within
30W.8
Links to Assoc'd Operator Nodes
30W.9
Links to Assoc'd Influential Users
30W.10
Links to Assoc'd Other Info Resources
30W.11
d.0.74 s.0.74
30W.38
370.5
370.6'
370.4'
374.1'
Kw Seq Operator Node (K-SON.31): e.g. Kw1 AND Kw2 Before Kw3 Near(4) Kw4 ButNot Kw5 AND (Score(-7) IF Kw7) AND (Score(+12) IF Antonym(Kw8))
songs, movies, celebrities, ...
370.7' to other node/region

| Node: | $Tn_{71}'$ | $Tn_{72}'$ | $Tn_{73}'$ | $Tn_{74}'$ |
|---|---|---|---|---|
| **Attribute:** Member of B tree? | Yes | No | Yes | Yes |
| Member of C tree? | No | No | No | No |
| Number of A tree child nodes= | 3 | None | None | None |
| Number of B tree child nodes= | 1 | 5 | None | None |
| ... | | | | |
| Links to nodes/ subregions in KW Space = | Lnk71.K57 Lnk71.K85 ... | Lnk72.K57 Lnk72.K33 ... | None | None |
| Links to nodes/ subregions in UR Space = | Lnk71.U68 Lnk71.U96 ... | None | Lnk73.U45 Lnk73.U43 ... | None |
| ... | ... | ... | ... | ... |

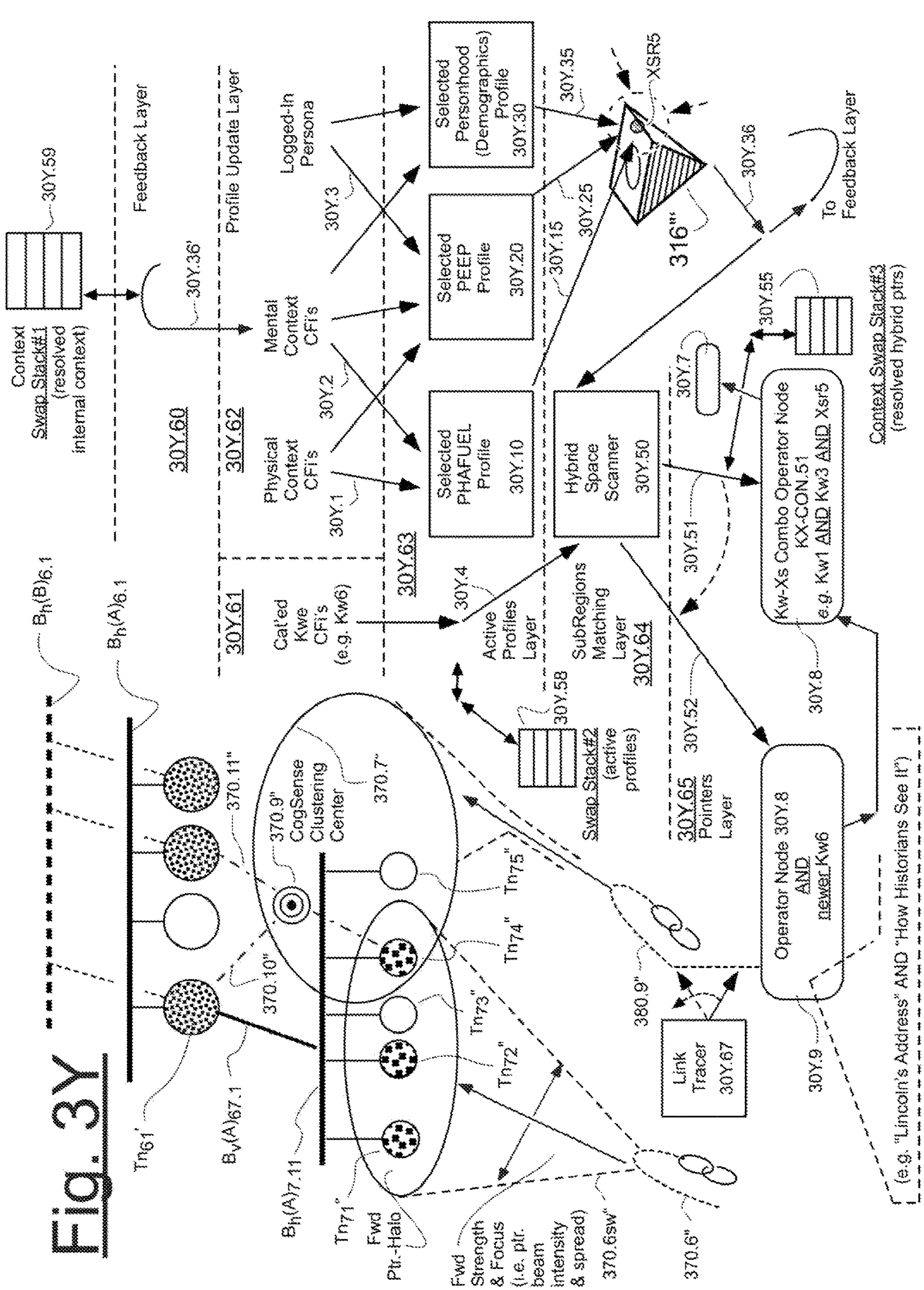

Fig. 3Y
Context Swap Stack#1 (resolved internal context)
30Y.59
Feedback Layer
30Y.36'
30Y.60
Profile Update Layer
30Y.62
Physical Context CFi's
Mental Context CFi's
Logged-In Persona
30Y.1
30Y.2
30Y.3
Selected PHAFUEL Profile 30Y.10
Selected PEEP Profile 30Y.20
Selected Personhood (Demographics) Profile 30Y.30
30Y.15
30Y.25
30Y.35
XSR5
316'''
30Y.36
To Feedback Layer
30Y.61
Cat'ed Kwe CFi's (e.g. Kw6)
30Y.63
30Y.4
Active Profiles Layer
Hybrid Space Scanner 30Y.50
SubRegions Matching Layer
30Y.64
30Y.51
30Y.7
30Y.55
Context Swap Stack#3 (resolved hybrid ptrs)
Kw-Xs Combo Operator Node KX-CON.51 e.g. Kw1 AND Kw3 AND Xsr5
30Y.8
30Y.58
Swap Stack#2 (active profiles)
30Y.52
30Y.65 Pointers Layer
Operator Node 30Y.8 AND newer Kw6
30Y.9
(e.g. "Lincoln's Address" AND "How Historians See It")
Link Tracer 30Y.67
380.9"
$B_h(B)_{6.1}$
$B_h(A)_{6.1}$
370.11"
370.9" CogSense Clustering Center
370.7"
370.10"
$Tn_{61}'$
$B_v(A)_{67.1}$
$B_h(A)_{7.11}$
$Tn_{71}"$
$Tn_{72}"$
$Tn_{73}"$
$Tn_{74}"$
$Tn_{75}"$
Fwd Ptr.-Halo
Fwd Strength & Focus (i.e. ptr. beam intensity & spread)
370.6sw"
370.6"

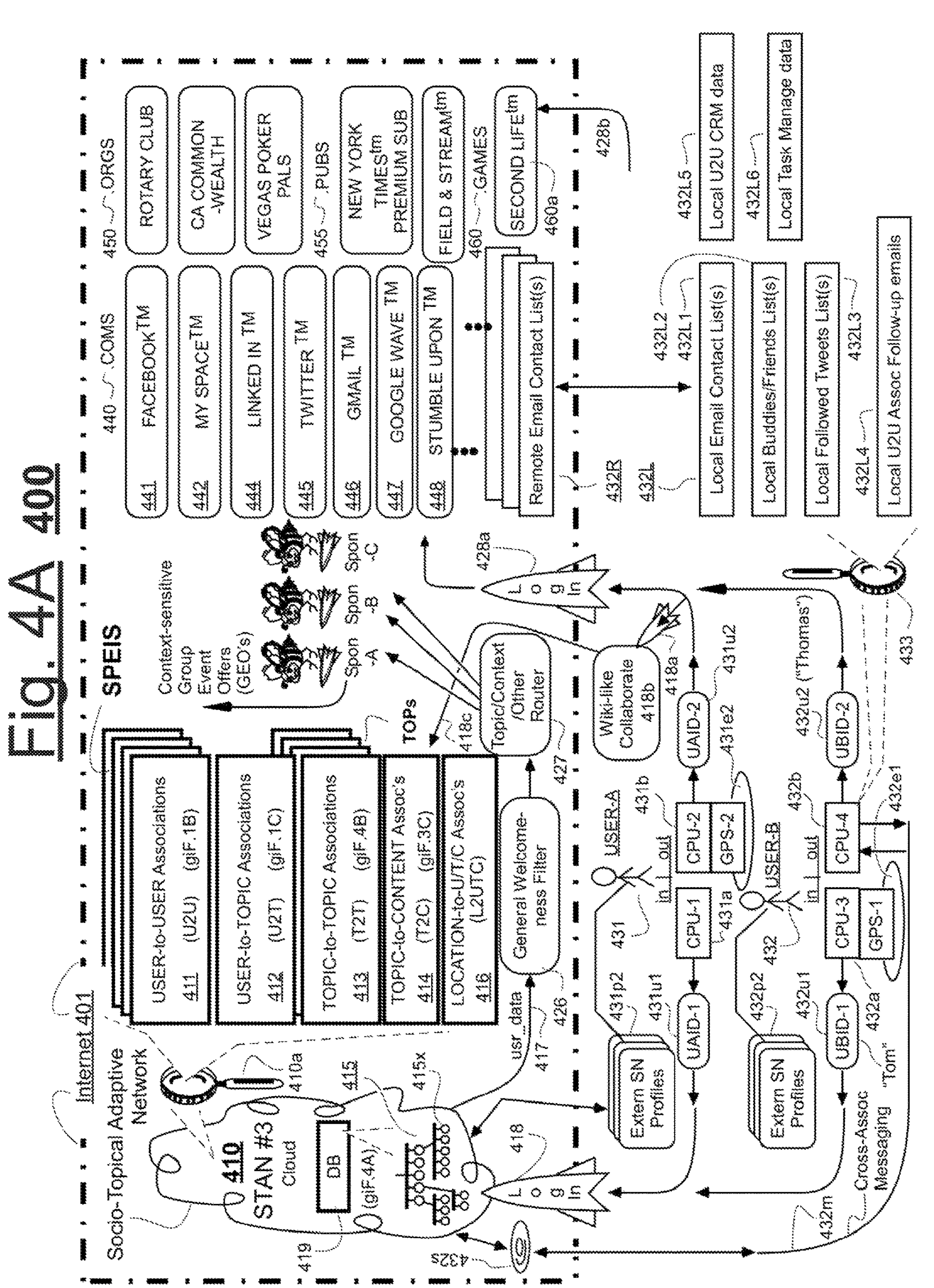
Fig. 4A 400
SPEIS
Socio-Topical Adaptive Network
Internet 401
410 STAN #3 Cloud
DB
(giF.4A)
410a
415
415x
419
418
432s
USER-to-USER Associations 411 (U2U) (giF.1B)
USER-to-TOPIC Associations 412 (U2T) (giF.1C)
TOPIC-to-TOPIC Associations 413 (T2T) (giF.4B)
TOPIC-to-CONTENT Assoc's 414 (T2C) (giF.3C)
LOCATION-to-U/T/C Assoc's 416 (L2UTC)
TOPs
General Welcome-ness Filter
426
usr_data
417
Topic/Context /Other Router
427
418c
Context-sensitive Group Event Offers (GEO's)
Spon -A
Spon -B
Spon -C
Wiki-like Collaborate 418b
418a
428a
428b
440 .COMS
441 FACEBOOK™
442 MY SPACE™
444 LINKED IN ™
445 TWITTER ™
446 GMAIL ™
447 GOOGLE WAVE ™
448 STUMBLE UPON ™
450 .ORGS
ROTARY CLUB
CA COMMON -WEALTH
VEGAS POKER PALS
455 .PUBS
NEW YORK TIMES™ PREMIUM SUB
FIELD & STREAM™
460 .GAMES
SECOND LIFE™
460a
Remote Email Contact List(s)
432R
432L
432L1
432L2
Local Email Contact List(s)
Local Buddies/Friends List(s)
432L3
Local Followed Tweets List(s)
432L4
Local U2U Assoc Follow-up emails
432L5
Local U2U CRM data
432L6
Local Task Manage data
USER-A
431
in | out
CPU-1
CPU-2
GPS-2
431a
431b
431e2
431u2
UAID-1
UAID-2
431p2
431u1
Extern SN Profiles
USER-B
432
CPU-3
CPU-4
GPS-1
432a
432b
432e1
432u2 ("Thomas")
UBID-1
UBID-2
432p2
432u1
"Tom"
433
432m
Cross-Assoc Messaging
Log In

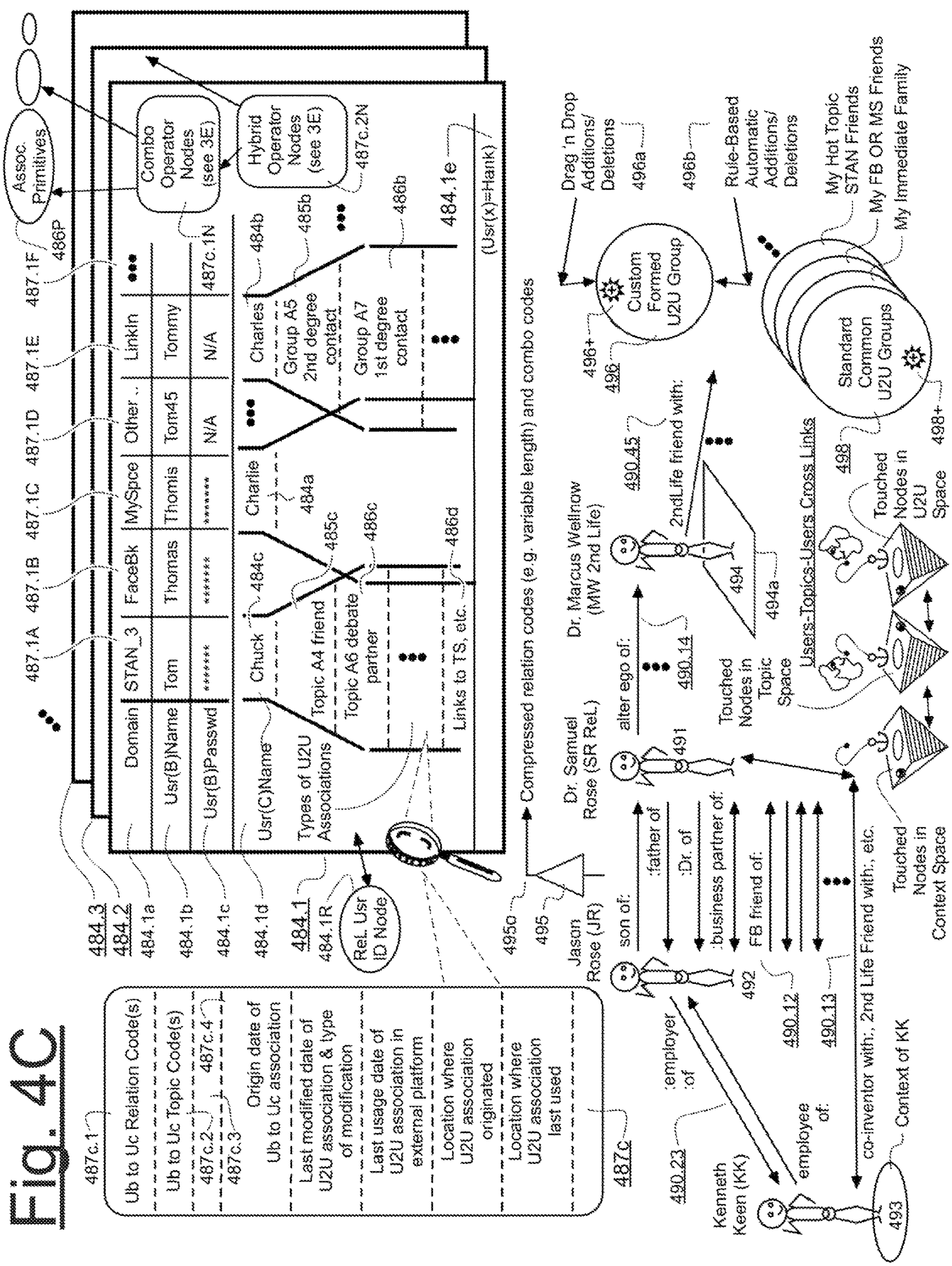
Fig. 4C
484.3
484.2
484.1a
484.1b
484.1c
484.1d
484.1
484.1R
Rel. Usr ID Node
487.1A
487.1B
487.1C
487.1D
487.1E
487.1F
486P
Assoc. Primitives
Combo Operator Nodes (see 3E)
Hybrid Operator Nodes (see 3E)
487c.1N
487c.2N
Domain
STAN_3
FaceBk
MySpce
Other ..
LinkIn
Usr(B)Name
Tom
Thomas
Thomis
Tom45
Tommy
Usr(B)Passwd
******
******
*******
N/A
N/A
Usr(C)Name
Chuck
Charlie
Charles
484a
484b
484c
485b
485c
486b
486c
486d
Types of U2U Associations
Topic A4 friend
Topic A6 debate partner
Group A5 2nd degree contact
Group A7 1st degree contact
Links to TS, etc.
484.1e
(Usr(x)=Hank)
Compressed relation codes (e.g. variable length) and combo codes
487c.1
Ub to Uc Relation Code(s)
Ub to Uc Topic Code(s)
487c.2
487c.3
487c.4
Origin date of Ub to Uc association
Last modified date of U2U association & type of modification
Last usage date of U2U association in external platform
Location where U2U association originated
Location where U2U association last used
487c
495o
495
Jason Rose (JR)
Dr. Samuel Rose (SR Rel.)
491
Dr. Marcus Wellnow (MW 2nd Life)
alter ego of:
490.14
490.45
2ndLife friend with:
494
494a
son of:
:father of
:Dr. of
:business partner of:
FB friend of:
492
490.12
490.13
co-inventor with:, 2nd Life Friend with:, etc.
Kenneth Keen (KK)
:employer :of
employee of:
490.23
493
Context of KK
Touched Nodes in Context Space
Touched Nodes in Topic Space
Touched Nodes in U2U Space
Users-Topics-Users Cross Links
498
498+
Standard Common U2U Groups
My Hot Topic STAN Friends
My FB OR MS Friends
My Immediate Family
496
496+
Custom Formed U2U Group
Drag 'n Drop Additions/ Deletions
496a
496b
Rule-Based Automatic Additions/ Deletions

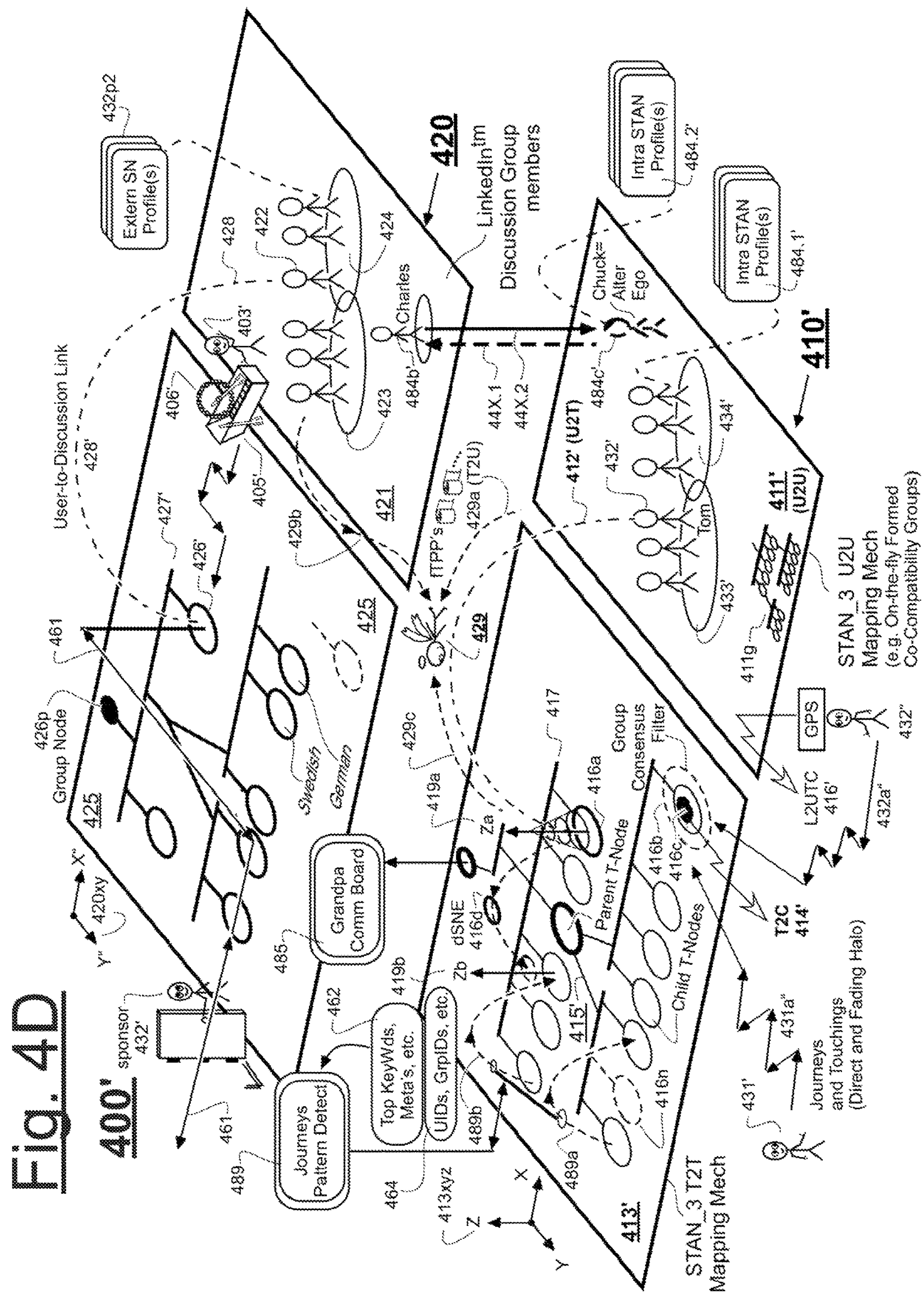

Fig. 4D
400'
sponsor
432'
Journeys Pattern Detect
489
461
Top KeyWds, Meta's, etc.
UIDs, GrpIDs, etc.
462
464
489b
489a
413xyz
413'
STAN_3 T2T Mapping Mech
Grandpa Comm Board
485
419b
Zb
dSNE
416d
Za
419a
429c
415'
Parent T-Node
Child T-Nodes
416n
416b
416c
416a
417
Group Consensus Filter
T2C
414'
431'
431a"
Journeys and Touchings (Direct and Fading Halo)
L2UTC
416'
432a"
432"
GPS
X'
Y"
420xy
425
426p
Group Node
Swedish
German
426'
427'
User-to-Discussion Link
428'
405'
406'
403'
429b
421
429
ITPP's
429a (T2U)
423
484b'
Charles
44X.1
44X.2
422
424
428
420
LinkedIn™ Discussion Group members
Extern SN Profile(s)
432p2
Intra STAN Profile(s)
484.2'
484.1'
Chuck= Alter Ego
484c'
434'
432'
412' (U2T)
Tom
433'
411'
(U2U)
411g
410'
STAN_3 U2U Mapping Mech (e.g. On-the-fly Formed Co-Compatibility Groups)
X
Y
Z

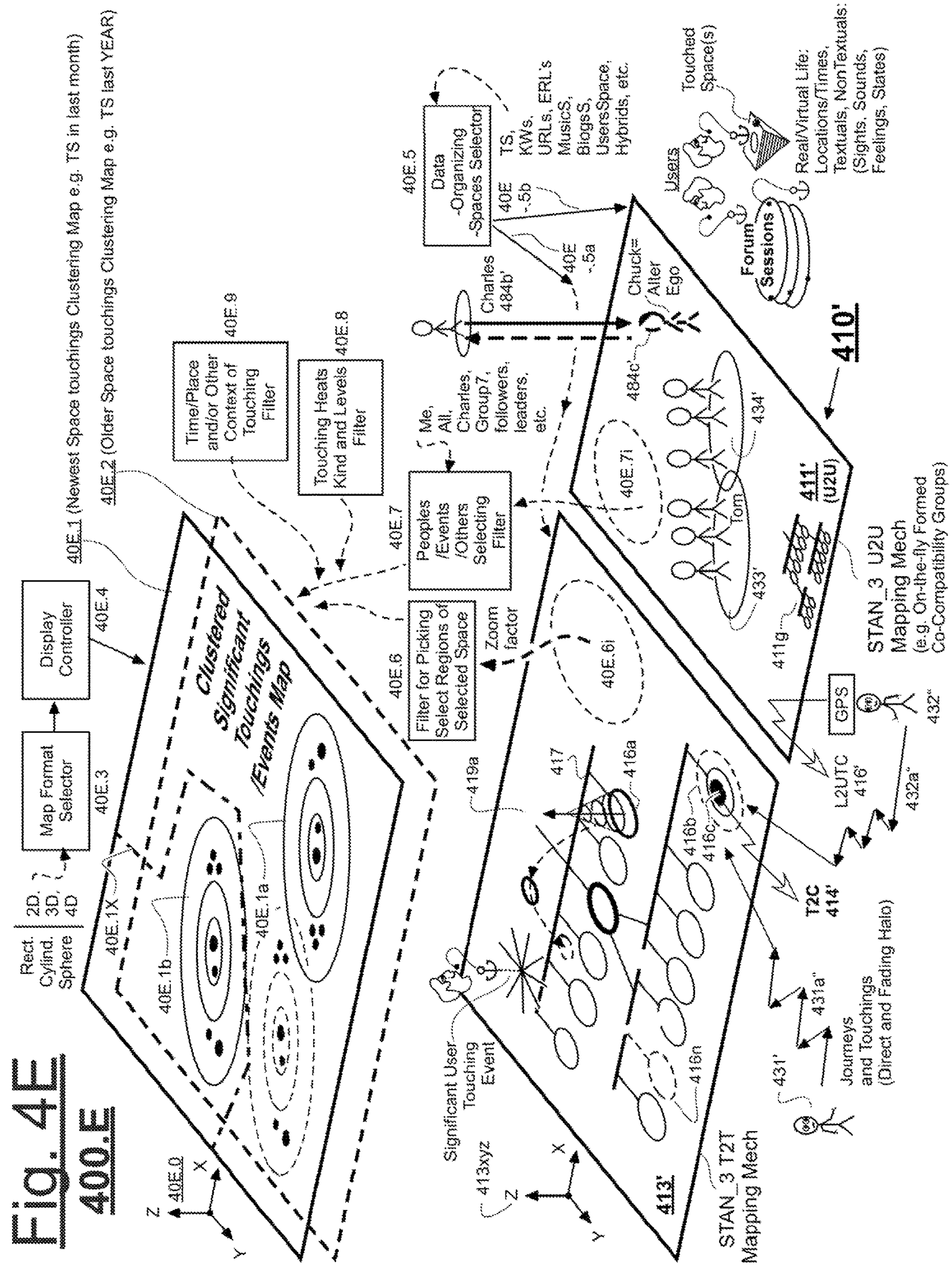
Fig. 4E
400.E
40E.1 (Newest Space touchings Clustering Map e.g. TS in last month)
40E.2 (Older Space touchings Clustering Map e.g. TS last YEAR)
Rect.
Cylind.
Sphere
2D,
3D,
4D
Map Format Selector
40E.3
Display Controller
40E.4
Clustered Significant Touchings /Events Map
40E.0
40E.1X
40E.1b
40E.1a
Time/Place and/or Other Context of Touching Filter
40E.9
Touching Heats Kind and Levels Filter
40E.8
Peoples /Events /Others Selecting Filter
40E.7
Me, All, Charles, Group7, followers, leaders, etc.
Filter for Picking Select Regions of Selected Space
40E.6
Zoom factor
40E.6i
40E.7i
Data -Organizing -Spaces Selector
40E.5
40E -.5b
40E -.5a
TS, KWs, URLs, ERL's MusicS, BlogsS, UsersSpace, Hybrids, etc.
Charles 484b'
Chuck= Alter Ego
484c'
Users
Touched Space(s)
Forum Sessions
Real/Virtual Life: Locations/Times, Textuals, NonTextuals: (Sights, Sounds, Feelings, States)
410'
434'
433'
Tom
411'
(U2U)
411g
STAN_3 U2U Mapping Mech (e.g. On-the-fly Formed Co-Compatibility Groups)
GPS
432"
432a"
L2UTC 416'
T2C 414'
419a
417
416a
416b
416c
416n
Significant User Touching Event
413xyz
413'
STAN_3 T2T Mapping Mech
431'
431a"
Journeys and Touchings (Direct and Fading Halo)

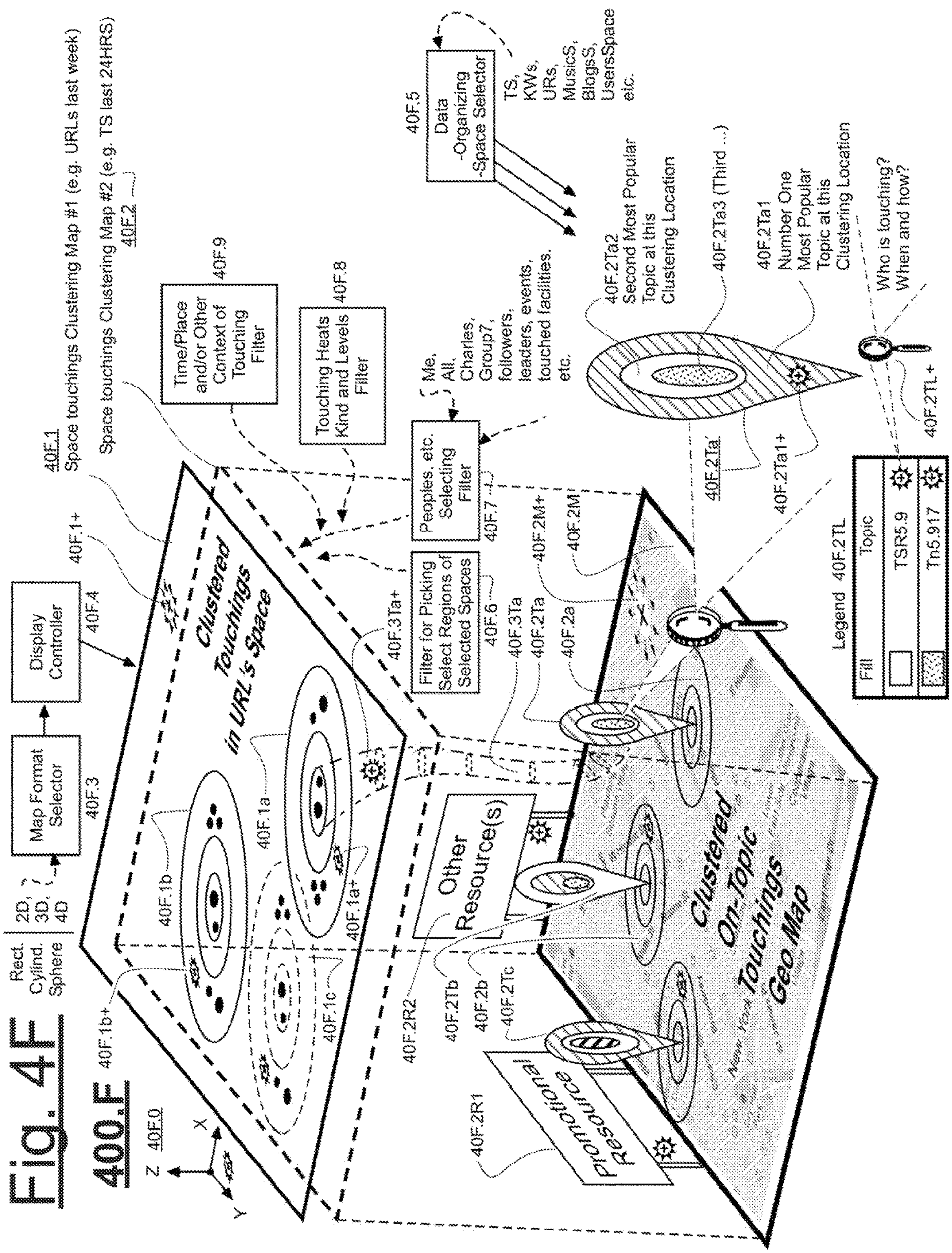
Fig. 4F
400.F
40F.0
Z
X
Y
Rect.
Cylind.
Sphere
2D,
3D,
4D
Map Format Selector
40F.3
Display Controller
40F.4
40F.1+
40F.1
Space touchings Clustering Map #1 (e.g. URLs last week)
Space touchings Clustering Map #2 (e.g. TS last 24HRS)
40F.2
Time/Place and/or Other Context of Touching Filter
40F.9
Touching Heats Kind and Levels Filter
40F.8
Peoples, etc. Selecting Filter
40F.7
Me,
All,
Charles,
Group7,
followers,
leaders, events,
touched facilities,
etc.
Filter for Picking Select Regions of Selected Spaces
40F.6
Data -Organizing -Space Selector
40F.5
TS,
KWs,
URs,
MusicS,
BlogsS,
UsersSpace
etc.
Clustered Touchings in URL's Space
40F.1b
40F.1a
40F.1a+
40F.1c
40F.1b+
40F.3Ta+
40F.3Ta
40F.2Ta
40F.2a
40F.2M+
40F.2M
40F.2Ta'
40F.2Ta1+
40F.2Ta2
Second Most Popular Topic at this Clustering Location
40F.2Ta3 (Third ...)
40F.2Ta1
Number One Most Popular Topic at this Clustering Location
Who is touching?
When and how?
40F.2TL+
Legend 40F.2TL
Fill
Topic
TSR5.9
Tn5.917
Other Resource(s)
40F.2R2
40F.2Tb
40F.2b
40F.2Tc
Promotional Resource
40F.2R1
Clustered On-Topic Touchings Geo Map
New York

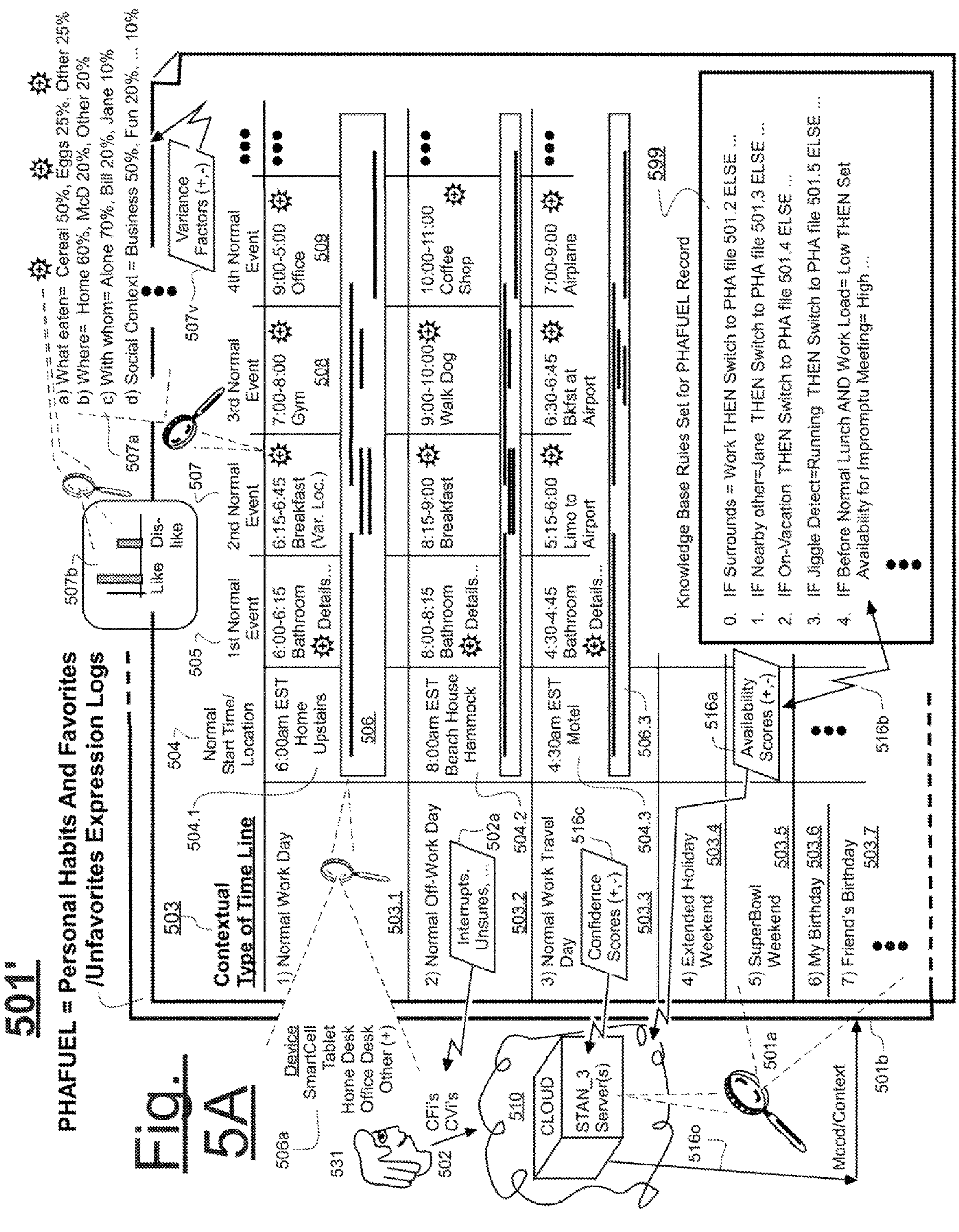
Fig. 5A
501'
PHAFUEL = Personal Habits And Favorites /Unfavorites Expression Logs
503
Contextual Type of Time Line
504 Normal Start Time/ Location
505 1st Normal Event
507 2nd Normal Event
3rd Normal Event
4th Normal Event
1) Normal Work Day
503.1
6:00am EST Home Upstairs
504.1
6:00-6:15 Bathroom Details...
6:15-6:45 Breakfast (Var. Loc.)
7:00-8:00 Gym 508
9:00-5:00 Office 509
506
2) Normal Off-Work Day
Interrupts, Unsures, ...
502a
503.2
8:00am EST Beach House Hammock
504.2
8:00-8:15 Bathroom Details...
8:15-9:00 Breakfast
9:00-10:00 Walk Dog
10:00-11:00 Coffee Shop
3) Normal Work Travel Day
516c
Confidence Scores (+,-)
503.3
4:30am EST Motel
504.3
4:30-4:45 Bathroom Details...
5:15-6:00 Limo to Airport
6:30-6:45 Bkfst at Airport
7:00-9:00 Airplane
506.3
4) Extended Holiday Weekend 503.4
516a
Availability Scores (+,-)
516b
5) SuperBowl Weekend 503.5
6) My Birthday 503.6
7) Friend's Birthday 503.7
507b
Like
Dis-like
507a
a) What eaten= Cereal 50%, Eggs 25%, Other 25%
b) Where= Home 60%, McD 20%, Other 20%
c) With whom= Alone 70%, Bill 20%, Jane 10%
d) Social Context = Business 50%, Fun 20%, ... 10%
507v
Variance Factors (+,-)
599
Knowledge Base Rules Set for PHAFUEL Record
0. IF Surrounds = Work THEN Switch to PHA file 501.2 ELSE ...
1. IF Nearby other=Jane THEN Switch to PHA file 501.3 ELSE ...
2. IF On-Vacation THEN Switch to PHA file 501.4 ELSE ...
3. IF Jiggle Detect=Running THEN Switch to PHA file 501.5 ELSE ...
4. IF Before Normal Lunch AND Work Load= Low THEN Set Availability for Impromptu Meeting= High ...
506a
Device
SmartCell
Tablet
Home Desk
Office Desk
Other (+)
531
CFi's CVi's
502
510
CLOUD
STAN_3 Server(s)
516o
501a
Mood/Context
501b

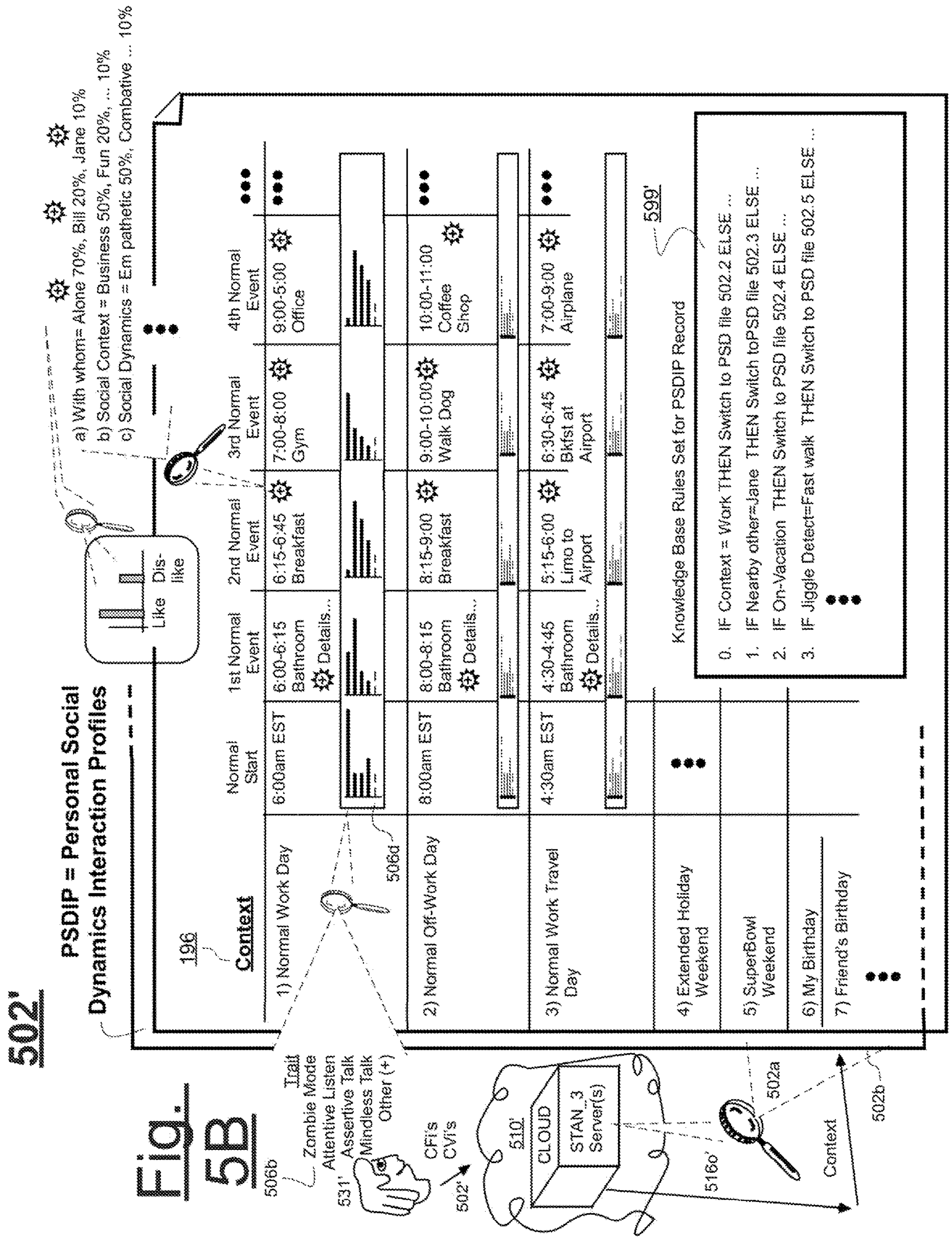
Fig. 5B
502'
PSDIP = Personal Social Dynamics Interaction Profiles
a) With whom= Alone 70%, Bill 20%, Jane 10%
b) Social Context = Business 50%, Fun 20%, ... 10%
c) Social Dynamics = Em pathetic 50%, Combative ... 10%
Like
Dis-like
196
Context
Normal Start
1st Normal Event
2nd Normal Event
3rd Normal Event
4th Normal Event
1) Normal Work Day
6:00am EST
6:00-6:15 Bathroom
Details...
6:15-6:45 Breakfast
7:00-8:00 Gym
9:00-5:00 Office
2) Normal Off-Work Day
8:00am EST
8:00-8:15 Bathroom
Details...
8:15-9:00 Breakfast
9:00-10:00 Walk Dog
10:00-11:00 Coffee Shop
3) Normal Work Travel Day
4:30am EST
4:30-4:45 Bathroom
Details...
5:15-6:00 Limo to Airport
6:30-6:45 Bkfst at Airport
7:00-9:00 Airplane
4) Extended Holiday Weekend
5) SuperBowl Weekend
6) My Birthday
7) Friend's Birthday
506d
599'
Knowledge Base Rules Set for PSDIP Record
0. IF Context = Work THEN Switch to PSD file 502.2 ELSE ...
1. IF Nearby other=Jane THEN Switch toPSD file 502.3 ELSE ...
2. IF On-Vacation THEN Switch to PSD file 502.4 ELSE ...
3. IF Jiggle Detect=Fast walk THEN Switch to PSD file 502.5 ELSE ...
506b
531'
Trait
Zombie Mode
Attentive Listen
Assertive Talk
Mindless Talk
Other (+)
CFi's
CVi's
502'
510'
CLOUD
STAN_3 Server(s)
516o'
502a
Context
502b

503'

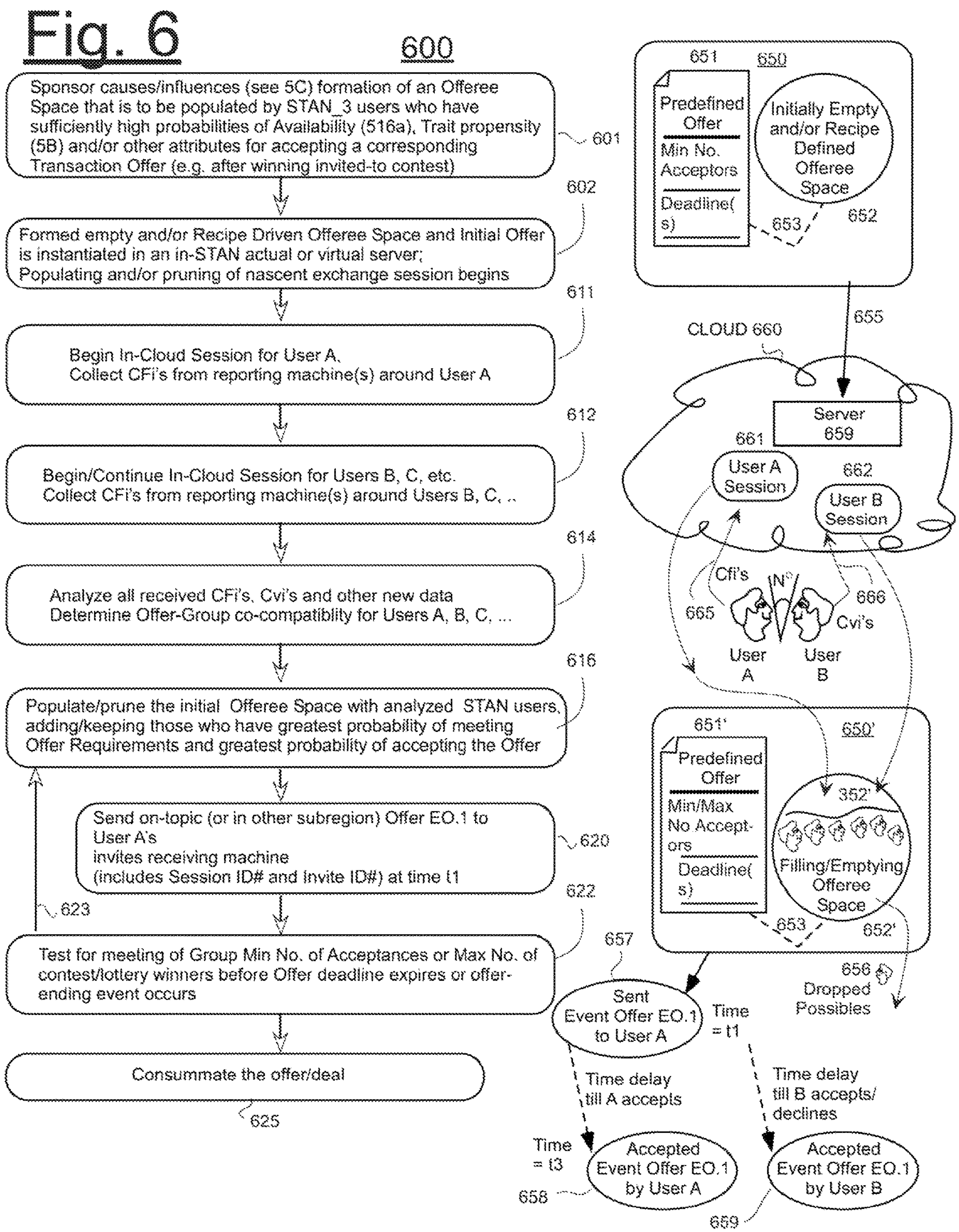
Fig. 6
600
Sponsor causes/influences (see 5C) formation of an Offeree Space that is to be populated by STAN_3 users who have sufficiently high probabilities of Availability (516a), Trait propensity (5B) and/or other attributes for accepting a corresponding Transaction Offer (e.g. after winning invited-to contest)
601
602
Formed empty and/or Recipe Driven Offeree Space and Initial Offer is instantiated in an in-STAN actual or virtual server; Populating and/or pruning of nascent exchange session begins
611
Begin In-Cloud Session for User A, Collect CFi's from reporting machine(s) around User A
612
Begin/Continue In-Cloud Session for Users B, C, etc. Collect CFi's from reporting machine(s) around Users B, C, ..
614
Analyze all received CFi's, Cvi's and other new data Determine Offer-Group co-compatiblity for Users A, B, C, ...
616
Populate/prune the initial Offeree Space with analyzed STAN users, adding/keeping those who have greatest probability of meeting Offer Requirements and greatest probability of accepting the Offer
Send on-topic (or in other subregion) Offer EO.1 to User A's invites receiving machine (includes Session ID# and Invite ID#) at time t1
620
623
622
Test for meeting of Group Min No. of Acceptances or Max No. of contest/lottery winners before Offer deadline expires or offer-ending event occurs
Consummate the offer/deal
625
651
650
Predefined Offer
Min No. Acceptors
Deadline(s)
Initially Empty and/or Recipe Defined Offeree Space
653
652
655
CLOUD 660
Server 659
661
User A Session
662
User B Session
Cfi's
N°
665
666
Cvi's
User A
User B
651'
650'
Predefined Offer
Min/Max No Acceptors
Deadline(s)
352'
Filling/Emptying Offeree Space
653
652'
657
Sent Event Offer EO.1 to User A
Time = t1
656
Dropped Possibles
Time delay till A accepts
Time delay till B accepts/ declines
Time = t3
Accepted Event Offer EO.1 by User A
658
Accepted Event Offer EO.1 by User B
659

SOCIAL TOPICAL CONTEXT ADAPTIVE NETWORK HOSTED SYSTEM

1. FIELD OF DISCLOSURE

The present disclosure of invention relates generally to online networking systems and uses thereof. The disclosure relates more specifically to social-topical/contextual adaptive networking (STAN) systems that, among other things, can gather co-compatible users on-the-fly into corresponding online chat or other forum participation sessions based on user context and/or more likely topics currently being focused-upon; and can additionally provide transaction offerings to groups of people based on detected context and on their usage of the STAN systems. Yet more specifically one such offering may be a promotional offering such as group discount coupon that becomes effective if a minimum number of offerees commit to using the offered online coupon before a predetermined deadline expires.

2a. PRIORITY

This patent application claims priority as a Continuation of U.S. patent application Ser. No. 17/714,802, filed on Apr. 6, 2022; which claims the benefit as a Continuation of U.S. patent application Ser. No. 16/196,542, filed on Nov. 20, 2018; which claims the benefit as a Continuation of Ser. No. 14/192,119, filed on Feb. 27, 2014; which claims the benefit as a Continuation of Ser. No. 13/367,642, filed on Feb. 7, 2012; which claims the benefit of provisional patent application having Ser. No. 61/485,409, filed May 12, 2011 and provisonal patent application having Ser. No. 61/551,338, filed on Oct. 25, 2011; the aforementioned applications being incorporated by reference in their entirety.

2b. CROSS REFERENCE TO AND INCORPORATION OF CO-OWNED APPLICATIONS

The following copending U.S. patent applications are owned by the owner of the present application, and their disclosures are incorporated herein by reference in their entireties as originally filed.

(A) Ser. No. 12/369,274 filed Feb. 11, 2009 by Jeffrey A. Rapaport et al. and which is originally entitled 'Social Network Driven Indexing System for Instantly Clustering People with Concurrent Focus on Same Topic into On Topic Chat Rooms and/or for Generating On-Topic Search Results Tailored to User Preferences Regarding Topic', where said application was early published as US 2010-0205541 A1; and (B) Ser. No. 12/854,082 filed Aug. 10, 2010 by Seymour A. Rapaport et al. and which is originally entitled, Social-Topical Adaptive Networking (STAN) System Allowing for Cooperative Inter-coupling with External Social Networking Systems and Other Content Sources.

2c. CROSS REFERENCE TO PATENTS/PUBLICATIONS

The disclosures of the following U.S. patents or Published U.S. patent applications are incorporated herein by reference:

(A) U.S. Pub. 20090195392 published Aug. 6, 2009 to Zalewski; Gary and entitled: Laugh Detector and System and Method for Tracking an Emotional Response to a Media Presentation;

(B) U.S. Pub. 2005/0289582 published Dec. 29, 2005 to Tavares, Clifford; et al. and entitled: System and method for capturing and using biometrics to review a product, service, creative work or thing;

(C) U.S. Pub. 2003/0139654 published Jul. 24, 2003 to Kim, Kyung-Hwan; et al. and entitled: System and method for recognizing user's emotional state using short-time monitoring of physiological signals; and (D) U.S. Pub. 20030055654 published Mar. 20, 2003 to Oudeyer, Pierre Yves and entitled: Emotion recognition method and device.

PRELIMINARY INTRODUCTION TO DISCLOSED SUBJECT MATTER

Imagine a set of virtual elevator doors opening up on your N-th generation smart cellphone screen (where N≥3 here) and imagine an energetic bouncing ball hopping into the elevator, dragging you along visually with it into the insides of a dimly lighted virtual elevator. Imagine the ball bouncing back and forth between the elevator walls while blinking sets of virtual light emitters embedded in the ball. You keep your eyes trained on the attention grabbing ball. What will it do next?

Suddenly the ball jumps to the elevator control panel and presses the button for floor number 86. A sign lights up next to the button. It glowingly says "Superbowl™ Sunday Party". You already have a notion of where this virtual elevator ride is going to next take you. Soon the doors open up and you find yourself looking at a smartphone screen (the screen of your real life (ReL) intelligent cellphone) having a center area populated with websites related to today's Superbowl™ football game. On the left side of your screen is a list of friends whom you often like to talk to about sports related matters. Next to their names are a strange set of revolving pyramids with red lit bars disposed along the slanted sides of the pyramids. At the top of your screen there is serving tray supporting a set of invitations serving plates where the served stacks or combinations of donut-like objects each invite you to join a recently initiated or soon-to-start online chat and where the user-to-user exchanges of these chats are (or will be) primarily directed to today's game. On the bottom of your screen is another serving tray serving up a set of transaction offers related to buying Superbowl™ associated paraphernalia. One of the promotional offerings is for T-shirts with your favorite team's name on them and proclaiming them the champions of this year's climactic but-not-yet-played-out game. You think to yourself, "I'm ready to buy that".

As you muse over this screenful of information that was automatically presented to you and as you muse over what today's date is, as well as considering the real life surroundings where you located and the context of that location, you realize in the back of your mind that the virtual bouncing ball and its virtual elevator friend had surprisingly guessed correctly about you, about where you are, your surrounding physical context, what you are thinking about at the moment (your mental context) and what invitations or promotional offerings you are ready to now welcome. Indeed, today is Superbowl™ Sunday and at the moment you are already sitting (in real life) on the couch in your friend's house (Ken's house) getting ready to watch the big game along with a few other like minded colleagues. You surmise that the smart virtual ball inside your smartphone must have used a GPS sensor embedded in the smart cellphone as well as your online digitized calendar to make best-estimate guesses at where you are, what you are probably now doing, how you mentally perceive your current context, and what online content you might now find to be of greatest and most welcomed interest to you.

With that thought fading into the back of your subconscious, you start focusing on one of the automatically presented websites now found within a first focused-upon area of your smartphone screen. It is reporting on the health condition of your favorite football player. Meanwhile in your real life background, the TV is already blaring with the pre-game announcements and Ken has started blasting some party music from the kitchen area while he opens bags of pretzels and potato chips. As you focus on the web content presented by your PDA-style (Personal Digital Assistant type) smartphone, a small on-screen advertisement pops up next to the side of the athlete's health-condition reporting frame. The advertisement says: "Pizza: Big Neighborhood Discount Offer, While it lasts, First 10 Households, Press here for more". This promotional offering you realize is not at all annoying to you. Actually it is welcomed. You were starting to feel hungry just before the ad popped up. Maybe it was the smell of the opened bags of potato chips. You hadn't eaten pizza in a while and the thought of it starts your mouth salivating. So you pop the advertisement open. It informs you that at least 50 households in your current neighborhood are having similar Superbowl™ Sunday parties and that a reputable pizza store nearby is ready to deliver two large sized pizza pies to each accepting household at a heavily discounted price, where the offered deal requires at least 10 households in the same neighborhood to accept the deal within the next 60 minutes; otherwise the deal lapses. Additional pies and other items are available at different discount rates, first not as good as the opening teaser rate, but then getting better as you order larger and larger volumes (or more expensive ones) of those items. (In an alternate version of this hypothetical story, the deal minimum is not based on number of households but rather number of pizzas ordered, or number of people who send their email addresses to the promoter or on some other basis that is beneficial to the product vendor.)

This promotional teaser offer not only sounds like a great deal for you, but as you think on it some more, you realize it is also a win-win deal for the local pizza pie vendor. The pizza store owner can greatly reduce his delivery overhead costs by delivering a large volume of same-time ordered pizzas to a same one local neighborhood (especially if there are large social gatherings i.e., parties at each) using just one delivery run if the 10 or more households all order in the allotted 60 minutes. Additionally, the pizza store can time a mass-production run of the pizzas, and a common storage of the volume-ordered hot pizzas (and of other co-ordered items) so they all arrive fresh and hot (or at least lukewarm) in the next hour to all the accepting customers in the one neighborhood. Everyone ends up pleased with this deal; customers and promoter. Additionally, the pizza store owner can capture new customers at the party if they are impressed with the speed and quality of the delivery and the taste of the food.

You ask around the room and discover that a number of other people at the party (in Ken's house, including Ken) are also very much in the mood for some hot fresh pizza. Charlie says he wants spicy chicken wings to go along with that. As you hit the virtual acceptance button of the on-screen offer, you begin to wonder; how did the pizza store, or more correctly your smartphone's computer; know this would happen just now—that all these people would welcome the promotional offering? You start filling in the order details on your screen while keeping an eye on an on-screen deal-acceptance counter. The deal counter indicates how many nearby neighbors have also signed up for the group discount (and/or other promotional offering) before the offer deadline lapses. Next to the sign-up count there is a time countdown indicator decrementing from 60 minutes towards zero. Soon the required minimum number of acceptances is reached, well before the countdown timer reaches zero. How did all this come to be? Details will follow shortly below.

After you place the pizza order, a not-unwelcomed further suggestion box pops open on your screen. It says: "This is the kind of party that your friends A) Henry and B) Charlie would like to be at but they are not present. Would you like to send a personalized invitation to one or more of them? Please select: 0) No, 1) Initiate Instant Chat, 2) Text message to their cellphones using pre-drafted invitation template, 3) Dial their cellphone now for personal voice invite, 4) Email, 5) more . . . ". The automatically generated suggestion further says, "Please select one of the following, on-topic messaging templates and the persons (A,B,C, etc.) to apply this to." The first listed topic reads: "SuperBowl Party, Come ASAP". You think to yourself, yes this is indeed a party where Charlie is sorely missed. How did my computer know this? I'm going to press the number 2) Text message option right now. In response to the press, a pre-drafted invitation template addressed to Charlie automatically pops open. It says: "Charlie, We are over at Ken's house having a Superbowl™ Sunday Party. We miss you. Please join." Further details for this kind of feature will follow below as well.

Your eyes flick back to the news story concerning the health of your favorite sports celebrity. A new frame has now appeared next to it. In the background, the doorbell rings. Someone says, "Pizza is here!" The new frame on your screen says "Best Chat Comments re Joe's Health". From experience you know that this is a compilation of contributions collected from numerous chat rooms, blog comments, etc. You know that these "community board" comments have been voted on, ranked as the best liked and/or currently 'hottest' and they are all directed to a topic centering on the health condition of your favorite sports celebrity's (e.g., "Is Joe well enough to play full throttle today?"). The best comments have percolated to the top of the list. You have given up trying to figure out how your computer did this too. Details for this kind of feature will follow below.

Definitions

As used herein, terms such as "cloud", "server", "software", "software agent", "BOT", "virtual BOT", "virtual agent", "virtual ball", "virtual elevator" and the like do not mean nonphysical abstractions but instead always entail a physically real aspect unless otherwise explicitly stated herein to the contrary.

Claims appended hereto which use such terms (e.g., "cloud", "server", "software", etc.) do not preclude others from thinking about, speaking about or similarly non-usefully using abstract ideas, or laws of nature or naturally occurring phenomenon. Instead, such "virtual" or non-virtual entities as described herein are accompanied by changes of physical state of real physical objects. For example, when it is in an active (e.g., an executing) mode, a "software" module or entity, be it a "virtual agent", a spyware program or the alike is understood to be a physical ongoing process being carried out in one or more real physical machines (e.g., data processing machines) where the machine(s) entropically consume(s) electrical power and/or other forms of real energy per unit time as a consequence of said physical ongoing process being carried out there within. Parts or wholes of software implementations may be substituted for by hardware or firmware implementations including for example implementation of functions by way of field programmable gate arrays (FPGA's) or other such programmable logic devices (PLD's). When in a static (e.g., non-executing) mode, an instantiated "software" entity or module, or "virtual agent" or the alike is understood (unless explicitly stated otherwise herein) to be embodied as a substantially unique and functionally operative pattern of transformed physical matter preserved in a more-than-elusively-transitory manner in one or more physical memory devices so that it can functionally and cooperatively interact with a commandable or instructable machine as opposed to being merely descriptive and nonfunctional matter. The one or more physical memory devices mentioned herein can include, but are not limited to, PLD's and/or memory devices which utilize electrostatic effects to represent stored data, memory devices which utilize magnetic effects to represent stored data, memory devices which utilize magnetic and/or other phase change effects to represent stored data, memory devices which utilize optical and/or other phase change effects to represent stored data, and so on.

As used herein, the terms, "signaling", "transmitting", "informing" "indicating", "logical linking", and the like do not mean nonphysical and abstract events but rather physical and not elusively transitory events where the former physical events are ones whose existence can be verified by modern scientific techniques. Claims appended hereto that use the aforementioned terms, "signaling", "transmitting", "informing", "indicating", "logical linking", and the like or their equivalents do not preclude others from thinking about, speaking about or similarly using in a non-useful way abstract ideas, laws of nature or naturally occurring phenomenon.

Background and Further Introduction to Related Technology

The above identified and herein incorporated by reference U.S. patent application Ser. No. 12/369,274 (filed Feb. 11, 2009) and Ser. No. 12/854,082 (filed Aug. 10, 2010) disclose certain types of Social-Topical Adaptive Networking (STAN) Systems (hereafter, also referred to respectively as "Sierra #1" or "STAN_1" and "Sierra #2" or "STAN_2") which enable physically isolated online users of a network to automatically join with one another (electronically or otherwise) so as to form a topic-specific and/or otherwise based information-exchanging group (e.g., a 'TCONE'—as such is described in the STAN_2 application). A primary feature of the STAN systems is that they provide and maintain one or more so-called, topic space defining objects (e.g., topic-to-topic associating database records) which are represented by physical signals stored in memory and which topic space defining objects can define topic nodes and logical interconnections between those nodes and/or can provide logical links to forums associated with topics of the nodes and/or to persons or other social entities associated with topics of the nodes and/or to on-topic other material associated with topics of the nodes. The topic space defining objects (e.g., database records) can be used by the STAN systems to automatically provide, for example, invitations to plural persons or to other social entities to join in on-topic online chats or other Notes Exchange sessions (forum sessions) when those social entities are deemed to be currently focusing-upon such topics and/or when those social entities are deemed to be co-compatible for interacting at least online with one another. (In one embodiment, co-compatibilities are established by automatically verifying reputations and/or attributes of persons seeking to enter a STAN-sponsored chat room or other such Notes Exchange session, e.g., a Topic Center "Owned" Notes Exchange session or "TCONE".) Additionally, the topic space defining objects (e.g., database records) are used by the STAN systems to automatically provide suggestions to users regarding on-topic other content and/or regarding further social entities whom they may wish to connect with for topic-related activities and/or socially co-compatible activities.

During operation of the STAN systems, a variety of different kinds of informational signals may be collected by a STAN system in regard to the current states of its users; including but not limited to, the user's geographic location, the user's transactional disposition (e.g., at work? at a party? at home? etc.); the user's recent online activities; the user's recent biometric states; the user's habitual trends, behavioral routines, and so on. The purpose of this collected information is to facilitate automated joinder of like-minded and co-compatible persons for their mutual benefit. More specifically, a STAN-system-facilitated joinder may occur between users at times when they are in the mood to do so (to join in a so-called Notes Exchange session) and when they have roughly concurrent focus on same or similar detectable content and/or when they apparently have approximately concurrent interest in a same or similar particular topic or topics and/or when they have current personality co-compatibility for instantly chatting with, or for otherwise exchanging information with one another or otherwise transacting with one another.

In terms of a more concrete example of the above concepts, the imaginative introduction that was provided above revolved around a group of hypothetical people who all seemed to be currently thinking about a same popular event (the day's Superbowl™ football game) and many of whom seemed to be concurrently interested in then obtaining event-relevant refreshments (e.g., pizza) and/or other event-relevant paraphernalia (e.g., T-shirts). The group-based discount offer sought to join them, along with others, in an online manner for a mutually beneficial commercial transaction (e.g., volume purchase and localized delivery of a discounted item that is normally sold in smaller quantities to individual customers one at a time). The unsolicited, and thus "pushed" solicitation was not one that generally annoyed them as would conventionally pushed unsolicited and undesired advertisements. It's almost as if the users pulled the solicitation in to them by means of their subconscious will power rather than having the solicitations rudely pushed onto them by an insistent high pressure salesperson. The underlying mechanisms that can automatically achieve this will be detailed below. At this introductory phase of the present disclosure it is worthwhile merely to note that some wants and desires can arise at the subconscious level and these can be inferred to a reasonable degree of confidence by carefully reading a person's facial expressions (e.g., micro-expressions) and/or other body gestures, by monitoring the persons' computer usage activities, by tracking the person's recent habitual or routine activities, and so on, without giving away that such is going on and without inappropriately intruding on reasonable expectations of privacy by the person. Proper reading of each individual's body-language expressions may require access to a Personal Emotion Expression Profile (PEEP) that has been pre-developed for that individual and for certain contexts in which the person may find themselves. Example structures for such PEEP records are disclosed in at least one of the here incorporated U.S. Ser. No. 12/369,274 and Ser. No. 12/854,082. Appropriate PEEP records for each individual may be activated based on automated determination of time, place and other context revealing hints or clues (e.g., the individual's digitized calendar or recent email records which show a plan, for example, to attend a certain friend's "Superbowl™ Sunday Party" at a pre-arranged time and place, for example 1:00 PM at Ken's house). Of course, user permission for accessing and using such information should be obtained by the system and the users should be able to rescind the permissions whenever they want to do so, whether manually or by automated command (e.g., IF Location=Charlie's Tavern THEN Disable All STAN monitoring"). In one embodiment, user permission automatically fades over time for all or for one or more prespecified regions of topic space and needs to be reestablished by contacting the user. In one embodiment, certain prespecified regions of topic space are tagged by system operators and/or the respective users as being of a sensitive nature and special double permissions are required before information regarding user direct or indirect 'touchings' into these sensitive regions of topic space is automatically shared with one or more prespecified other social entities (e.g., most trusted friends and family).

Before delving deeper into such aspects, a rough explanation of the term "STAN system" as used herein is provided. The term arises from the nature of the respective network systems, namely, STAN_1 as disclosed in here-incorporated U.S. Ser. No. 12/369,274 and STAN_2 as disclosed in here-incorporated U.S. Ser. No. 12/854,082. Generically they are referred to herein as Social-Topical 'Adaptive' Networking (STAN) systems or STAN systems for short. One of the things that such STAN systems can generally do is to maintain in memory one or more virtual spaces (data-objects organizing spaces) populated by interrelated data objects such as interrelated topic nodes (or 'topic centers' as they are referred to in the Ser. No. 12/854,082 application) where the nodes may be hierarchically interconnected (via logical graphing) to one another and/or to topic-related forums (e.g., online chat rooms) and/or to topic-related other content. The STAN systems can cross match users with respective topic nodes and also with other users (e.g., co-compatible other users) so as to create logical linkages between users that are both topically relevant and socially acceptable for such users of the STAN system. Incidentally, hierarchical graphing of topic-to-topic associations (T2T) is not a necessary or only way that STAN systems can graph T2T associations via a physical database or otherwise. Topic-to-topic associations (T2T) may alternatively or additionally be defined by non-hierarchical graphs (ones that do not have clear parent to child relationships as between nodes) and/or by spatial and distance based positionings within a specified virtual positioning space.

Because people and their interests tend to change with time, location and variation of social context (as examples), the STAN systems are typically structured to adaptively change their focused-upon subareas within topics-defining maps (e.g., hierarchical and/or spatial) and to adaptively change the topics-defining maps themselves (a.k.a. topic spaces, which maps/spaces have physically represented topic nodes or the like defined by data signals recorded in databases or other appropriate memory means and which topic nodes or groups thereof can be pointed to with logical pointer mechanisms). Such adaptive change of perspective regarding virtual positions or graphed interlinks in topic space and/or reworking of the topic space and of topic space content helps the STAN systems to keep in tune with their variable user populations as the latter migrate to new topics (e.g., fad of the day) and/or to new personal dispositions (e.g., higher levels of expertise, different moods, etc.). One of the adaptive mechanisms that can be relied upon by the STAN system is the generation and collection of implicit vote or CVi signals (where CVi may stand for Current and implied Vote-Indicating record). CVi's are automatically collected from user surrounding machines and used to infer subconscious positive or negative votes cast by users as they go about their normal machine usage activities or normal life activities, where those activities are open to being monitored (due to rescindable permissions given by the user for such monitoring) by surrounding information gathering equipment. User PEEP files may be used in combination with collected CVi signals to automatically determine most probable, user-implied votes regarding focused-upon material even if those votes are only at the subconscious level. Stated otherwise, users can implicitly urge the STAN system topic space and pointers thereto to change (or pointers/links within the topic space to change) in response to subconscious votes that the users cast where the subconscious votes are inferred from telemetry gathered about user facial grimaces, body language, vocal grunts, breathing patterns, and the like.

In addition to disclosing an adaptively changing topics space/map (topic-to-topic (T2T) associations space), the here incorporated U.S. Ser. No. 12/854,082 (STAN_2) discloses the notion of a user-to-user (U2U) associations space as well as a user-to-topic (U2T) cross associations space. Here, an extension of the user-to-user (U2U) associations space will be disclosed where that extension will be referred to as the SPEIS'es; which is short for Social/Persona Entities Interrelation Spaces. A single such space is a SPEIS. However, there often are many such spaces due to the typical presence of multiple social networking (SN) platforms like FaceBook™, LinkedIn™, MySpace™, Quora™, etc. and the many different kinds of user-to-user associations which can be formed by activities carried out on these various platforms in addition to user activities carried out on a STAN platform. The concept of different "personas" for each one real world person was explained in the here incorporated U.S. Ser. No. 12/854,082 (STAN_2). In this disclosure however, Social/Persona Entities (SPE's) may include not only the one or different personas of a real world, single flesh and blood person, but also personas of hybrid real/virtual persons (e.g., a Second Life™ avatar driven by a committee of real persons) and personas of collectives such as a group of real persons and/or a group of hybrid real/virtual persons and/or purely virtual persons (e.g., those driven entirely by an executing computer program). In one embodiment, each STAN user can define his or her own custom groups or the user can use system-provided templates (e.g., My Immediate Family). The Group social entity may be used to keep a collective tab on what a relevant group of social entities are doing (e.g., what topic or other thing are they recently focusing-upon?).

When it comes to automated formation of social groups, one of the extensions or improvements disclosed herein involves formation of a group of online real persons who are to be considered for receiving a group discount offer or another such transaction/promotional offering. More specifically, the present disclosure provides for a machine-implemented method that can use the automatically gathered CFi and/or CVi signals (current focus indicator and current voting indicator signals) of a STAN system advantageously to automatically infer therefrom what unsolicited solicitations (e.g., group offers and the like) would likely be welcome at a given moment by a targeted group of potential offerees (real or even possibly virtual if the offer is to their virtual life counterparts, e.g., their avatars) and which solicitations would less likely be welcomed and thus should not be now pushed onto the targeted personas, because of the danger of creating ill-will or degrading previously developed goodwill. Another feature of the present disclosure is to automatically sort potential offerees according to likelihood of welcoming and accepting different ones of possible solicitations and pushing the M most likely-to-be-welcomed solicitations to a corresponding top N ones of the potential offerees who are likely to accept (where here M and N are corresponding predetermined numbers). Outcomes can change according to changing moods/ideas of socially-interactive user populations as well as those of individual users (e.g., user mood or other current user persona state). A potential offeree who is automatically determined to be less likely to welcome a first of simultaneously brewing group offers may nonetheless be determined to more likely to welcome a second of the brewing group offers. Thus brewing offers are competitively sorted so that each is transmitted (pushed) to a respective offerees population that is populated by persons deemed most likely to then accept that offer and offerees are not inundated with too many or unwelcomed offers. More details follow below.

Another novel use disclosed herein of the Group entity is that of tracking group migrations and migration trends through topic space. If a predefined group of influential personas (e.g., Tipping Point Persons) is automatically tracked as having traveled along a sequence of paths or a time parallel set of paths through topic space (by virtue of making direct or indirect 'touchings' in topic space, then predictions can be automatically made about the paths that their followers (e.g., twitter fans) will soon follow and/or of what the influential group will next likely do as a group. This can be useful for formulating promotional offerings to the influential group and/or their followers. Detection of sequential paths and/or time parallel paths through topic space is not limited to predefined influential groups. It can also apply to individual STAN users. The tracking need not look at (or only at) the topic nodes they directly or indirectly 'touched' in topic space. It can include a tracking of the sequential and/or time parallel patterns of CFi's and/or CVi's (e.g., keywords, meta-tags, hybrid combinations of different kinds of CFi's (e.g., keywords and context-reporting CFi's), etc.) produced by the tracked individual STAN users. Such trackings can be useful for automatically formulating promotional offerings to the corresponding individuals.

It is to be understood that this background and further introduction section is intended to provide useful background for understanding the here disclosed inventive technology and as such, this technology background section may and probably does include ideas, concepts or recognitions that were not part of what was known or appreciated by those skilled in the pertinent art prior at corresponding invention dates of invented subject matter disclosed herein. As such, this background of technology section is not to be construed as any admission whatsoever regarding what is or is not prior art. A clearer picture of the inventive technology will unfold below.

SUMMARY

In accordance with one aspect of the present disclosure, likely to-be-welcomed group-based offers or other offers are automatically presented to STAN system users based on information gathered from their STAN system usage activities. The gathered information may include current mood or disposition as implied by a currently active PEEP (Personal Emotion Expression Profile) of the user as well as recent CFi signals, CVi signals recently uploaded for the user and recent topic space (TS) usage patterns or trends detected of the user and/or recent friendship space usage patterns or trends detected of the user (where latter is more correctly referred to here as recent SPEIS'es usage patterns or trends {usage of Social/Persona Entities Interrelation Spaces}). Current mood and/or disposition may be inferred from currently focused-upon nodes and/or subregions of other spaces besides just topic space (TS) as well as from detected hints or clues about the user's real life (ReL) surroundings (e.g., identifying music playing in the background).

In accordance with another aspect of the present disclosure, various user interface techniques are provided for allowing a user to conveniently interface with resources of the STAN system including by means of device tilt, body gesture, head tilt and/or wobble inputs and/or touch screen inputs detected by tablet and/or palmtop data processing units used by STAN system users.

In accordance with another aspect of the present disclosure, a user-viewable screen area is organized to have user-relevant social entities (e.g., My Friends and Family) iconically represented in one subarea and user-relevant topical material (e.g., My Top 5 Now Topics) iconically represented in another subarea of the screen, where an indication is provided to the user regarding which user-relevant social entities are currently focusing-upon which user-relevant topics. Thus the user can readily appreciate which of persons or other social entities relevant to him/her (e.g., My Friends and Family, My Followed Influencers) are likely to be currently interested in what same or similar topics to those of current interest to the user or in topics that the user has not yet focused-upon.

Other aspects of the disclosure will become apparent from the below detailed description.

BRIEF DESCRIPTION OF THE DRAWINGS

The below detailed description section makes reference to the accompanying drawings, in which:

FIG. 1F shows a machine-implemented system for computing heat attributes that are attributable by a respective first user (e.g., Me) to a cross-correlation between a given topic space region and a preselected one or more second users (e.g., My Friends and Family) of the system;

FIG. 1H shows an automated process that may be used in conjunction with the automated community board posting and posts ranking/promoting system of FIG. 1G;

FIGS. 3A-3B illustrate automated systems for passing user click streams and/or other energetic and contemporary focusing activities of a user through an intermediary server (e.g., webpage downloading server) to the STAN_3 system for thereby having the STAN_3 system return topic-related information for optional downloading to the user of the intermediary server;

FIG. 3D provides a data flow schematic for explaining how fuzzy locus determinations made by the system within various data-organizing spaces of the system (e.g., topic space, context space, etc.) can interact with one another and with context sensitive results produced for or on behalf of a monitored user;

FIG. 3E provides a data structure schematic for explaining how cross links can be provided as between different data organizing spaces of the system, including for example, as between the recorded and adaptively updated topic space (Ts) of the system and a keywords organizing space, a URL's organizing space, a meta-tags organizing space and hybrid organizing spaces which cross organize data objects (e.g., nodes) of two or more different, data organizing spaces;

FIGS. 3F-3I respectively show data structures of data object primitives useable for example in a music-nodes data organizing space, a sounds-nodes data organizing space, a voice nodes data organizing space, and a linguistics nodes data organizing space;

FIG. 3J shows data structures of data object primitives useable in a context nodes data organizing space;

FIGS. 3M-3P respectively show data structures of data object primitives useable for example in an images nodes data organizing space, and a body-parts/gestures nodes data organizing space;

FIG. 3Q shows an example of a data structure that may be used to define an operator node;

FIG. 3U shows an example of a data structure that may be used for implementing a generic CFi's collecting (clustering) node in the system of FIGS. 3R-3S;

FIG. 3V shows an example of a data structure that may be used for implementing a species of a CFi's collecting node specific to textual types of CFi's;

FIG. 3W shows an example of a data structure that may be used for implementing a textual expression primitive object;

FIG. 3Y illustrates a system that automatically scans through a hybrid context-plus-other space (e.g., context-plus-keyword expressions space) in order to identify context appropriate topic nodes and/or subregions that score highest for correspondence with CFi's received under the assumed context;

FIG. 4A is a block diagram of a networked system that includes network interconnected mechanisms for maintaining one or more Social/Persona Entities Interrelation Spaces (SPEIS), for maintaining one or more kinds of topic spaces (TS's, including a hybrid context plus topic space) and for supplying group offers to users of a Social-Topical Adaptive Networking system (STAIN) that supports the SPEIS and TS's as well as other relationships (e.g., L2U/T/C, which here denotes location to user(s), topic node(s), content(s) and other such data entities);

FIG. 4C shows a combination of a data structure and examples of user-to-user associations (U2U) for explaining an embodiment of FIG. 4B in greater detail;

FIG. 4D is a perspective type of schematic view showing mappings between different kinds of spaces and also showing how different user-to-user associations (U2U) may be utilized by a STAN_3 server that determines, for example, "What topics are my friends now focusing on and what patterns of journeys have they recently taken through one or more spaces supported by the STAN_3 system?";

FIG. 4E illustrates how spatial clusterings of points, nodes or subregions in a given Cognitive Attention Receiving Space (CARS) may be displayed and how significant 'touchings' by identified (e.g., demographically filtered) social entities in corresponding 20 or higher dimensioned maps of data organizing spaces (e.g., topic space) can also be identified and displayed;

FIG. 4F illustrates how geographic clusterings of on-topic chat or other forum participation sessions can be displayed and how availability of nearby promotional or other resources can also be displayed;

FIG. 5A illustrates a profiling data structure (PHA-_FUEL) usable for determining habits, routines, and likes and dislikes of STAN users;

FIG. 5B illustrates another profiling data structure (PS-DIP) usable for determining time and context dependent social dynamic traits of STAN users;

FIG. 6 forms a flow chart indicating how an offering recipients-space may be populated by identities of persons who are likely to accept a corresponding offered transaction where the populating or depopulating of the offering recipients-space may be a function of usage by the targeted offerees of the STAN_3 system.

MORE DETAILED DESCRIPTION

Figure 1A:
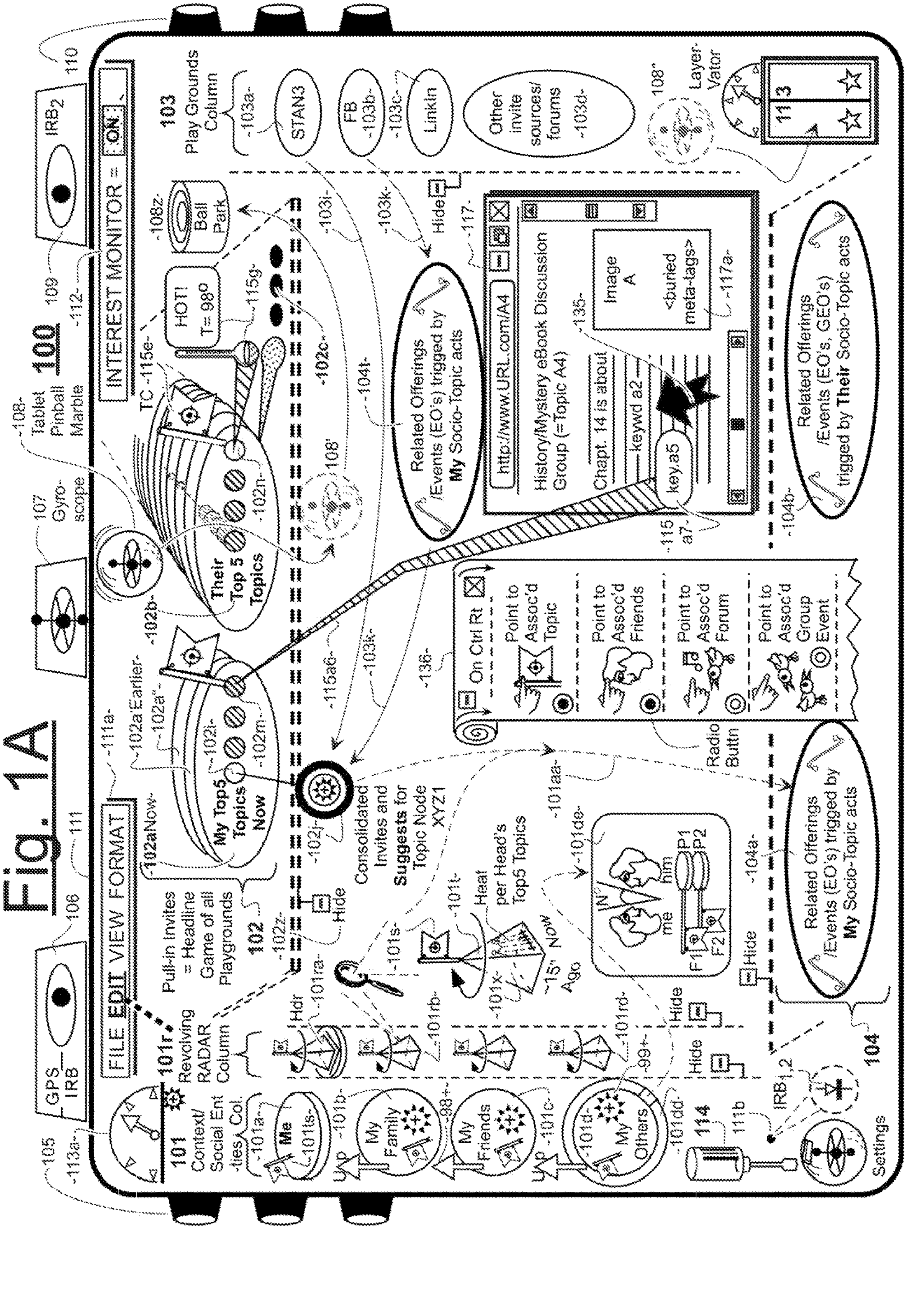
FIG. 1A is a block diagram of a portable tablet microcomputer which is structured for electromagnetic linking (e.g., electronically and/or optically linking) with a networking environment that includes a Social-Topical Adaptive Networking (STAN_3) system where, in accordance with the present disclosure, the STAN_3 system includes means for automatically making individual or group transaction offerings based on usages of the STAN_3 system.

Some of the detailed description immediately below here is substantially repetitive of detailed description of a FIG. 1A found in the here-incorporated U.S. Ser. No. 12/854,082 application (STAN_2) and thus readers familiar with the details of the STAN_2 may elect to skim through to a part further below that begins to detail a tablet computer 100 illustrated by FIG. 1A of the present disclosure. FIG. 4A of the present disclosure corresponds to, but is not completely the same as the FIG. 1A provided in the here-incorporated U.S. Ser. No. 12/854,082 application (STAN_2).

Referring to FIG. 4A of the present disclosure, shown is a block diagram of an electromagnetically inter-linked (e.g., electronically and/or optically linked) networking environment 400 that includes a Social-Topical Adaptive Networking (STAN_3) sub-system 410 in accordance with the present disclosure and which environment 400 includes other sub-network systems (e.g., Non-STAN subnets 441, 442, etc., generally denoted herein as 44X). Although the electromagnetically inter-linked networking environment 400 will be often described as one using the Internet 401 for providing communications between and data processing support for persons or other social entities and/or providing communications between, and data processing support for, respective communication and data processing devices thereof, the networking environment 400 is not limited to just using the Internet. The Internet 401 is just one example of a panoply of communications supporting and data processing supporting resources that may be used by the STAN_3 system 410. Other examples include, but are not limited to, telephone systems such as cellular telephone systems, including those wherein users or their devices can exchange text, image or other messages with one another as well as voice messages. The other examples further include cable television and/or satellite dish systems which can act as conduits and/or routers (e.g., uni-cast, multi-cast broadcast) for not only for digitized or analog TV signals but also for various other digitized or analog signals, wide area wireless broadcast systems and local area wireless broadcast, uni-cast, and/or multi-cast systems. (Note: In this disclosure, the terms STAN_3, STAN #3, STAN-3, STAN3, or the like are used interchangeably.)

The resources of the environment 400 may be used to define so-called, user-to-user associations (U2U) including for example, so-called "friendship spaces" (which spaces are a subset of the broader concept of Social/Persona Entities Interrelation Spaces (SPEIS) as disclosed herein and represented by data signals stored in a SPEIS database area 411 of the system 410 of FIG. 4A. Examples of friendship spaces may include a graphed representation of real persons whom a first user (e.g., 431) friends and/or de-friends over a predetermined time period when that first user utilizes an available version of the FaceBook™ platform 441. Another friendship space may be defined by a graphed representation of real persons whom the user 431 friends and/or de-friends over a predetermined time period when that first user utilizes an available version of the MySpace™ platform 442. Other Social/Personal Interrelations may be defined by the first user 431 utilizing other available social networking (SN) systems such as LinkedIn™ 444, Twitter™ and so on. As those skilled in the art of social networking (SN) will be aware, the well known FaceBook™ platform 441 and MySpace™ platform 442 are relatively pioneering implementations of social media approaches to exploiting user-to-user associations (U2U) for providing network users with socially meaningful experiences. However there is much room for improvement over the pioneering implementations and numerous such improvements may be found at least in the present disclosure.

The present disclosure will show how various matrix-like cross-correlations between one or more SPEIS 411 (e.g., friendship relation spaces) and topic-to-topic associations (T2T, a.k.a. topic spaces) 413 may be used to enhance online experiences of real person users (e.g., 431, 432) of the one or more of the sub-networks 410, 441, 442, . . . , 44X, etc. due to cross-correlating actions automatically instigated by the STAN_3 sub-network system 410.

Yet more detailed background descriptions on how Social-Topical Adaptive Networking (STAN) sub-systems may operate can be found in the above-cited and here incorporated U.S. application Ser. No. 12/369,274 and Ser. No. 12/854,082 and therefore as already mentioned, detailed repetitions of said incorporated by reference materials will not all be provided here. For sake of avoiding confusion between the drawings of Ser. No. 12/369,274 (STAN_1) and the figures of the present application, drawings of Ser. No. 12/369,274 will be identified by the prefix, "giF." (which is "Fig." written backwards) while figures of the present application will be identified by the normal figure prefix, "Fig.".

In brief, giF. 1A of the here incorporated '274 application shows how topics of current interest to (not to be confused with content being currently 'focused upon' by) individual online participants may be automatically determined based on detection of certain content being currently and emotively 'focused upon' by the respective online participants and based upon pre-developed profiles of the respective users (e.g., registered and logged-in users of the STAN_1 system). (Incidentally, in the here disclosed STAN_3 system, the notion is included of determining what group offers a user is likely to welcome or not welcome based on a variety of factors including habit histories, trending histories, detected context and so on.)

Further in brief, giF. 1B of the incorporated '274 application shows a data structure of a first stored chat co-compatibility profile that can change with changes of user persona (e.g., change of mood); giF. 1C shows a data structure of a stored topic co-compatibility profile that can also change with change of user persona (e.g., change of mood, change of surroundings); and giF. 1E shows a data structure of a stored personal emotive expression profile of a given user, whereby biometrically detected facial or other biotic expressions of the profiled user may be used to deduce emotional involvement with on-screen content and thus degree of emotional involvement with focused upon content. One embodiment of the STAN_1 system disclosed in the here incorporated '274 application uses uploaded CFi (current focus indicator) packets to automatically determine what topic or topics are most likely ones that each user is currently thinking about based on the content that is being currently focused upon with above-threshold intensity. The determined topic is logically linked by operations of the STAN_1 system to topic nodes (herein also referred to as topic centers or TC's) within a hierarchical parent-child tree represented by data stored in the STAN_1 system.

Yet further and in brief, giF. 2A of the incorporated '274 application shows a possible data structure of a stored CFi record while giF. 2B shows a possible data structure of an implied vote-indicating record (CVi) which may be automatically extracted from biometric information obtained from the user. The giF. 3B diagram shows an exemplary screen display wherein so-called chat opportunity invitations (herein referred to as in-STAN-vitations™) are provided to the user based on the STAN_1 system's understanding of what topics are currently of prime interest to the user. The giF. 3C diagram shows how one embodiment of the STAN_1 system (of the '274 application) can automatically determine what topic or domain of topics might most likely be of current interest for a given user and then responsively can recommend, based on likelihood rankings, content (e.g., chat rooms) which are most likely to be on-topic for that user and compatible with the user's current status (e.g., level of expertise in the topic).

Moreover, in the here incorporated '274 application, giF. 4A shows a structure of a cloud computing system (e.g., a chunky grained cloud) that may be used to implement a STAN_1 system on a geographic region by geographic region basis. Importantly, each data center of giF. 4A has an automated Domains/Topics Lookup Service (DLUX) executing therein which receives up- or in-loaded CFi data packets (Current Focus indicating records) from users and combines these with user histories uploaded form the user's local machine and/or user histories already stored in the cloud to automatically determine probable topics of current interest then on the user's mind. In one embodiment the DLUX points to so-called topic nodes of a hierarchical topics tree. An exemplary data structure for such a topics tree is provided in giF. 4B which shows details of a stored and adaptively updated topic mapping data structure used by one embodiment of the STAN_1 system. Also each data center of giF. 4A further has one or more automated Domain-specific Matching Services (DsMS's) executing therein which are selected by the DLUX to further process the up- or in-loaded CFi data packets and match alike users to one another or to matching chat rooms and then presents the latter as scored chat opportunities. Also each data center of giF. 4A further has one or more automated Chat Rooms management Services (CRS) executing therein for managing chat rooms or the like operating under auspices of the STAN_1 system. Also each data center of giF. 4A further has an automated Trending Data Store service that keeps track of progression of respective users over time in different topic sectors and makes trend projections based thereon.

The here incorporated '274 application is extensive and has many other drawings as well as descriptions that will not all be briefed upon here but are nonetheless incorporated herein by reference. (Where there are conflicts as between any two or more of the earlier filed and here incorporated applications and this application, the later filed disclosure controls as to conflicting teachings.)

Referring now to FIG. 4A of the present disclosure, in the illustrated environment 400 which includes a more advanced STAN_3 system 410, a first real and living user 431 (also USER-A, also "Stan") is shown to have access to a first data processing device 431*a* (also CPU-1, where "CPU" does not limit the device to a centralized or single data processing engine, but rather is shorthand for denoting any single or multi-processing digital or mixed signals device). The first user 431 may routinely log into and utilize the illustrated STAN_3 Social-Topical Adaptive Networking system 410 by causing CPU-1 to send a corresponding user identification package 431*u*1 (e.g., user name and user password data signals and optionally, user fingerprint and/or other biometric identification data) to a log-in interface portion 418 of the STAN_3 system 410. In response to validation of such log-in, the STAN_3 system 410 automatically fetches various profiles of the logged-in user (431, "Stan") from a database (DB, 419) thereof for the purpose of determining the user's currently probable topics of prime interest and current focus-upon, moods, chat co-compatibilities and so forth. In one embodiment, a same user (e.g., 431) may have plural personal log-in pages, for example, one that allows him to log in as "Stan" and another which allows that same real life person user to log-in under the alter ego identity (persona) of say, "Stewart" if that user is in the mood to assume the "Stewart" persona at the moment rather than the "Stan" persona. If a user (e.g., 431) logs-in via interface 418 with a second alter ego identity (e.g., "Stewart") rather than with a first alter ego identity (e.g.,"Stan"), the STAN_3 Social-Topical Adaptive Networking system 410 automatically activates personal profile records (e.g., CpCCp's, DsCCp's, PEEP's, PHAFUEL's, etc.; where latter will be explained below) of the second alter ego identity (e.g., "Stewart") rather than those of the first alter ego identity (e.g.,"Stan"). Topics of current interest that are being focused-upon by the logged-in persona may be identified as being logically associated with specific nodes (herein also referred to as TC's or topic centers) on a topics domain-parent/child tree structure such as the one schematically indicated at 415 within the drawn symbol that represents the STAN_3 system 410 in FIG. 4A. A corresponding stored data structure that represents the tree structure in the earlier STAN_1 system (not shown) is illustratively represented by drawing number giF. 4B. The topics defining tree 415 as well as user profiles of registered STAN_3 users may be stored in various parts of the STAN_3 maintained database (DB) 419 which latter entity could be part of a cloud computing system and/or implemented in the user's local and/or remotely-instantiated data processing equipment (e.g., CPU-1, CPU-2, etc.). The database (DB) 419 may be a centralized one or one that is semi-redundantly distributed over different service centers of a geographically distributed cloud computing system. In the distributed cloud computing environment, if one service center becomes nonoperational or overwhelmed with service requests, another somewhat redundant service center can function as a backup (yet more details are provided in the here incorporated STAN_1 patent application). The STAN_1 cloud computing system is of chunky granularity rather than being homogeneous in that local resources (cloud data centers) are more dedicated to servicing local STAN user than to backing up geographically distant centers should the latter become overwhelmed or temporarily nonoperational.

As used herein, the term, "local data processing equipment" includes data processing equipment that is remote from the user but is nonetheless controllable by a local means available to the user. More specifically, the user (e.g., 431) may have a so-called net-computer (e.g., 431*a*) in his local possession and in the form for example of a tablet computer (see also 100 of FIG. 1A) or in the form for example of a palmtop smart cellphone/computer (see also 199 of FIG. 2) where that networked-computer is operatively coupled by wireless or other means to a virtual computer or to a virtual desktop space instantiated in one or more servers on a connected to network (e.g., the Internet 401). In such cases the user 431 may access, through operations of the relatively less-fully equipped net-computer (e.g., tablet 100 of FIG. 1A or palmtop 199 of FIG. 2, or more generally CPU-1 of FIG. 4A), the greater computing and data storing resources (hardware and/or software) available in the instantiated server(s) of the supporting cloud or other networked super-system. As a result, the user 431 is made to feel as if he has a much more resourceful computer locally in his possession (more resourceful in terms of hardware and/or software, both of which are physical manifestations as those terms are used herein) even though that might not be true of the physically possessed hardware and/or software. For example, the user's locally possessed net-computer (e.g., 431*a* in FIG. 4A, 100 in FIG. 1A) may not have a hard disk or a key pad but rather a touch-detecting display screen and/or other user interface means appropriate for the nature of the locally possessed net-computer (e.g., 100 in FIG. 1A) and the local context in which it is used. However the server (or cloud) instantiated virtual machine or other automated physical process that services that net-computer can project itself as having an extremely large hard disk or other memory means and a versatile keyboard-like interface that appears with context variable keys by way of the user's touch-responsive display and/or otherwise interactive screen. Occasionally the term "downloading" will be used herein under the assumption that the user's personally controlled computer (e.g., 431*a*) is receiving the downloaded content. However, in the case of a net-book or the like local computer, the term "downloaded" is to be understood as including the more general notion of inloaded, wherein a virtual computer on the network (or in a cloud computing system) is inloaded with the content rather than having that content being "downloaded" from the network to an actual local and complete computer (e.g., tablet 100 of FIG. 1A) that is in direct possession of the user.

Of course, certain resources such as the illustrated GPS-2 peripheral of CPU-2 (in FIG. 4A, or imbedded GPS 106 and gyroscopic (107) peripherals of FIG. 1A) may not always be capable of being operatively mimicked with an in-net or in-cloud virtual counterpart; in which case it is understood that the locally-required resource (e.g., GPS, gyroscope, IR beam source 109, barcode scanner, RFID tag reader, etc.) is a physically local resource. On the other hand, cell phone triangulation technology, RFID (radio frequency based wireless identification) technology, image recognition technology (e.g., recognizing a landmark) and/or other technologies may be used to mimic the effect of having a GPS unit although one might not be directly locally present.

It is to be understood that the CPU-1 device (431*a*) used by first user 431 when interacting with (e.g., being tracked, monitored in real time by) the STAN_3 system 410 is not limited to a desktop computer having for example a "central" processing unit (CPU), but rather that many varieties of data processing devices having appropriate minimal intelligence capability are contemplated as being usable, including laptop computers, palmtop PDA's (e.g., 199 of FIG. 2), tablet computers (e.g., 100 of FIG. 1*a*), other forms of net-computers, including 3rd generation or higher smartphones (e.g., an iPhone™, and Android™ phone), wearable computers, and so on. The CPU-1 device (431*a*) used by first user 431 may have any number of different user interface (UI) and environment detecting devices included therein such as, but not limited to, one or more integrally incorporated webcams (one of which may be robotically aimed to focus on what off screen view the user appears to be looking at, e.g. 210 of FIG. 2), one or more integrally incorporated ear-piece and/or head-piece subsystems (e.g., Bluetooth™) interfacing devices (e.g., 201*b* of FIG. 2), an integrally incorporated GPS (Global Positioning System) location identifier and/or other automatic location identifying means, integrally incorporated accelerometers (e.g., 107 of FIG. 1) and/or other such MEMs devices (micro-electromechanical devices), various biometric sensors (e.g., pulse, respiration rate, eye blink rate, eye focus angle, body odor) that are operatively coupleable to the user 431 and so on. As those skilled in the art will appreciate from the here incorporated STAN_1 and STAN_2 disclosures, automated location determining devices such as integrally incorporated GPS and/or audio pickups may be used to determine user surroundings (e.g., at work versus at home, alone or in noisy party) and to thus infer from this sensing of environment and user state within that environment, the more probable current user persona (e.g., mood, frame of mind, etc.). One or more (e.g., stereoscopic) first sensors (e.g., 106, 109 of FIG. 1A) may be provided in one embodiment for automatically determining what off-screen or on-screen object(s) the user is currently looking at; and if off-screen, a robotically amiable further sensor (e.g., webcam 210) may be automatically trained onto the off-screen view (e.g., 198 in FIG. 2) in order to identify it, categorize it and optionally provide a virtually-augmented presentation of that off-screen object (198). In one embodiment, an automated image categorizing tool such as GoogleGoggles™ or IQ_Engine™ (e.g., www.iqengines.com) may be used to automatically categorize imagery or objects (including real world objects) that the user appears to be focusing upon. The categorization data of the automatically categorized image/objects may then be used as an additional "encoding" and hint presentations for assisting the STAN_3 system 410 in determining what topic or finite set of topics the user (e.g., 431) currently most probably has in focus within his or her mind.

It is within the contemplation of the present disclosure that alternatively or in addition to having an imaging device near the user and using an automated image/object categorizing tool such as GoogleGoggles™, IQ_Engine™, etc., other encoding detecting devices and automated categorizing tools may be deployed such as, but not limited to, sound detecting, analyzing and categorizing tools; non-visible light band detecting, analyzing, recognizing and categorizing tools (e.g., IR band scanning and detecting tools); near field apparatus identifying communication tools, ambient chemistry and temperature detecting, analyzing and categorizing tools (e.g., What human olfactorable and/or unsmellable vapors, gases are in the air surrounding the user and at what changing concentration levels?); velocity and/or acceleration detecting, analyzing and categorizing tools (e.g., Is the user in a moving vehicle and if so, heading in what direction at what speed or acceleration?); gravitational orientation and/or motion detecting, analyzing and categorizing tools (e.g., Is the user titling, shaking or otherwise manipulating his palmtop device?); and virtually-surrounding or physically-surrounding other people detecting, analyzing and categorizing tools (e.g., Is the user in virtual and/or physical contact or proximity with other personas, and if so what are their current attributes?).

Each user (e.g., 431, 432) may project a respective one of different personas and assumed roles (e.g., "at work" versus "at play" persona) based on the specific environment (including proximate presence of other people virtually or physically) that the user finds him or herself in. For example, there may be an at-the-office or work-site persona that is different from an at-home or an on-vacation persona and these may have respectively different habits and/or routines. More specifically, one of the many personas that the first user 431 may have is one that predominates in a specific real and/or virtual environment 431*e*2 (e.g., as geographically detected by integral GPS-2 device of CPU-2). When user 431 is in this environmental context (431*e*2), that first user 431 may choose to identify him or herself with (or have his CPU device automatically choose for him/her) a different user identification (UAID-2, also 431*u*2) than the one utilized (UAID-1, also 431*u*1) when typically interacting in real time with the STAN_3 system 410. A variety of automated tools may be used to detect, analyze and categorize user environment (e.g., place, time, calendar date, velocity, acceleration, surroundings—objects and/or people, etc.). These may include but are not limited to, webcams, IR Beam (IRB) face scanners, GPS locators, electronic time keeper, MEMs, chemical sniffers, etc.

When operating under this alternate persona (431*u*2), the first user 431 may choose (or pre-elect) to not be wholly or partially monitored in real time by the STAN_3 system (e.g., through its CFi, CVi or other such monitoring and reporting mechanisms) or to otherwise be generally interacting with the STAN_3 system 410. Instead, the user 431 may elect to log into a different kind of social networking (SN) system or other content providing system (e.g., 441, . . . , 448, 460) and to fly, so-to-speak, solo inside that external platform 441-etc. While so interacting with the alternate social networking (SN) system (e.g., FaceBook™ MySpace™, LinkedIn™, YouTube™, GoogleWave™, ClearSpring™, etc.), the user may develop various types of user-to-user associations (U2U, see block 411) unique to that platform. More specifically, the user 431 may develop a historically changing record of newly-made "friends"/"frenemys" on the FaceBook™ platform 441 such as: recently de-friended persons, recently allowed-behind the private wall friends (because they are more trusted) and so on. The user 431 may develop a historically changing record of newly-made 1st degree "contacts" on the LinkedIn™ platform 444, newly joined groups and so on. The user 431 may them wish to import some of these user-to-user associations (U2U) to the STAN_3 system 410 for the purpose of keeping track of what topics in one or more topic spaces 413 the friends, un-friends, contacts, buddies etc. are currently focusing-upon. Importation of user-to-user association (U2U) records into the STAN_3 system 410 may be done under joint import/export agreements as between various platform operators or via user transfer of records from an external platform (e.g., 441) to the STAN_3 system 410.

Referring firstly on a brief basis to FIG. 1A (more details are provided later below), shown here is a display screen 111 of a corresponding tablet computer 100 on whose screen 111 there are displayed a variety of machine-instantiated virtual objects. In the exemplary illustration, the displayed objects are organized into major screen regions including a major left column region 101, a top hideable tray region 102, a major right column region 103 and a bottom hideable tray region 104. The corners at which the column and row regions 101-104 meet also have noteworthy objects. The bottom right corner contains an elevator tool 113. The upper left corner contains an elevator floor indicating tool 113*a*. The bottom left corner contains a settings tool 114. The top right corner is reserved for a status indicating tool 112 that tells the user at least whether monitoring is active or not, and if so, what parts of his/her screen and/or activities are being monitored (e.g., full screen and all activities). The center of the display screen 111 is reserved for centrally focused-upon content (e.g., window 117, not to scale) that the user will usually be focusing-upon.

Among the objects displayed in the left column area 101 are a sorted list of social entities such as "friends" and/or "family" members and/or groups currently associated with a King-of the-Hill Social Entity (e.g., KoH="Me" 101*a*) listed at the top of left column 101. In terms of a more specific example, the displayed circular plate denoted as the "My Friends" group 101*c* can represent a filtered subset of a current FaceBook™ friends whose identification records have been imported from the corresponding external platform (e.g., 441 of FIG. 4A) and then filtered according to a user-chosen filtering algorithm (e.g., all my trusted, behind the wall friends of the past week who haven't been de-friended by me in the past 2 weeks). An EDIT function provided by an on-screen menu 111*a* includes tools (not shown) for allowing the user to select who or what social entity (e.g., the "Me" entity) will be placed at and thus serve as the header or King-of the-Hill top leader of the social entities column 101 and what social-associates of the head entity 101*a* (e.g., "Me") will be displayed below it and how those further socially-associated entities 101*b*-101*d* will be grouped and/or filtered (e.g., only all my trusted, behind the wall friends of the past week) for tracking some of their activities in an adjacent column 101*r*. In the illustrated example, a subsidiary adjacent column 101*r* (social radars column) indicates what top-5 topics of the entity "Me" (101*a*) are also being focused-upon in recent time periods (e.g., now and 15 minutes ago) and to what extent (amount of "heat") by associated friends or family or other social entities (101*b*-101*d*). The focused-upon top-5 topics are represented by topic nodes defined in a corresponding one or more topic space defining database records (e.g., area 413 of FIG. 4A) maintained or tracked by the STAN_3 system 410.

Yet more specifically, the user of tablet computer 100 (FIG. 1A) may select a selectable persona of himself (e.g., 431*u*1) to be used as the head entity or "mayor" (or "King-'o-Hill", KoH) of the social entities column 101. The user may elect to have that selected KoH persona to be listed as the "Me" head entity in screen region 101*a*. The user may select a selectable usage attribute (e.g., current top-5 topics of mine, older top N topics of mine, recently most heated up N' topics of mine, etc.) to be tracked in the subsidiary and radar-like tracking column 101*r* disposed adjacent to the social entities listing column 101. The user may also select an iconic method by way of which the selected usage attribute will be displayed.

It is to be understood that the layout and contents of FIG. 1A are merely exemplary. The same tablet computer 100 may display other Layer-Vator (113) reachable floors or layers that have completely different layouts and contain different objects. This will be clearer when the "Help Grandma" floor is later described in conjunction with FIG. 1N. Moreover, it is to be understood that, although various graphical user interfaces (GUI's) are provided herein as illustrative examples, it is within the contemplation of the disclosure to use user interfaces other than or in addition to GUI's; including, but not limited to; (1) voice only interfaces (e.g., provided through a user worn head set or earpiece (i.e. a BlueTooth™ compatible earpiece); (2) sight-independent touch/tactile interfaces such as those that might be used by visually impaired persons; (3) gesture recognition interfaces such as those where a user's hand gestures and/or other body motions and/or muscle tensionings or relaxations are detected by automated means and converted into computer-usable input signals; and so on.

Figure 1D:
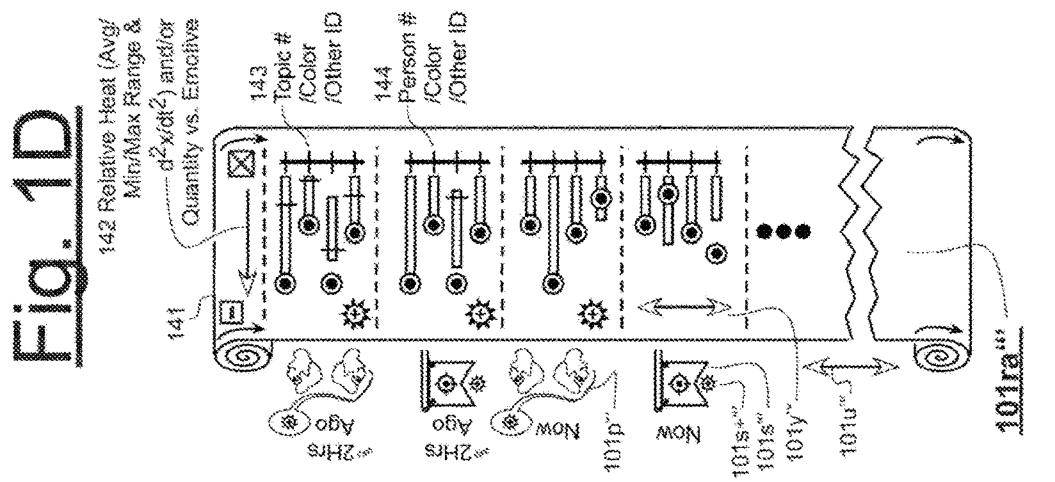
FIG. 1D shows in greater detail, another way of displaying heat as a function of time and personas or groups involved and/or topic nodes involved.
Figure 1C:
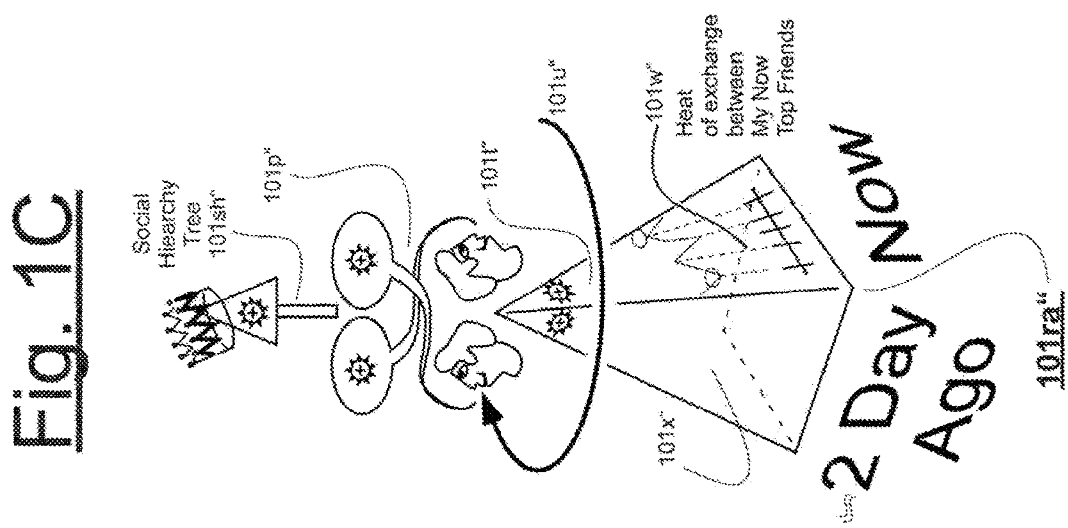
FIG. 1C shows in greater detail, another multi-dimensional and rotatable "heat" indicating construct that may be used in the radar display column of FIG. 1A where the illustrated heat indicating construct is indicative of intensity of discussion or other data exchanges as may be occurring between pairs of persons or groups of persons (SPE's) when using the STAN_3 system.
Figure 1B:
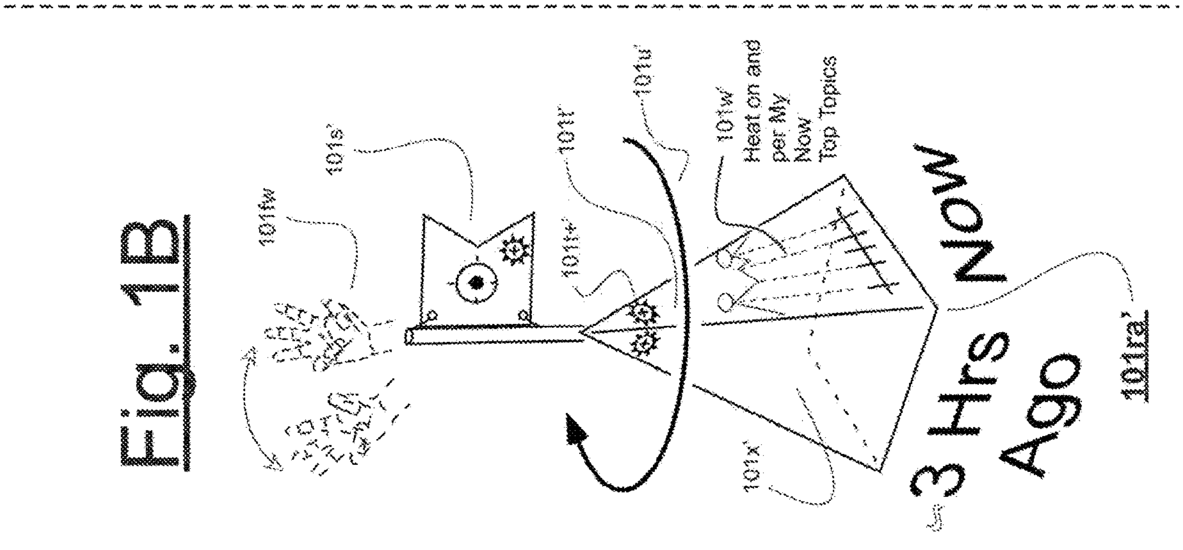
FIG. 1B shows in greater detail, a multi-dimensional and rotatable "heat" indicating construct that may be used in a so-called, SPEIS radar display column of FIG. 1A where the illustrated heat indicating construct is indicative of intensity of focus on certain topic nodes of the STAN_3 system by certain SPE's (Social/Persona Entities) who are context wise related to a top-of-column SPE (e.g., "Me")

Referring to still to the illustrative example of FIG. 1A and also to a further illustrative example provided in corresponding FIG. 1B, the user is assumed in this case to have selected a rotating-pyramids visual-radar displaying method of having his selected usage attribute (e.g., heat per my now top 5 topics) presented to the user. Here, two faces of a periodically or sporadically revolving or rotationally reciprocating pyramid (e.g., a pyramid having a square base) are simultaneously seen by the user. One face graphs so-called temperature or heat attributes of his currently focused-upon, top-N topics as determined over a corresponding time period (e.g., a predetermined duration such as over the last 15 minutes). That first period is denoted as "Now". The other face provides bar graphed temperatures of the identified top topics of "Me" for another time period (e.g., a predetermined duration such as between 2.5 hours ago and 3.5 hours ago) which in the example is denoted as "3 Hours Ago". (The chosen attributes and time periods are better shown in FIG. 1B, where the earlier time period can vary according to user editing of radar options in an available settings menu). Although a rotating pyramid having an N-sided base (e.g., N=3, 4, 5, . . . ) is one way of displaying graphed heats, temperatures or other user-selectable attributes for different time periods and/or for geographic locations and/or for context zones of the leader entity (the KoH), it is within the contemplation of the present disclosure to instead display faces of other kinds of M-faced rotating polyhedrons (where M can be 3 or more, including very large numbers if so desired). These polyhedrons can rotate about different axes thereof so as to display in one or more forward winding or backward winding motions, multiple ones of such faces. It is also within the contemplation of the disclosure to use a scrolling reel format such as illustrated in FIG. 1D where the reel winds forwards or backwards and occasionally rewinds through the graphs-providing frames of that reel 101*ra*'''. In one embodiment, the user can edit what will be displayed on each face of his revolving polyhedron (e.g., 101*ra*'' of FIG. 1C) or winding reel (e.g., 101*ra*''' of FIG. 1D) and how the polyhedron/reeled tape will automatically rotate or wind and rewind. The user-selected parameters may include for example, different time ranges for respective time-based faces, different topics and/or social entities for respective topic-based and/or social entity-based faces, and what events (e.g., passage of time, threshold reached, desired geographic area reached, check-in into business or other establishment or place achieved, etc.) will trigger an automated rotation to and showing off of a given face or tape frame and its associated graphs or other metering or mapping mechanisms.

On each face of a revolving pyramid, or polyhedron, or back and forth winding tape reel, etc., the bar graphed (or otherwise graphed) and so-called, temperature parameter (a.k.a. 'heat' magnitude) may represent any of a plurality of user-selectable attributes including, but not limited to, degree and/or duration of focus on a topic and/or degree of emotional intensity detected as statistically normalized, averaged, or otherwise statistically massaged for a corresponding social entity (e.g., "Me", "My Friend", "My Friends" (a user defined group), "My Family Members", "My Immediate Family" (a user defined or system defined group), etc.) and as regarding a corresponding set of current top topics of the head entity 101*a* of the social entities column 101. The current top topics of the head entity (KoH) 101*a* may be found for example in a current top topics serving plate (or listing) 102*a* Now displayed elsewhere on the screen 111 (of FIG. 1A). Alternatively, the user may activate a virtual magnifying or details-showing and unpacking button (e.g., 101*t*+' provided on Now face 101*t*' of FIG. 1B) so as to see an enlarged and more detailed view of the corresponding radar feature and its respective components. In FIGS. 1A-1D as well as others, a plus symbol (+) inside of a star-burst icon (e.g., 101*t*+' of FIG. 1B or 99+ of FIG. 1A) indicates that such is a virtual magnification/unpacking invoking button tool which will cause presentation of a magnified or expanded-into-more detailed (unpacked) view of the object when the virtual magnification button is virtually activated by touch-screen and/or other activation techniques (e.g., mouse clicks). Temperature may be represented as length or range of the displayed bar in bar graph fashion and/or as color or relative luminance of the displayed bar and/or flashing rate, if any, of a blinking bar where the flashing may indicate a significant change from last state and/or an above-threshold value of the determined heat value. These are merely non-limiting examples. Incidentally, in FIG. 1A, embracing hyphens (e.g., those at the start and end of a string like: –99+–) are generally used around reference numbers to indicated that these reference symbols are not displayed on the display screen 111.

Still referring to FIG. 1B, in one embodiment, a special finger waving flag 101*fw* may automatically pop out from the top of the pyramid (or reel frame if the format of FIG. 1D is instead used) at various times. The popped out finger waving flag 101*fw* indicates (as one example of various possibilities) that the tracked social entity has three out of five of commonly shared topics with the column leader (e.g., KoH='Me') exceeding a predetermined threshold. In other words, such a 2, 3, 4, etc. fingers waving hand (e.g., 101*fw*) alerts the user that the corresponding non-leader social entity (could be a person or a group) is showing above-threshold heat not just for one of the current top N topics of the leader (of the KoH), but rather for two or more, or three or more shared topic nodes or shared topic space regions (TSR's—see FIG. 3D), where the required number of common topics and level of threshold crossing for the alerting hand 101*fw* to pop up is selected by the user through a settings tool (114) and, of course, the popping out of the waving hand 101*fw* may also be turned off as the user desires. The exceeding-threshold, m out of n common topics function may be provided not only for the alert indication 101*fw* shown in FIG. 1B, but also for a similar alerting indications (not shown) in FIG. 1C, in FIG. 1D and in FIG. 1K. The usefulness of such an m out of n common topics indicating function (where here $m \leq n$ and both are whole numbers) will be further explained below in conjunction with description of FIG. 1K.

Referring back to the left side of FIG. 1A, each time the header (leader, KoH, mayor) pyramid 101*ra* (or another such temperature and/or commonality indicating means) rotates or otherwise advances to show a different set of faces thereof, and to therefore show a different set of time periods or other context-representing faces; or each time the header object 101*ra* partially twists and returns to its original angle of rotation, the follower pyramids 101*rb*-101*rd* (or other radar objects) below it follow suite (but perhaps with slight time delay to show that they are followers, not leaders). At that time the displayed faces of each pyramid or other radar object are refreshed to show the latest temperature or heats data for the displayed faces or frames on a reel and optionally where a predetermined threshold level has been crossed by the displayed heat or other attribute indicators (e.g., bar graphs). As a result, the user (not shown in 1A, see instead 201A of FIG. 2) of the tablet computer 100 can quickly see a visual correlation as between the top topics of the header entity 101*a* (e.g., KoH="Me") and the intensity with which other associated social entities 101*b*-101*d* (e.g., friends and family) are also focusing-upon those same topic nodes (top topics of mine) during a relevant time period (e.g., Now versus X minutes or hours or days ago) and in cases where there is a shared large amount of 'heat' with regard to more than one common topic, the social entities that have such multi-topic commonality of concurrent large heats (e.g., 3 out of 5 are above-threshold per the example in FIG. 1B); such may be optionally flagged (e.g., per waving hand object 101*fw* of FIG. 1B) as deserving special attention by the user. Incidentally, the header entity 101*a* (e.g., KoH="Me") does not have to be the user of the tablet computer 100. It can be a person or group whom the user admires (or despises, or feels otherwise about) where the user wishes to see what topics are currently deemed to be the "topmost" and/or "hottest" for that user-selected header entity 101*a*. Moreover, the so-called, topics serving plates 102*a*, 102*b*, 102*c*, etc. of the topics serving tray 102 (where 102*c* and more are not shown and instead indicated to be accessible with a viewing expansion tool (e.g., 3 ellipses)) are not limited to showing an automatically determined (e.g., determined via knowledge base rules) set such as a social entities' top 5 topics or top N topics (N=number other than 5 here). The user can manually establish how many topics serving plates 102*a*, 102*b*, etc. (if any) will be displayed on the topics serving tray 102 (if the latter is displayed rather than being hidden (102*z*)) and which topic or collection of topics will be served on each topics serving plate (e.g., 102*a*). The topics on a given topics serving plate (e.g., 102*a*) do not have to be related to one another, although they could be. One or more editing functions may be used to determine who or what the header entity (KoH) 101*a* is; and in one embodiment, the system (410) automatically changes the identity of who or what is the header entity 101*a* at, for example, predetermined intervals of time (e.g., once every 10 minutes) so that the user is automatically supplied over time with a variety of different radar scope like reports that may be of interest. When the header entity (KoH) 101*a* is automatically so changed, the leftmost topics serving plate (e.g., 102*a*) is automatically also changed to, for example, serve up a representation of the current top 5 topics of the new KoH (King of the Hill) 101*a*.

The ability to track the top-N topic(s) that the user and/or other social entity is now focused-upon or has earlier focused-upon is made possible by operations of the STAN_3 system 410 (which system is represented for example in FIG. 4A as optionally including cloud-based and/or remote-server based and database based resources). These operations include that of automatically determining the more likely topics currently deemed to be on the minds of logged-in STAN users by the STAN_3 system 410. Of course each user, whose topic-related temperatures are shown via a radar mechanism such as the illustrated revolving pyramids 101*ra*-101*rd*, is understood to have a-priori given permission (or double level permissions) in one way or another to the STAN_3 system 410 to share such information with others. In one embodiment, each user of the STAN_3 system 410 can issue a retraction command that causes the STAN_3 system to erase all CFi's and/or CVi's collected from that user in the last m minutes (e.g., m=2, 5, 10, 30, 60 minutes) and to erase from sharing, topical information regarding what the user was doing in the specified last m minutes. The retraction command can be specific to an identified region of topic space instead of being global for all of topic space. In this way, if the user realizes after the fact that what he/she was focusing-upon is something they do not want to share, they can retract the information to the extent it has not yet been seen by others. In one embodiment, each user of the STAN_3 system 410 can control his/her future share-out attributes so as to specify one or more of: (1) no sharing at all; (2) full sharing of everything; (3) limited sharing to a limited subset of associated other users (e.g., my trusted, behind-the-wall friends and immediate family); (4) limited sharing as to a limited set of time periods; (5) limited sharing as to a limited subset of areas on the screen 111 of the user's computer; (6) limited sharing as to limited subsets of identified regions in topic space; (7) limited sharing based on specified blockings of identified regions in topic space; and so on. If a given second user has not authorized sharing out of his attribute statistics, such blocked statistics will be displayed as faded out, grayed out or over areas or otherwise indicated as not available areas on the radar icons (e.g., 101*ra*' of FIG. 1B) of the watching first user. Additionally, if a given second user is currently off-line, the "Now" face (e.g., 101*t*' of FIG. 1B) of the radar icon (e.g., pyramid) of that second user will be dimmed, dashed, grayed out, etc. If the given second user was off-line during the time period (e.g., 3 Hours Ago) specified by the second face 101*x*' of the radar icon (e.g., pyramid) of that second user, such second face 101*x*' will be grayed out. Accordingly, the first user may quickly tell whom among his friends and family (or other associated social entities) was online when (if sharing of such information is permitted) and what interrelated topics they were focused-upon during the corresponding time period (e.g., Now versus 3 Hrs. Ago). If a second user does not want to share out information about when he/she is online or off, no pyramid (or other radar object) will be displayed for that second user to other users. (Or if the second user is a member of group whose group dynamics are being tracked by a radar object, that second user will be treated as if he or she not then participating in the group, in other words, he/she is offline.)

Not all of FIG. 4A has been described yet. This disclosure will be ping ponging between FIGS. 1A and 4A as the interrelation between them warrants. With regard to FIG. 4A, it has already been discussed that a given first user (431) may develop a wide variety of user-to-user associations and corresponding U2U records 411 based on social networking activities carried out within the STAN_3 system 410 and/or within external platforms (e.g., 441, 442, etc.). Also the real person user 431 may elect to have many and differently identified social personas for himself which personas are exclusive to, or cross over as between two or more social networking (SN) platforms. For example, the user 431 may, while interacting only with the MySpace™ platform 442 choose to operate under an alternate ID and/or persona 431*u*2—i.e. "Stewart" instead of "Stan" and when that persona operates within the domain of external platform 442, that "Stewart" persona may develop various user-to-topic associations (U2T) that are different than those developed when operating as "Stan" and under the usage monitoring auspices of the STAN_3 system 410. Also, topic-to-topic associations (T2T), if they exist at all and are operative within the context of the alternate SN system (e.g., 442) may be different from those that at the same time have developed inside the STAN_3 system 410. Additionally, topic-to-content associations (T2C, see block 414) that are operative within the context of the alternate SN system 442 may be nonexistent or different from those that at the same time have developed inside the STAN_3 system 410. Yet further, Context-to-other attribute(s) associations (L2(U/T/C, see block 416) that are operative within the context of the alternate SN system 442 may be nonexistent or different from those that at the same time have developed inside the STAN_3 system 410. It can be desirable in the context of the present disclosure to import at least subsets of user-to-user associations (U2U) developed within the external platforms (e.g., FaceBook™ 441, LinkedIn™ 444, etc.) into a user-to-user associations (U2U) defining database section 411 maintained by the STAN_3 system 410 so that automated topic tracking operations such as the briefly described one of columns 101 and 101*r* of FIG. 1A can take place while referencing the externally-developed user-to-user associations (U2U).

The word "context" is used to mean several different things within this disclosure. Unfortunately, the English language does not offer too many alternatives for expressing the plural semantic possibilities for "context" and thus its meaning must be determined based on; please forgive the circular definition, its context. One of the meanings ascribed herein for "context" is to describe a role assigned to or undertaken by an actor and the expectations that come with that role assignment. More specifically, when a person is in the context of being "at work", there are certain "roles" assigned to that actor while he or she is deemed to be operating within the context of that "at work" activity. More particularly, a given actor may be assigned to the formal role of being Vice President of Social Media Research and Development at a particular company and there may be a formal definition of expected performances to be carried out by the actor when in that role (e.g., directing subordinates within the company's Social Media Research and Development Department). Similarly, the activity (e.g., being a VP while "at work") may have a formal definition of expected subactivities. At the same time, the formal role may be a subterfuge for other expected roles and activities because everybody tends to be called "Vice President" for example in modern companies while that formal designation is not the true "role". So there can be informal role definitions and informal activity definitions. Moreover, a person can be carrying out several roles at one time and thus operating within overlapping contexts. More specifically, while "at work", the VP of Social Media R&D may drop into an online chat room where he has the role of active room moderator and there he may encounter some of the subordinates in his company's Social Media R&D Dept. also participating within that forum. At that time, the person may have dual roles of being their boss in real life (ReL) and also being room moderator over their virtual activities within the chat room. Accordingly, the simple term "context" can very quickly become complex and its meanings may have to be determined based on existing circumstances (another way of saying context).

One addition provided by the STAN_3 system 410 disclosed here is the database portion 416 which provides "Context" based associations. More specifically, these can be Location-to-User and/or Topic and/or Content associations. The context; if it is location-based for example, can be a real life (ReL) geographic one and/or a virtual one where the real life (ReL) or virtual user is deemed by the system to be located. Alternatively or additionally, the context can be indicative of what type of Social-Topical situation the user is determined to be in, for example: "at work", "at a party", at a work-related party, in the school library, etc. The context can alternatively or additionally be indicative of a temporal range in which the user is situated, such as: time of day, day of week, date within month or year, special holiday versus normal day and so on. Alternatively or additionally, the context can be indicative of a sequence of events that have and/or are expected to happen such as: a current location being part of a sequence of locations the user habitually or routinely traverses through during for example, a normal work day and/or a sequence of activities and/or social contexts the user habitually or routinely traverses through during for example, a normal weekend day (e.g., IF Current Location/Activity=Filling up car at Gas Station X, THEN Next Expected Location/Activity=Passing Car through Car Wash Line at same Gas Station X in next 20 minutes). Much more will be said herein regarding "context". It is a complex subject.

For now it is sufficient to appreciate that database records (e.g., hierarchically organized context nodes and links which connect them to other nodes) in this new section 416 can indicate context related associations (e.g., location and/or time related associations) including, but not limited to, (1) when an identified social entity (e.g., first user) is disposed at a given location as well as within a cross-correlated time period, and that the following one or more topics are likely to be associated with the role that the social entity is engaged in due to being in the given "context' or circumstances: T1, T2, T3, etc.; (2) when a first user is disposed at a given location as well as within a cross-correlated time period, and the following one or more additional social entities are likely to be associated with (e.g., nearby to) the first user: U2, U3, U4, etc.; (3) when a first user is disposed at a given location as well as within a cross-correlated time period, and the following one or more content items are likely to be associated with the first user: C1, C2, C3, etc.; and (4) when a first user is disposed at a given location as well as within a cross-correlated time period, and the following one or more combinations of other social entities, topics, devices and content items are likely to be associated with the first user: U2/T2/D2/C2, U3/T2/D4/C4, etc. The context-to-other association records 416 (e.g., L-to-U/T/C association records 416) may be used to support location-based or otherwise context-based, automated generation of assistance information.

Before providing a more concrete example of how a given user (e.g., Stan/Stew 431) may have multiple personas operating in different contexts and how those personas may interact differently and may form different user-to-user associations (U2U) when operating under their various contexts (domains) including under the contexts of different social networking (SN) or other platforms, a brief discussion about those possible other SN's or other platforms is provided here. There are many well known dot.COM websites (440) that provide various kinds of social interaction services. The following is a non-exhaustive list: Baidu™; Bebo™; Flickr™; Friendster™; Google Buzz™, hi5™; LinkedIn™, LiveJournal™; MySpace™, NetLog™; Orkut™; Twitter™; XING™; and Yelp™.

One of the currently most well known and used ones of the social networking (SN) platforms is the FaceBook™ system 441 (hereafter also referred to as FB). FB users establish an FB account and set up various permission options that are either "behind the wall" and thus relatively private or are "on the wall" and thus viewable by any member of the public. Only pre-identified "friends" (e.g., friend-for-the-day, friend-for-the-hour) can look at material "behind the wall". FB users can manually "de-friend" and "re-friend" people depending on who they want to let in on a given day or other time period to the more private material behind their wall.

Another well known SN site is MySpace™ (442) and it is somewhat similar to FB. A third SN platform that has gained popularity amongst so-called "professionals" is the LinkedIn™ platform (444). LinkedIn™ users post a public "Profile" of themselves which typically appears like a resume and publicizes their professional credentials in various areas of professional activity. LinkedIn™ users can form networks of linked-to other professionals. The system automatically keeps track of who is linked to whom and how many degrees of linking separation, if any, are between people who appear to the LinkedIn™ system to be strangers to each other because they are not directly linked to one another. LinkedIn™ users can create Discussion Groups and then invite various people to join those Discussion Groups. Online discussions within those created Discussion Groups can be monitored (censored) or not monitored by the creator (owner) of the Discussion Group. For some Discussion Groups (private discussion groups), an individual has to be pre-accepted into the Group (for example, accepted by the Group moderator) before the individual can see what is being discussed behind the wall of the members-only Discussion Group or can contribute to it. For other Discussion Groups (open discussion groups), the group discussion transcripts are open to the public even if not everyone can post a comment into the discussion. Accordingly, as is the case with "behind the wall" conversations in FaceBook™, Group Discussions within LinkedIn™ may not be viewable to relative "strangers" who have not been accepted as a linked-in friend or as a contact for whom an earlier member of the LinkedIn™ system sort of vouches for by "accepting" them into their inner ring of direct (1st degree of operatively connection) contacts.

The Twitter™ system (445) is somewhat different because often, any member of the public can "follow" the "tweets" output by so-called "tweeters". A "tweet" is conventionally limited to only 140 characters. Twitter™ followers can sign up to automatically receive indications that their favorite (followed) "tweeters" have tweeted something new and then they can look at the output "tweet" without need for any special permissions. Typically, celebrities such as movie stars output many tweets per day and they have groups of fans who regularly follow their tweets. It could be said that the fans of these celebrities consider their followed "tweeters" to be influential persons and thus the fans hang onto every tweeted output sent by their worshipped celebrity (e.g., movie star).

The Google™ Corporation (Mountain View, California) provides a number of well known services including their famous online and free to use search engine. They also provide other services such a Google™ controlled Gmail™ service (446) which is roughly similar to many other online email services like those of Yahoo™, EarthLink™, AOL™, Microsoft Outlook™ Email, and so on. The Gmail™ service (446) has a Group Chat function which allows registered members to form chat groups and chat with one another. GoogleWave™ (447) is a project collaboration system that is believed to be still maturing at the time of this writing. Microsoft Outlook™ provides calendaring and collaboration scheduling services whereby a user can propose, declare or accept proposed meetings or other events to be placed on the user's computerized schedule.

It is within the contemplation of the present disclosure for the STAN_3 system to periodically import calendaring and/or collaboration/event scheduling data from a user's Microsoft Outlook™ and/or other alike scheduling databases (irrespective of whether those scheduling databases and/or their support software are physically local within a user's computer or they are provided via a computing cloud) if such importation is permitted by the user, so that the STAN_3 system can use such imported scheduling data to infer, at the scheduled dates, what the user's more likely environment and/or contexts are. Yet more specifically, in the introductory example given above, the hypothetical attendant to the "Superbowl™ Sunday Party" may have had his local or cloud-supported scheduling databases pre-scanned by the STAN_3 system 410 so that the latter system 410 could make intelligent guesses as to what the user is later doing, what mood he will probably be in, and optionally, what group offers he may be open to welcoming even if generally that user does not like to receive unsolicited offers.

Incidentally, it is within the contemplation of the present disclosure that essentially any database and/or automated service that is hosted in and/or by one or more of a user's physically local data processing device, a website's web serving and/or mirroring servers and parts or all of a cloud computing system or equivalent can be ported in whole or in part so as to be hosted in and/or by different one of such physical mechanisms. With net-computers, palm-held convergence devices (e.g., iPhone™, iPad™ etc.) and the like, it is usually not of significance where specifically the physical processes of data processing of sensed physical attributes take place but rather that timely communication and connectivity are provided so that the user experiences substantially same results. Of course, some acts of data acquisition and/or processing may by necessity have to take place at the physical locale of the user such as the acquisition of user responses (e.g., touches on a touch-sensitive tablet screen, IR based pattern recognition of user facial grimaces and eyeball orientations, etc.) and of local user encodings (e.g., what the user's local environment looks, sounds, feels and/or smells like). Returning back to the digressed-away from method of automatically importing scheduling data to thereby infer at the scheduled dates, the user's more likely environment, a more specific example can be this: If the user's scheduling database indicates that next Friday he is scheduled to be at the Social Networking Developers Conference (SNDC, a hypothetical example) and more particularly at events 1, 3 and 7 in that conference at the respective hours of 10:00 AM, 3:00 PM and 7:00 PM, then when that date and corresponding time segment comes around, the STAN_3 system may use such information as one of its gathered encodings for then automatically determining the user's likely mood, surroundings and so forth. For example, between conference events 1 and 3, the user may be likely to seek out a local lunch venue and to seek out nearby friends and/or colleagues to have lunch with. This is where the STAN_3 system 410 can come into play by automatically providing welcomed “offers”. One welcomed offer might be from a local restaurant which proposes a discount if the user brings 3 of his friends/colleagues. Another such welcomed offer might be from one of his friends who asks, “If you are at SNDC today or near the downtown area around lunch time, do you want to do lunch with me? I want to let you in on my latest hot project.” These are examples of location specific, social-interrelation specific, time specific, and/or topic specific event offers which may pop up on the user’s tablet screen 111 (FIG. 1A) for example in topic-related area 104*t* (adjacent to on-topic window 117) or in general event offers area 104 (at the bottom tray area of the screen).

In order for the system 400 to appear as if it can magically and automatically connect all the right people (e.g., those with concurrent shared interests and social interaction co-compatibilities) at the right time for a power lunch in the locale of a business conference they are attending, the system 400 should have access to data that allows the system 400 to: (1) infer the moods of the various players (e.g., did each not eat recently and is each in the mood for a business oriented lunch?), (2) infer the current topic(s) of interest most likely on the mind of the individual at the relevant time; (3) infer the type of conversation or other social interaction the individual will most likely desire at the relevant time and place (e.g., a lively debate as between people with opposed view points, or a singing to the choir interaction as between close friends and/or family?); (4) infer the type of food or other refreshment or eatery ambiance/decor each invited individual is most likely to agree to (e.g., American cuisine? Beer and pretzels? Chinese take-out? Fine-dining versus fast-food? Other?); (5) infer the distance that each invited individual is likely to be willing to travel away from his/her current location to get to the proposed lunch venue (e.g., Does one of them have to be back on time for a 1:00 PM lecture where they are the guest speaker? Are taxis or mass transit readily available? Is parking a problem?) and so on.

Since STAN systems such as the ones disclosed in here incorporated U.S. application Ser. No. 12/369,274 and Ser. No. 12/854,082 as well as the present disclosure are persistently testing or sensing for change of user mood (and thus change of active PEEP and/or other profiles), the same mood determining algorithms may be used for automatically formulating group invitations based on mood. Since STAN systems are also persistently testing for change of current user location or current surroundings, the same user location/context determining algorithms may be used for automatically formulating group invitations based on current user location and/or other current user context. Since STAN systems are also persistently testing for change of user’s current likely topic(s) of interest, the same user topic(s) determining algorithms may be used for automatically formulating group invitations based on user topic(s) being currently focused-upon. Since STAN systems are also persistently checking their users’ scheduling calendars for open time slots and pressing obligations, the same algorithms may assist in the automated formulating of group invitations based on open time slots and based on competing other obligations. In other words, much of the underlying data processing is already occurring in the background for the STAN systems to support their primary job of delivering online invitations to STAN users to join on-topic (or other) online forums. It is thus a relatively small extension to add other types of group offers to the process, where the other types of offers can include invitations to join in a real world social interactions (e.g., lunch, dinner, movie, show, bowling, etc.) or to join in on a real world or virtual world business oriented venture (e.g., group discount coupon, group collaboration project).

In one embodiment, user PEEP records (Personal Emotion Expression Profiles) are augmented with user PHAFUEL records (Personal Habits And Favorites/Unfavorites Expression Logs) which indicate various life style habits of the respective users such as, but not limited to: (1) what types of foods he/she likes to eat, when and where (e.g., favorite restaurants or restaurant types); (2) what types of sports activities he/she likes to engage in, when and where (e.g., favorite gym or exercise equipment); (3) what types of non-sport activities he/she likes to engage in, when and where (e.g., favorite movies, movie houses, theaters, actors, etc.); (4) what are the usual sleep, eat, work and recreational time patterns of the individuals are (e.g., typically sleeps 11 pm-6 am, gym 7-8, breakfast 8-8:30, work 9-12, 1-5, dinner 7 pm, etc.) during normal work weeks, when on vacation, when on business oriented trips, etc. The combination of such PEEP records and PHAFUEL records can be used to automatically formulate event invitations that are in tune with each individual’s life style habits.

In line with this, automated life style planning tools such as the Microsoft Outlook™ product typically provide Tasks tracking functions wherein various to-do items and their criticalities (e.g., flagged as a must-do today, must-do next week, etc.) are recorded. Such data could be stored in a computing cloud or in another remotely accessible data processing system. It is within the contemplation of the present disclosure for the STAN_3 system to periodically import Task tracking data from the user’s Microsoft Outlook™ and/or other alike task tracking databases (if permitted by the user, and whether stored in a same cloud or different resource) so that the STAN_3 system can use such imported task tracking data to infer during the scheduled time periods, the user’s more likely environment, context, moods, social interaction dispositions, offer welcoming dispositions, etc. The imported task tracking data may also be used to update user PHAFUEL records (Personal Habits And Favorites/Unfavorites Expression Log) which indicate various life style habits of the respective user if the task tracking data historically indicates a change in a given habit or a given routine. More specifically with regard to current user context, if the user’s task tracking database indicates that the user has a high priority, high pressure work task to be completed by end of day, the STAN_3 system may use this imported information to deduce that the user would not then likely welcome an unsolicited event offer (e.g., 104*t* or 104*a* in FIG. 1A) directed to leisure activities for example and instead that the user’s mind is most likely sharply focused on topics related to the must-be-done task(s) as their deadlines approach and they are listed as not yet complete. Similarly, the user may have Customer Relations Management (CRM) software that the user regularly employs and the database of such CRM software might provide exportable information (if permitted by the user) about specific persons, projects, etc. that the user will more likely be involved with during certain time periods and/or when present in certain locations. It is within the contemplation of the present disclosure for the STAN_3 system to periodically import CRM tracking data from the user’s CRM tracking database(s) (if permitted by the user, and whether such data is stored in a same cloud or different resources) so that the STAN_3 system can use such imported CRM tracking data to, for example, automatically formulate an impromptu lunch proposal for the user and one of his/her customers if they happen to be located close to a nearby restaurant and they both do not have any time pressing other activities to attend to. Such automatically generated suggestions for impromptu lunch proposals and the like may be based on automated assessment of each invitee's current emotional state (as determined by current active PEEP record) for such a proposed event as well as each invitee's current physical availability (e.g., distance from venue and time available). In one embodiment, a first user's palmtop computer (e.g., 199 of FIG. 2) automatically flashes a group invite proposal to that first user such as: "Customers X and Z happen to be nearby and likely to be available for lunch with you, Do you want to formulate a group lunch invitation?". If the first user clicks Yes, a corresponding group event offer (e.g., 104*a*) soon thereafter pops on the screens of the selected offerees. In one embodiment, the first user's palmtop computer first presents a draft boiler plate template to the first user of the suggested "group lunch invitation" which the first user may then edit or replace with his own before approving its multi-casting to the computer formulated list of invitees (which list the first user can also edit with deletions or additions).

Better yet, the corresponding group event offer (e.g., let's have lunch together) may be augmented by a local merchant's add-on advertisement. For example, the group event offer (e.g., let's have lunch together) which was instigated by the first user (the one whose CRM database was exploited to this end) is automatically augmented by the STAN_3 system 410 to have attached thereto a group discount offer (e.g., "Very nearby Louigie's Italian Restaurant is having a lunch special today"). The augmenting offer from the local food provider automatically attached due to a group opportunity algorithm automatically running in the background of the STAN_3 system 410 and which group opportunity algorithm will be detailed below. Briefly, goods and/or service providers formulate discount offer templates which they want to have matched with groups of people that are likely to accept the offers. The STAN_3 system 410 then automatically matches the more likely groups of people with the discount offers they are more likely to accept. It is win-win for both the consumers and the vendors. In one embodiment, after, or while a group is forming for a social gathering (in real life and/or online) the STAN_3 system 410 automatically reminds its user members of the original and possibly newly evolved and/or added on reasons for the get together. For example, a pop-up reminder may be displayed on a user's screen (e.g., 111) indicating that 70% of the invited people have already accepted and they accepted under the idea that they will be focusing-upon topics T_original, T_added_on and so on. (Here, T_original can be an initially proposed topic that serves as an initiating basis for having the meeting while T_added_on can be later added topic proposed for the meeting after discussion about having the meeting started.) In the heat of social gatherings, people sometimes forget why they got together in the first place (what was the T_original?). However, the STAN_3 system can automatically remind them and/or additionally provide on-topic content related to the initial or added-on or deleted or modified topics (e.g., T_original, T_added_on, T_deleted, etc.)

More specifically and referring to FIG. 1A, in one hypothetical example a group of social entities (e.g., real persons) have assembled in real life (ReL) and/or online with the original intent of discussing a book they have been reading because most of them are members of the Mystery-History book of the month club. However, some other topic is brought up first by one of the members and this takes the group off track. To counter this possibility, the STAN_3 system 410 posts a flashing, high urgency invitation 102*m* in top tray area 102 of the displayed screen 111 of FIG. 1A.

In response, one of the group members notices the flashing (and optionally red colored) circle 102*m* on front plate 102*a*_Now of his tablet computer 100 and double clicks the dot 102*m* open. In response to such activation, his computer 100 displays a forward expanding connection line 115*a*6 whose advancing end (at this stage) eventually stops and opens up into a previously not displayed, on-topic content window 117. As seen in FIG. 1A, the on-topic content window 117 has an on-topic URL named as www.URL.com/A4 where URL.com represents a hypothetical source location for the in-window content and A4 represents a hypothetical code for the original topic that the group had initially agreed to meet for (as well as meeting for example to have coffee and/or other foods or beverages). In this case, the opened window 117 is HTML coded and it includes two HTML headers (not shown): <H2>Mystery History Online Book Club</H2> and <H3>This Month's Selection: Sherlock Holmes and the Franz Ferdinand Case</H3>. These are two embedded hints or clues that the STAN_3 system 410 may have used to determine that the content in window 117 is on-topic with a topic center in its topic space (413) which is identified by for example, the code name A4. Other embedded hints or clues that the STAN_3 system 410 may have used include explicit keywords (e.g., 115*a*7) in text within the window 117 and buried (not seen by the user) meta-tags embedded within an in-frame image 117*a* provided by the content sourced from source location www.URL.com/A4 (an example). This reminds the group member of the topic the group originally gathered to discuss. It doesn't mean the member or group is required to discuss that topic. It is merely a reminder. The group member may elect to simply close the window 117 (e.g., activating the X box in the upper right corner) and thereafter ignore it. Dot 102*m* then stops flashing and eventually fades away or moves out of sight. In the same or an alternate embodiment, the reminder may come in the form of a short reminder phrase (e.g., "Main Meetg Topic=Book of the Month"). (Note: the references 102*a*_Now and 102*a*Now are used interchangeably herein.)

In one embodiment, after passage of a predetermined amount of time the My Top-5 Topics Now plate 102*a*_Now automatically becomes a My Top-5 Topics Earlier plate 102*a*'_Earlier which is covered up by a slightly translucent but newer My Top Topics Now plate 102*a*_Now. If the user wants to see the older, My Top Topics Earlier plate 102*a*'_Earlier, he may click on a protruding out small portion of that older plate or use other menu means for shuffling it to the front. Behind the My Top Topics Earlier plate 102*a*'_Earlier there is an even earlier in time plate 102*a*" and so on. Invitations (to online and/or real life meetings) that are for a substantially same topic (e.g., book club) line up almost behind one another so that a historical line up of such on-topic invitations is perceived when looking through the partly translucent plates. This optional viewing of current and older on-topic invitations is shown for the left side of plates stack 102*b* (Their Top 5 Topics). (Note: the references 102*a*'_Earlier and 102*a*'Earlier are used interchangeably herein.)

If the exemplary Book-of the-Month Club member had left window 117 open for more than a predetermined length of time, an on-topic event offering 104*t* may have popped open adjacent to the on-topic material of window 117. However, this description of such on-topic promotional offerings has jumped ahead of itself because a broader tour of the user's tablet computer 100 has not yet been supplied here.

Recall how the Preliminary Introduction above began with a bouncing, rolling ball (108) pulling the user into a virtual elevator (113) that took the user's observed view to a virtual floor of a virtual high rise building. When the doors open on the virtual elevator (113, bottom right corner of screen) the virtual ball (108") hops out and rolls to the diagonally opposed, left upper corner of the screen 111. This tends to draw the user's eyes to an on-screen context indicator 113*a* and to the header entity 101*a* of social entities column 101. The user notes that the header entity is "Me".

Next, the virtual ball (also referred to herein as the Magic Marble 108) outputs a virtual spot light onto a small topic flag icon 101*ts* sticking up from the "Me" header object 101*a*. A balloon (not shown) temporarily opens up and displays the guessed-at most prominent (top) topic that the system (410) has determined to be the topic likely to be foremost (topmost) in the user's mind. In this example, it says, "Superbowl™ Sunday Party". The temporary balloon (not shown) collapses and the Magic Marble 108 shines another virtual spotlight on invitation dot 102*i* at the left end of the also-displayed, My Top Topics Now plate 102*a*_Now. Then the Magic Marble 108 rolls over to the right side of the screen 111 and parks itself in a ball parking area 108*z*.

Unseen by the user during this exercise (wherein the Magic Marble 108 rolls diagonally from one corner (113) to the other (113*a*) and then across to Ball Park 108*z*) is that the user's tablet computer 100 was watching him while he was watching it. Two spaced apart sensors, 106 and 109, are provided along an upper edge of the tablet computer 100. (There could be more, such as three at three corners.) Another sensor embedded in the computer housing (100) is a GPS one (Global Positioning Satellites receiver, shown to be included in housing area 106). At the beginning of the story (the Preliminary Introduction to Disclosed Subject Matter), the GPS sensor was used by the STAN_3 system 410 to automatically determine that the user is geographically located at the house of one of his known friends (Ken's house). That information in combination with timing and accessible calendaring data (e.g., Microsoft Outlook™) allowed the STAN_3 system 410 to extract best-guess hints that the user is likely attending the "Superbowl™ Sunday Party" at his friend's house (Ken's). It similarly provided the system 410 with hints that the user would soon welcome an unsolicited Group Coupon offering 104*a* for fresh hot pizza. But again the story is leap frogging ahead of itself. The guessed at, social context "Ken's Superbowl™ Sunday Party" also allowed the system 410 to pre-formulate the layout of the screen 111 as is illustrated in FIG. 1A. That predetermined layout includes the specifics of who (what persona or group) is listed as the header social entity 101*a* (KoH="Me") at the top of left side column 101 and who or what groups are listed as follower social entities 101*b*, 101*c*, . . . , 101*d* below the header social entity (KoH) 101*a*. (In one embodiment, the initial sequence of listing of the follower social entities 101*b*, 101*c*, . . . , 101*d* is established by a predetermined sorting algorithm such as which follower entity has greatest commonality of heat levels applied to same topics as does the header social entity 101*a* (KoH="Me"). That initial sequence can be altered by the user however, for example with use of a shuffle up tool 98+.) The predetermined layout also includes the specifics of what types of corresponding radar objects (101*ra*, 101*rb*, . . . , 101*rd*) will be displayed in the radar objects column 101*r*. It also determines which invitation-providing plates, 102*a*, 102*b*, etc. (and optionally, on-topic, content-suggestion providing plates; where here 102*a* is understood to reference the plates stack that includes plate 102*a*Now as well as those behind it and accordingly the picked plates) are displayed in the top and retractable, invitations tray 102 provided on the screen 111. It also determines which associated platforms will be listed in a right side, playgrounds column 103. In one embodiment, when a particular one or more invitations (e.g., 102*i*) is/are directed to an online forum or real life (ReL) gathering associated with a specific platform (e.g., FaceBook™, LinkedIn™ etc.), when the user hovers over the invitation(s) with a user-controlled cursor or otherwise inquires about the invitations (e.g., 102*i*; or associated content suggestions), the corresponding platform in column 103 (e.g., FB 103*b* in the case of an invitation linked thereto by linkage showing-line 103*k*) will automatically glow and/or otherwise indicate the logical link relationship between platform and the queried invitation or suggestion. The predetermined layout shown in FIG. 1A may also determine which pre-associated event offers (104*a*, 104*b*) will be initially displayed in a bottom and retractable, offers tray 104 provided on the screen 111. Each such tray or side-column/row may include a minimize or hide command mechanism. For sake of illustration, FIG. 1A shows Hide buttons such as 102*z* of the top tray 102 for allowing the user to minimize or hide away any one or more respective ones of the automatically displayed trays: 101, 101*r*, 102, 103 and 104. Of course, other types of hide/minimize/resize mechanisms may be provided, including more detailed control options in the Format drop down menu of toolbar 111*a*.

The display screen 111 may be a Liquid Crystal Display (LCD) type or an electrophoretic type or another as may be appropriate. The display screen 111 may accordingly include a matrix of pixel units embedded therein for outputting and/or reflecting differently colored visible wavelengths of light (e.g., Red, Green, Blue and White pixels) that cause the user (see 201A of FIG. 2) to perceive a two-dimensional (2D) and/or three-dimensional (3D) image being projected to him. The display screens 111, 211 of respective FIGS. 1A and 2 also have a matrix of infra red (IR) wavelength detectors embedded therein, for example between the visible light outputting pixels. In FIG. 1A, only an exemplary one such IR detector is indicated to be disposed at point 111*b* of the screen and is shown as magnified to include one or more photodetectors responsive to wavelengths output by IR beam flashers 106 and 109. The IR beam flashers, 106 and 109, alternatingly output patterns of IR light that can reflect off of a user's face and bounce back to be seen (detected and captured) by the matrix of IR detectors (only one shown at 111*b*) embedded in the screen 111. The so-captured stereoscopic images (captured by the IR detectors 111*b*) are uploaded to the STAN_3 servers (for example in cloud 410 of FIG. 4A) for processing by the data processing resources of the STAN_3 system 410. These resources may include parallel processing digital engines or the like that quickly decipher the captured IR imagery and automatically determine therefrom how far away from the screen 111 the user's face is and/or what points on the screen the user's eyeballs are focused upon. The stereoscopic reflections of the user's face, as captured by the in-screen IR sensors may also indicate what facial expressions (e.g., grimaces) the user is making and/or how warm blood is flowing to or leaving different parts of the user's face. The point of focus of the user's eyeballs tells the system 410 what content the user is probably focusing-upon. Point of focus mapped over time can tell the system 410 what content the user is focusing-upon for longest durations and perhaps reading or thinking about. Facial grimaces (as interpreted with aid of the user's currently active PEEP file) can tell the system 410 how the user is probably reacting emotionally to the focused-upon content (e.g., inside window 117).

When earlier in the story the Magic Marble 108 bounced around the screen after entering the displayed scene (of FIG. 1A) by taking a ride thereto by way of virtual elevator 113, the system 410 was preconfigured to know where on the screen the Magic Marble 108 was located. It then used that known information to calibrate its IRB sensors (106, 109) and/or its IR image detectors (111*b*) so as to more accurately determine what angles the user's eyeballs are at as they follow the Magic Marble 108 during its flight. In one embodiment, there is another virtual floor in the virtual high rise building where virtual presence on this other floor may be indicated to the user by the "you are now on this floor" virtual elevator indicator 113*a* of FIG. 1A (upper left corner). When virtually transported to this other floor; the user is presented with a virtual game room filled with virtual pinball game machines and the like. The Magic Marble 108 then serves as a virtual pinball in these games. And the IRB sensors (106, 109) and the IR image detectors (111*b*) are calibrated while the user plays these games. In other words, the user is presented with one or more fun activities that call for the user to keep his eyeballs on the Magic Marble 108. In the process, the system 410 heuristically or otherwise forms a heuristic mapping between the captured IR reflection patterns (as caught by the IR detectors 111*b*) and the probable angle of focus of the user's eyeballs (which should be tracking the Magic Marble 108).

Another sensor that the tablet computer 100 may include is a tilt and jiggle sensor 107. This can be in the form of an opto-electronically implemented gyroscopic sensor and/or MEMs type acceleration sensors. The tilt and jiggle sensor 107 determines what angles the flat panel display screen 111 is at relative to gravity. The tilt and jiggle sensor 107 also determines what directions the tablet computer 100 is being shaken in (e.g., up/down, side to side or both). The user may elect to use the Magic Marble 108 as a rolling type of cursor (whose action point is defined by a virtual spotlight cast by the internally lit ball 108) and to position the ball with tilt and shake actions applied to the housing of the tablet computer 100. Push and/or rotate actuators 105 and 110 are respectively located on the left and right sides of the tablet housing and these may be activated by the user to invoke pre-programmed functions of the Magic Marble 108. These functions may be varied with a Magic Marble Settings tool 114 provided in a tools area of the screen 111.

One of the functions that the Magic Marble 108 (or alternatively a touch driven cursor 135) may provide is that of unfurling a context-based controls setting menu such as the one shown at 136 when the user depresses a control-right keypad or an alike side-bar button combination. Then, whatever the Magic Marble 108 or cursor 135 or both is/are pointing to, can be highlighted and indicated as activating a user-controllable menu function (136) or set of such functions. In the illustrated example of menu 136, the user has preset the control-right key press function to cause two actions to simultaneously happen. First, if there is a pre-associated topic (topic node) associated with the pointed-to on-screen item, an icon representing the associated topic will be pointed to. More specifically, if the user moves cursor 135 to point to keyword 115*a*7 (the key.a5 word of phrase), connector beam 115*a*6 grows backwards from the pointed-to object (key.a5) to an on-topic invitation and/or suggestion (e.g., 102*m*) in the top tray 102. Second, if there are certain friends or family members or other social entities pre-associated with the pointed-to object (e.g., key.a5) and there are on-screen icons (e.g., 101*a*, . . . , 101*d*) representing those social entities, the corresponding icons (e.g., 101*a*, . . . , 101*d*) will glow or otherwise be highlighted. Hence, with a simple hot key combination (e.g., a control right click), the user can quickly come to appreciate object-to-topic relations and/or object-to-person relations as between a pointed-to object (e.g., key.a5 in FIG. 1A) and on-screen other icons that correspond to the topic of, or the associated person(s) of that pointed-to object (e.g., key.a5).

Let it be assumed for sake of illustration and as a hypothetical that when the user control-right clicks on the key.a5 object, the My Family icon 101*b* glows. Let it also be assumed that in response to this, the user wants to see more specifically what topics the social entity called "My Family" (101*b*) is now primarily focusing-upon (what are their top N topics?). This cannot be done with the illustrated configuration of FIG. 1A because "Me" is the header entity in column 101. That means that all the follower radar objects 101*rb*, . . . , 101*rd* are following the current top-5 topics of "Me" (101*a*) and not the current top N topics of "My Family" (101*b*). However, if the user causes the "My Family" icon 101*b* to shuffle up into the header (leader, mayor) position of column 101, the social entity known as "My Family" (101*b*) then becomes the header entity. Its current top N topics become the lead topics shown in the top most radar object of radar column 101*r*. (The "Me" icon may drop to the bottom of column 101 and its adjacent pyramid will now show heat as applied by the "Me" entity to the top N topics of the new header entity, "My Family".) In one embodiment, the stack of plates called My Current Top Topics 102*a* shifts to the right in tray 102 and an new stack of plates called My Family's Current Top Topics (not shown) takes its place as being closest to the upper left corner of the screen 111. This shuffling in and out of the top leader position (101*a*) can be accomplished with a shuffle Up tool (e.g., 98+ of icon 101*c*) provided as part of each social entity icon except that of the leader social entity.

In addition to the topic flag icon (e.g., 101*ts*) provided with each social entity representing object (101*a*, . . . , 101*d*) and the shuffle up tool (98+, except for topmost entity 101*a*), each social entity representing object (101*a*, . . . , 101*d*) may be provided with a show-me-more details tool 99+ (e.g., the starburst plus sign for example in circle 101*d* of FIG. 1A) that opens up additional details and/or options for that social entity representing object (101*a*, . . . , 101*d*). More specifically, if the show-me-more details tool 99+ of circle 101*d* has been activated, a wider diameter circle 101*dd* spreads out from under the first circle 101*d*. Clicking on one area of the wider diameter circle 101*dd* causes a greater details pane 101*de* to pop up on the screen 111. The greater details pane 101*de* may show a degrees of separation value used by the system 410 for defining a user-to-user association (U2U) between the header entity (101*a*) and the expanded entity (101*d*, e.g., "him"). The greater details pane 101*de* may show flags (F1, F2, etc.) for common topic centers as between the Me-and-Him social entities and the platforms (those of column 103), P1, P2, etc. from which those topic centers spring. Clicking on one of the flags (F1, F2, etc.) opens up more detailed information about the corresponding topic. Clicking on one of the platform icons (P1, P2, etc.) opens up more detailed information about where in the corresponding platform (e.g., FaceBook™, STAN3™, etc.) the topic center logically links to.

Aside from causing a user-selected hot key combination (e.g., control right click) to provide information about one or more of associated topic and associated social entities (e.g., friends), the settings menu 136 may be programmed to cause the user-selected hot key combination to provide information about one or more of other logical entities, such as, but not limited to, associated forums (e.g., platforms 103) and associated group events (e.g., professional conference, lunch date, etc.) and/or invitations thereto.

While a few specific sensors and/or their locations in the tablet computer 100 have been described thus far, it is within the contemplation of the present disclosure for the computer 100 to have other or additional sensors. For example, second display screen with embedded IR sensors and/or touch or proximity sensors may be provided on the other side (back side) of the same tablet housing 100. In addition to or as replacement for the IR beam units, 106 and 109, stereoscopic cameras may be provided in spaced apart relation to look back at the user's face and/or eyeballs and/or to look forward at a scene the user is also looking at.

Figure 2:
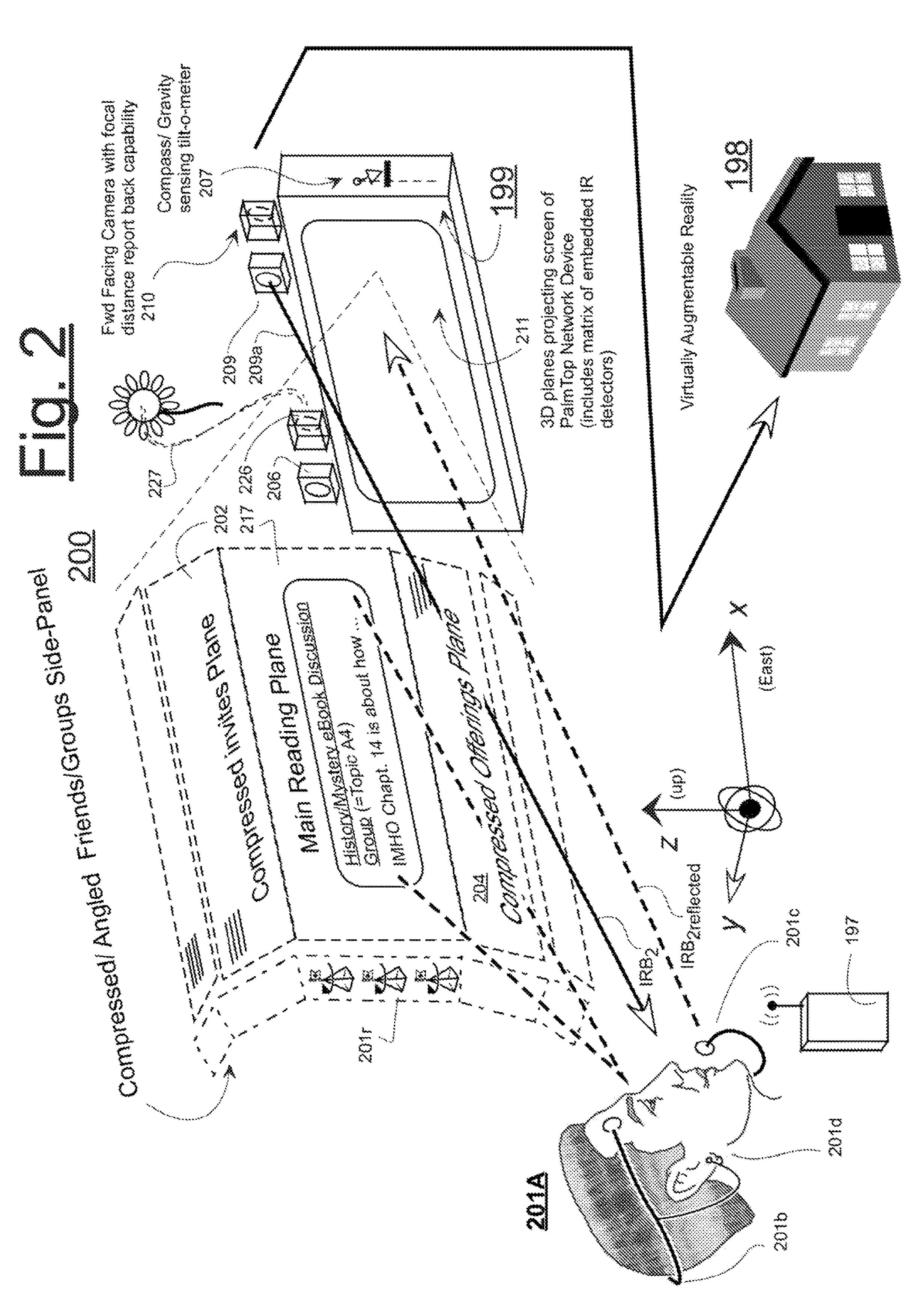
FIG. 2 is a perspective block diagram of a portable palmtop microcomputer and/or intelligent cellphone (smartphone) which is structured for electromagnetic linking (e.g., electronically and/or optically linking) with a networking environment that includes a Social-Topical Adaptive Networking (STAN_3) system where, in accordance with one aspect of the present disclosure, the STAN_3 system includes means for automatically presenting through the palmtop user interface, individual or group transaction offerings based on usages of the STAN_3 system.

More specifically, in the case of FIG. 2, the illustrated palmtop computer 199 may have its forward pointing camera 210 pointed at a real life (ReL) object such a Ken's house 198 and/or a person (e.g., Ken). Object recognition software provided by the STAN_3 system 410 and/or by one or more external platforms (e.g., GoogleGoggles™ or IQ_Engine™) may automatically identify the pointed-at real life object (e.g., Ken's house 198). The automatically determined identity is then fed to a reality augmenting server within the STAN_3 system 410. The reality augmenting server (not explicitly shown, but one of the data processing resources in the cloud) automatically looks up most likely topics that are cross-associated as between the user (or other entity) and the pointed-at real life object/person (e.g., Ken's house 198/Ken). For example, one topic-related invitation that may pop up on the user's augmented reality side (screen 211) may be something like: "This is where Ken's Superbowl™ Sunday Party will take place next week. Please RSVP now." Alternatively, the user's augmented reality or augmented virtuality side of the display may suggest something like: "There is Ken in the real life or recently inloaded image and by the way you should soon RSVP to Ken's invitation to his Superbowl™ Sunday Party". These are examples of topic space augmented reality and/or virtuality. The user is automatically reminded of topics of interest associated with real life (ReL) objects/persons that the user aims his computer (e.g., 100, 199) at or associated with recognizable objects/persons present in recent images inloaded into the user's device. As another example, the user may point at the refrigerator in his kitchen and the system 410 invites him to formulate a list of food items needed for next week's party. The user may point at the local supermarket as he passes by (or the GPS sensor 106 detects its proximity) and the system 410 invites him to look at a list of items on a recent to-be-shopped-for list. This is another example of topic space augmented reality.

Yet other sensors that may be embedded in the tablet computer 100 and/or other devices (e.g., head piece 201*b* of FIG. 2) adjacent to the user include sound detectors, further IR beam emitters and odor detectors (e.g., 226 in FIG. 2). The sound detectors and/or odor detectors may be used by the STAN_3 system 410 for automatically determining when the user is eating, duration of eating, number of bites or chewings taken, what the user is eating (e.g., based on odor 227 and/or IR readings of bar code information) and for estimating how much the user is eating based on duration of eating and/or counted chews, etc. Later, (e.g., 3-4 hours later) the system 410 may use the earlier collected information to automatically determine that the user is likely getting hungry again. That could be one way that the system of the Preliminary Introduction knows that a group coupon offer from the local pizza store would likely be "welcomed" by the user at a given time and in a given context (Ken's Superbowl™ Sunday Party) even though the solicitation was not explicitly pulled by the user. The system 410 may have collected enough information to know that the user has not eaten pizza in the last 24 hours (otherwise, he may be tired of it) and that the user's last meal was small one 4 hours ago meaning he is likely getting hungry now. The system 410 may have collected similar information about other STAN users at the party to know that they too are likely to welcome a group offer for pizza at this time. Hence there is a good likelihood that all involved will find the unsolicited coupon offer to be a welcomed one rather than an annoying and somewhat overly "pushy" one.

In the STAN_3 system 410 of FIG. 4A, there is provided within its ambit (e.g., cloud, and although shown as being outside), a general welcomeness filter 426 and a topic-based router 427. The general welcomeness filter 426 receives user data 417 that is indicative of what general types of unsolicited offers the corresponding user is likely or not likely to now welcome. More specifically, if the recent user data 417 indicates the user just ate a very large meal, that will usually flag the user as not welcoming an unsolicited offer for more food. If the recent user data 417 indicates the user just finished a long business oriented meeting, that will usually flag the user as not welcoming an unsolicited offer for another business oriented meeting. (In one embodiment, stored knowledge base rules may be used to automatically determine if an unsolicited offer for another business oriented meeting would be welcome or not; such as for example: IF Length_of_Last_Meeting >45 Minutes AND Number_Meetings_Done_Today>4 AND Current_Time>6:00 PM THEN Next_Meeting_Offer_Status=Not Welcome, ELSE . . . ) If the recent user data 417 indicates the user just finished a long exercise routine, that will usually flag the user as not likely welcoming an unsolicited offer for another physically strenuous activity although, on the other hand, it may additionally, flag the user as likely welcoming an unsolicited offer for a relaxing social event at a venue that serves drinks. These are just examples and the list can of course go on. In one embodiment, the general welcomeness filter 426 is tied to a so-called PHA_FUEL file of the user's (Personal Habits And Favorites/Unfavorites Expression Log—see FIG. 5) where the latter will be detailed later below. Briefly, known habits and routines of the user are used to better predict what the user is likely to welcome or not in terms of unsolicited offers when in different contexts (e.g., at work, at home, at a party, etc.). (Note: the references PHA_FUEL and PHAFUEL are used interchangeably herein.)

If general welcomeness has been determined by the automated welcomeness filter 426 for certain general types of offers, the identification of the likely welcoming user is forwarded to the router 427 for more refined determination of what specific unsolicited offers the user (and current friends) are likely to accept based on one or more the current topic(s) on his/their minds, current location(s) where he/they are situated, and so on. The so sorted outputs of the Topic/Other Router 427 are then forwarded to current offer sponsors (e.g., food vendors, paraphernalia vendors) who will have their own criteria as to which users or user groups will qualify for certain offers and these are applied as further match-making criteria until specific users or user groups have been shuffled into an offerees group that is pre-associated with a group offer they are very likely to accept. The purpose of this welcomeness filtering and routing and shuffling is so that STAN_3 users are not annoyed with unwelcome solicitations and so that offer sponsors are not disappointed with low acceptance rates (or too high of an acceptance rate if alternatively that is one of their goals). More will be detailed about this below.

Referring still to FIG. 4A, but returning to the subject of the out-of-STAN platforms or services contemplated thereby, the StumbleUpon™ system (448) allows its registered users to recommend websites to one another. Users can click a thumb-up icon to vote for a website they like and can click on a thumb-down icon to indicate they don't like it. The voted upon websites can be categorized by use of "Tags" which generally are one or two short words to give a rough idea of what the website is about. Similarly, other online websites such as Yelp™ allow its users to rate real world providers of goods and services with number of thumbs-up, or stars, etc. It is within the contemplation of the present disclosure that the STAN_3 system 410 automatically imports (with permission as needed from external platforms or through its own sideline websites) user ratings of other websites, of various restaurants, entertainment venues, etc. where these various user ratings are factored into decisions made by the STAN_3 system 410 as to which vendors (e.g., coupon sponsors) may have their discount offer templates matched with what groups of likely-to-accept STAN users. The goal is to minimize the number of times that STAN-generated event offers (e.g., 104*t*, 104*a* in FIG. 1A) invite STAN users to establishments whose services or goods are below a predetermined acceptable level of quality or the number of times they invite STAN users to establishments whose services or goods that are the wrong kinds (e.g., not acceptable relative to what the user had in mind). Additionally, the STAN_3 system 410 collects CVi's (implied vote-indicating records) from its users while they are agreeing to be so-monitored. It is within the contemplation of the present disclosure to automatically collect CVi's from permitting STAN users during STAN-sponsored group events where the collected CVi's indicate how well or not the STAN users like the event (e.g., the restaurant, the entertainment venue, etc.). Then the collected CVi's are automatically factored into future decisions made by the STAN_3 system 410 as to which vendors may have their discount offer templates matched with what groups of likely-to-accept STAN users. The goal again is to minimize the number of times that STAN-generated event offers (e.g., 104*t*, 104*a*) invite STAN users to establishments whose services or goods are collectively voted on as being inappropriate, untimely and/or below a predetermined minimum level of acceptable quality.

Additionally, it is within the contemplation of the present disclosure to automatically collect implicit or explicit CVi's from permitting STAN users at the times that unsolicited event offers (e.g., 104*t*, 104*a*) are popped up on that user's tablet screen (or otherwise presented to the user). (An example of an explicit CVi may be a user-activateable flag which is attached to the promotional offering and which indicates, when checked, that this promotional offering was not welcome or worse, should not be present again to the user and/or to others.) The then-collected CVi's may indicate how welcomed or not welcomed the unsolicited event offers (e.g., 104*t*, 104*a*) are for that user at the given time and in the given context. The goal is to minimize the number of times that STAN-generated event offers (e.g., 104*t*, 104*a*) are unwelcomed by the respective user. Neural networks or other heuristically evolving automated models may be automatically developed in the background for better predicting when and which unsolicited event offers will be welcomed or not by the various users of the STAN_3 system 410. Parameters for the over-time developed heuristic models are stored in personal preference records (e.g., habit records) of the respective users and thereafter used by the general welcomeness filter 426 of the system 410 or by like other means to block unwelcomed solicitations from being made too often to STAN users. After sufficient training time has passed, users begin to feel as if the system 410 somehow magically knows when unsolicited event offers (e.g., 104*t*, 104*a*) will be welcomed and when not. Hence in the above given example of the hypothetical "Superbowl™ Sunday Party", the STAN_3 system 410 had beforehand developed one or more PHAFUEL records (Personal Habits And Favorites/Unfavorites Expression Profiles) for the given user indicating for example what foods he likes or dislikes under different circumstances, when he likes to eat lunch, when he is likely to be with a group of other people and so on. The combination of the pre-developed PHAFUEL records and the welcome/unwelcomed heuristics for the unsolicited event offers (e.g., 104*t*, 104*a*) can be used by the STAN_3 system 410 to know when are likely times and circumstances that such unsolicited event offers will be welcome by the user and what kinds of unsolicited event offers will be welcome or not. More specifically, the PHAFUEL records of respective STAN users can indicate what things the user least likes or hates as well what they normally like and accept. So if the user of the above hypothecated "Superbowl™ Sunday Party" hates pizza (or is likely to reject it under current circumstances, e.g., because he just had pizza 2 hours ago) the match between vendor offer and the given user and/or his forming social interaction group will be given a low score and generally will not be presented to the given user and/or his forming social interaction group. Incidentally, active PHAFUEL records for different users may automatically change as a function of time, mood, context, etc. Accordingly, even though a first user may have a currently active PHAFUEL record (Personal Habit Expression Profiles) indicating he now is likely to reject a pizza-related offer; that same first user may have a later activated PHAFUEL record which is activated in another context and when so activated indicates the first user is likely to then accept the pizza-related offer.

Referring still to FIG. 4A and more of the out-of-STAN platforms or services contemplated thereby, consider the well known social networking (SN) system reference as the SecondLife™ network (460*a*) wherein virtual social entities can be created and caused to engage in social interactions. It is within the contemplation of the present disclosure that the user-to-user associations (U2U) portion 411 of the database of the STAN_3 system 410 can include virtual to real-user associations and/or virtual-to-virtual user associations. A virtual user (e.g., avatar) may be driven by a single online real user or by an online committee of users and even by a combination of real and virtual other users. More specifically, the SecondLife™ network 460*a* presents itself to its users as an alternate, virtual landscape in which the users appear as "avatars" (e.g., animated 3D cartoon characters) and they interact with each other as such in the virtual landscape. The Second Life™ system allows for Non-Player Characters (NPC's) to appear within the SecondLife™ landscape. These are avatars that are not controlled by a real life person but are rather computer controlled automated characters. The avatars of real persons can have interactions within the SecondLife™ landscape with the avatars of the NPC's. It is within the contemplation of the present disclosure that the user-to-user associations (U2U) 411 accessed by the STAN_3 system 410 can include virtual/real-user to NPC associations. Yet more specifically, two or more real persons (or their virtual world counterparts) can have social interactions with a same NPC and it is that commonality of interaction with the same NPC that binds the two or more real persons as having second degree of separation relation with one another. In other words, the user-to-user associations (U2U) 411 supported by the STAN_3 system 410 need not be limited to direct associations between real persons and may additionally include user-to-user-to-user-etc. associations (U3U, U4U etc.) that involve NPC's as intermediaries. A very large number of different kinds of user-to-user associations (U2U) may be defined by the system 410. This will be explored in greater detail below.

Aside from these various kinds of social networking (SN) platforms (e.g., 441-448, 460), other social interactions may take place through tweets, email exchanges, list-serve exchanges, comments posted on "blogs", generalized "in-box" messagings, commonly-shared white-boards or Wikipedia™ like collaboration projects, etc. Various organizations (dot.org's, 450) and content publication institutions (455) may publish content directed to specific topics (e.g., to outdoor nature activities such as those followed by the Field-and-Streams™ magazine) and that content may be freely available to all members of the public or only to subscribers in accordance with subscription policies generated by the various content providers. (With regard to Wikipedia™ like collaboration projects, those skilled in the art will appreciate that the Wikipedia™ collaboration project—for creating and updating a free online encyclopedia—and similar other "Wiki"-spaces or collaboration projects (e.g., Wikinews™, Wikiquote™, Wikimedia™, etc.) typically provide user-editable world-wide-web content. The original Wiki concept of "open editing" for all web users may be modified however by selectively limiting who can edit, who can vote on controversial material and so on. Moreover, a Wiki-like collaboration project, as such term is used further below, need not be limited to content encoded in a form that is compatible with early standardizations of HTML coding (world-wide-web coding) and browsers that allow for viewing and editing of the same. It is within the contemplation of the present disclosure to use Wiki-like collaboration project control software for allowing experts within different topic areas to edit and vote (approvingly or disapprovingly) on structures and links (e.g., hierarchical or otherwise) and linked-to/from other nodes/content providers of topic nodes that are within their field of expertise. More detail will follow below.)

Since a user (e.g., 431) of the STAN_3 system 410 may also be a user of one or more of these various other social networking (SN) and/or other content providing platforms (440, 450, 455, 460, etc.) and may form all sorts of user-to-user associations (U2U) with other users of those other platforms, it may be desirous to allow STAN users to import their out-of-STAN U2U associations, in whole or in part (and depending on permissions for such importation) into the user-to-user associations (U2U) database area 411 maintained by the STAN_3 system 410. To this end, a cross-associations importation or messaging system 432*m* may be included as part of the software executed by or on behalf of the STAN user's computer (e.g., 100, 199) where the cross-associations importation or messaging system 432*m* allows for automated importation or exchange of user-to-user associations (U2U) information as between different platforms. At various times the first user (e.g., 432) may choose to be disconnected from (e.g., not logged-into and/or not monitored by) the STAN_3 system 410 while instead interacting with one or more of the various other social networking (SN) and other content providing platforms (440, 450, 455, 460, etc.) and forming social interaction relations there. Later, a STAN user may wish to keep an eye on the top topics currently being focused-upon by his "friend" Charlie, where the entity known to the first user as "Charlie" was befriended firstly on the MySpace™ platform. (See briefly 484*a* under column 487.1C of FIG. 4C.) Different iconic GUI representations may be used in the screen of FIG. 1A for representing out-of-STAN friends like "Charlie" and the external platform on which they were befriended. In one embodiment, when the first user hovers his cursor over a friend icon, highlighting or glowing will occur for the corresponding representation in column 103 of the main platform and/or other playgrounds where the friendship with that social entity (e.g., "Charlie") first originated. In this way the first user is quickly reminded that it is "that" Charlie, the one he first met for example on the MySpace™ platform. So next, and for sake of illustration, a hypothetical example will be studied where User-B (432) is going to be interacting with an out-of-STAN_3 subnet (where the latter could be any one of outside platforms like 441, 442, 444, etc.; 44X in general) and the user forms user-to-user associations (U2U) in those external playgrounds that he would like to later have tracked by columns 101 and 101*r* at the left side of FIG. 1A as well as reminded of by column 103 to the right.

In this hypothetical example, the same first user 432 (USER-B) employs the username, "Tom" when logged into and being tracked in real time by the STAN_3 system 410 (and may use a corresponding Tom-associated password). (See briefly 484.1*c* under column 487.1A of FIG. 4C.) On the other hand, the same first user 432 employs the username, "Thomas" when logging into the alternate SN system 44X (e.g., FaceBook™—See briefly 484.1*b* under column 487.1B of FIG. 4C.) and he then may use a corresponding Thomas-associated password. The Thomas persona (432*u*2) may favor focusing upon topics related to music and classical literature and socially interacting with alike people whereas the Tom persona (432*u*1) may favor focusing on topics related to science and politics (this being merely a hypothesized example) and socially interacting with alike science/politics focused people. Accordingly, the Thomas persona (432*u*2) may more frequently join and participate in music/classical literature discussion groups when logged into the alternate SN system 44X and form user-to-user associations (U2U) therein, in that external platform. By contrast, the Tom persona (432*u*1) may more frequently join and participate in science/politics topic groups when logged into or otherwise being tracked by the STAN_3 system 410 and form corresponding user-to-user associations (U2U) therein which latter associations can be readily recorded in the STAN_3 U2U database area 411. The local interface devices (e.g., CPU-3, CPU-4) used by the Tom persona (431*u*1) and the Thomas persona (432*u*2) may be a same device (e.g., same tablet or palmtop computer) or different ones or a mixture of both depending on hardware availability, and moods and habits of the user. The environments (e.g., work, home, coffee house) used by the Tom persona (432*u*1) and the Thomas persona (432*u*2) may also be same or different ones depending on a variety of circumstances.

Despite the possibilities for such difference of persona and interests, there may be instances where user-to-user associations (U2U) and/or user-to-topic associations (U2T) developed by the Thomas persona (432*u*2) while operating exclusively under the auspices of the external SN system 44X environment (e.g., FaceBook™) and thus outside the tracking radar of the STAN_3 system 410 may be of cross-association value to the Tom persona (432*u*1). In other words, at a later time when the Tom/Thomas person is logged into the STAN_3 system 410, he may want to know what topics, if any, his new friend "Charlie" is currently focusing-upon. However, "Charlie" is not the pseudo-name used by the real life (ReL) personage of "Charlie" when that real life personage logs into system 410. Instead he goes by the name, "Chuck". (See briefly item 484*c* under column 487.1A of FIG. 4C.)

It may not be practical to import the wholes of external user-to-user association (U2U) maps from outside platforms (e.g., MySpace™) because, firstly, they can be extremely large and secondly, few STAN users will ever demand to view or otherwise interact with all other social entities (e.g., friends, family and everyone else in the real or virtual world) of all external user-to-user association (U2U) maps of all platforms. Instead, STAN users will generally wish to view or otherwise interact with only other social entities (e.g., friends, family) whom they wish to focus-upon because they have a preformed social relationship with them and/or a preformed, topic-based relationship with them. Accordingly, the here disclosed STAN_3 system 410 operates to develop and store only selectively filtered versions of external user-to-user association (U2U) maps in its U2U database area 411. The filtering is done under control of so-called External SN Profile importation records 431*p*2, 432*p*2, etc. for respective ones of STAN_3's registered members (e.g., 431, 432, etc.). The External SN Profile importation records (e.g., 431*p*2, 432*p*2) may reflect the identification of the external platform (44X) where the relationship developed as well as user social interaction histories that were externally developed and user compatibility characteristics (e.g., co-compatibilities to other users, compatibilities to specific topics, types of discussion groups etc.) and as the same relates to one or more external personas (e.g., 431*u*2, 432*u*2) of registered members of the STAN_3 system 410. The external SN Profile records 431*p*2, 432*p*2 may be automatically generated or alternatively or additionally they may be partly or wholly manually entered into the U2U records area 411 of the STAN_3 database (DB) 419 and optionally validated by entry checking software or other means and thereafter incorporated into the STAN_3 database.

Figure 4B:
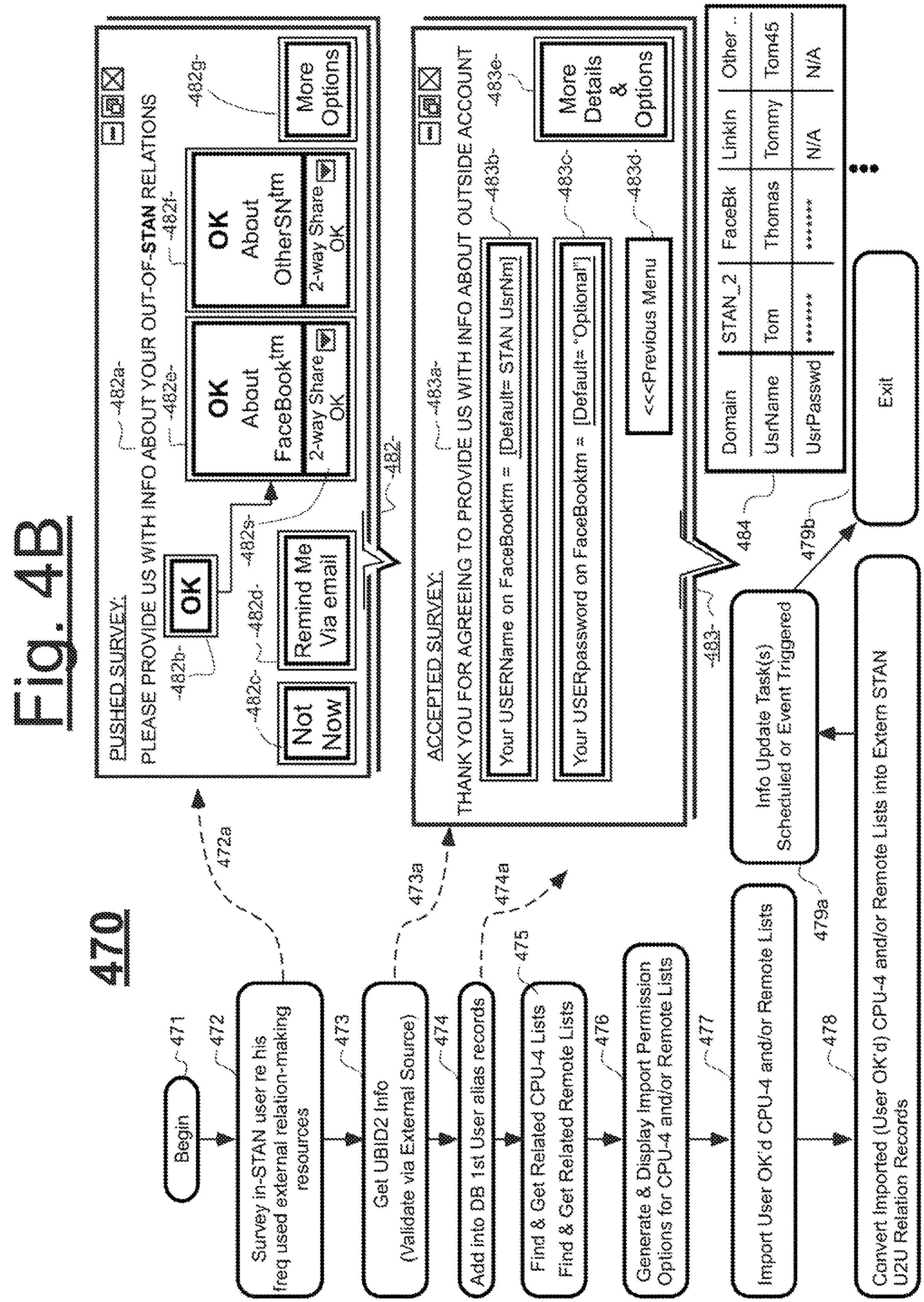
FIG. 4B shows a combination of flow chart and popped up screen shots illustrating how user-to-user associations (U2U) from external platforms can be acquired by (imported into) the STAN_3 system.

An external U2U associations importing mechanism is more clearly illustrated by FIG. 4B and for the case of second user 432. In one embodiment, while this second user 432 is logged-in into the STAN_3 system 410 (e.g., under his STAN_3 persona as "Tom", 432*u*1), a somewhat intrusive and automated first software agent (BOT) of system 410 invites the second user 432 to reveal by way of a survey his external UBID-2 information (his user-B identification name, "Thomas" and optionally his corresponding external password) which he uses to log into interface 428 of a specified Out-of-STAN other system (e.g., 441, 442, etc.), and if applicable; to reveal the identity and grant access to the alternate data processing device (CPU-4) that this user 432 uses when logged into the Out-of STAN other system 44X. The automated software agent (not explicitly shown in FIGS. 4A-4B) then records an alias record into the STAN_3 database (DB 419) where the stored record logically associates the user's UAID-1 of the 410 domain with his UAID-2 of the 44X external platform domain. Yet another alias record would make a similar association between the UAID-1 identification of the 410 domain with some other identifications, if any, used by user 432 in yet other external domains (e.g., 44Y, 44Z, etc.) Then the agent (BOT) begins scanning that alternate data processing device (CPU-4) for local friends and/or buddies and/or other contacts lists 432L2 and their recorded social interrelations as stored in the local memory of CPU-4 or elsewhere (e.g., in a remote server or cloud). The automated importation scan may also cover local email contact lists 432L1 and Tweet following lists 432L3 held in that alternate data processing device (CPU-4). If it is given the alternate site password for temporary usage, the STAN_3 automated agent also logs into the Out-of-STAN domain 44X while pretending to be the alternate ego, "Thomas" (with user 432's permission to do so) and begins scanning that alternate contacts/friends/followed tweets/etc. listing site for remote listings 432R of Thomas's email contacts, Gmail™ contacts, buddy lists, friend lists, accepted contacts lists, followed tweet lists, and so on; depending on predetermined knowledge held by the STAN_3 system of how the external content site 44X is structured. Different external content sites (e.g., 441, 442, 444, etc.) may have different mechanisms for allowing logged-in users to access their private (behind the wall) and public friends, contacts and other such lists based on unique privacy policies maintained by the various external content sites. In one embodiment, database 419 of the STAN_3 system 410 stores accessing know-how data (e.g., knowledge base rules) for known ones of the external content sites. In one embodiment, a registered STAN_3 user (e.g., 432) is enlisted to serve as a sponsor into the Out-of STAN platform for automated agents output by the STAN_3 system 410 that need vouching for.

In one embodiment, cooperation agreements are negotiated and signed as between operators of the STAN_3 system 410 and operators of one or more of the Out-of STAN other platforms (e.g., external platforms 441, 442, 444, etc.) that permit automated agents output by the STAN_3 system 410 or live agents coached by the STAN_3 system to enter the other platforms and operate therein in accordance with restrictions set forth in the cooperation agreements while creating filtered submaps of the external U2U association maps and thereafter causing importation of the so-filtered submaps (e.g., reduced in size and scope; as well as optionally compressed by compression software) into the U2U records area 411 of the STAN_3 database (DB) 419. An automated format change may occur before filtered external U2U submaps are ported into the STAN_3 database (DB) 419.

Referring to FIG. 4C, shown as a forefront pane 484.1 is an example of a first stored data structure that may be used for cross linking between pseudonames (alter-ego personas) used by a given real life (ReL) person when operating under different contexts and/or within the domains of different social networking (SN) platforms, 410 as well as 441, 442, . . . , 44X. The identification of the real life (ReL) person is stored in a real user identification node 484.1R of a system maintained, "users space" (a.k.a. user-related data-objects organizing space). Node 484.1R is part of a hierarchical data-objects organizing tree that has all users as its root node (not shown). The real user identification node 484.1R is bi-directionally linked to data structure 484.1 or equivalents thereof. In one embodiment, the system blocks essentially all other users from having access to the real user identification nodes (e.g., 484.1R) of a respective user unless the corresponding user has given written permission for his or her real life (ReL) identification to be made public. The source platform (44X) from which each imported U2U submap is logical linked (e.g., recorded alongside) is listed in a top row 484.1*a* (Domain) of tabular second data structure 484.1 (which latter data structure links to the corresponding real user identification node 484.1R). A respective pseudoname (e.g., Tom, Thomas, etc.) for the primary real life (ReL) person—in this case, 432 of FIG.

4A—is listed in the second row 484.1*b* (User(B)Name) of the illustrative tabular data structure 484.1. If provided by the primary real life (ReL) person (e.g., 432), the corresponding password for logging into the respective external account (of external platform 44X) is included in the third row 484.1*c* (User(B)Passwd) of the illustrative tabular data structure 484.1.

As a result, an identity cross-correlation can be established for the primary real life (ReL) person (e.g., 432 and having corresponding real user identification node 484.1R stored for him in system memory) and his various pseudonames (alter-ego personas) and passwords (if given) when that first person logs into the various different platforms (STAN_3 as well as other platforms such as FaceBook™, MySpace™, LinkedIn™, etc.). With access to the primary real life (ReL) person's passwords, pseudonames and/or networking devices (e.g., 100, 199, etc.), the STAN_3 BOT agents often can scan through the appropriate data storage areas to locate and copy external social entity specifications including, but not limited to: (1) the pseudonames (e.g., Chuck, Charlie, Charles) of friends of the primary real life (ReL) person (e.g., 432); (2) the externally defined social relationships between the ReL person (e.g., 432) and his friends, family members and/or other associates; (3) the dates on when these relationships were originated or last modified or last destroyed (e.g., by de-friending) and then perhaps last rehabilitated, and so on.

Although FIG. 4C shows just one exemplary area 484.1*d* where the user(B) to user(C) relationships data are recorded as between for example Tom/Thomas/etc. and Chuck/Charlie/etc., it is to be understood that the forefront pane 484.1 (Tom's pane) may be extended to include many other user(B) to user(X) relationship detailing areas 484.1*e*, etc., where X can be another personage other than Chuck/Charlie/etc. such as X=Hank/Henry/etc.; Sam/Sammy/Samantha, etc. and so on.

Referring to column 487.1A of the forefront pane 484.1 (Tom's pane), this one provides representations of user-to-user associations (U2U) as formed inside the STAN_3 system 410. For example, the "Tom" persona (432*u*1 in FIG. 4A) may have met a "Chuck" persona (484*c* in FIG. 4C) while participating in a STAN_3 spawned chat room which initially was directed to a topic known as topic A4 (see relationship defining subarea 485*c* in FIG. 4C). Tom and Chuck became more involved friends and alter on they joined as debate partners in another STAN_3 spawned chat room which was directed to a topic A6 (see relationship defining subarea 486*c* in FIG. 4C). More generally, various entries in each column (e.g., 487.1A) of a data structure such as 484.1 may include pointers or links to topic nodes after topic space regions (TSRs) of system topic space and/or pointers or links to nodes of other system-supported spaces (e.g., keyword space 370 as shown in FIG. 3E). This aspect of FIG. 4C is represented by optional entries 486*d* (Links to topic space (TS), etc.) in exemplary column 487.1A.

The real life (ReL) personages behind the personas known as "Tom" and "Chuck" may have also collaborated within the domains of outside platforms such as the LinkedIn™ platform, where the latter is represented by vertical column 487.1E of FIG. 4C. However, when operating in the domain of that other platform, the corresponding real life (ReL) personages are known as "Tommy" and Charles" respectively. See data holding area 484*b* of FIG. 4C. The relationships that "Tommy" and Charles" have in the out-of-STAN domain (e.g., LinkedIn™) may be defined differently than the way user-to-user associations (U2U) are defined for in-STAN interactions. More specifically, in relationship defining area 485*b* (a.k.a. associations defining area 485*b*), "Charles" (484*b*) is defined as a second-degree-of-separation contact of Tommy's who happens to belong to same LinkedIn™ discussion group known as Group A5. This out-of-STAN discussion group (e.g., Group A5) may not be logical linked to an in-STAN topic node (or topic center, TC) within the STAN_3 topic space. So the user(B) to user(C) code for area-of-commonality may have to be recorded as a discussion group identifying code (not shown) rather than as a topic node(s) identifying code (latter shown in next-discussed area 487*c*.2 of FIG. 4C).

More specifically, and referring to magnified data storing area 487*c* of FIG. 4C; one of the established (and system recorded) relationship operators between "Tom" and "Chuck" (col. 487.1A) may revolve about one or more in-STAN topic nodes whose corresponding identities are represented by one or more codes (e.g., compressed data codes) stored in region 487*c*.2 of the data structure 487*c*. These one or more topic node(s) identifications do not however necessarily define the corresponding relationships of user(B) (Tom) as it relates to user(C) (Chuck). Instead, another set of codes stored in relationship(s) specifying area 487*c*.1 represent the one or more relationships developed by "Tom" as he thus relates to "Chuck" where one or more of these relationships may revolve about the topic nodes identified in area-of-commonality specifying area 487*c*.2.

Relationships between social entities (e.g., real life persons) may be many faceted and uni or bidirectional. By way of example, imagine two real life persons named Doctor Samuel Rose (491) and his son Jason Rose (492). These are hypothetical persons and any relation to real persons living or otherwise is coincidental. A first set of uni-directional relationships stemming from Dr. S. Rose (Sr. for short) 491 and J. Rose (Jr. for short) 492 is that Sr. is biologically the father of Jr. and is behaviorally acting as a father of Jr. A second relationship may be that from time to time Sr. behaves the physician of Jr. A bi-directional relationship may be that Sr. and Jr. are friends in real life (ReL). They may also be online friends, for example on FaceBook™. They may also topic-related co-chatterers in one or more online forums sponsored or tracked by the STAN_3 system 410. The variety of possible uni- and bi-directional relationships possible between Sr. (491) and Jr. (492) is represented in a nonlimiting way by the uni- and bi-directional relationship vectors 490.12 shown in FIG. 4C.

In one embodiment, at least some of the many possible uni- and bi-directional relationships between a given first user (e.g., Sr. 491) and a corresponding second user (e.g., Jr. 492) are represented by digitally compressed code sequences. The code sequences are organized so that the most common of relationships between general first and second users are represented by short length code sequences (e.g., binary 1's and 0's). This reduces the amount of memory resources needed for storing codes representing the most common relationships (e.g., FaceBook™ friend of, MySpace™ friend of, father of, son of, brother of, husband of, etc.). Unit 495 in FIG. 4C represents a code compressor/decompressor that in one mode compresses long relationship descriptions (e.g., Boolean combinatorial descriptions of relationships) into shortened binary codes (included as part of compressor output signals 495*o*) and in another mode, decompresses the relationship defining codes back into their decompressed long forms. It is within the contemplation of the disclosure to provide the functionality of at least one of the decompressor mode and compressor mode of unit 495 in local data processing equipment of STAN users. It is also within the contemplation of the disclosure to provide the functionality of at least one of the decompressor mode and compressor mode of unit 495 in in-cloud resources of the STAN_3 system 410. The purpose of this description here is not to provide a full exegesis of data compression technologies. Rather it is to show how the storage of relationship representing data can be practically done without consuming unmanageable amounts of storage space. Also transmission bandwidth over wireless channels can be reduced by using compressed code and decompressing at the receiving end. It is left to those skilled in the data compression arts to work out specifics of exactly which user-to-user association descriptions (U2U) are to have the shortest run length codes and which longer ones. The choices may vary from application to application. An example of a use of a Boolean combinatorial description of relationships is: STAN user Y is member of group Gxy IFF (Y is at least one of relation R1 relative to STAN user X OR relation R2 relative to X OR . . . Ra relative to X) AND (Y is all of following relations relative to X: R(a+1) AND NOT R(a+2) AND . . . R(a+b)). More generally this may be seen as a Boolean product of sums. Alternatively or additionally, Boolean sums of products may be used.

Jason Rose (a.k.a. Jr. 492) may not know it, but his father, Dr. Samuel Rose (a.k.a. Sr. 491) enjoys playing in a virtual reality domain, say in the SecondLife™ domain (e.g., 460*a* of FIG. 4A) or in Zygna's Farmville™ and/or elsewhere in the virtual reality universe. When operating in the SecondLife™ domain 494*a* (or 460*a*, and this is purely hypothetical), Dr. Samuel Rose presents himself as the young and dashing Dr. Marcus U. R. Wellnow 494 where the latter appears as an avatar who always wears a clean white lab coat and always has a smile on his face. By using this avatar 494, the real life (ReL) personage, Dr. Samuel Rose 491 develops a set of relationships (490.14) as between himself and his avatar. In turn the avatar 494 develops a related set of relationships (490.45) as between itself and other virtual social entities it interacts with within the domain 494*a* of the virtual reality universe (e.g., within SecondLife™ 460*a*). Those avatar-to-others relationships reflect back to Sr. 491 because for each, Sr. may act as the behind the scenes puppet master of that relationship. Hence, the virtual reality universe relationships of a virtual social entity such as 494 (Dr. Marcus U. Welcome) reflect back to become real world relationships felt by the controlling master, Sr. 491. In some applications it is useful for the STAN_3 system 410 to track these relationships so that Sr. 491 can keep an eye on what top topics are being currently focused-upon by his virtual reality friends.

Jason Rose (a.k.a. Jr. 492) is not only a son of Sr. 491. he is also a business owner. In his business, Jr. 492 employs Kenneth Keen, an engineer (a.k.a. as KK 493). They communicate with one another via various social networking (SN) channels. Hence a variety of online relationships 490.23 develop between them as it may relate to business oriented topics or outside-of-work topics. At times, Jr. 492 wants to keep track of what new top topics KK 493 is currently focusing-upon and also what new top topics other employees of Jr. 492 are focusing-upon. Jr. 492, KK 493 and a few other employees of Jr. are STAN users. So Jr. has formulated a to-be-watched custom U2U group 496 in his STAN_3 system account. In one embodiment, Jr. 492 can do so by dragging and dropping icons representing his various friends and/or other social entity acquaintances into a custom group defining circle 496 (e.g., his circle of trust). In the same or an alternate embodiment, Jr. 492 can formulate his custom group 496 of to-be-watched social entities (real and/or virtual) by specifying group assemblage rules such as, include all my employees who are also STAN users and are friends of mine on at least one of FaceBook™ and LinkedIn™ (this is merely an example). An advantage of such rule based assemblage is that the system 410 can thereafter automatically add and delete appropriate social entities from the custom group based on the user specified rules. Jr. 492 does have to hand retool his custom group definition every time he hires a new employee or one decides to seek greener pastures elsewhere. However, if Jr. 492 alternatively or additionally wants to use the drag-and-drop operation to further refine his custom group 496, he can. In one embodiment, icons representing collective social entity groups (e.g., 496) are also provided with magnification and/or expansion unpacking/repacking tool options such as 496+. Hence, anytime Jr. 492 wants to see who specifically is included within his custom formed group definition, he can with use of the unpacking/repacking tool option 496+. The same tool may also be used to view and/or refine the automatic add/drop rules 496*b* for that custom formed group representation.

Aside from custom group representations (e.g., 496), the STAN_3 system 410 provides its users with the option of calling up pre-fabricated common templates 498 such as, but not limited to, a pre-programmed group template whose automatic add/drop rules (see 496*b*) cause it to maintain as its followed personas, all living members of the user's immediate family. The relationship codes (e.g., 490.12) maintained as between STAN users allows the system 410 to automatically do this. Other examples of pre-fabricated common templates 498 include all my FaceBook™ and/or MySpace™ friends of the last 2 weeks; my in-STAN top topic friends of the last 8 days and so on. As the case with custom group representations (e.g., 496), each pre-programmed group template 498 may include magnification and/or expansion unpacking/repacking tool options such as 498+. Hence, anytime Jr. 492 wants to see who specifically is included within his template formed group definition, he can with use of the unpacking/repacking tool option 498+. The same tool may also be used to view and/or refine the automatic add/drop rules (see 496*b*) for that template formed group representation. When the template rules are so changed, the corresponding data object becomes a custom one. A system provided template (498) may also be converted into a custom one by its respective user (e.g., Jr. 492) by using the drag-and-drop option 496*a*.

From the above examples it is seen that relationship specifications and formation of groups (e.g., 496, 498) can depend on a large number of variables. The exploded view of relationship specifying data object 487*c* at the far left of FIG. 4C provides some nonlimiting examples. As has already been mentioned, a first field 487*c*.1 in the database record may specify one or more user(B) to user(C) relationships by means of compressed binary codes or otherwise. A second field 487*c*.2 may specify one or more area-of-commonality attributes. These area-of-commonality attributes 487*c*.2 can include one or more topic nodes of commonality where the specified topic nodes (e.g., TCONE's) are maintained in the area 413 of the STAN_3 system 410 database and where optionally the one or more topic nodes of commonality are represented by means of compressed binary codes and/or otherwise. However, when out-of-STAN platforms are involved (e.g., FaceBook™' LinkedIn™, etc.), the specified area-of-commonality attributes may be ones other than or in addition to STAN_3 maintained topic nodes, for example discussion groups in the FaceBook™ or LinkedIn™ domains. These too can be represented by means of compressed binary codes and/or otherwise.

Blank field 487*c*.3 is representative of many alternative or additional parameters that can be included in relationship specifying data object 487*c*. More specifically, these may include user(B) to user(C) shared platform codes. In other words, what platforms do user(B) and user(C) have shared interests in? These may include user(B) to user(C) shared event offer codes. In other words, what group discount or other online event offers do user(B) and user(C) have shared interests in? These may include user(B) to user(C) shared content source codes. In other words, what major URL's, blogs, chat rooms, etc., do user(B) and user(C) have shared interests in?

Relationships can be made, broken and repaired over the course of time. In accordance with another aspect of the present disclosure, the relationship specifying data object 487*c* may include further fields specifying when and/or where the relationship was first formed, when and/or where the relationship was last modified (and was the modification a breaking of the relationship (e.g., a de-friending?), a remaking of the last broken level or an upgrade to higher/stronger level of relationship). In other words, relationships may be defined by recorded data of one embodiment, not with respect to most recent changes but also with respect to lifetime history so that cycles in long term relationships can be automatically identified and used for automatically predicting future co-compatibilities and the like. The relationship specifying data object 487*c* may include further fields specifying when and/or where the relationship was last used, and so on. Automated group assemblage rules such as 496*b* may take advantage of these various fields of the relationship specifying data object 487*c* to automatically form group specifying objects (e.g., 496) which may then be inserted into column 101 of FIG. 1A so that their collective activities may be watched by means of radar objects such as those shown in column 101*r* of FIG. 1A.

While the user-to-user associations (U2U) space has been described above as being composed in one embodiment of tabular data structures such as panes 484.1, 484.2, etc. for respective real life (ReL) users (e.g., where pane 484.1 corresponds to the real life (ReL) user identified by ReL ID node 484.1R) and where each of the tabular data structures contain, or has pointers pointing to, further data structures such as487*c*, it is within the contemplation of the present disclosure to use alternate methods for organizing the data objects of the user-to-user associations (U2U) space. More specifically, an "operator nodes" method is disclosed here in FIG. 3E for organizing keyword expressions as combinations, sequences and so forth in a hierarchical graph. The same approach can be used for organizing the U2U space of FIG. 4C. In that alternate embodiment (not fully shown), each real life (ReL) person (e.g., 432) has a corresponding real user identification node 484.1R stored for him in system memory. His various pseudonames (alter-ego personas) and passwords (if given) are stored in child nodes (not shown) under that ReL user ID node 484.1R. (The stored passwords are of course not shared with other users.) Additionally, a plurality of user-to-user association primitives 486P are stored in system memory (e.g., FaceBook™ friend, LinkedIn™ contact, real life biological father of:, employee of:, etc.). Various operational combining nodes 487*c*.1N are provided in system memory where the operational combining nodes have pointers pointing to two or more pseudoname (alter-ego persona) nodes of corresponding users for thereby defining user-to-user associations between the pointed to social entities. An example might be: Is Member of My (FB or MS) Friends Group (see 498) where the one operational combining node (not specifically shown, see 487*c*.1N) has plural bi-directional pointers pointing to the pseudoname nodes (or ReL nodes 484.1R if permitted) of corresponding friends and at least one addition bi-directional pointer pointing to at least one pseudoname node of the owner of that My (FB or MS) Friends Group list.

The "operator nodes" (e.g., 487*c*.1N, 487*c*.2N) may point to other spaces aside from pointing to internal nodes of the user-to-user associations (U2U) space. More specifically, rather than having a specific operator node called "Is Member of My (FB or MS) Friends Group" as in the above example, a more generalized relations operator node may be a hybrid node (e.g., 487*c*.2N) call "Is Member of My (XP1 or XP2 or XP3 or . . . ) Friends Group" where XP1, XP2, XP3, etc. are inheritance pointers that can point to external platform names (e.g., FaceBook™) or to other operator nodes that form combinations of platforms or inheritance pointers that can point to more specific regions of one or more networks or to other operator nodes that form combinations of such more specific regions and by object oriented inheritance, instantiate specific definitions for the "Friends Group", or more broadly, for the corresponding user-to-user associations (U2U) node.

Hybrid operator nodes may point to other hybrid operator nodes (e.g., 487*c*.2N) and/or to nodes in various system-supported "spaces" (e.g., topic space, keyword space, music space, etc.). Accordingly, by use of object-oriented inheritance functions, a hybrid operator node in U2U space may define complex relations such as, for example, "These are my associates whom I know from platforms (XP1 or XP2 or XP3) and with whom I often exchange notes within chat or other Forum Participation Sessions (FPS1 or FPS2 or FPS3) where the exchanged notes relate to the following topics and/or topic space regions: (Tn11 or (Tn22 AND Tn33) or TSR44 but not TSR55)". It is to be understood here that like XP1, XP2, etc., variables FPS1, etc.; Tn11, etc; TSR44, etc. are instantiated by way of modifiable pointers that point to fixed or modifiable nodes or areas in other spaces (e.g., in topic space). Accordingly a robust and easily modifiable data-objects organizing space is created for representing in machine memory, the user-to-user associations similar to the way that other data-object to data-object associations are represented, for example the topic node to topic node associations (T2T) of system topic space (TS). See more specifically TS 313' of FIG. 3E.

Referring now to FIG. 1A, the pre-specified group or individual social entity objects (e.g., 101*a*, 101*b*, . . . , 101*d*) that appear in the watched entities column 101 may vary as a function of context. More specifically, if the user is planning to soon attend a family event and the system 410 automatically senses that the user has this kind of topic in mind, the My Immediate Family and My Extended Family group objects may automatically be inserted by the system 410 so as to appear in left column 101. On the other hand, if the user is at Ken's house attending the "Superbowl™ Sunday Party", the system 410 may automatically sense that the user does not want to track topics currently top for his family members, but rather the current top topics of his sports-topic related acquaintances. If the system 410 on occasion, guesses wrong as to context and/or desires of the user, this can be rectified. More specifically, if the system 410 guesses wrong as to which social entities the user now wants in his left side column 101, the user can edit that column 101 and optionally activate a "training" button (not shown) that lets the system 410 know that the user made modification is "training" one which the system 410 is to use to heuristically re-adjust its context based decision makings on.

As another example, the system 410 may have guessed wrong as to context. The user is not in Ken's house to watch the Superbowl™ Sunday football game, but rather next door, in the user's grandmother's house because the user had promised his grandmother he would fix the door gasket on her refrigerator that day. In the latter case, if the Magic Marble 108 had incorrectly taken the user to the Superbowl™ Sunday floor of the metaphorical high rise building, the user can pop the Magic Marble 108 out of its usual parking area 108*z*, roll it down to the virtual elevator doors 113, and have it take him to the Help Grandma floor, one or a few stories above. This time when the virtual elevator doors open, the user's left side column 101 is automatically populated with social entities who are likely to be able to help him with fixing Grandma's refrigerator, the invitations tray 102 is automatically populated by invitations to chat rooms or other forums directed to the repair of certain name brand appliances (GE™, Whirlpool™, etc.) and the lower tray offers 104 may include solicitations such as: Hey if you can't do it yourself by half-time, I am a local appliance repair person who can be at Grandma's house in 15 minutes to fix her refrigerator at an acceptable price.

If the mistaken context determining action by the STAN_3 system 410 is an important one, the user can optionally activate a "training" button (not shown) when taking the Layer-vator 113 to the correct virtual floor or system layer and this lets the system 410 know that the user made modification is "training" one which the system 410 is to use to heuristically re-adjust its context determining decision makings on in the future.

Referring to FIG. 1A and for purposes of a quick recap, magnification and/or unpacking/packing tools such as for example the starburst plus sign 99+ in circle 101*d* of FIG. 1A allow the user to unpack group representing objects (e.g., 496 of FIG. 4C) or individual representing objects (e.g., Me) and discover who exactly is the Hank_123 social entity being specified (as an example) by an individual representing object that merely says Hank_123 on its face. Different people can claim to be Hank_123 on FaceBook™, on LinkedIn™, or elsewhere. The user-to-user associations (U2U) object 487*c* of FIG. 4C can be queried to see more specifically, who this Hank_123 (not shown) social entity is. Thus, when a STAN user (e.g., 432) is keeping an eye on top topics currently being focused-upon by a friend of his named Hank_123 by using the two left columns (101, 101*r*) in FIG. 1A and he sees that Hank_123 is currently focused-upon an interesting topic, the STAN user (e.g., 432) can first make sure it indeed is the Hank_123 he is thinking it is by activating the details magnification tool (e.g., starburst plus sign 99+) whereafter he can verify that yes, it is "that" Hank_123 he met over on the FaceBook™ 441 platform in the past two weeks while he was inside discussion group number A5. Incidentally, in FIG. 4C it is to be understood that the forefront pane 484.1 is one that provides user(B) to user(C) through user(X) specifications for the case where "Tom" is user(B). Shown behind it is an alike pane 484.2 but wherein user(B) is someone else, say, Hank, and one of Hank's user(C) through user(X) may be "Tommy". Similarly, the next pane 484.3 may be for the case where user(B) is Chuck, and so on.

In one embodiment, when users of the STAN_3 system categorize their imported U2U submaps of friends or other contacts in terms of named Groups, as for example, "My Immediate Family" (e.g., in the Circle of Trust shown as 101*b* in FIG. 1A) versus "My Extended Family" or some other designation so that the top topics of the formed group (e.g., "My Immediate Family" 101*b*) can be watched collectively, the collective heat bars may represent unweighted or weighted and scaled averages of what are the currently focused-upon top topics of members of the group called "My Immediate Family". Alternatively, by using a settings adjustment tool, the STAN user may formulate a weighted averages collective view of his "My Immediate Family" where Uncle Ernie gets 80% weighing but weird Cousin Clod is counted as only 5% contribution to the Family Group Statistics. The temperature scale on a watched group (e.g., "My Family" 101*b*) can represent any one of numerous factors that the STAN user selects with a settings edit tool including, but not limited to, quantity of content that is being focused-upon for a given topic, number of mouse clicks or other agitations associated with the on-topic content, extent of emotional involvement indicated by uploaded CFi's and/or CVi's regarding the on-topic content, and so on.

Although throughout much of this disclosure, an automated plate-packing tool having a name of the form "My Currently Focused-Upon Top 5 Topics" is used as an example (or "Their Currently Focused-Upon Top 5 Topics", etc.) for describing what items can be automatically provided on each serving plate (e.g., 102*b* of FIG. 1A) of invitations serving tray 102, it is to be understood that choice of "Currently Focused-Upon Top 5 Topics" is merely a convenient and easily understood example. Users may elect to manually pack invitation generating tools on different ones of named or unnamed serving plate as they please. A more specific explanation will be given below in conjunction with FIG. 1N. As a quick example here, one such automated invitation generating tool that may be stacked onto a serving plate (e.g., 102*c* of FIG. 1A) is one that consolidates over itself invitations to chat rooms whose current "heats" are above a predetermined threshold and whose corresponding topic nodes are within a predetermined hierarchical distance relative to a favorite topic node of the user's. In other words, if the user always visits a topic node called (for example) "Best Sushi Restaurants in My Town", he may want to take notice of "hot" discussions that occasionally develop on a nearby (nearby in topic space) other topic node called (for example) "Best Sushi Restaurants in My State". The automated invitation generating tool that he may elect to manually stack onto one of his higher priority serving plates (e.g., in area 102*c* of FIG. 1A) may be one that is pseudo-programmed for example to say: IF Heat(emotional) in any Topic Node within 3 Hierarchical Jumps from TN="Best Sushi Restaurants in My Town" is Greater than ThresholdLevel5, Get Invitation to Co-compatible Chat Room Anchored to that other topic node ELSE Sleep(20 minutes) and Repeat. Thus, within about 20 minute of a hot discussion breaking out in such a topic node that the user is normally not interested in, the user will nonetheless automatically get an invitation to a chat room tethered to that normally outside-of-interesting topic node.

Figure 1E:
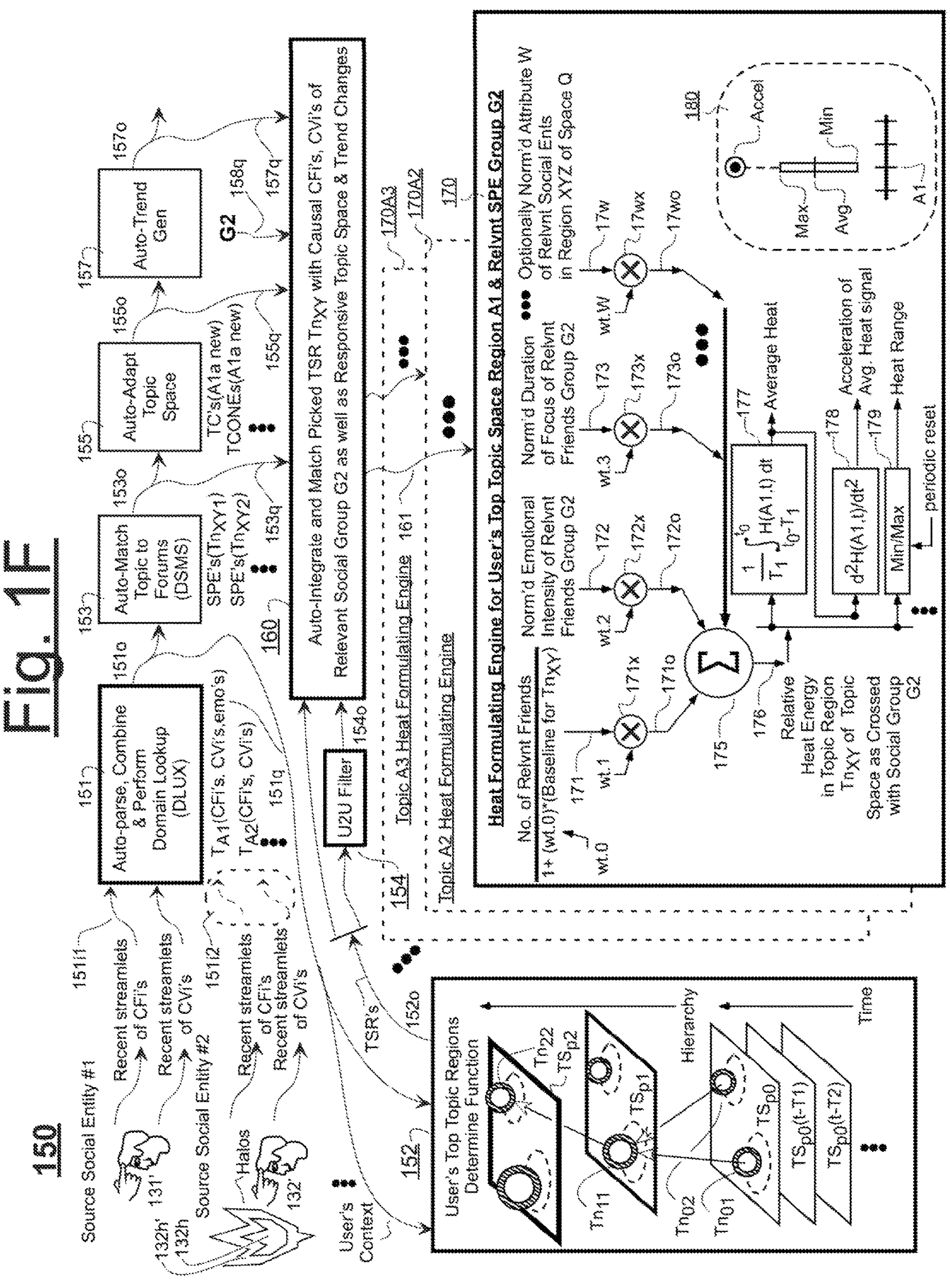
FIG. 1E shows a machine-implemented method for determining what topics are the top N topics of each social entity.
Figure 1G:
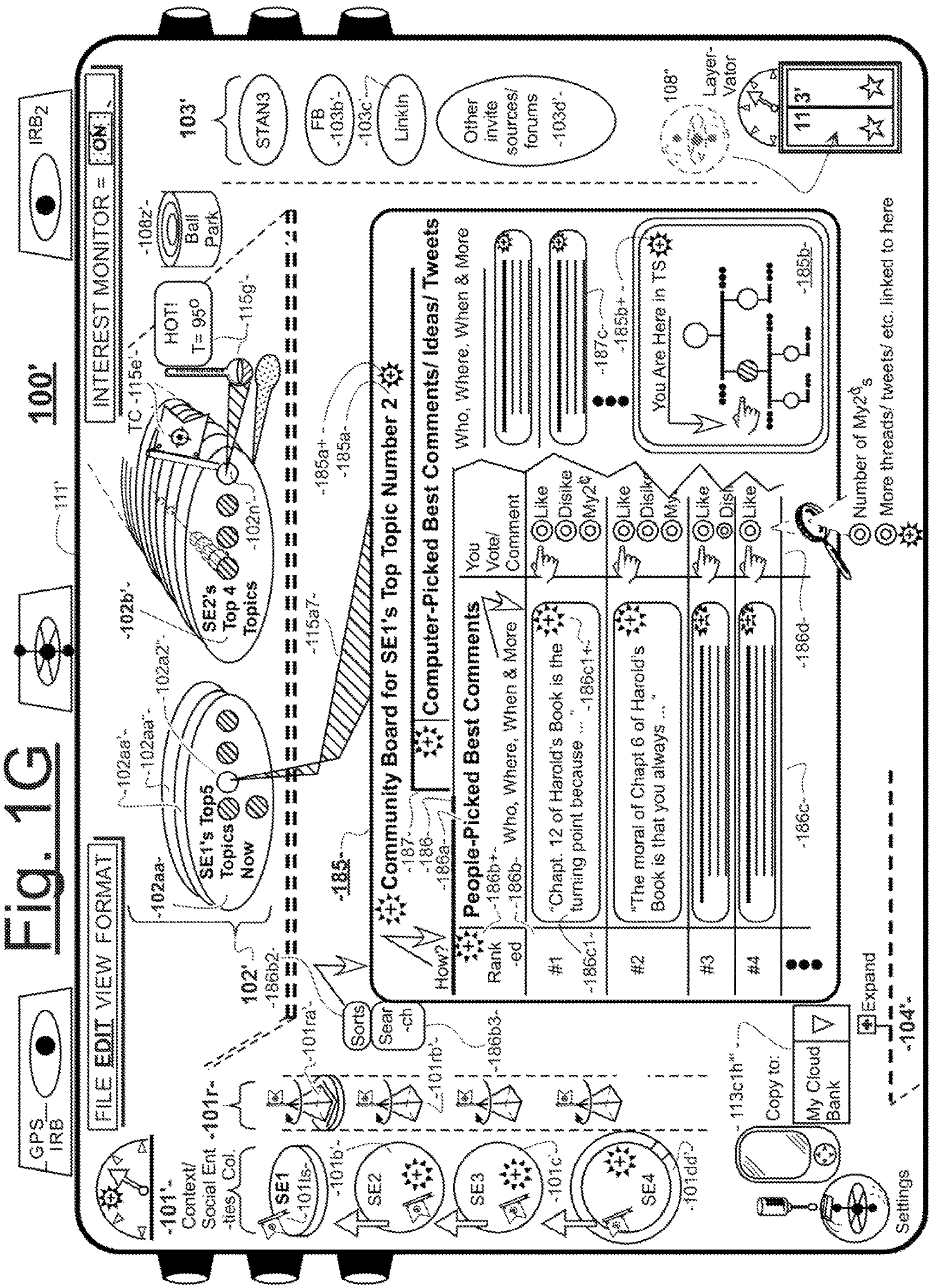
FIG. 1G shows an automated community board posting and posts ranking and/or promoting system in accordance with the disclosure.
Figure 1I:
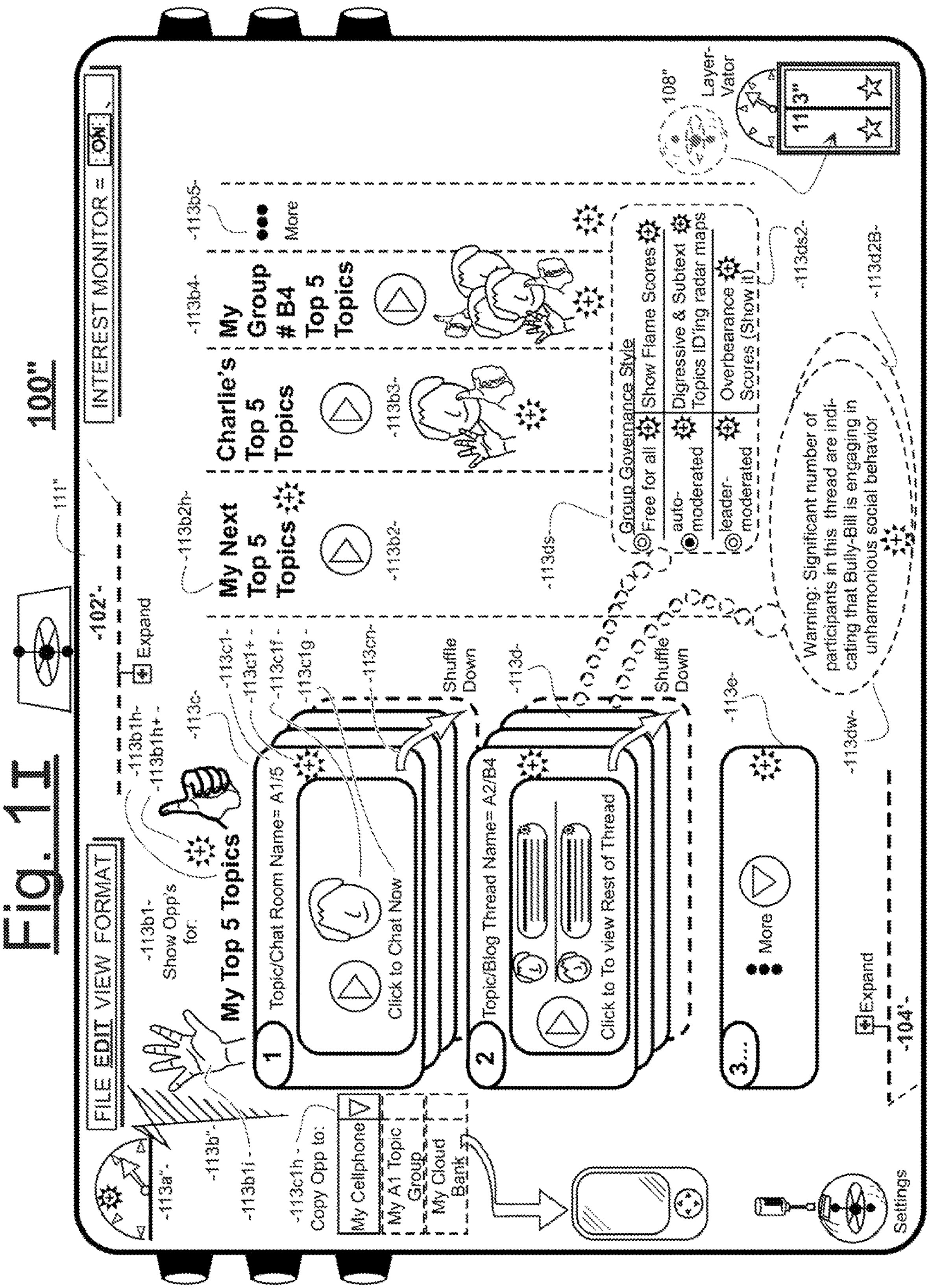
FIG. 1I shows a cell/smartphone and tablet computer compatible user interface method for presenting chat-now and alike, on-topic joinder opportunities to users of the STAN_3 system.
Figure 1J:
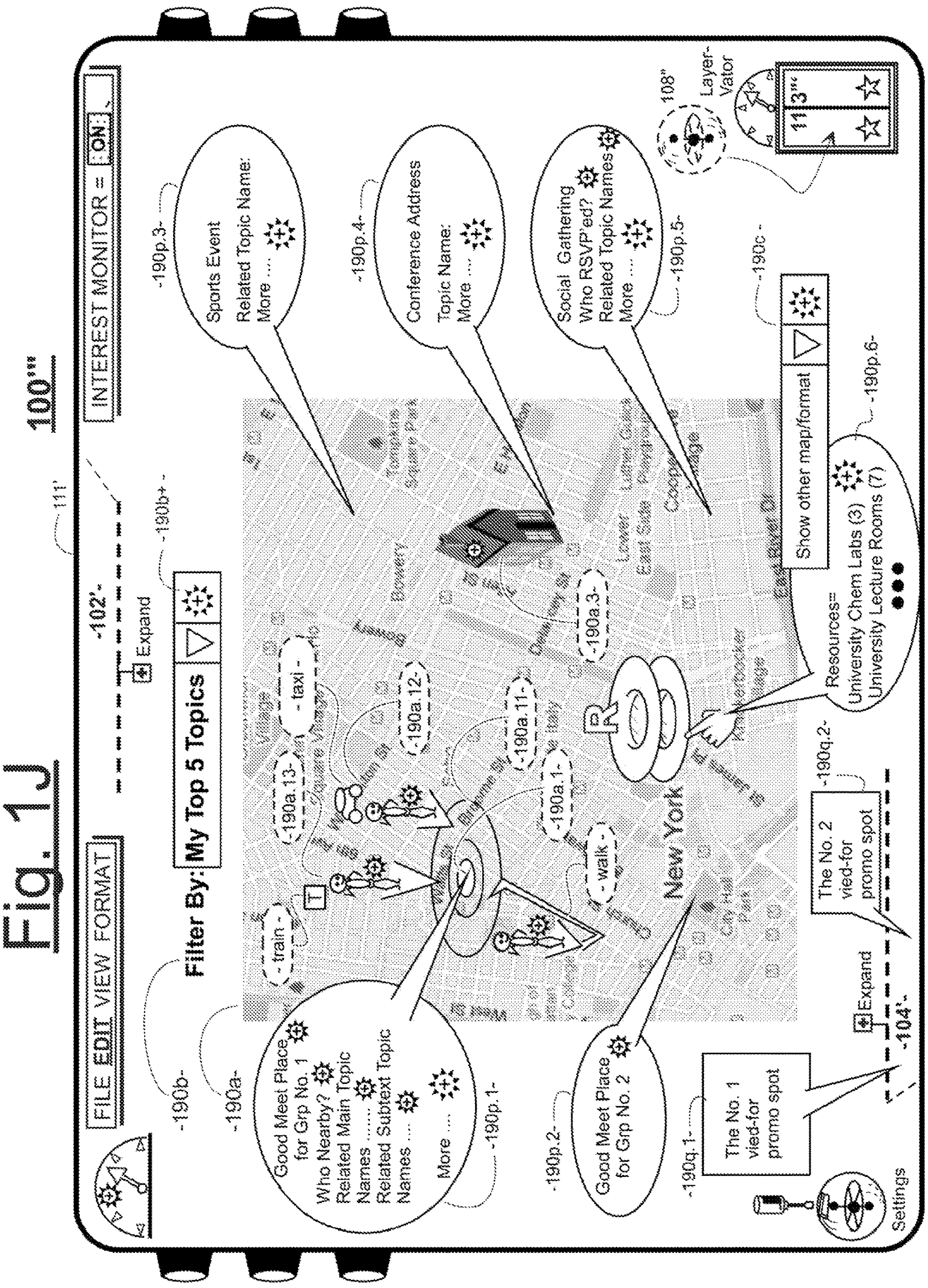
FIG. 1J shows a smartphone and tablet computer compatible user interface method for presenting on-topic location based congregation opportunities to users of the STAN_3 system.
Figure 1K:
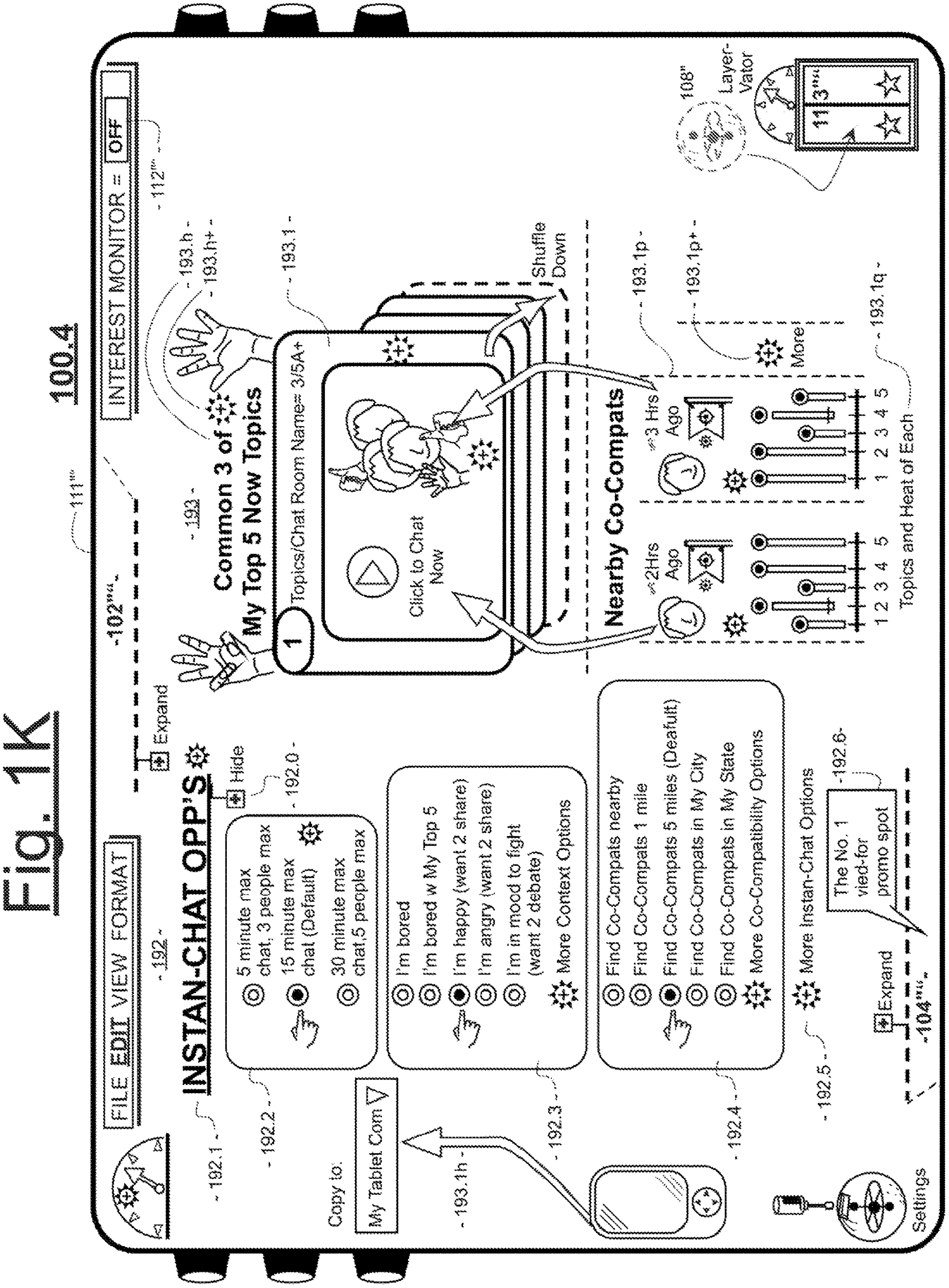
FIG. 1K shows a smartphone and tablet computer compatible user interface method for presenting an M out of N common topics and optional location based chat or other joinder opportunities to users of the STAN_3 system.
Figure 1L:
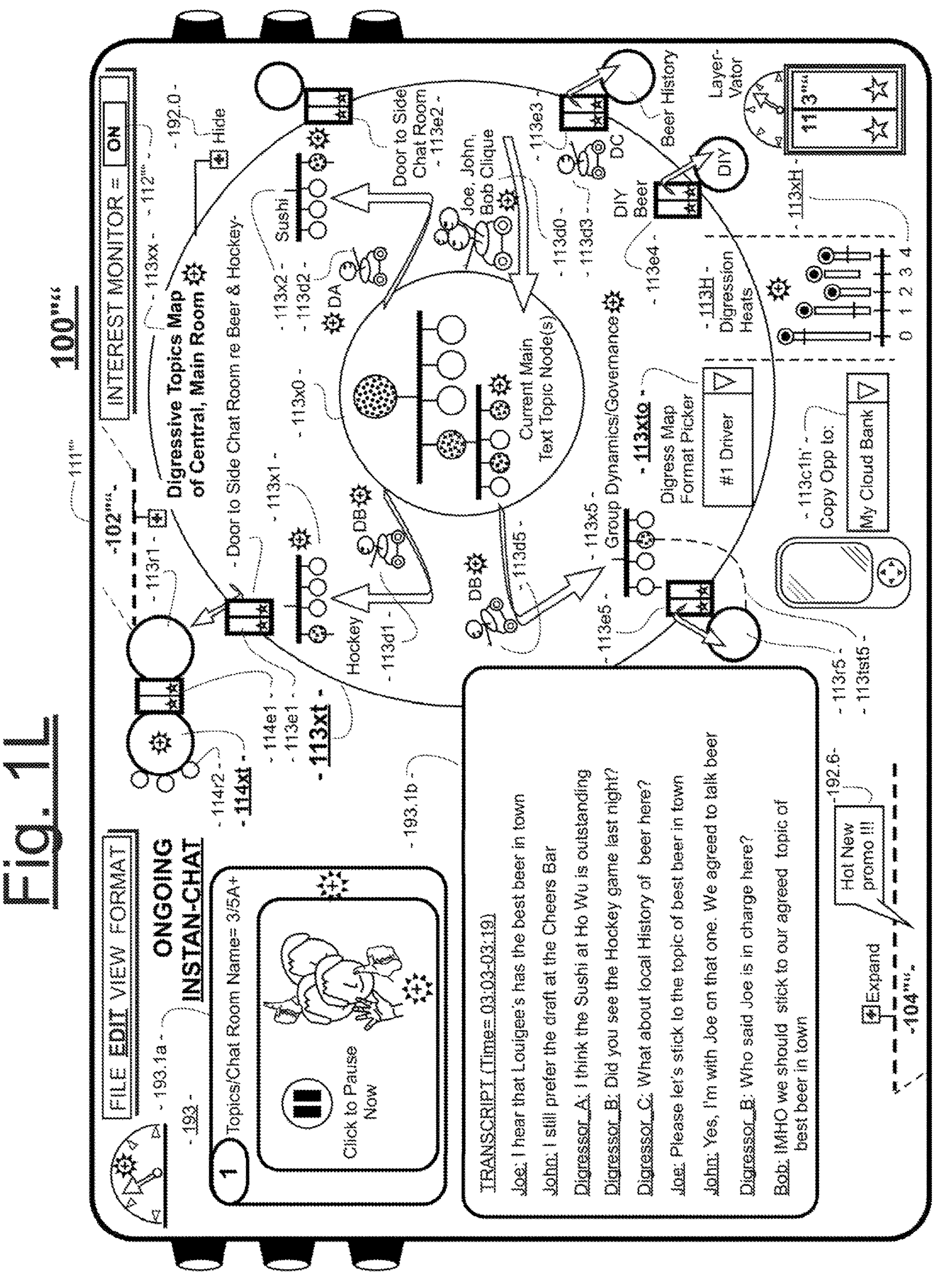
FIG. 1L shows a smartphone and tablet computer compatible user interface method that includes a topics digression mapping tool.
Figure 1M:
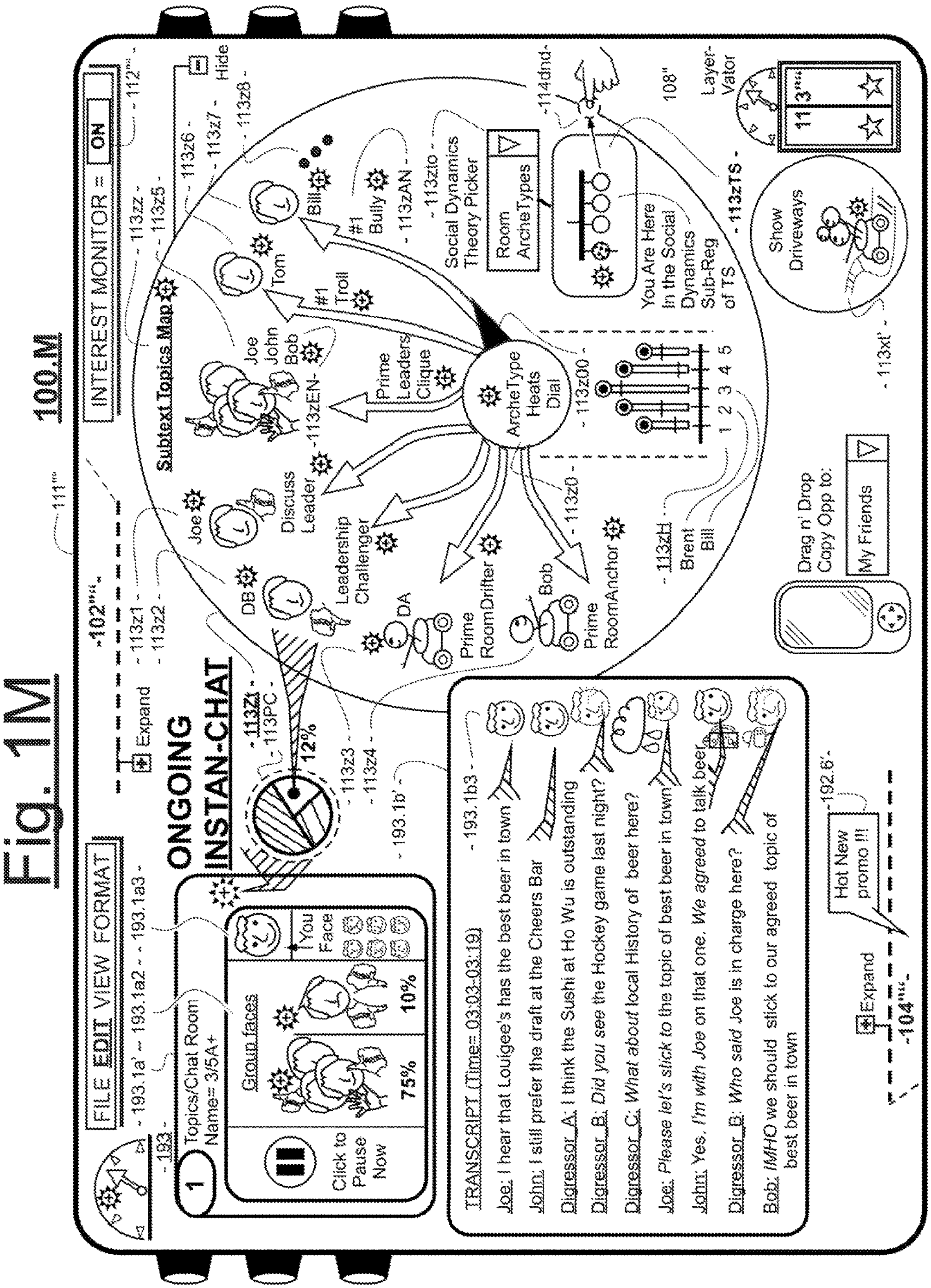
FIG. 1M shows a smartphone and tablet computer compatible user interface method that includes a social dynamics mapping tool.
Figure 1N:
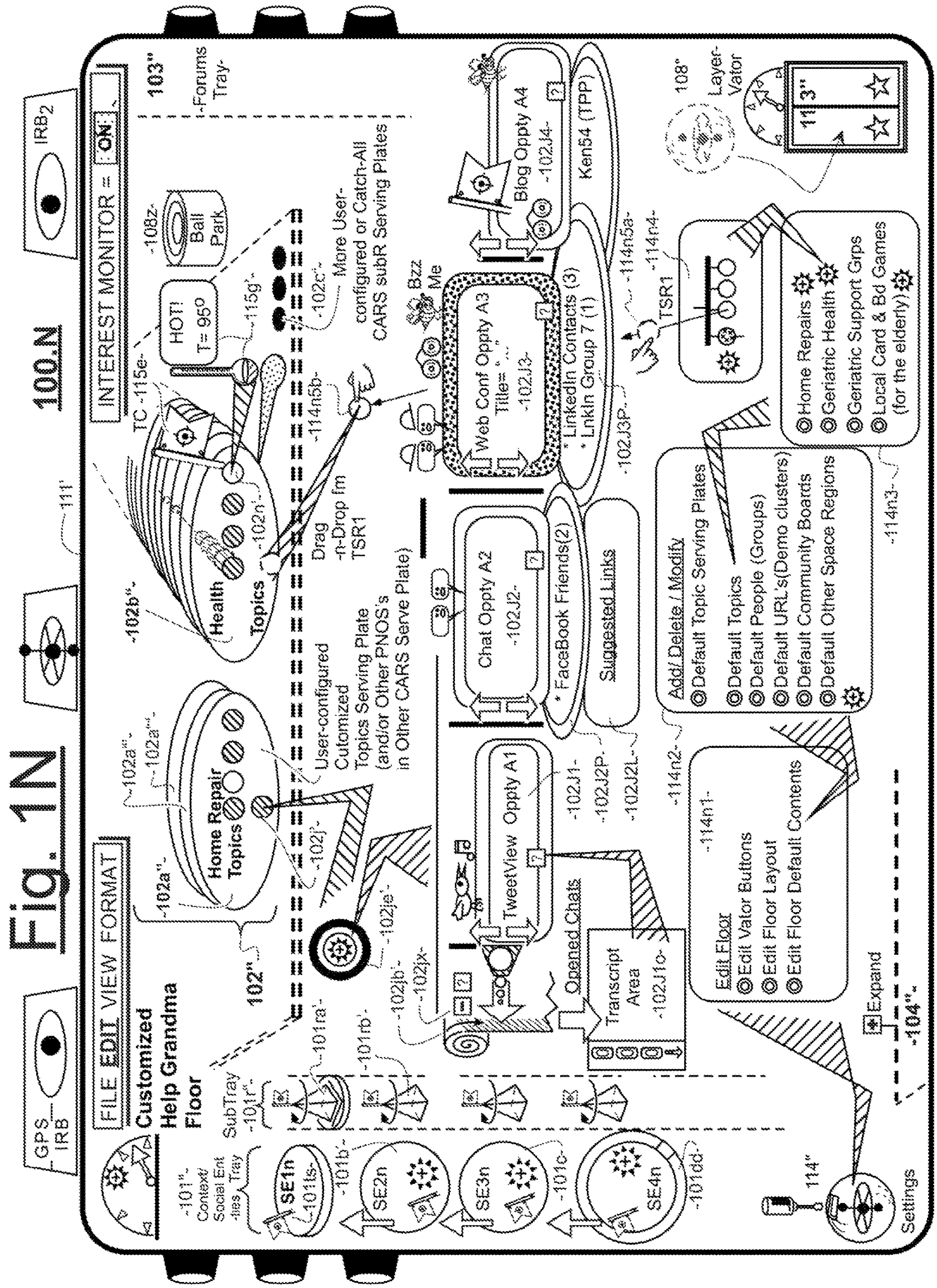
FIG. 1N shows how the layout and content of each floor in a virtual multi-storied building can be re-organized as the user desires.

Yet another automated invitation generating tool that the user may elect to manually attach to one of his serving plates or to have the system 410 automatically attach onto one of the serving plates on a particular Layer-Vator™ floor he visits (see FIG. 1N: Help Grandma) can be one called: "Get Invitations to Top 5 DIVERSIFIED Topics of Entity(X)" where X can be "Me" or "Charlie" or another identified social entity and the 5 is just an exemplary number. The way the latter tool works is as follows. It does not automatically fetch the topic identifications of the five first-listed topics (see briefly list 149*a* of FIG. 1E) on Entity(X)'s top N topics list. Instead it fetches the topmost first topic on the list and it determines where in topic space the corresponding topic node (or TSR) is located. Then it compares the location in topic space of the node or TSR of the next listed topic. If that location is within a predetermined radius distance (e.g., spatial or based on number of hierarchical jumps in a topic space tree) of the first node, the second listed item (of top N topics) is skipped over and the third item is tested. If the third item has its topic node (or TSR) located far enough away, an invitation to that topics is requested. The acceptable third item becomes the new base from which to find a next, sufficiently diversified topic on Entity(X)'s top N topics list and so on. It is within the contemplation of the disclosure to use variations on this theme such as a linearly or geometrically increasing distance requirement for "diversification" as opposed to a constant one; or a random pick of which out of the first top 5 topics in Entity(X)'s top N topics list will serve as the initial base for picking other topics, and so on.

An example of why a DIVERSIFIED Topics picker might be desirable is this. Suppose Entity(X) is Cousin Wendy and unfortunately, Cousin Wendy is obsessed with Health Maintenance topics. Invariably, her top 5 topics list will be populated only with Health Maintenance related topics. The user (who is an inquisitive relative of Cousin Wendy) may be interested in learning if Cousin Wendy is still in her Health Maintenance infatuation mode. So yes, if he is analyzing Cousin Wendy's currently focused-upon topics, he will be willing to see one hit pointing to a topic node or associated chat or other forum participation session directed to that same old and tired topic, but not ten all pointing to that one general topic subregion (TSR). The user may wish to automatically skip the top 10 topics of Cousin Wendy's list and get to item number 12, which for the first time in Cousin Wendy's list of currently focused-upon topics, points to an area topic space far away from the Health Maintenance region. This will next found hit will tell the inquisitive user (the relative of Cousin Wendy) that Wendy is also currently focused-upon, but not so much, on a local political issue, on a family get together that is coming up soon, and so on. (Of course, Cousin Wendy is understood to have not blocked out these other topics from being seen by inquisitive My Family members.)

In one embodiment, two or more top N topics mappings (e.g., heat pyramids) for a given social entity (e.g., Cousin Wendy) are displayed at the same time, for example her Undiversified Top 5 Now Topics and her Highly Diversified Top 5 Now Topics. This allows the inquiring friend to see both where the given social entity (e.g., Cousin Wendy) is concentrating her focus heats in an undiversified one topic space subregion (e.g., TSR1) and to see more broadly, other topic space subregions (e.g., TSR2, TSR3) where the given social entity is otherwise applying above-threshold heats. In one embodiment, the STAN_3 system 410 automatically identifies the most highly diversified topic space subregions (e.g., TSR1 through TSR9) that have been receiving above-threshold heat from the given social entity (e.g., Cousin Wendy) during the relevant time duration (e.g., Now or Then) and the system 410 then automatically displays a spread of top N topics mappings (e.g., heat pyramids) for the given social entity (e.g., Cousin Wendy) across a spectrum, extending from an undiversified top N topics Then mapping to a most diversified Last Ones of the Then Above-threshold M topics (where here M≤N) and having one or more intermediate mappings of less and more highly diversified topic space subregions (e.g., TSRS, TSR7) between those extreme ends of the above-threshold heat receiving spectrum.

Aside from the DIVERSIFIED Topics picker, the STAN_3 system 410 may provide many other specialized filtering mechanisms that use rule-based criteria for identifying nodes or subregions in topic space (TS) or in another system-supported space (e.g., a hybrid of topic space and context space for example). One such example is a population-rarifying topic and user identifying tool (not shown) which automatically looks at the top N now topics of a substantially-immediately contactable population of STAN users versus the top N now topics of one user (e.g., the user of computer 100). It then automatically determines which of the one user's top N now topics (where N can be 1, 2, 3, etc. here) is most popularly matched within the top N now topics of the substantially-immediately contactable population of other STAN users and it eliminates that topic from the list of shared topics for which co-focused users are to be identified. The system (410) thereafter tries to identify the other users in that population who are concurrently focused-upon one or more topic nodes or topic space subregion (TSRs) described by the pruned list (the list which has the most popular topic removed from it. Then the system indicates to the one user (e.g., of computer 100) how many persons in the substantially-immediately contactable population are now focused-upon one or more of the less popular topics, which topics; and if the other users had given permission for their identity to be publicized in such a way, the identifications of the other users who are now focused-upon one or more of the less popular topics. Alternatively or additionally, the system may automatically present the users with chat or other forum participation opportunities directed only to their respective less popular topics of concurrent focus. One example of an invitations filter option that can be presented in the drop down menu 190*b* of FIG. 1J can read as follows: "The Least Popular 3 of My Top 5 Now Topics Among Other Users Within 2 Miles of Me". Another similar filtering definition may appear among the offered card stacks of FIG. 1K and read: "The Least Popular 4 of My Top 10 Now Topics Among Other Users Now Chatting Online and In My Time Zone" (this being a non-limiting example).

The terminology, "substantially-immediately contactable population of STAN users" as used immediately above can have a selected one or more of the following meanings: (1) other STAN users who are physically now in a same room, building, arena or other specified geographic locality such that the first user (of computer 100) can physically meet them with relative ease; (2) other STAN users who are now participating in an online chat or other forum participation session which the first user is also now participating in; (3) other STAN users who are now currently online and located within a specified geographic region; (4) other STAN users who are now currently online; and (5) other STAN users who are now currently contactable by means of cellphone texting or other such socially less-intrusive-than direct-talking techniques.

It is within the contemplation of the disclosure to augment the above exemplary option of "The Least Popular 3 of My Top 5 Now Topics Among Other Users Within 2 Miles of Me" to instead read for example: "The Least Popular 3 of My Top 5 Now DIVERSIFIED Topics Among Other Users Within 10 Miles of Me" or "The Least Popular 2 of Wendy's Top 5 Now DIVERSIFIED Topics Among Other Users Now online".

An example of the use of a filter such as for example "The Least Popular 3 of My Top 5 Now DIVERSIFIED Topics Among Other Users Attending Same Conference as Me" can proceed as follows. The first user (of computer 100) is a medical doctor attending a conference on Treatment and Prevention of Diabetes. His number one of My Top 5 Now Topics is "Treatment and Prevention of Diabetes". In fact for pretty much every other doctor at the conference, one of their Top 5 Now Topics is "Treatment and Prevention of Diabetes". So there is little value under that context in the STAN_3 system 410 connecting any two or more of them by way of invitation to chat or other forum participation opportunities directed to that highly popular topic (at that conference). Also assume that all five of the first user's Top 5 Now Topics are directed to topics that relate in a fairly straight forward manner to the more generalized topic of "Diabetes". However, let it be assumed that the first user (of computer 100) has in his list of "My Top 5 Now DIVERSIFIED Topics", the esoteric topic of "Rare Adverse Drug Interactions between Pharmaceuticals in the Class 8 Compound Category" (a purely hypothetical example). The number of other physicians attending the same conference and being currently focused-upon the same esoteric topic is relatively small. However, as dinner time approaches, and after spending a whole day of listening to lectures on the number one topic ("Treatment and Prevention of Diabetes") the first user would welcome an introduction to a fellow doctor at the same conference who is currently focused-upon the esoteric topic of "Rare Adverse Drug Interactions between Pharmaceuticals in the Class 8 Compound Category" and the vise versa is probably true for at least one among the small subpopulation of conference-attending doctors who are similarly currently focused-upon the same esoteric topic. So by using the population-rarifying topic and user identifying tool (not shown), individuals who are uniquely suitable for meeting each other at say a professional conference, or at a sporting event, etc., can determine that the similarly situated other persons are substantially-immediately contactable and they can inquire if those other identifiable persons are now interested in meeting in person or even just via electronic communication means to exchange thoughts about the less locally popular other topics.

The example of "Rare Adverse Drug Interactions between Pharmaceuticals in the Class 8 Compound Category" (a purely hypothetical example) is merely illustrative. The two or more doctors at the Diabetes conference may instead have the topic of "Best Baseball Players of the 1950's" as their common esoteric topic of current focus to be shared during dinner.

Yet another example of an esoteric-topic filtering inquiry mechanism supportable by the STAN_3 system 410 may involve shared topics that have high probability of being ridiculed within the wider population but are understood and cherished by the rarified few who indulge in that topic. Assume as a purely hypothetical further example that one of the secret current passions of the exemplary doctor attending the Diabetes conference is collecting mint condition SuperMan™ Comic Books of the 1950's. However, in the general population of other Diabetes focused doctors, this secret passion of his is likely to be greeted with ridicule. As dinner time approaches, and after spending a whole day of listening to lectures on the number one topic ("Treatment and Prevention of Diabetes") the first user would welcome an introduction to a fellow doctor at the same conference who is currently focused-upon the esoteric topic of "Mint Condition SuperMan™ Comic Books of the 1950's". In accordance with the present disclosure, the "My Top 5 Now DIVERSIFIED Topics" is again employed except that this time, it is automatically deployed in conjunction with a True Passion Confirmation mechanism (not shown). Before the system generates invitations or other introductory propositions as between the two or more STAN users who are currently focused-upon an esoteric and likely-to-meet-with-ridicule topic, the STAN_3 system 410 automatically performs a background check on each of the potential invitees to verify that they are indeed devotees to the same topic, for example because they each participated to an extent beyond a predetermined threshold in chat room discussions on the topic and/or they each cast an above-threshold amount of "heat" at nodes within topic space (TS) directed to that esoteric topic. Then before they are identified to each other by the system, the system sends them some form of verification or proof that the other person is also a devotee to the same esoteric but likely-to-meet-with-ridicule by the general populace topic. Once again, the example of "Mint Condition SuperMan™ Comic Books of the 1950's" is merely an illustrative example. The likely-to-meet-with-ridicule by the general populace topic can be something else such as for example, People Who Believe in Abduction By UFO's, People Who Believe in one conspiracy theory or another or all of them, etc. In accordance with one embodiment, the STAN_3 system 410 provides all users with a protected-nodes marking tool (not shown) which allows each user to mark one or more nodes or subregions in topic space and/or in another space as being "protected" nodes or subregions for which the user is not to be identified to other users unless some form of evidence is first submitted indicating that the other user is trustable in obtaining the identification information, for example where the proffered evidence demonstrates that the other user is a true devotee to the same topic based on past above-threshold casting of heat on the topic for greater than a predetermined time duration. The "protected" nodes or subregions category is to be contrasted against the "blocked" nodes or subregions category, where for the latter, no other member of the user community can gain access to the identification of the first user and his or her 'touchings' with those "blocked" nodes or subregions unless explicit permission of a predefined kind is given by the first user.

Referring again to FIG. 4A, and more specifically, to the U2U importation part **432*m* thereof, after an external list of friends, buddies, contacts and/or the alike have been imported for a first external social networking (SN) platform (e.g., FaceBook™) and the imported contact identifications have been optionally categorized (e.g., as to which topic nodes they relate, which discussion groups and/or other), the process can be repeated for other external content resources (e.g., MySpace™, LinkedIn™, etc.). FIG. 4**B details an automated process by way of which the user can be coaxed into providing the importation supporting data.

Referring to FIG. 4B, shown is a machine-implemented and automated process 470 by way of which a user (e.g., 432) might be coached through a step of steps which can enable the STAN_3 system 410 to import all or a filter-criteria determined subset of the second user's external, user-to-user associations (U2U) lists, 432L1, 432L2, etc. (and/or other members of list groups 432L and 432R) into STAN_3 stored profile record areas **432*p*2 for example of that second user 432**.

Process 470 is initiated at step 471 (Begin). The initiation might be in automated response to the STAN_3 system determining that user 432 is not heavily focusing upon any on-screen content of his CPU (e.g., **432*a*) at this time and therefore this would likely be a good time to push an unsolicited survey or favor request on user 432** for accessing his external user-to-user associations (U2U) information.

The unsolicited usage survey push begins at step 472. Dashed logical connection 472*a* points to a possible survey dialog box 482 that might then be displayed to user 432 as part of step 472. The illustrated content of dialog box 482 may provide one or more conventional control buttons such as a virtual pushbutton 482*b* for allowing the user 432 to quickly respond affirmatively to the pushed (e.g., popped up) survey proposal 482. Reference numbers like 482*b* do not appear in the popped-up survey dialog box 482. Embracing hyphens like the ones around reference number 482*b* (e.g., "-482*b*-") indicate that it is a nondisplayed reference number. A same use of embracing hyphens is used in other illustrations herein of display content to indicate nondisplay thereof.

More specifically, introduction information 482*a* of dialog box 482 informs the user of what he is being asked to do. Pushbutton 482*b* allows the user to respond affirmatively in a general way. However, if the STAN_3 has detected that the user is currently using a particular external content site (e.g., FaceBook™' MySpace™, LinkedIn™, etc.) more heavily than others, the popped-up dialog box 482 may provide a suggestive and more specific answer option 482*e* for the user whereby the user can push one rather than a sequence of numerous answer buttons to navigate to his desired conclusion. If the user does not want to be now bothered, he can click on (or otherwise activate) the Not-Now button 482*c*. In response to this, the STAN_3 system will understand that it guessed wrong on user 432 being in a solicitation welcoming mode and thus ready to participate in such a survey. The STAN_3 system will adaptively alter its survey option algorithms for user 432 so as to better guess when in the future (through a series of trials and errors) it is better to bother user 432 with such pushed (unsolicited) surveys about his external user-to-user associations (U2U). Pressing of the Not-Now button 482*c* does not mean user 432 never wants to be queried about such information, just not now. The task is rescheduled for a later time. User 432 may alternatively press the Remind-me-via-email button 482*d*. In the latter case, the STAN_3 system will automatically send an email to a pre-selected email account of user 432 for again inviting him to engage in the same survey (482, 483) at a time of his choosing. The More-Options button 482*g* provides user 432 with more action options and/or more information. The other social networking (SN) button 482*f* is similar to 482*e* but guesses as to an alternate external network account which user 432 might now want to share information about. In one embodiment, each of the more-specific affirmation (OK) buttons 482*e* and 482*f* includes a user modifiable options section 482*s*. More specifically, when a user affirms (OK) that he or she wants to let the STAN_3 system import data from the user's FaceBook™ account(s) or other external platform account(s), the user may simultaneously wish to agree to permit the STAN_3 system to automatically export (in response to import requests from those identified external accounts) some or all of shareable data from the user's STAN_3 account(s). In other words, it is conceivable that in the future, external platforms such as FaceBook™, MySpace™, LinkedIn™, GoogleWave™, GoogleBuzz™, Google Social Search™, FriendFeed™, blogs, ClearSpring™, YahooPulse™, Friendster™, Bebo™, etc. might evolve so as to automatically seek cross-pollination data (e.g., user-to-user associations (U2U) data) from the STAN_3 system and by future agreements such is made legally possible. In that case, the STAN_3 user might wish to leave the illustrated default of "2-way Sharing is OK" as is. Alternatively, the user may activate the options scroll down sub-button within area 482*s* of OK virtual button 482*e* and pick another option (e.g., "2-way Sharing between platforms NOT OK"—option not shown).

If in step 472 the user has agreed to now being questioned, then step 473 is next executed. Otherwise, process 470 is exited in accordance with an exit option chosen by the user in step 472. As seen in the next popped-up and corresponding dialog box 483, after agreeing to the survey, the user is again given some introductory information 483*a* about what is happening in this proposed dialog box 483. Data entry box 483*b* asks the user for his user-name as used in the identified outside account. A default answer may be displayed such as the user-name (e.g., "Tom") that user 432 uses when logging into the STAN_3 system. Data entry box 483*c* asks the user for his user-password as used in the identified outside account. The default answer may indicate that filling in this information is optional. In one embodiment, one or both of entry boxes 483*b*, 483*c* may be automatically pre-filled by identification data automatically obtained from the encodings acquisition mechanism of the user's local data processing device. For example a built-in webcam automatically recognizes the user's face and thus identity, a built-in audio pick-up automatically recognizes his/her voice and/or a built-in wireless key detector automatically recognizes presence of a user possessed key device whereby manual entry of the user's name and/or password is not necessary and thus step 473 can be performed automatically without the user's manual participation. Pressing button 483*e* provides the user with additional information and/or optional actions. Pressing button 483*d* returns the user to the previous dialog box (482). In one embodiment, if the user provides the STAN_3 system with his external account password (483*c*), an additional pop-up window asks the user to give STAN_3 some time (e.g., 24 hours) before changing his password and then advices him to change his password thereafter for his protection.

Although the interfacing between the user and the STAN_3 system is shown illustratively as a series of dialog boxes like 482 and 483 it is within the contemplation of this disclosure that various other kinds of control interfacing may be used to query the user and that the selected control interfacing may depend on user context at the time. For example, if the user (e.g., 432) is currently focusing upon a SecondLife™ environment in which he is represented by an animated avatar (e.g., MW_2nd_life in FIG. 4C), it may be more appropriate for the STAN_3 system to present itself as a survey-taking avatar (e.g., a uniformed NPC with a clipboard) who approaches the user's avatar and presents these inquiries in accordance with that motif. On the other hand, if the user (e.g., 432) is currently interfacing with his CPU (e.g., 432*a*) by using a mostly audio interface (e.g., a BlueTooth™ microphone and earpiece), it may be more appropriate for the STAN_3 system to present itself as a survey-taking voice entity that presents its inquiries (if possible) in accordance with that predominantly audio motif, and so on.

If in step 473 the user has provided one or more of the requested items of information (e.g., 483*b*, 483*c*), then in subsequent step 474 the obtained information is automatically stored into an aliases tracking portion (e.g., record(s)) of the system database (DB 419). Part of an exemplary DB record structure is shown at 484 and a more detailed version is shown as database section 484.1 in FIG. 4C. For each entered data column in FIG. 4B, the top row identifies the associated SN or other content providing platform (e.g., FaceBook™, MySpace™, LinkedIn™, etc.). The second row provides the username or other alias used by the queried user (e.g., 432) when the latter is logged into that platform (or presenting himself otherwise on that platform). The third row provides the user password and/or other security key(s) used by the queried user (e.g., 432) when logging into that platform (or presenting himself otherwise for validate recognition on that platform). Since providing passwords is optional in data entry box 483*c*, some of the password entries in DB record structure 484 are recorded as not-available (N/A); this indicating the user (e.g., 432) chose to not share this information. As an optional substep in step 473, the STAN_3 system 410 may first grab the user-provided username (and optional password) and test these for validity by automatically presenting them for verification to the associated outside platform (e.g., FaceBook™, MySpace™ LinkedIn™, etc.). If the outside platform responds that no such username and/or password is valid on that outside platform, the STAN_3 system 410 flags an error condition to the user and does not execute step 474. Although exemplary record 484 is shown to have only 3 rows of data entries, it is within the contemplation of the disclosure to include further rows with additional entries such as, alternate UsrName and alternate password (optional) used on the same platform, the user name of best friend(s) on the same platform, the user names of currently being "followed" influential personas on the same platform, and so on. Yet more specifically, in FIG. 4C it will be shown how various types of user-to-user (U2U) relationships can be recorded in a user(B) database section 484.1 where the recorded relationships indicate how the corresponding user (B) (e.g., 432) relates to other social entities including to out-of-STAN entities (e.g., user(C), . . . , user(X)).

In next step 475 of FIG. 4B, the STAN_3 system uses the obtained username (and optional password and optional other information) for locating and beginning to access the user's local and/or online (remote) friend, buddy, contacts, etc. lists (432L, 432R). The user may not want to have all of this contact information imported into the STAN_3 system for any of a variety of reasons. After having initially scanned the available contact information and how it is grouped or otherwise organized in the external storage locations, in next step 476 the STAN_3 system presents (e.g., via text, graphical icons and/or voice presentations) a set of import permission options to the user, including the option of importing all, importing none and importing a more specific and user specified subset of what was found to be available. The user makes his selection(s) and then in next step 477, the STAN_3 system imports the user-approved portions of the externally available contact data into a STAN_3 scratch data storage area (not shown). The STAN_3 system checks for duplicates and removes these so that its database 419 will not be filled with unnecessary duplicate information.

Then in step 478 the STAN_3 system converts the imported external contacts data into formats that conform to data structures used within the External STAN Profile records (431*p*2, 432*p*2) for that user. In one embodiment, the conform format is in accordance with the user-to-user (U2U) relationships defining sections, 484.1, 484.2, . . . , etc. shown in FIG. 4C. With completion of step 478 of FIG. 4B for each STAN_3 registered user (e.g., 431, 432) who has allowed at one time or another for his/her external contacts information to be imported into the STAN_3 system 410, the STAN_3 system may thereafter automatically inform that user of when his friends, buddies, contacts, best friends, followed influential people, etc. as named in external sites are already present within or are being co-invited to join a chat opportunity or another such online forum and/or when such external social entities are being co-invited to participate in a promotional or other kind of group offering (e.g., Let's meet for lunch) and/or when such external social entities are focusing with "heat" on current top topics (102*a*_Now in FIG. 1A) of the first user (e.g., 432).

This kind of additional information (e.g., displayed in columns 101 and 101*r* of FIG. 1A and optionally also inside popped open promotional offerings like 104*a* and 104*t*) may be helpful to the user (e.g., 432) in determining whether or not he wishes to accept a given in-STAN-vitation™ or a STAN-provided promotional offering or a content source recommendation where such may be provided by expanding (unpacking) an invitations/suggestions compilation such as 102*j* of FIG. 1A. Icon 102*j* represents a stack of invitations all directed to the same one topic node or same region (TSR) of topic space; where for sake of compactness the invitations are shown as a pancake stack-like object. The unpacking of a stack of invitations 102*j* will be more clearly explained in conjunction with FIG. 1N. For now it is sufficient to understand that plural invitations to a same topic node may occur for example, if the plural invitations originate from friendships made within different platforms 103. For convenience it is useful to stack invitations directed to a same topic or same topic space region (TSR) one same pile (e.g., 102*j*). More specifically, when the STAN user activates a starburst plus sign such as shown within consolidated invitations/suggestions icon 102*j*, the unpacked and so displayed information will provide one or more of on-topic invitations, separately displayed (see FIG. 1N), to respective online forums, on-topic invitations to real life (ReL) gatherings, on-topic suggestions pointing to additional on-topic content as well as indicating if and which of the user's friends or other social entities are logical linked with respective parts of the unpacked information. In one embodiment, the user is given various selectable options including that of viewing in more detail a recommended content source or ongoing online forum. The various selectable options may further include that of allowing the user to conveniently save some or all of the unpacked data of the consolidated invitations/suggestions icon 102*j* for later access to that information and the option to thereafter minimize (repack) the unpacked data back into its original form of a consolidated invitations/suggestions icon 102*j*. The so saved-before-repacking information can include the identification of one or more external platform friends and their association to the corresponding topic.

Still referring to FIG. 4B, after the external contacts information has been formatted and stored in the External STAN Profile records areas (e.g., 431*p*2, 432*p*2 in FIG. 4A, but also 484.1 of FIG. 4C) for the corresponding user (e.g., 432) that recorded information can thereafter be used as part of the chat co-compatibility and desirability analysis when the STAN_3 system is automatically determining in the background the rankings of chat or other connect-to or gather with opportunities that the STAN_3 system might be recommending to the user for example in the opportunities banner areas 102 and 104 of the display screen 111 shown in FIG. 1A. (In one embodiment, these trays or banners, 102 and 104 are optionally out-and-in scrollable or hideable as opaque or shadow-like window shade objects; where the desirability of displaying them as larger screen objects depends on the monitored activities (e.g., as reported by up- or in-loaded CFi's) of the user at that time.)

At next to last step 479*a* of FIG. 4B and before exiting process 470, for each external resource, in one embodiment, the user is optionally asked to schedule an updating task for later updating the imported information. Alternatively, the STAN_3 system automatically schedules such an information update task. In yet another variation, the STAN_3 system alternatively or additionally, provides the user with a list of possible triggering events that may be used to trigger an update attempt at the time of the triggering event. Possible triggering events may include, but are not limited to, detection of idle time by the user, detection of the user registering into a new external platform (e.g., as confirmed in the user's email—i.e. "Thank you for registering into platform XP2, please record these as your new username and password . . . "); detection of the user making a major change to one of his external platform accounts (e.g., again flagged by a STAN_3 accessible email that says—i.e. "The following changes to your account settings have been submitted. Please confirm it was you who requested them . . . "). When a combination of plural event triggers are requested such as account setting change and user idle mode, the user idle mode may be detected with use of a user watching webcam as well as optional temperature sensing of the user wherein the user is detected to be leaning back, not inputting via a user interface device for a predefined number of seconds and cooling off after an intense session with his machine system. Of course, the user can also actively request initiation (471) of an update. The information update task may be used to add data (e.g., user name and password in records 484.1, 484.2, etc.) for newly registered into external platforms and new, nonduplicate contacts that were not present previously, to delete undesired contacts and/or to recategorize various friends, buddies, contacts and/or the alike as different kinds of "Tipping Point" persons (TPP's) and/or as other kinds of noteworthy personas. The process then ends at step 479*b* but may be re-begun at step 471 for yet a another external content source when the STAN_3 system 410 determines that the user is probably in an idle mode and is probably willing to accept such a pushed survey 482.

Referring again to FIG. 4A, it may now be appreciated how some of the major associations 411-416 can be enhanced by having the STAN_3 system 410 cooperatively interacting with external platforms (441, 442, . . . 44X, etc.) by, for example, importing external contact lists of those external platforms. More specifically, the user-to-user associations (U2U) database section 411 of the system 410 can be usefully expanded by virtue of a displayed window such as 111 of FIG. 1A being able to now alert the user of tablet computer 100 as to when friends, buddies, contacts and/or the alike of an external platform (e.g., 441, 444) are also associated within the STAN_3 system 410 with displayed invitations and/or connect-to-recommendation (e.g., 102*j* of FIG. 1A) and this additional information may further enhance the user's network-using experience because the user (e.g., 432) now knows that not only is he/she not alone in being currently interested in a given topic (e.g., Mystery-History Book of the Month in content-displaying area 117) but that specific known friends, family members and/or familiar or followed other social entities are similarly currently interested in exactly the same given topic or in a topic closely related to it. (A method for identifying closely related topics will be described in conjunction with FIGS. 1F-1E.) Moreover, the first user's experience (e.g., 432's) can be enhanced by virtue of a displayed screen image such as that of FIG. 1A being able to further indicate to the viewing user how deeply interested is (e.g., how much "heat" is being directed by) the certain one or more influential individuals (e.g., My Best Friends) are in the exactly same given topic or in a topic closely related to it. The degree of interest can be indicated by heat bar graphs such as shown for example in FIG. 1D or by heat gauges or declarations (e.g., "Hot!") such as shown at 115*g* of FIG. 1A. When a STAN user spots a topic-associated invitation (e.g., 102*n*) that is declared to be "Hot!" (e.g., 115*g*), the user can activate a topic center tool (e.g., flag 115*e*) that automatically presents the user with a view of a topic space landscape (e.g., a 3D landscape) that shows where in topic space the first user (e.g., 432) is deemed to be focusing-upon and where in the same topic space neighborhood his or her specifically known friends, family members and/or familiar or followed other social entities are similarly currently focusing-upon. Such a mapping image can inform the first user (e.g., 432) that, although he/she is currently focusing-upon a topic node that is generally considered hot in the relevant social circle(s), there is/are nearby topic nodes that are considered even more hot by others and perhaps the first user (e.g., 432) should investigate those other topic nodes because his friends and family are so interested in the same.

Referring next to FIG. 1E, it will shortly be explained how the "top N" topic nodes or topic regions of various social entities (e.g., friends and family) can be automatically determined by servers (not shown) of the STAN_3 system 410 that are tracking user visitations (touchings of a direct and/or distance-wise decaying halo type—see 132*h*, 132*h*' of FIG. 1F) through different regions of the STAN_3 topic space. But in order to better understand FIG. 1E, a digression into FIG. 4D will first be taken.

FIG. 4D shows in perspective form how two social networking (SN) spaces or domains (410' and 420) may be used in a cross-pollinating manner. One of the illustrated domains is that of the STAN_3 system 410' and it is shown in the form of a lower plane that has 3D or greater dimensional attributes (see frame 413*xyz*).

More specifically, the illustrated perspective view in FIG. 4D of the STAN_3 system 410 can be seen to include: (a) a user-to-user associations (U2U) mapping mechanism 411' (represented as a first plane); (b) a topic-to-topic associations (T2T) mapping mechanism 413' (represented as an adjacent second plane); (c) a user-to-topic and/or topic content associations (U2T) mapping mechanism 412' (which latter automated mechanism is not shown as a plane); and (d) a topic-to-content associations (T2C) mapping mechanism 414' (which latter automated mechanism is not shown as a plane and is, in one embodiment, an embedded part of the T2T mechanism 413'—see Gif. 4B). Additionally, the STAN_3 system 410 can be seen to include: (e) a Context-to-other attribute(s) associations (L2U/T/C) mapping mechanism 416' which latter automated mechanism is not shown as a plane and is, in one embodiment, dependent on automated location determination (e.g., GPS) of respective users for thereby determining their current contexts.

Yet more specifically, the two platforms, 410' and 420 are respectively represented in the multiplatform space 400' of FIG. 4D in such a way that the lower, or first of the platforms, 410' (corresponding to 410 of FIG. 4A) is schematically represented as a 3-dimensional lower prismatic structure having a respective 3D axis frame 413*xyz*. On the other hand, the upper or second of the platforms, 420 (corresponding to 441, . . . , 44X of FIG. 4A) is schematically represented as a 2-dimensional upper planar structure having respective 2D axis frame 420*xy*. Each of the first and second platforms, 410' and 420 is shown to respectively have a compilation-of-users-of-the-platform sub-space, 411' and 421; and a messaging-rings supporting sub-space, 415' and 425 respectively. In the case of the lower platform, 410' the corresponding messaging-rings supporting sub-space, 415' is understood to generally include the STAN_3 database (419 in FIG. 4A) as well as online chat rooms and other online forums supported or managed by the STAN_3 system 410. Also, the corresponding messaging-rings supporting sub-space, 415' is understood to generally include mapping mechanisms 413' (T2T), 411' (U2U), 412' (U2T), 414' (T2C) and 416' (L2UTC).

FIG. 4D will be described in yet more detail below. First, however, the implied journeys 431*a*" of a first STAN user 431' (shown in lower left of FIG. 4D) will be described. It is assumed that STAN user 431' is being monitored by the STAN_3 system 410. As such, a topic domain lookup service (DLUX) of the system is persistently attempting in the background to automatically determine what topic or topics are likely to be foremost (likely top topics) in that user's mind based on in-loaded CFi's, CVi's, etc. of that user (431') as well as developed histories, profiles (e.g., PEEP's, PHA-FULE's, etc.) and trend projection produced for that user (431'). The outputs of the topic domain lookup service (DLUX—to be explicated in conjunction with 1510 of FIG. 1F) identify topic nodes upon which the user is deemed to have directly treaded on and neighboring topic nodes upon which the user's radially fading halo may be deemed to have indirectly touched upon. One type of indirect touching upon is hierarchy indirect touching which will be further explained with reference to FIG. 1E.

The STAN_3 topic space includes a topic-to-topic (T2T) associations graph which latter entity includes a parent-to-child hierarchy of topic nodes. In FIG. 1E, three levels of such levels of a graphed hierarchy are shown as part of a forefront-represented topic space (Ts). Those skilled in the art of computing machines will of course understand from this that a non-abstract data structure representation of the graph is intended and is implemented. Topic nodes are stored data objects with distinct data structures (see for example giF. 4B of the here-incorporated STAN_1 application). The branches of a hierarchical (or other kind) of graph that link the plural topic nodes are also stored data objects (typically pointers that point to where in machine memory, interrelated nodes such as parent and child are located). A topic space therefore, and as used herein is an organized set of recorded data objects, where those objects include topic nodes but can also include other objects, for example topic space cluster regions (TScRs) which are closely clustered pluralities of topic nodes. For simplicity, in box 146*a* of FIG. 1E, a bottom two of the illustrated topic nodes, $Tn_{01}$ and $Tn_{02}$ are assumed to be leaf nodes of a branched tree-like hierarchy graph that assigns as a parent node to leaf nodes $Tn_{01}$ and $Tn_{02}$, a next higher up node, $Tn_{11}$; and that assigns as a grandparent node to leaf nodes $Tn_{01}$ and $Tn_{02}$, a next yet higher up node, $Tn_{22}$. The end leaf or child nodes, $Tn_{01}$ and $Tn_{02}$ are shown to be disposed in a lower or zero-ith topic space plane, $TS_{p0}$. The parent node $Tn_{11}$ as well as a neighboring other node, $Tn_{12}$ are shown to be disposed in a next higher topic space plane, $TS_{p1}$. The grandparent node, $Tn_{22}$ as well as a neighboring other node are shown to be disposed in a yet next higher topic space plane, $TS_{p2}$. It is worthy of note to observe that the illustrated planes, $TS_{p0}$, $TS_{p1}$ and $TS_{p2}$ are all below a fourth hierarchical plane (not shown) where that fourth plane ($TS_{p3}$ not shown) is at a predefined depth (hierarchical distance) from a root node of the hierarchical topic space tree (main graph). This aspect is represented in FIG. 1E by the showing of a minimum topic resolution level Res(Ts.min) in box 146*a*. It will be appreciated by those skilled in the art of hierarchical graphs or trees that refinement of what the topic is (resolution of what the specific topic is) usually increases as one descends deeper towards the base of the hierarchical pyramid and thus further away from the root node of the tree. More specifically, an example of hierarchical refinement might progress as follows Tn22(Topic=mammals), Tn11(Topic=mammals/subclass=*omnivore*), Tn01(–Topic=mammals/subclass=*omnivore*/super-subclass=fruit-eating), Tn02(Topic=mammals/subclass=*omnivore*/super-subclass=grass-eating) and so on.

As a first user (131) makes implied visitations (131*a*) through the illustrated section 146*a* of topic space during a corresponding first time period (first time slot $t_0$-$t_1$), he can spend different amounts of time making direct 'touchings' on different ones of the illustrated topic nodes and he can optionally spend different amounts of time (and/or otherwise cast different amounts of 'heat' energies) making indirect 'touchings' on such topic nodes. An example of a hierarchical indirect touching is where user 131 is deemed (by the STAN_3 system 410) to have 'directly' touched child node $Tn_{01}$ and, because of a then existing halo effect (see 132*h* of FIG. 1F) that is then attributed to user 131, the same user is automatically deemed (by the STAN_3 system 410) to have indirectly touched parent node $Tn_{11}$ in the next higher plane $TS_{p1}$. In the same or another embodiment, the user is further automatically deemed to have indirectly touched grandparent node $Tn_{22}$ in the yet next higher plane $TS_{p2}$ due to an attributed halo of greater hierarchical extent (e.g., two jumps upward along the hierarchical tree rather than one) or due to an attributed greater spatial radius in spatial topic space for his halo (e.g., bigger halo 132*h*' in FIG. 1F).

In one embodiment, topic space auditing servers (not shown) of the STAN_3 system 410 keep track of the percent time spent and/or degree of energetic engagement with which each monitored STAN user engages directly and/or indirectly in touching different topic nodes within respective time slots. The time spent and/or the emotional or other energy intensity that are deemed to have been cast by indirect touchings may be attenuated based on a predetermined halo diminution function (decays with hierarchical step distance of spatial radial distance—not necessarily at same decay rate in all directions). More specifically, during a first time slot represented by left and right borders of box 146*b* of FIG. 1E, a second exemplary user 132 of the STAN_3 system 410 may have been deemed to have spent 50% of his implied visitation time (and/or 'heat' energies such as may be cast due to emotional involvement/intensity) making direct and optionally indirect touchings on a first topic node (the one marked 50%) in respective topic space plane or region $TS_{p2r3}$. During the same first time slot, $t_{0-1}$ of box 146*b*, the second user 132 may have been deemed to have spent 25% of his implied visitation time (and/or energies) in touching a neighboring second topic node (the one marked 25%) in respective topic space plane or region $TS_{p2r3}$. Similarly, during the same first time slot, $t_{0-1}$, further touchings of percentage amounts 10% and 5% may have been attributed to respective topic nodes in topic space plane or region $TS_{p1r4}$ Yet additionally, during the same first time slot, $t_{0-1}$, further touchings of percentage amounts 7% and 3% may have been attributed to respective topic nodes in topic space plane or region $TS_{p0r5}$. The percentages do not have to add up to, or be under 100% (especially if halo amounts are included in the calculations). Note that the respective topic space planes or regions which are generically denoted here as $TS_{pXrY}$ in box 146*b* (where X and Y here can be respective plane and region identification coordinates) and the respective topic nodes shown therein do not have to correspond to those of upper box 146*a* in FIG. 1E, although they could.

Before continuing with explanation of FIG. 1E, a short note is inserted here. The journeys of travelers 131 and 132 are not necessarily uni-space journeys through topic space alone. Their respective journeys, 131*a* and 132*a*, can concurrently cause the system 410 to deem them as each having directly or indirectly made 'touchings' in a keywords organizing space (KeyWds space), in a URL's organizing space, in a meta-tags organizing space and/or in other such data object organizing spaces. These concepts will become clearer when FIGS. 3D and 3E are explained further below. However, for now it is easiest to understand the respective journeys, 131*a* and 132*a*, of STAN users 131 and 132 by assuming that such journeys are uni-space journeys taking them through the, so-far more familiar, nodes Tn01, Tn11, Tn22, etc. in topic space.

Also for sake of simplicity of the current example, it will be assumed that during journey subparts 132*a*3, 132*a*4 and 132*a*5 of respective traveler 132, that traveler 132 is merely skimming through web content at his client device end of the system and not activating any hyperlinks or entering on-topic chat rooms—which activations would be examples of direct 'touching' in URL space and in chat room space. Although traveler 132 is not yet clicking or otherwise activating hyperlinks and is not entering chat rooms or accepting invitations to chat or other forum participation opportunities, the domain-lookup servers (DLUX's) of the system 410 will be responding to his nonetheless energetic skimmings through web content and will be concurrently determining most likely topic nodes to attribute to this energetic (even if low level energetic) activity of user 132. Each topic node that is deemed to be a currently more likely than not, now focused-upon node in system topic space can be simultaneously deemed by the system 410 to be a directly 'touched' upon topic node. Each such direct 'touching' can contribute to a score that is being totaled in the background by the system 410 where the total will indicate how much time the user 132 just spent in directly touching' various ones of the topic nodes.

The first and third journey subparts 132*a*3 and 132*a*5 of traveler 132 are shown to have extended into a next time slot 147*b* (slot $t_{1-2}$). Here the extended journeys are denoted as further journey subparts 132*a*6 and 132*a*8. The second journey, 132*a*4 ended in the first time slot ($t_{0-1}$). During the second time slot 147*b* (slot $t_{1-2}$), corresponding journey subparts 132*a*6 and 132*a*8 respectively touch corresponding nodes (or topic space cluster regions (TScRs) if such 'touchings' are being tracked) with different percentages of consumed time and/or spent energies (e.g., emotional intensities determined by CFi's). More specifically, the detected 'touchings' of journey subparts 132*a*6 and 132*a*8 are on nodes within topic space planes or regions $TS_{p2r6}$ and $TS_{p0r8}$. There can be yet more time slots following the illustrated second time slot ($t_{1-2}$). The illustration of just two is merely for sake of simplified example. At the end of a predetermined total duration (e.g., $t_0$ to $t_2$), percentages (or other normalized scores) attributed to the detected 'touchings' are sorted relative to one another within each time slot box (e.g., 146*b*), for example from largest to smallest. This produces a ranking or an assigned sort number for each directly or indirectly 'touched' topic node or clustering of topic nodes. Then predetermined weights are applied on a time-slot-by slot basis to the sort numbers (rankings) of the respective time slots so that, for example the most recent time slot is more heavily weighted than an earlier one. The weights could be equal. Then the weighted sort values are added on a node-by-node basis (or other topic region by topic region basis) to see which node (or topic region) gets the highest preference value, which the lowest and which somewhere in between. Then the identifications of the visited nodes (or topic regions) are sorted again (e.g., in unit 148*b*) according to their respective summed scores (weighted rankings) to thereby generate a second-time sorted list (e.g., 149*b*) extending from most preferred (top most) topic node to least preferred (least most) of the directly and/or indirectly visited topic nodes. This list is recorded for example in Top-N Nodes Now list 149*b* for the case of social entity 132 and respective other list 149*a* for the case of social entity 131. Thus the respective top 5 (or other number of) topic nodes or topic regions currently being focused-upon now by social entity 131 might be listed in memory means 149*a* of FIG. 1E. The top N topics list of each STAN user is accessible by the STAN_3 system 410 for downloading in raw or modified, filtered, etc. (transformed) form to the STAN interfacing device (e.g., 100 in FIG. 1A, 199 in FIG. 2) such that each respective user is presented with a depiction of what his current top N topics Now are (e.g., by way of invitations/topics serving plate 102*a*Now of FIG. 1A) and/or is presented with a depiction of what the current top M topics Now are of his friends or other followed social entities/groups (e.g., by way of serving plate 102*b* of FIG. 1A, where here N and M are whole numbers set by the system 410 or picked by the user).

Accordingly, by using a process such as that of FIG. 1E, the recorded lists of the Top-N topic nodes now favored by each individual user (or group of users, where the group is given its own halos) may be generated based on scores attributed to each directly or indirectly touched topic node and relative time spent for such touching and/or optionally, amount of 'heat' expended by the individual user or group in directly or indirectly touching upon that topic node. A more detailed explanation of how group 'heat' can be computed for topic space 'regions" and for groups of passing-through-topic-space other social entities will be given in conjunction with FIG. 1F. However, for an individual user, various factors such as factor 172 (e.g., optionally normalized emotional intensity, as shown in FIG. 1F) and other factor 173 (e.g., optionally normalized, duration of focus, also in FIG. 1F) can be similarly applicable and these preference score parameters need not be the only ones used for determining 'social heat' cast by a group of others on a topic node. (Note that 'social heat' is different than individual heat because social group factors such as size of group (absolute or normalized to a baseline), number of influential persons in the group, etc. apply in group situations as will become more apparent when FIG. 1F is described in more detail below). However, with reference to the introductory aspects of FIG. 1E, when intensity of emotion is used as a means for scoring preferred topic nodes, the user's then currently active PEEP record (not shown) may be used to convert associated personal emotion expressions (e.g., facial grimaces) of the user into optionally normalized emotion attributes (e.g., anxiety level, anger level, fear level, annoyance level, joy level, sadness level, trust level, disgust level, surprise level, expectation level, pensiveness/anticipation level, embarrassment level, frustration level, level of delightfulness, etc.) and then these are combined in accordance with a predefined aggregation function to arrive at an emotional intensity score. Topic nodes that score as ones with high emotional intensity scores become weighed, in combination with time spent focusing-upon the topic, as the more preferred among the top N topics Now of the user for that time duration (where here, the term, more preferred may include topic nodes to which the user had extremely negative emotional reactions, e.g., the discussion upset him and not just those that the user reacted positively to). By contrast, topic nodes that score as ones with relatively low emotional intensity scores (e.g., indicating indifference, boredom) become weighed, in combination with the minimal time spent focusing, as the less preferred among the top N topics Now of the user for that time duration.

Just as lists of top N topic nodes or topic space region (TSRs) now being focused-upon now (e.g., 149*a*, 149*b*) can be automatically created for each STAN user based on the monitored and tracked journeys of the user (e.g., 131) through system topic space, and based on time spent focusing-upon those areas of topic space and/or based on emotional energies (or other energies) detected to have been expended by the user when focusing-upon those areas of topic space (nodes and/or topic space regions (TSRs) and/or topic space clustering-of-nodes regions (TScRs)), similar lists of top N' nodes or regions within other types of system "spaces" can be automatically generated where the lists indicate for example, top N" URL's or combinations or sequences of URL's being focused-upon now by the user based on his direct or indirect 'touchings' in URL space (see briefly 390 of FIG. 3E); top N'" keywords or combinations or sequences of keywords being focused-upon now by the user based on his direct or indirect 'touchings' in Keyword space (see briefly 370 of FIG. 3E); and so on where N', N" and N'" here can be same or different whole numbers just as the N number for top N topics now can be a predetermined whole number.

With the introductory concepts of FIG. 1E now in place regarding scoring for top N(', ", '", . . . ) nodes or subspace regions now of individual users for their use of the STAN_3 system 410 and for their corresponding 'touchings' in data-object organizing spaces of the system 410 such as topic space (see briefly 313" of FIG. 3D); content space (see 314" of FIG. 3D); emotion space (see 315" of FIG. 3D); context space (see 316" of FIG. 3D); and/or other data object organizing spaces (see briefly 370, 390, 395, 396, 397 of FIG. 3E), the description here returns to FIG. 4D. In FIG. 4D, platforms or online social interaction playgrounds that are outside the CFi monitoring scope of the STAN_3 system 410' are referred to as out-of-STAN platforms. The planar domain of a first out-of-STAN platform 420 will now be described. It is described first here because it follows a more conventional approach such as that of the FaceBook™ and LinkedIn™ platforms for example.

The domain of the exemplary, out-of-STAN platform 420 is illustrated as having a messaging support (and organizing) space 425 and as having a membership support (and organizing) space 421. Let it be assumed that initially, the messaging support space 425 of external platform 420 is completely empty. In other words, it has no discussion rings (e.g., blog thread) like illustrated ring 426' yet formed in that space 425. Next, a single ring-creating user 403' of space 421 (membership support space) starts things going by launching (for example in a figurative boat 405') a nascent discussion proposal 406'. This launching of a proposed discussion can be pictured as starting in the membership space 421 and creating a corresponding data object 426' into group discussion support space 425. In the LinkedIn™ environment this action is known as simply starting a discussion by attaching a headline message (example: "What do you think about what the President said today?") to a created discussion object and pushing that proposal (406' in its outward bound boat 405') out into the then empty discussions space 425. Once launched into discussions space 425 the launched (and substantially empty) ring 426' can be seen by other members (e.g., 422) of a predefined Membership Group 424. The launched discussion proposal 406' is thereby transformed into a fixedly attached child ring 426' of parent node 426*p* (attached to 426' by way of linking branch 427'), where 426*p* is merely an identifier of the Membership Group 424 but does not have message exchange rings like 426' inside of it. Typically, child rings like 426' attach to an ever growing (increasing in illustrated length) branch 427' according to date of attachment. In other words, it is a mere chronologically growing one branch with dated nodes attached to it, the newly attached ring 426' being one such dated node. As time progresses, a discussions proposal platform like the LinkedIn™ platform may have a long list of proposed discussions posted thereon according to date and ID of its launcher (e.g., posted 5 days ago by discussion leader Jones). Many of the proposals may remain empty and stagnate into oblivion if not responded to by other members of a same membership group within a reasonable span of time.

More specifically, in the initial launching stage of the newly attached-to-branch-427' discussion proposal 426', the latter discussion ring 426' has only one member of group 424 associated with it, namely, its single launcher 403'. If no one else (e.g., a friend, a discussion group co-member) joins into that solo-launched discussion proposal 426', it remains as a substantially empty boat and just sits there, aging at its attached and fixed position along the ever growing history branch 427' of group parent node 426*p*. On the other hand, if another member 422 of the same membership group 424 jumps into the ring (by way of by way of leap 428') and responds to the affixed discussion proposal 426' (e.g., "What do you think about what the President said today?") by posting a responsive comment inside that ring 426', for example, "Oh, I think what the President said today was good.", then the discussion has begun. The discussion launcher/leader 403' may then post a counter comment or other members of the discussion membership group 424 may also jump in and add their comments. Irrespective of how many other members of the membership group 424 jump into the launched ring 426' or later cease further participation within that ring 426', that ring 426' stays affixed to the parent node 426*p* and in the original historical position where it originally attached to historically-growing branch 427'. Some discussion rings in LinkedIn™ can grow to have hundreds of comments and a like number of members commenting therein. Other launched discussion rings of LinkedIn™ (used merely as an example here) may remain forever empty while still remaining affixed to the parent node in their historical position and having only the one discussion launcher 403' logically linked to that otherwise empty discussion ring 426'. There is essentially no adaptive recategorization and/or adaptive migration in a topic space for the launched discussion ring 426'. This will be contrasted below against a concept of chat rooms or other forum participation sessions that drift (see drifting Notes Exchange session 416*d*) in an adaptive topic space 413' supported by the STAN_3 system 410' of FIG. 4D.

Still referring to the external platform 420, it is to be understood that not all discussion group rings like 426' need to be carried out in a single common language such as a lay-person's English. It is quite possible that some discussion groups (membership groups) may conduct their internal exchanges in respective other languages such as, but not limited to, German, French, Italian, Swedish, Japanese, Chinese or Korean. It is also possible that some discussion groups have memberships that are multilingual and thus conduct internal exchanges within certain discussion rings using several languages at once, for example, throwing in French or German loan phrases (e.g., Schadenfreude) into a mostly English discourse where no English word quite suffices. It is also possible that some discussion groups use keywords of a mixed or alternate language type to describe what they are talking about. It is also possible that some discussion groups have members who are experts in certain esoteric arts (e.g., patent law, computer science, medicine, economics, etc.) and use art-based jargon that lay persons not skilled in such arts would not normally understand or use. The picture that emerges from the upper portion of FIG. 4D is therefore one of isolated discussion rings like 426' that remain at their place of birthing (virtual boat attachment) and often remain disconnected from other isolated discussion rings (e.g., those conducted in Swedish, German rather than English) due to differences of language and/or jargon used by respective membership groups of the isolated discussion rings (e.g., 426').

By contrast, the birthing (instantiation) of a messaging ring (a TCONE) in the lower platform space 410' (corresponding to the STAN_3 system 410 of FIG. 4A) is often (there are exceptions) a substantially different affair (irrespective of whether the discourse within the TCONE type of messaging ring (e.g., 416*d*) is to be conducted in layperson's English, or French or mixed languages or specialized jargon). Firstly, a nascent messaging ring (not shown) is generally not launched by only one member (e.g., registered user) of platform 410 but rather by at least two such members (e.g., 431' and 432'; both assumed to be ordinary-English speaking in this example). In other words, at the time of launch of a so-called, TCONE ring (see 416*a*), the two or more launchers of the nascent messaging ring have already implicitly agreed to enter into an ordinary-English based online chat (or another form of online "Notes Exchange" which is the NE suffix of the TCONE acronym) centering around one or more predetermined topics. Accordingly, and as a general proposition herein (there could be exceptions such as if one launcher immediately drops out for example or when a credentialed expert launches a to-be taught-educational-course ring), each nascent messaging ring like (new TCONE) enters a corresponding rings-supporting and mapping (e.g., indexing, organizing) space 413' while already having at least two STAN_3 members already joined in online discussion (or in another form of mutually understandable "Notes Exchange") therein because they both accepted a system generated invitation or other proposal to join into the online and Social-Topical exchange (e.g., 416*a*). As mentioned above, the STAN_3 system 410 can also generate proposals for real life (ReL) gatherings (e.g., Let's meet for lunch this afternoon because we are both physically proximate to each other). In one embodiment, the STAN_3 system 410 automatically alerts co-compatible STAN users to when they are in relatively close physical proximity to each other and/or the system 410 automatically spawns chat or other forum participation opportunities to which there are invited only those co-compatible and/or same-topic focused-upon STAN users who are in relatively close physical proximity to each other. This can encourage people to have more real life (ReL) gatherings in addition to having more online gatherings with co-compatible others.

Detailed description about how an initially launched (instantiated) and anchored (moored) Social Notes Exchange (SNE) ring can become a drifting one that swings Tarzan-style from one anchoring node (TC) to a next, in other words, it becomes a drifting dSNE 416*d*; have been provided in the STAN_1 and STAN_2 applications that are incorporated herein. As such the same details will not be repeated here.

Additionally, in the here incorporated STAN_2 application, it was disclosed how topic space can be both hierarchical and spatial and can have fixed points in a multidimensional reference frame (e.g., 413*xyz*) as well as how topic space can be defined by parent and child hierarchical graphs (as well as non-hierarchical other association graphs). As such the same will not be repeated here except to note that it is within the contemplation of the present disclosure to use spatial halos in place of or in addition to the above described, hierarchical touchings halo to determine what topic nodes have been directly or indirectly touched by the journeys through topic space of a STAN_3 monitored user (e.g., 131 or 132 of FIG. 1E).

Additionally, in the here incorporated STAN_2 application, it was disclosed how cross language and cross-jargon dictionaries may be used to locate persons and/or groups that likely share a common topic of interest. As such the same will not be repeated here except to note that it is within the contemplation of the present disclosure to use similar cross language and cross-jargon dictionaries to expand definitions of user-to-user association (U2U) types such as those shown for example in area 490.12 of FIG. 4C of the present disclosure. More specifically, the cross language and cross-jargon expansion may be of a Boolean OR type where one can be defined as a "friend of OR buddy of OR 1st degree contact of OR hombre of OR hommie of" another social entity (this example including Spanish and street jargon instances). (Additionally, in FIG. 3E of the present disclosure, it will be explained how context-equivalent substitutes (e.g., 371.2*e*) for certain data items can be automatically inherited into a combination and/or sequence operator node (e.g., 374.1).)

Additionally, an example given in FIG. 4C of the present disclosure showed how a "Charles" 484*b* of an external platform (487.1E) can be the same underlying person as a "Chuck" 484*c* of the STAN_3 system 410. In the now-described FIG. 4D, the relationship between the same "Charles" and "Chuck" personas is represented by cross-platform logical links 44X.1 and 44X.2. When "Chuck" (the in-STAN persona) strongly touches upon an in-STAN topic node such as 416*n* of space 413' for example; and the system 410 knows that "Chuck" is "Charles" 484*b* of an external platform (e.g., 487.1E) even though "Tom" (of FIG. 4C) does not know this, the STAN_3 system 410 can inform "Tom" that his external friend "Charles" (484*b*) is strongly interested in a same top 5 topic as that of "Tom". This can be done because Tom's intra-STAN U2U associations profile 484.1' (shown in FIG. 4*d* also) tells the system 410 that Tom and "Charles" (484*b*) are friends and also what type of friendship is involved (e.g., the 485*b* type shown in FIG. 4C). Thus when "Tom" is viewing his tablet computer 100 in FIG. 1A, "Charles" (not shown in 1A) may light up as an on-radar friend (in column 101) who is strongly interested in a same topic as one of the top 5 topics now are of "Tom" (My Top 5 Topics Now 102*a*_Now).

That is one way of keeping friends in one's radar scope and seeing what topics they are now focused-upon. However that might call for each friend having his own individual radar scope, thus cluttering up screen space 111 of FIG. 1A with too many radar representing objects (e.g., spinning pyramids). The better approach is to group individuals into defined groups and track the focus of the group as a whole.

Referring to FIG. 1F, it will now be explained how 'groups' of social entities can be tracked with regard to the 'heats' they apply to a top N now topics of a first user (e.g., Tom). It was already explained in conjunction with FIG. 1E how the top N topics (of a given time duration and) of a first user (say Tom) can be determined with a machine-implemented automatic process. Moreover, the notion of a "region" of topic space was also introduced. More specifically, a "region" of topic space that a first user is focusing-upon can include not only topic nodes that are directly 'touched' by the STAN_3-monitored activities of that user, but also hierarchically or otherwise adjacent topic nodes that are indirectly 'touched' by a predefined 'halo' of the given user. In the example of FIG. 1E it was assumed that user 131 had only an upwardly radiating 3 level hierarchical halo. In other words, when user 131 directly 'touched' either of nodes Tn01 and Tn02 of the lower hierarchy plane $TS_{p0}$, those direct 'touchings' radiated only upwardly by two more levels (but not further) to become corresponding indirect 'touchings' of node Tn11 in plane $TS_{p1}$, and of node Tn22 in next higher plane $TS_{p2}$ due to the then present hierarchical graphing between those topic nodes. In one embodiment, indirect 'touchings' are weighted less than direct 'touchings'. Stated otherwise, the attributed time spent at, or energy burned onto the indirectly 'touched' node is discounted as compared to the corresponding time spent or energy applied factors attributed the correspondingly directly touched node. The amount of discount may progressively decrease as hierarchical distance from the directly touched node increases. In one embodiment, more influential persons or other influential social entities are assigned a wider or more energetic halo so that their direct and/or indirect 'touchings' count for more than do the 'touchings' of less influential, ordinary social entities. In one embodiment, halos may extend hierarchically downwardly as well as upwardly although the progressively decaying weights of the halos do not have to be symmetrical in the up and down directions. In other words and as an example, the downward directed halo may be less influential than it corresponding upwardly directed counterpart (or vise versa).

Moreover, in one embodiment, the distance-wise decaying halos of node touching persons (e.g., 131 in FIG. 1E, or more broadly of node touching social entities) can be spatially distributed and/or directed ones rather than (or in addition to) being hierarchically distributed and up/down directed ones. In such embodiments, topic space (and/or other object-organizing spaces of the system 410) is partially populated with fixed points of predetermined multi-dimensional coordinates (e.g., w, x, y and z coordinates in FIG. 4D where the w dimension is not shown) and where relative distances and directions are determined based on those predetermined fixed points. However, most topic nodes (e.g., the node 419*a* onto which ring 416*a* is strongly tethered) are free to drift in topic space and to attain any location in the topic space as may be dictated for example by the whims of the governing entities of that displaceable topic node (e.g., 419*a*). Generally, the active users of the node (e.g., those in its controlling forums) will vote on where 'their' node should be positioned within hierarchical and/or within spatial topic space. Halos of traveling-through visitors who directly 'touch' on the driftable topic nodes then radiate spatially and/or hierarchically by corresponding distances, directions and strengths to optionally contribute to the cumulative touched scores of surrounding and also driftable topic nodes. In accordance with one aspect of the present disclosure, topic space and/or other related spaces (e.g., URL space 390 of FIG. 3E) can be constantly changing and evolving spaces whose inhabiting nodes (or other types of inhabiting data objects) can constantly shift in both location and internal nature and can constantly evolve to have newly graphed interrelations (added on interrelations) with other alike, space-inhabiting nodes (or other types of space-inhabiting data objects) and/or changed (e.g., strengthened, weakened, broken) interrelations with other alike, space-inhabiting nodes/objects. As such, halos can be constantly casting different shadows through the constantly changing ones of the touched spaces (e.g., topic space, URL space, etc.).

Thus far, topic space (see for example 413' of FIG. 4D) has been described for the most part as if there is just one hierarchical graph or tree linking together all the topic nodes within that space. However, this does not have to be so.

In accordance with one embodiment, so-called Wiki-like collaboration project control software modules (418*b*, only one shown) are provided for allowing certified experts having expertise, good reputation and/or credentials within different topic areas to edit and/or vote (approvingly or disapprovingly) with respect to topic nodes that are controlled by Wiki-like collaboration governance groups, where the Wiki-like collaborated over topic nodes (not explicitly shown in FIG. 4D—see instead 415*x* of FIG. 4A) may be accessible by way of Wiki-like collaborated-on topic trees (not explicitly shown in FIG. 4D—see instead the "B" tree of FIG. 3E). More specifically, it is within the contemplation of the present disclosure to allow for multiple linking trees of hierarchical and non-hierarchical nature to co-exist within the STAN_3 system's topic-to-topic associations (T2T) mapping mechanism 413'. At least one of the linking trees (not explicitly shown in FIG. 4A, see instead the A, B and C trees of FIG. 3E) is a universal and hierarchical tree; meaning in respective order, that it (e.g., tree A of FIG. 3E) connects to all topic nodes within the STAN_3 topic space (Ts) and that its hierarchical structure allows for non-ambiguous navigation from a root node (not shown) of the tree to any specific ones of the universally-accessible topic nodes that are progeny of the root node. Preferably, at least a second hierarchical tree supported by the STAN_3 system 410 is included where the second tree is a semi-universal hierarchical tree, meaning that it (e.g., tree B of FIG. 3E) does not connect to all topic nodes or topic space regions (TSRs) within the STAN_3 topic space (Ts). More specifically, an example of such a semi-universal, hierarchical tree would be one that does not link to topic nodes directed to scandalous or highly contentious topics, for example to pornographic content, or to racist material, or to seditious material, or other such subject matters. The determination regarding which topic nodes and/or topic space regions (TSRs) will be designated as taboo is left to a governance body that is responsible for maintaining that semi-universal, hierarchical tree. They decide what is permitted on their tree or not. The governance style may be democratic, dictatorial or anything in between. An example of such a limited reach tree might be one designated as safe for children under 13 years of age.

In addition to hierarchical trees that link to all (universal) or only a subset (semi-universal) of the topic nodes in the STAN_3 topic space, there can also be non-hierarchical trees (e.g., tree C of FIG. 3E) included within the topic space mapping mechanism 413' where the non-hierarchical (and non-universal) trees provide links as between selected topic nodes and/or selected topic space regions (TSRs) and/or selected community boards (see FIG. 1G) and/or as between hybrid combinations of such linkable objects (e.g., from one topic node to the community board of a far away other topic node) while not being fully hierarchical in nature. Such non-hierarchical trees may be used as navigational short cuts for jumping (e.g., warping) for example from one topic space region (TSR.1) of topic space to a far away second topic space region (TSR.2), or for jumping (e.g., warping) for example from a location within topic space to a location in another kind of space (e.g., context space) and so on. The worm-hole tunneling types of non-hierarchical trees do not necessarily allow one to navigate unambiguously and directly to a specific topic node in topic space. (And to navigate from that specific topic node to the chat or other forum participation opportunities a.k.a. (TCONE's) that are tethered weakly or strongly to that specific topic node; and/or from there to the on-topic content sources that are linked with the specific topic node and tagged by users of the topic node as being better or not for serving various on-topic purposes; and/or from there to on-topic social entities who are linked with the specific topic node and tagged by users of the topic node as being better or not for serving various on-topic purposes). Instead, worm-hole tunneling types of non-hierarchical trees may bring the traveler to a region within topic space that is close to the desired destination, whereafter the traveler will have to do some exploring on his or her own to locate an appropriate topic node. This is so because most topic nodes can constantly shift in position within topic space. As is the case with semi-universal, hierarchical trees, at least some of the non-hierarchical trees can be controlled by respective governance bodies such as Wiki-like collaboration governance groups. One of the governance bodies can be the system operators of the STAN_3 system 410.

The Wiki-like collaboration project governance bodies that use corresponding ones of the Wiki-like collaboration project control software modules (418*b*) can each establish their own hierarchical and/or non-hierarchical and universal, although generally they will be semi-universal linking trees that link at least to topic nodes controlled by the Wiki-like collaboration project governance body. The Wiki-like collaboration project governance body can be an open type or a limited access type of body. By open type, it is meant here that any STAN user can serve on such a Wiki-like collaboration project governance body if he or she so chooses. Basically, it mimics the collaboration of the open-to-public Wikipedia™ project for example. On the other hand, other Wiki-like collaboration projects supported by the STAN_3 system 410 can be of the limited access type, meaning that only pre-approved STAN users can log in with special permissions and edit attributes of the project-owned topic nodes and/or attributes of the project-owned topic trees and/or vote on collaboration issues.

More specifically, and referring to FIG. 4A, let it be assumed that USER-A (431) has been admitted into the governance body of a STAN_3 supported Wiki-like collaboration project. Let it be assumed that USER-A has full governance privileges (he can edit anything he wants and vote on any issue he wants). In that case, USER-A can log-in using special log-in procedure 418*a* (e.g., a different password than his usual STAN_3 password; and perhaps a different user name). The special log-in procedure 418*a* gives him full or partial access to the Wiki-like collaboration project control software module 418*b* associated with his special log-in 418*a*. Then by using the so-accessible parts of the project control software module 418*b*, USER-A (431) can add, delete or modify topic nodes that are owned by the Wiki-like collaboration project. Addition or modification can include but is not limited to, changing the node's primary name (see 461 of giF. 4B), the node's secondary alias name, the node's specifications (see 463 of giF. 4B), the node's list of most commonly associated URL hints, keyword hints, meta-tag hints, etc.; the node's placement within the project-owned hierarchical and/or non-hierarchical trees, the node's pointers to its most immediate child nodes (if any) in the project-owned hierarchical and/or non-hierarchical trees, the node's pointers to on-topic chat or other forum participation opportunities and/or the sorting of such pointers according to on-topic purpose (e.g., which blogs or other on-topic forums are most popular, most respected, most credentialed, most used by Tipping Point Persons, etc.); the node's pointers to on-topic other content and/or the sorting of such pointers according to on-topic purpose (e.g., which URL's or other pointers to on-topic content are most popular, most respected, most backed up credentialed peer review, most used by Tipping Point Persons, etc.); the node ID tag given to that node by the collaboration project governance body, and so on.

Such a full-privileges member of the Wiki-like collaboration project can also modify others of the data-object organizing or mapping mechanisms within the STAN_3 system 410 for trees or space regions owned by the Wiki-like collaboration project. More specifically, aside from being able to modify and/or create topic-to-topic associations (T2T) for project-owned subregions of the topic-to-topic associations mapping mechanism 413 and topic-to-content associations (T2C) 414, the same user (e.g., 431) may be able to modify and/or create location-to-topic associations (L2T) 416 for project-owned ones of such lists or knowledge base rules; and/or modify and/or create topic-to-user associations (T2U) 412 for project-owned ones of such lists or knowledge base rules that affect project owned topic nodes and/or project owned community boards; and/or the fully-privileged user (431) may be able to modify and/or create user-to-user associations (U2U) 411 for project-owned ones of such lists or knowledge base rules that affect project owned definitions of user-to-user associations (e.g., how users within the project relate to one another).

In one embodiment, although not all STAN users may have such full or lesser privileged control of non-open Wiki-like collaboration projects, they can nonetheless visit the project-controlled nodes (if allowed to by the project owners) and at least observe what occurs in the chat or other forum participation sessions of those nodes if not also participate in those collaboration project controlled forums. For some Wiki-like collaboration projects, the other STAN users can view the credentials of the owners of the project and thus determine for themselves how to value or not the contributions that the collaborators in the respective Wiki-like collaboration projects make. In one embodiment, outside-of-the-project users can voice their opinions about the project even though they cannot directly control the project. They can voice their opinions for example by way of surveys and/or chat rooms that are not owned by the Wiki-like collaboration projects but instead have the corresponding Wiki-like collaboration projects as one of the topics of the not-owned chat room (or other such forum). Thus a feedback system is provided for whereby the project governance body can see how outsiders view the project's contributions and progress.

Returning to description of general usage members of the STAN_3 community and their 'touchings' with system resources such as system topic space (413) or other system data organizing mechanisms (e.g., 411, 412, 414, 416), it is to be appreciated that when a general STAN user such as "Stanley" 431 focuses-upon his local data processing device (e.g., 431*a*) and STAN_3 activities-monitoring is turned on for that device (e.g., 431*a* of FIG. 4A), that user's activities can map out not only as topic node 'touchings' on respective topic nodes of a topic space tree but also as 'touchings' in other system supported spaces such as for example: (A) 'touchings' in system supported chat room spaces (or more generally: (A.1) 'touchings' in system supported forum spaces), where in the latter case a forum-'touching' occurs when the user opens up a corresponding chat or other forum participation session. The various 'touchings' can have different kinds "heats" attributed to them. (See also the heats formulating engine of FIG. 1F.) The monitored activities can alternatively or additionally be deemed by system software to be: (B) corresponding 'touchings' (with optionally associated "heats) in search space (e.g., keywords space), (C) 'touchings' in URL space; (D) 'touchings' in real life GPS space; (E) 'touchings' by user-controlled avatars or the like in virtual life spaces if the virtual life spaces (which are akin to the Second Life™ world) are supported/monitored by the STAN_3 system 410; (F) 'touchings' in context space; (G) 'touchings' in emotion space; (H) 'touchings' in music and/or sound spaces (see also FIGS. 3F-3G); (I) 'touchings' in recognizable images space (see also FIG. 3H); (J) 'touchings' in recognizable body gestures space (see also FIG. 3I); (K) 'touchings' medical condition space (see also FIG. 3J); (L) 'touchings' in gaming space (see also FIG. 3XX?); (L) 'touchings' in hybrid spaces (e.g., time and/or geography and/or context combined with yet another space (see also FIG. 3E and FIG. 4E) and so on.

The basis for automatically detecting one or more of these various 'touchings' (and optionally determining their corresponding "heats") and automatically mapping the same into corresponding data-objects organizing spaces (e.g., topics space, keywords space, etc.) is that CFi, CVi or other alike reporting signals are being repeatedly collected by and from user-surrounding devices (e.g., 100) and these signals are being repeatedly in- or up-loaded into report analyzing resources (e.g., servers) of the STAN_3 system 410 where the report analyzing resources then logically link the collected reports with most-likely-to-be correlated nodes or subregions of one or more data categorizing spaces. More specifically and as an example, when CFi, CVi or other alike reporting signals are being repeatedly fed to domain-lookup servers (DLUX's, see 151 of FIG. 1F) of the system 410, the DLUX servers can output signals 1510 (FIG. 1F) indicative of the more probable topic nodes that are deemed by the machine system (410) to be directly or indirectly 'touched' by the detected activities of the so-monitored STAN user (e.g., "Stanley" 431' of FIG. 4D). In the system of FIG. 4D, the patterns over time of successive and sufficiently 'hot' touchings made by the user (431') can be used to map out one or more significant 'journeys' 431_a_" attributable to that social entity (e.g., "Stanley" 431'). A journey (e.g., 431_a_") may be deemed significant by the system because, for example, one or more of the 'touchings' of that journey (e.g., 431_a_") exceed a predetermined "heat" threshold level.

When the respective significant 'journeys' (e.g., 431_a_", 432_a_") of plural social entities (e.g., 431', 432") cross within a relatively same region of hierarchical and/or spatial topic space (413'), then the heats produced by their respective halos will usually add up to thereby define cumulatively increased heats for the so-'touched' nodes. This can give a global indication of how 'hot' each of the topic nodes is. However, the detection that certain social entities (e.g., 431', 432") are both crossing through a same topic node during a predetermined time period may be an event that warrants adding even more heat to the shared topic node, particularly if one or more of the those social entities whose paths (e.g., 431_a_", 432_a_") cross through a same node (e.g., 416_c_) are predetermined to be influential or Tipping Point Persons (TPP's) by the system. When a given topic node experiences plural crossings through it by 'significant journeys' (e.g., 431_a_", 432_a_") of plural social entities (e.g., 431', 432") within a predetermined time duration (e.g., same week), then it may be of value to track the steps that brought those social entities to a same hot node (e.g., 416_c_) and it may be of value to track the subsequent journey steps of the influential persons soon after they have touched on the shared hot node (e.g., 416_c_). This can provide other users with insights as to the thinking of the influential persons as it relates to the topic of the shared hot node (e.g., 416_c_). In other words, what next topic node(s) do the influential social entities (e.g., 431', 432") associate with the topic(s) of the shared hot node (e.g., 416_c_)?

Sometimes influential social entities (e.g., 431', 432") follow parallel, but not crossing ones of 'significant journeys' through adjacent subregions of topic space. This kind of event is exemplified by parallel 'significant journeys' 489_a_ and 489_b_ in FIG. 4D. An automated, journeys pattern detector 498 is provided and configured to automatically detect 'significant journeys' of significant social entities (e.g., Tipping Point Persons) and to measure approximate distances (spatially or hierarchically) between those possibly parallel journeys, where the tracked journeys take place within a predetermined time period (e.g., same day, same week, same month, etc.). Then, if the tracked journeys (e.g., 489_a_, 489_b_) are detected by the journeys pattern detector 498 to be relatively close and/or parallel to one another; for example because two or more influential persons touched substantially same topic space regions (TSRs) even though not exactly the same topic nodes (e.g., 416_c_), then the relatively close and/or parallel journeys (e.g., 489_a_, 489_b_) are automatically flagged out by the journeys pattern detector 498 as being worthy of note to interested parties. In one embodiment, the presence of such relatively close and/or parallel journeys may be of interest to marketing people who are looking for trending patterns in topic space by persons fitting certain predetermined demographic attributes (e.g., age range, income range, etc.). Although the tracked relatively close and/or parallel journeys (e.g., 489_a_, 489_b_) do not lead the corresponding social entities (e.g., 431', 432") into a same chat room (because, for example, they never touched on a same common topic node), the presence of the relatively close and/or parallel journeys may indicate that the demographically significant (e.g., representative) persons are thinking along similar lines and eventually trending towards certain topic nodes of future interest. it may be worthwhile for product promoters or market predictors to have advance warning of the relatively same directions in which the parallel journeys (e.g., 489_a_, 489_b_) are taking the corresponding travelers (e.g., 431', 432").

In one embodiment, the automated, journeys pattern detector 498 is configured to automatically detect when the not-yet-finished 'significant journeys' of new users are tracking in substantially same sequences and/or closeness of paths with paths (e.g., 489_a_, 489_b_) previously taken by earlier and influential (e.g., pioneering) social entities (e.g., Tipping Point Persons). In such a case, the journeys pattern detector 498 sends alerts to subscribed promoters of the presence of the new users whose more recent but not-yet-finished 'significant journeys' are taking them along paths similar to those of the trail-blazing pioneers (e.g., Tipping Point Persons). The alerted promoters may then wish to make promotional offerings to the in-transit new travelers based on predictions that the new travelers will substantially follow in the footsteps (e.g., 489_a_, 489_b_) of the earlier and influential (e.g., pioneering) social entities. In one embodiment, the alerts generated by the journeys pattern detector 498 are offered up as leads that are to be bid upon (auctioned off to) persons who are looking for prospective new customers who are following behind in the footsteps of the trail-blazing pioneers. The journeys pattern detector 498 is also used for detecting path crossings such as of journeys 431a" and 432a" through common node 416c. In that case, the closeness of the tracked paths reduces to zero as the paths cross through a same node (e.g., 416c) in topic space 413'.

It is within the contemplation of the present disclosure to use automated, journeys pattern detectors like 498 for locating close or crossing 'touching' paths in other data-objects organizing spaces besides just topic space. For example, influential trailblazers (e.g., Tipping Point Persons) may lead hoards of so-called, "followers" on sequential journeys through a music space (see FIG. 3F) and/or through other forms of shared-experience spaces (e.g., You-Tube™ videos space; shared jokes space, shared books space, etc.). It may desirable for product promoters and/or researchers who research societal trends to be automatically alerted by the STAN_3 system 410 when its other automated, journeys pattern detectors like 498 locate significant movements and/or directions taken in those other data-objects organizing spaces (e.g., Music-space, You-Tube™ videos space; etc.).

In one embodiment, heats are counted as absolute value numbers. However, there are several drawbacks to using such a raw absolute numbers when computing global summation of heats. (But with that said, the present disclosure nonetheless contemplates the use of such a global summation of absolute heats as a viable approach.) One drawback is that some topic nodes (or other 'touched' nodes of other spaces) may have thousands of visitors implicitly or actually 'touching' upon them every minute while other nodes—not because they are not worthy—have only a few visitors per week. That does not necessarily mean that a next visitation by one person to the rarely visited node within a given space (e.g., topic space. keyword space, etc.) should not be considered "hot" or otherwise significant. By way of example, what if a very influential person (a Tipping Point Person) 'touches' upon the rarely visited node? That might be considered a significant event even though it was just one user who touched the node. A second drawback to a global summation of absolute heats approach is that most users do not care if random strangers 'touched' upon random ones of topic nodes (or nodes of other spaces). They are usually more interested in the case where relevant social entities (e.g., friends and family) who are relevant to them 'touched' upon nodes or topic space regions relevant to them (e.g., My Top 5 Topics). This concept will be explored again when filters of a mechanism that can generate clustering mappings (FIG. 4E) will be detailed below. First, however, the generation of "heat" values need to be better defined.

With the above as introductory background, details of a 'relevant' heats measuring system 150 in accordance with FIG. 1F will be described. In the illustrated example of FIG. 1F, first and second STAN users 131' and 132' are shown as being representative of users whose activities are being monitored by the STAN_3 system 410. As such, corresponding streamlets of CFi signals (current focus indicating records) and/or CVi signals (current implicit or explicit vote indicating records) are respectively shown as signal streamlets 151i1 and 151i2 for users 131' and 132' respectively. These signal streamlets, 151i1 and 151i2, are being persistently up- or in-loaded into the STAN_3 cloud (see also FIG. 4A) for processing by various automated software modules and/or programmed servers provided therein. The in-cloud processings may include a first set of processings 151 wherein received CFi and/or CVi streamlets are parsed according to user identification, time of original signal generation, place of original signal generation (e.g., machine ID and/or machine location) and likely interrelationships between emotion indicating telemetry and content identifying telemetry (which interrelationships may be functions of the user's currently active PEEP profile). In the process, emotion indicating telemetry is converted into emotion representing codes (e.g., anger, joy, fear, etc. and degree of each) based on the currently active PEEP profile of the respective user (e.g., 131', 132, etc.). Alternatively or additionally in the process, unique encodings (e.g., keywords, jargon) that are personal to the user are converted into more generically recognizable encodings based on the currently active Domain specific profiles (DsCCp's) of the respective user. Then the so-parsed, converted and recombined data is forwarded to one or more domain-lookup servers (DLUX's) whose jobs it is to automatically determine the most likely topic(s) of associated interest for the respective user based for example on the user's currently active, topic-predicting profiles (e.g., CpCCp's, DsCCp's, PHAFUEL, etc.). It is to be noted here that in-cloud processings of the received signal streamlests, 151i1 and 151i2, of corresponding users are not limited to the purpose of pinpointing in topic space (see 313" of FIG. 3D) of most likely topic nodes and/or topic space regions (TSR's) which the respective users will be deemed to be more likely than not focusing-upon at the moment. The received signal streamlets, 151i1 and 151i2, can be used for identifying nodes or regions in other spaces besides just topic space. This will be discussed more in conjunction with FIG. 3D. For now the focus remains on FIG. 1F. Part of the signals 151 o output from the first set 151 of software modules and/or programmed servers illustated in FIG. 1F are topic domain and/or topic node identifying signals that indicate what general one or handful of topic domains and/or topic nodes have been determined to be most likely (based on likelihood scores) to be ones whose corresponding topics are probably now on the corresponding user's mind. In FIG. 1F these determined topic domains/nodes are denoted as $T_{A1}$, $T_{A2}$, etc. where A1, A2 etc. identify the corresponding nodes or subregions in the STAN_3 system's topic space mapping and maintaining mechanism (see 413' of FIG. 4D). Such topic nodes also are represented in area 152 of FIG. 1F by hierarchically interrelated topic nodes Tn01, Tn11 etc.

"Heats" can come in many types, where type depends on mixtures of weights, baselines and optional normalizations picked when generating the respective "heats". As it processes in-coming CFi and like streamlets in pipelined fashion, the heats measuring subsystem 150 (FIG. 1F) of the STAN_3 system 410 maintains logical links between the output topic node identifications (e.g., $T_{A1}$, $T_{A2}$, etc.) and the source data which resulted in production of those topic node identifications where the source data can include one or more of user ID, user CFi's, user CVi's, determined emotions of the user and their degrees, determined location of the user, determined context of the user, and so on. This machine-implemented action is denoted in FIG. 1F by the notations: $T_{A1}$(CFI's, CVi's, emos), $T_{A2}$(CFi's, CVi's, emos), etc. which are associated with signals on the 151q output line of module 151. The maintained logical links may be used for generating relative 'heat' indications as will become apparent from the following. In addtiion to retaining the associations ($TA_1$( ), $TA_2$( ), etc.) as between determined topics and original source signals, the heats measuring system 150 of FIG. 1F maintains sets of definitions in its memory for current halo patterns (e.g., 132h) at least for more frequently 'followed' ones of its users. If no halo pattern data is stored for a given user, then a default pattern indicating no halo may be used. (Alternatively, the default halo pattern may be one that extends just one level up hierarchically in the A-tree of hierarchical topic space. In other words, if a user with such a default halo pattern implicitly or explicitly touches topic node Tn01 (shown inside box 152) then hierarchical parent node Tn11 will also be deemed to have been implicitly touched according to a predetermined degree of touching score value.) 'Touching' halos can be fixed or variable. If variable, their extent (e.g., how many hierarchical levels upward they extend), their fade factors (e.g., how rapidly their virtual torches diminish in energy intensity as a function of distance from a core 'touching' point) and their core energy intensities may vary as functions of the node touching user's reputation, and/or his current level of emotion and/or speed of travel through the corresponding topic region. In other words, if a given user is merely skimming very rapidly through content and thus implicitly skimming very rapidly through its associated topic region, then this rapid pace of focusing through content can diminish the intensity and/or extent of the user's variable halo (e.g., 132*h*). On the other hand, if a given user is determined to be spending a relatively large amount of time stepping very slowly and intently through content and thus implicitly stepping very slowly and with high focus through its associated topic region, then this comparatively slow pace of focusing can automatically translate into increased intensity and/or increased extent of the user's variable halo (e.g., 132*h*'). In one embodiment, the halo of each user is also made an automated function of the specific region of topic space he or she is skimming through. If that person has very good reputation in that specific region of topic space (as determined for example by votes of others), then his/her halo may automatically grow in intensity and/or extent and direction of reach (e.g., per larger halo 132*h*' of FIG. 1F as compared to smaller halo 132*h*). On the other hand, if the same user enters into a region of topic space where he or she is not regarded as an expert, or as one of high reputation and/or as a Tipping Point Person (TPP), then that same user's variable halo (e.g., smaller halo 132*h*) may shrink in intensity and/or extent of reach.

In one embodiment, the halo (and/or other enhance-able weighting attribute) of a Tipping Point Person (TPP) is automatically reduced in effectiveness when the TPP enters into or otherwise touches a chat or other forum participation session where the demographics of that forum are determined to be substantially outside of an ideal demographics profile of that Tipping Point Person (TPP, which ideal demographics profile is predetermined and stored in system memory for that TPP). More specifically, a given TPP may be most influential with an older generation of people and/or within a certain geographic region but not regarded as so much of an influencer with a younger generation and/or outside the certain geographic region. Accordingly, when the particular TPP enters into a chat room (or other forum) populated mostly by younger people and/or people who reside outside the certain geographic region, that particular TPP is not likely to be recognized by the other forum occupants as an influential person who deserves to be awarded with more heavily weighted attributes (e.g., a wider halo). The system 410 automatically senses such conditions in one embodiment and automatically shrinks the TPP's weighted attributes to more normally sized ones (e.g., more normally sized halos). This automated reduction of weighted attributes can be beneficial to the TPP as well as to the audience for whom the TPP is not considered influential. The reason is that TPP's, like other persons, typically have limited bandwidth for handling requests from other people. If the given TPP is bothered with responding to requests (e.g., for help in a topic region he is an expert in) by people who don't appreciate his influential credentials so much (e.g., due to age disparity or distance from the certain geographic regions in which the TPP is better appreciated) then the TPP will have less bandwidth for responding to requests from people who do appreciate to a greatly extent his help. Hence the effectiveness of the TPP may be diminished by his being flagged as a TPP for forums or topic nodes where he will be less appreciated as a result of demographic miscorrelation. Therefore, in the one embodiment, the system automatically tones down the weighted attributes (e.g., halos) of the TPP when he journeys through or nearby forums or nodes that are substantially demographically miscorrelated relative to his ideal demographics profile. The fixed or variable halo (e.g., 132*h*) of each user (e.g., 132') indirectly determines the extent of a touched "topic space region" of his where this TSR (topic space region) includes a top topic of that user. Consider user 132' in FIG. 1F as an example. Assume that his monitored activities (those monitored with permission by the STAN_3 system 410) result in the domain-lookup server(s) (DLUX 151) determining that user 132' has directly touched nodes Tn01 and Tn02 (implicitly or explicitly), which topic space nodes are illustrated inside box 152 of FIG. 1F. Assume that at the moment, this user 132' has a default, a one-up hierarchical halo. That means that his direct 'touchings' of nodes Tn01 and Tn02 causes his halo (132*h*) to touch the hierarchically next above node (next as along a predetermined tree, e.g., the "A" tree of FIG. 3E) in topic space, namely, node Tn11. In this case the corresponding TSR (topic space region) for this journey is the combination of nodes Tn01, Tn02 and Tn11.

The so-specified topic space region (TSR) not only identifies a compilation of directly or indirectly 'touched' topic nodes but also implicates, for example, a corresponding set of chat rooms or other forums of those 'touched' topic nodes, where relevant friends of the first user (e.g., 132') may be currently participating in those chat rooms or other forums. (It is to be understood that a directly or indirectly touched topic node can also implicate nodes in other spaces besides forum space, where those other nodes logically link to the touched topic node.) The first user (e.g., 132') may therefore be interested in finding out how many or which ones of my relevant friends are 'touching' those relevant chat rooms or other forums and to what degree (to what extent of relative 'heat')? However, before moving on to explaining a next step where a given type of "heat" is calculated, assume alternatively that user 132' is a reputable expert in this quadrant of topic space (the one including Tn01) and his halo 132*h* extends downwardly by two hierarchical levels as well as upwardly by three hierarchical levels. In such an alternate situation where the halo is larger and/or more intense, the associated topic space region (TSR) that is automatically determined based on the reputable user 132' having touched node Tn01 will be larger and the number of encompassed chat rooms or other forums will be larger and/or the heat cast by the larger and more intense halo on each indirectly touched node will be greater. And this may be so arranged in order to allow the reputable expert to determine with aid of the enlarged halo which of his relevant friends (or other relevant social entities) are active both up and down in the hierarchy of nodes surrounding his one directly touched node. It is also so arranged in order to allow the relevant friends to see by way of indirect 'touchings' of the expert, what quadrant of topic space the expert is currently journeying through, and moreover, what intensity 'heat' the expert is casting onto the directly or indirectly 'touched' nodes of that quadrant of topic space. In one embodiment, a user can have two or more different halos (e.g., 132*h* and 132*h*') where for example a first halo (132*h*) is used to define his topic space region (TSR) of interest and the second halo (132*h*') is used to define the extent to which the first user's 'touchings' are of interest (relevance) to other social entities (e.g., to his friends). There can be multiple copies of second type halos (132*h*', 132*h*", etc., latter not shown) for indicating to different groups of friends or other social entities what the extent is of the first user's 'touchings'.

Referring next to further modules beyond 151 of FIG. 1F, a subsequently coupled module, 152 is structured and configured to output so-called, TSR signals 152*o* which represent the corresponding topic space regions (TSR's) deemed to have been indirectly 'touched' by the halo given the directly touched nodes ($T_{A1}$( ), $T_{A2}$( ), etc. as represented by signal 151*q*) and their corresponding CFi's, CVi's and/or emo's. Output signal 151*q* from domain-lookup module 151 can include a user's context identifying signal and the latter can be used to automatically adjust variable halos as can other components of the 151*q* signal.

The TSR signals 152*o* output from module 152 can flow to at least two places. A first destination is a heat parameters formulating module 160. A second destination is a U2U filter module 154. The user-to-user associations filtering module 154 automatically scans through the chat rooms or other forums of the corresponding TSR (e.g., forums of Tn01, Tn02 and Tn11) to thereby identify presence therein of friends or other relevant social entities belonging to a group (e.g., G2) being tracked by the first user's radar scopes (e.g., 101*r* of FIG. 1A). The output signals 154*o* of the U2U filter module 154 are sent at least to the heat parameters formulating module 160 so the latter can determine how many relevant friends (or other entities) are currently active within the corresponding topic space region (TSR). The output signals 154*o* of the U2U filter module 154 are also sent to the radar scope displaying mechanism of FIG. 1A for thereby identifying to the displaying mechanism which relevant friends (or other entities) are currently active in the corresponding topic space region (TSR). Recall that one possible feature of the radar scope displaying mechanism of FIG. 1A is that friends, etc. who are not currently online and active in a topic space region (TSR) of interest are grayed out or otherwise indicated as not active. The output 154*o* of the U2U filter module 154 can be used for automatically determining when that gray out or fade out aspect is deployed.

Accordingly, two of a plurality of input signals received by the next-described, heat parameters formulating module 160 are the TSR identification signals 152*o* and the relevant active friends signals 154*o*. Identifications of friends (or other relevant social entities) who are not yet currently active in the topic space region (TSR) of interest but who have been invited into that TSR may be obtained from partial output signals 153*q* of a matching forums determining module 153. The latter module 153 receives output signals 1510 from module 151. Output signals 1510 indicate which topic nodes are most likely to be of interest to a respective first user (e.g., 132'). The matching forums determining module 153 then finds chat rooms or other TCONE's (forums) having co-compatible chat mates. Some of those co-compatible chat mates can be pre-made friends of the first user (e.g., 132') who are deemed to be currently focused-upon the same topics as the top N now topics of the first user; which is why those co-compatible chat mates are being invited into a same on-topic chat room. Accordingly, partial output signals 153*q* can include identifications of social entities (SPE's) in a target group (e.g., G2) of interest to the first user and thus their identifications plus the identifications of the topic nodes (e.g., Tnxy1, Tnxy2, etc.) to which they have been invited are optionally fed to the heat parameters formulating module 160 for possible use as a substitute for, or an augmentation of the 152*o* (TSR) and 154*o* (relevant SPE's) signals input into module 160.

For sake of completeness, description of the top row of modules which top row includes modules 151 and 153 continues here with module 155. As matches are made by module 153 between co-compatible STAN users and the topic nodes they are currently focusing-upon, and the specific chat rooms (or other TCONEs—see dSNE 416*d* in FIG. 4D) they are being invited into, statistics of the topic space may be changed, where those statistics indicate where and to what intensity various participants are "clustered" in topic space (see also FIG. 4E). This statistics updating function is performed by module 155. It automatically updates the counts of how many chat rooms are active, how many users are in each chat room, which chat rooms vote to cleave apart, which vote to merge with one another, which vote to drift (see dSNE 416*d* in FIG. 4D) to a new place in topic space, and so forth. In one embodiment, the STAN_3 system 410 automatically suggests to members of a chat room that they drift themselves apart to a new position in topic space when a majority of the chat room members refocus themselves (digress themselves) towards a modified topic that rightfully belongs in a different place in topic space than where their chat room currently resides. Assume for example that the members first indicated via their CFi's that they are interested in primate anatomy and thus they were invited into a chat room tethered to a general, primate anatomy topic node. However, 80% of the same users soon thereafter generated new CFi's indicating they are interested in the more specific topic of chimpanzee grooming behavior. In one variation of this hypothetical scenario, there already exits such a specific topic node (chimpanzee grooming behavior) in the system 410. In another variation of this hypothetical scenario, the node (chimpanzee grooming behavior) does not yet exist and the system 410 automatically offers to the 80% portion of the users that such a new node can be auto-generated for them and then the system 410 automatically suggests they agree to drift their part of the chat room to the new topic node.

Such adaptive changes in topic space, including ever changing population concentrations (clusterings, see FIG. 4E) at different topic nodes/subregions and drifting of chat rooms to new spots, or mergers or bifurcations, all represent a kind of velocity indication of what is becoming more heated and what is cooling down within different regions of topic space. This is another set of parameter signals 155*q* fed into the heat parameters formulating module 160 from module 155.

Once a history of recent changes to topic space population densities (e.g., clusterings), ebbs and flows is recorded (e.g., periodic snapshots of change reporting signals 155*o* are recorded), a next module 157 of the top row in FIG. 1F can start making trending predictions of where the movement is heading towards. Such trending predictions 157*o* can represent a further kind of velocity or acceleration prediction indication of what is going to become more heated up and what is expected to be further cooling down in the near future. This is another set of parameter signals 157*q* that can be fed into the heat parameters formulating module 160. Departures from the predictions of trends determining module 157 can be yet other signals that are fed into formulating module 160.

In a next step, the heat parameters formulating module 160 automatically determines which of its input parameters it will instruct a downstream engine (e.g., 170) to use, what weights will be assigned to each and which will not be used (e.g., a zero weight) or which will be negatively used (a negative weight). In one embodiment, the heat parameters formulating module 160 uses a generalized topic region lookup table (LUT, not shown) assigned to a relative large region of topic space within which the corresponding, subset topic region (e.g., A1) of a next-described heat formulating engine 170 resides. In other words, system operators of the STAN_3 system 410 may have prefilled the generalized topic region lookup table (LUT, not shown) to indicate something like: IF subset topic region (e.g., A1) is mostly inside larger topic region A, use the following A-space parameters and weights for feeding summation unit 175 with: Param1(A), wt1(A), Param2(A), wt2(A), etc., but do not use these other parameters and weights: Param3(A), wt3(A), Param4(A), wt4(A), etc., ELSE IF subset topic region (e.g., B1) is mostly inside larger topic region B, use the following B-space parameters and weights: Param5(B), wt5(B), Param6(B), wt6(B), etc., to define signals (e.g., 171*o*, 172*o*, etc.) which will be fed into summation unit 175 . . . , etc. The system operators in this case will have manually determined which heat parameters and weights are the ones best to use in the given portion of the overall topic space (413'). In an alternate embodiment, governing STAN users who have been voted into governance position by users of hierarchically lower topic nodes define the heat parameters and weights to be used in the corresponding quadrant of topic space. In one embodiment, a community boards mechanism of FIG. 1G is used for determining the heat parameters and weights to be used in the corresponding quadrant of topic space.

Still referring to FIG. 1F, two primary inputs into the heat parameters formulating module 160 are one representing an identified TSR 152*o* deemed to have been touched by a given first user (e.g., 132') and an identification 158*q* of a group (e.g., G2) that is being tracked by the radar scope (101*r*) of the given first user (e.g., 132') when that first user is radar header item (101*a* equals Me) in the 101 screen column of FIG. 1A.

Using its various inputs, the formulating module 160 will instruct a downstream engine (e.g., 170, 170A2, 170A3 etc.) how to next generate various kinds 'heat' measurement values (output by units 177, 178, 179 of engine 170 for example). The various kinds 'heat' measurement values are generated in correspondingly instantiated, heat formulating engines where engine 170 is representative of the others. The illustrated engine 170 cross-correlates received group parameters (G2 parameters) with attributes of the selected topic space region (e.g., TSR Tnxy, where node Tnxy here can be also named as node A1). For every tracked social entity group (e.g., G2) and every pre-identified topic space region (TSR) of each header entity (e.g., 101*a* equals Me and pre-identified TSR equals my number 2 of my top N now topics) there is instantiated, a corresponding heat formulating engine like 170. Blocks 170A2, 170A3, etc. represent other instantiated heat formulating engines like 170 directed to other topic space regions (e.g., where the pre-identified TSR equals my number 3, 4, 5, . . . of my top N now topics). Each instantiated heat formulating engine (e.g., 170, 170A2, 170A3, etc.) receives respectively pre-picked parameters 161, etc. from module 160, where as mentioned, the heat parameters formulating module 160 picks the parameters and their corresponding weights. The to-be-picked parameters (171, 172, etc.) and their respective weights (wt.1, wt.2, etc.) may be recorded in a generalized topic region lookup table (LUT, not shown) which module 160 automatically consults with when providing a corresponding, heat formulating engine (e.g., 170, 170A2, 170A3, etc.) with its respective parameters and weights.

It is to be understood at this juncture that "group" heat is different from individual heat. Because a group is a "social group", it is subject to group dynamics rather than to just individual dynamics. Since each tracked group has its group dynamics (e.g., G2's dynamics) being cross-correlated against a selected TSR and its dynamics (e.g., the dynamics of the TSR identified as Tnxy), the social aspects of the group structure are important attributes in determining "group" heat. More specifically, often it is desirable to credit as a heat-increasing parameter, the fact that there are more relevant people (e.g., members of G2) participating within chat rooms etc. of this TSR then normally is the case for this TSR (e.g., the TSR identified as Tnxy). Accordingly, a first illustrated, but not limiting, computation that can be performed in engine 170 is that of determining a ratio of the current number of G2 members present (participating) in corresponding TSR Tnxy (e.g., Tn01, Tn01 and Tn11) in a recent duration versus the number of G2 members that are normally there as a baseline that has been pre-obtained over a predetermined and pro-rated baseline period (e.g., the last 30 minutes). This normalized first factor 171 can be fed as a first weighted signal 1710 (fully weighted, or partially weighted) into summation unit 175 where the weighting factor wt.1 enters one input of multiplier 171*x* and first factor 171 enters the other. On the other hand, in some situations it may be desirable to not normalize relative to a baseline. In that case, a baseline weighting factor, wt.0 is set to zero for example in the denominator of the ratio shown for forming the first input parameter signal 171 of engine 170. In yet other situations it may be desirable to operate in a partially normalized and partially not normalized mode wherein the baseline weighting factor, wt.0 is set to a value that causes the product, (wt.0)*(Baseline) to be relatively close to a predetermined constant (e.g., 1) in the denominator. Thus the ratio that forms signal 171 is partially normalized by the baseline value but no completely so normalized. A variation on theme in forming input signal 171 (there can be many variations) is to first pre-weight the relevant friends count according to the reputation or other influence factor of each present (participating) member of the G2 group. In other words, rather than doing a simple body count, input factor 171 can be an optionally partially/fully normalized reputation mass count, where mass here means the relative influence attributed to each present member. A normal member may have a relative mass of 1.0 while a more influential or more respected or more highly credentialed member may have a weight of 1.25 or more (for example).

Yet another possibility (not shown due to space limitations in FIG. 1F) is to also count as an additive heat source, participating social entities who are not members of the targeted G2 group but who are nonetheless identified in result signal 153*q* (SPE's(Tnxy)) as entities who are currently focused-upon and/or already participating in a forum of the same TSR and to normalize that count versus the baseline number for that same TSR. In other words, if more strangers than usual are also currently focused-upon the same topic space region TnxyA1, that works to add a slight amount of additional outside 'heat' and thus increase the heat values that will ultimately be calculated for that TSR and assigned to the target G2 group. Stated otherwise, the heat of outsiders can positively or negatively color the final heat attributed to insider group G2.

As further seen in FIG. 1F, another optionally weighted and optionally normalized input factor signal 172*o* indicates the emotion levels of group G2 members with regard to that TSR. More specifically, if the group G2 members are normally subdued about the one or more topic nodes of the subject TSR (e.g., TnxyA1) but now they are expressing substantially enhanced emotions about the same topic space region (per their CFi signals and as interpreted through their respective PEEP records), then that works to increase the 'heat' values that will ultimately be calculated for that TSR and assigned to the target G2 group. As a further variation, the optionally normalized emotional heats of strangers identified by result signal 153*q* (and whose emotions are carried in corresponding 151*q* signals) can be used to augment, in other words to color, the ultimately calculated heat values produced by engine 170 (as output by units 177, 178, 179 of engine 170).

Yet another factor that can be applied to summation unit 175 is the optionally normalized duration of focus by group G2 members on the topic nodes of the subject TSR (e.g., TnxyA1) relative for example, to a baseline duration as summed with a predetermined constant (e.g., +1). In other words, if they are spending more time focusing-upon this topic area than normal, that works to increase the 'heat' values that will ultimately be calculated. The optionally normalized durations of focus of strangers can also be included as augmenting coloration in the computation. A wide variety of other optionally normalized and/or optionally weighted attributes W can be factored in as represented in the schematic of engine 170 by multiplier unit 17*wx*, by it inputs 17*w* and by its respective weight factor wt.W and its output signal 17*wo*.

The output signal 176 produced by summation unit 175 of engine 170 can therefore represent a relative amount of so-called 'heat' energy that has been recently cast by STAN users on the subject topic space region (e.g., TSR TnxyA1) by currently online members of the 'insider' G2 target group (as well as optionally by some outside strangers) and which heat energy has not yet faded away (e.g., in a black body radiating style) where this 'heat' energy value signal 176 is repeatedly recomputed for corresponding predetermined durations of time. The absolute lengths of these predetermined durations of time may vary depending on objective. In some cases it may be desirable to discount (filter out) what a group (e.g., G2) has been focusing-upon shortly after a major news event breaks out (e.g., an earthquake, a political upheaval) and causes the group (e.g., G2) to divert its focus momentarily to a new topic area (e.g., earthquake preparedness) whereas otherwise the group was focusing-upon a different subregion of topic space. In other words, it may be desirable to not or count or to discount what the group (e.g., G2) has been focusing-upon in the last say 5 minutes to two hours after a major news story unfolds and to count or more heavily weigh the heats cast on topic nodes in more normal time durations and/or longer durations (e.g., weeks, months) that are not tainted by a fad of the moment. On the other hand, in other situations it may be desirable to detect when the group (e.g., G2) has been diverted into focusing-upon a topic related to a fad of the moment and thereafter the group (e.g., G2) continues to remain fixated on the new topic rather than reverting back to the topic space subregion (TSR) that was earlier their region of prolonged focus. This may indicate a major shift in focus by the tracked group (e.g., G2).

Although 'heated' and maintained focus by a given group (e.g., G2) over a predetermined time duration and on a given subregion (TSR) of topic space is one kind of 'heat' that can be of interest to a given STAN user (e.g., user 131'), it is also within the contemplation of the present disclosure that the given STAN user (e.g., user 131') may be interested in seeing (and having the system 410 automatically calculate for him) heats cast by his followed groups (e.g., G2) and/or his followed other social entities (e.g., influential individuals) on subregions or nodes of other kinds of data-objects organizing spaces such as keywords space, or URL space or music space or other such spaces as shall be more detailed when FIG. 3E is described below. For sake of brief explanation here, heat engines like 170 may be tasked with computing heats cast on different nodes of a music space (see briefly FIG. 3F) where clusterings of large heats (see briefly FIG. 4E) can indicate to the user (e.g., user 131' of FIG. 1F) which new songs or musical genre areas his or her friends or followed influential people are more recently focusing-upon. This kind of heats clustering information (see briefly FIG. 4E) can keep the user informed about and not left out on new regions of topic space or music space or another kind of space that his followed friends/influencers are migrating to or have recently migrated to.

It may be desirable to filter the parameters input into a given heat-calculating engine such as 170 of FIG. 1F according to any of a number of different criteria. More specifically, by picking a specific space or subspace, the computed "heat" values may indicate to the watchdogging user not only what are the hottest topics of his/her friends and/or followed groups recently (e.g., last one hour) or in a longer term period (e.g., this past week, month, business financial quarter, etc.), but for example, what are the hottest chat rooms or other forums of the followed entities in a relevant time period, what are the hottest other shared experiences (e.g., movies, You-Tube™ videos, TV shows, sports events, books, social games, music events, etc.) of his/her friends and/or followed groups, TPP's, etc., recently (e.g., last 30 minutes) or in a longer term period (e.g., this past evening, weekday, weekend, week, month, business financial quarter, etc.).

Specific time durations and/o specific spaces or subspaces are merely some examples of how heats may be filtered so as to provide more focused information about how others are behaving (and/or how the user himself has been behaving). Heat information may also be generated while filtering on the basis of context. More specifically, a given user may be asked by his boss to report on what he has been doing on the job this past month or past business quarter. The user may refresh his or her memory by inputting a request to the STAN_3 system 410 to show the one user's heats over the past month and as further filtered to count only 'touchings' that occurred within the context and/or geographic location basis of being at work or on the job. In other words, the user's 'touchings' that occurred outside the specified context (e.g., of being at work or on the job) will not be counted. In another situation, the user may be interested in collecting information about heats cast by him/herself and/or others while within a specified one or more geographic locations (e.g., as determined by GPS). In another situation, the user may be interested in collecting information about heats cast by him/herself and/or others while focusing-upon a specified kind of content (e.g., as determined by CFi's that report focus upon one or more specified URL's). In another situation, the user may be interested in collecting information about heats cast by him/herself and/or others while engaged in certain activities involving group dynamics (see briefly FIG. 1M). In such various cases, available CFi, CVi and/or other such collected and historically recorded telemetry may be filtered according to the relevant factors (e.g., time, place, context, focused-upon content, nearby other persons, etc.) and run through a corresponding one or more heat-computing engines (e.g., 170) for thereby creating heat concentration (clustering) maps as distributed over topic and/or other spaces and/or as distributed over time.

As mentioned above, heat measurement values may come in many different flavors or kinds including normalized, fully or partially not normalized, filtered or not according to above-threshold duration, above-threshold emotion levels, time, location, context, etc. Since the 'heat' energy value 176 produced by the weighted parameters summing unit 175 may fluctuate substantially over longer periods of time or smooth out over longer periods of time, it may be desirable to process the 'heat' energy value signals 176 with integrating and/or differentiating filter mechanisms. For example, it may be desirable to compute an averaged 'heat' energy value over a yet longer duration, T1 (longer than the relatively short time durations in which respective 'heat' energy value signals 176 are generated). The more averaged output signal is referred to here as $H_{avg}(T1)$. This $H_{avg}(T1)$ signal may be obtained by simply summing the user-cast "heat energies" during time T1 for each heat-casting member among all the members of group G2 who are 'touching' the subject topic node directly (or indirectly by means of a halo) and then dividing this sum by the duration length, T1. Alternatively, when such is possible, the $H_{avg}(T1)$ output signal may be obtained by regression fitting of sample points represented by the contributions of touching G2 members over time. The plot of over-time contributions is fitted to by a variably adjusting and thus conformably fitting but smooth and continuous over-time function. Then the area under the fitted smooth curve is determined by integrating over duration T1 to determine the total heat energy in period T1. In one embodiment the continuous fitting function is normalized into the form $F(H_j(T1))/T1$, where j spans the number of touching members of group Gk and $H_j(T1)$ represents their respective heats cast over time window T1. F( ) may be a Fourier Transform.

In another embodiment, another appropriate smoothing function such as that of a running average filter unit 177 whose window duration T1 is predefined, is used and a representation of current average heat intensity may be had in this way. On the other hand, aside from computing average heat, it may be desirable to pinpoint topic space regions (TSR's) and/or social groups (e.g., G2) which are showing an unusual velocity of change in their heat, where the term velocity is used here to indicate either a significant increase or decrease in the heat energy function being considered relative to time. In the case of the continuous representation of this averaged heat energy this may be obtained by the first derivative with respect to time t, more specifically $V=d\{F(H_j(T1))/T1\}/dt$; and for the discrete representation it may be obtained by taking the difference of $H_{avg}(T1)$ at two different appropriate times and dividing by the time interval being considered.

Likewise, acceleration in corresponding 'heat' energy value 176 may be of interest. In one embodiment, production of an acceleration indicating signal may be carried out by double differentiating unit 178. (In this regard, unit 177 smooths the possibly discontinuous signal 176 and then unit 178 computes the acceleration of the smoothed and thus continuous output of unit 177.) In the continuous function fitting case, the acceleration may be made available by obtaining the second derivative of the smooth curve versus time that has been fitted to the sample points. If the discrete representation of sample points is instead used, the collective heat may be computed at two different time points and the difference of these heats divided by the time interval between them would indicate heat velocity for that time interval. Repeating for a next time interval would then give the heat velocity at that next adjacent time interval and production of a difference signal representing the difference between these two velocities divided by the sum of the time intervals would give an average acceleration value for the respective two time intervals.

It may also be desirable to keep an eye on the range of 'heat' energy values 176 over a predefined period of time and the MIN/MAX unit 179 may in this case use the same running time window T1 as used by unit 177 but instead output a bar graph or other indicator of the minimum to maximum 'heat' values seen over the relevant time window. The MIN/MAX unit 179 is periodically reset, for example at the start of each new running time window T1.

Although the description above has focused-upon "heat" as cast by a social group on one or more topic nodes, it is within the contemplation of the present disclosure to alternatively or additionally repeatedly compute with machine-implemented means, different kinds of "heat" as cast by a social group on one or more nodes or subregions of other kinds of data-objects organizing spaces, including but not limited to, keywords space, URL space and so on.

Block 180 of FIG. 1F shows one possible example of how the output signals of units 177 (heat average over duration T1), 178 (heat acceleration) and 179 (min/max) may be displayed for user, where the base point A1 indicates that this is for topic space region A1. The same set of symbols may then be used in the display format of FIG. 1D to represent the latest 'heat' information regarding topic A1 and the group (e.g., My Immediate Family, see 101*b* of FIG. 1A) for which that heat information is being indicated.

In some instances, all this complex 'heat' tracking information may be more than what a given user of the STAN_3 system 410 wants. The user may instead wish to simply be informed when the tracked 'heat' information crosses above predefined threshold values; in which case the system 410 automatically throws up a HOT! flag like 115*g* in FIG. 1A and that is enough to alert the user to the fact that he may wish to pay closer attention to that topic and/or the group (e.g., G2) that is currently engaged with that topic.

Referring to FIG. 1D, aside from showing the user-to-topic associated (U2T) heats as produced by relevant social entities (e.g., My Immediate Family, see 101*b* of FIG. 1A) and as computed for example by the mechanism shown in FIG. 1F, it is possible to display user-to-user (U2U) associated heats as produced due to social exchanges between relevant social entities (e.g., as between members of My Immediate Family) where, again, this can be based on normalized values and detected accelerations of such as weighted by the emotions and/or the influence weights attributed to different relevant social entities. More specifically, if the frequency and/or amount of information exchange between two relevant and highly influential (e.g., Tipping Point Persons) within group G2 is detected by the system 410 to have exceeded a predetermined threshold, then a radar object like 101*ra*" of FIG. 1C may pop up or region 143 of FIG. 1D may flash (e.g., in red colors) to alert a first user (user of tablet computer 100) that one of his followed and thus relevant social groups is currently showing unusual exchange heat (group member to group member exchange heat). In a further variation, the displayed alert (e.g., the pyramid of FIG. 1C) may indicate that the group member to group member heated exchange is directed to one of the currently top 5 topics of the "Me" entity. In other words, a topic now of major interest to the "Me" entity is currently being heavily discussed as between two social entities whom the first user regards as highly influential or highly relevant to him.

Referring back to FIG. 1A, it may now be better appreciated how various groups (e.g., 101*b*, 101*c*) that are relevant to the tablet user may be defined and iconically represented (e.g., as discs or circles having unpacking options like 99+, topic space flagging options like 101*ts* and shuffling options like 98+). It may now be better appreciated how the 'heat' signatures (e.g., 101*w*' of FIG. 1B) attributed to each of the groups can be automatically computed and intuitively displayed. It may now be better appreciated how the My top 5 now topics of serving plate 102*a*_Now in FIG. 1A can be automatically identified (see FIG. 1E) and intuitively displayed in top tray 102.

Referring to FIG. 1G, when a currently hot topic or a currently hot exchange between group or forum members on a given topic is flagged to the user of tablet computer 100, one of the options he may exercise is to view a hot topic percolation board. Such a hot topic percolation board is a form of community board where the currently deemed to be most relevant comments are percolated up from different on-topic chat rooms or the like to be viewed by a broader community; what may be referred to as a confederation of chat or other forum participation sessions who are clustered in a particular subregion (e.g., quadrant) of topic space. In the case where an invitation flashes (e.g., 102*a*2" in FIG. 1G) as a hot button item on the invitations serving tray 102' of the user's screen, the user may activate the starburst plus tool for the point or the user might right click (or other) and one of the options presented to him will be the Show Community Topic Boards option.

More specifically, and referring to the middle of FIG. 1G, the popped open Community Topic Boards Frame 185 (unfurled from circular area 102*a*2" by way of roll-out indicator 115*a*7) may include a main heading portion 185*a* indicating what topic(s) (within STAN_3 topic space) is/are being addressed and how that/those topic(s) relates to an identified social entity (e.g., it is top topic number 2 of SE1). If the user activates (e.g., clicks on) the corresponding information expansion tool 185*a*+, the system 410 automatically provides additional information about the community board (what is it, what do the rankings mean, what other options are available, etc.) and about the topic and topic node(s) with which it is associated; and optionally the system 410 automatically provides additional information about how social entity SE1 is associated with that topic space region (TSR). In one embodiment, one of the informational options made available by activating expansion tool 185*a*+ is the popping open of a map 185*b* of the local topic space region (TSR) associated with the open Community Topic Board 185. More details about the You Are Here map 185*b* will be provided below.

Inside the primary Community Topic Board Frame 185 there may be displayed one or more subsidiary boards (e.g., 186, 187, . . . ). Referring to the subsidiary board 186 which is shown displayed in the forefront, it has a corresponding subsidiary heading portion 186*a* indicating that the illustrated and ranked items are mostly people-picked and people-ranked ones (as opposed to being picked and ranked only or mostly by a computer program). The subsidiary heading portion 186*a* may have an information expansion tool (not shown, but like 185*a*+) attached to it. In the case of the back-positioned other exemplary board 187, the rankings and choosing of what items to post there were generated primarily by a computer system (410) rather than by real life people. In accordance with one aspect of an embodiment, users may look at the back subsidiary board 187 that was populated by mostly computer action and such people may then vote and/or comment on the items (187*c*) posted on the back subsidiary board 187 to a sufficient degree such that the item is automatically moved as a result of voting/commenting from the back subsidiary board 187 to column 186*c* of the forefront board 186. The knowledge base rules used for determining if and when to promote a backboard item (187*c*) to a forefront board 186 and where to place it within the rankings of the forefront board may vary according to region of topic space, the kinds of users who are looking at the community board and so on. In one embodiment, for example, the automated determination to promote a backboard item (187*c*) to being forefront item (186*c*) is based at least on one or more factors selected from the factors group that includes: (1) number of net positive votes representing different people who voted to promote the item; (2) reputations and/or credentials of people who voted to promote the item versus that of those who voted against its promotion; (3) rapidity with which people voted to promote (or demote) the item (e.g., number of net positive votes within a predetermined unit of time exceeds a threshold), (4) emotions relayed via CFi's or CVi's indicating how strongly the voters felt about the item and whether the emotions were intensifying with time, etc.

Each subsidiary board 186, 187, etc. (only two shown) has a respective ranking column (e.g., 186*b*) and a corresponding expansion tool (e.g., 186*b*+) for viewing and/or altering the method that has been pre-used by the system 410 for ranking the rank-wise shown items (e.g., comments, tweets or other-wise whole or abbreviated snippets of user-originated information). As in the case of promoting a posted item from backboard 187 to forefront board 186, the displayed rankings (186*b*) may be based on popularity of the item (e.g., number of net positive votes), on emotions running high and higher in a short time, and so on. When a user activates the ranking column expansion tool (e.g., 186*b*+), the user is automatically presented with an explanation of the currently displayed ranking system and with an option to ask for displaying of a differently sorted list based on a correspondingly different ranking system (e.g., show items ranked according to a 'heat' formula rather than according to raw number of net positive votes).

For the case of exemplary comment snippet 186*c*1 (the top or #1 ranked one in items containing column 186*c*), if the viewing user activates its respective expansion tool 186*c*1+, then the user is automatically presented with further information (not shown) such as, (1) who (which social entity) originated the comment 186*c*1; (2) a more complete copy of the originated comment (where the snippet may be an abstracted/abbreviated version of the original full comment), (3) information about when the shown item (e.g., comment, tweet, abstracted comment, etc.) in its whole was originated; (4) information about where the shown item (186*c*1) in its original whole form was originated; where this location information can be: (4*a*) an identification of an online region (e.g., ID of chat room or other TCONE, ID of its topic node, ID of discussion group and/or ID of external platform if it is an out-of-STAN playground) and/or this 'more' information can be (4*b*) an identification of a real life (ReL) location, in context appropriate form (e.g., GPS coordinates and/or name of meeting room, etc.) of where the shown item (186*c*1) was originated; (5) information about the reputation, credentials, etc. of the originator of the shown item (186_c_1) in its original whole form; (6) information about the reputation, credentials, etc. of the TCONE social entities whose votes indicated that the shown item (186_c_1) deserves promotion up to the forefront Community Topic Board (e.g., 186) either from a backboard 187 or from a TCONE (not shown); (7) information about the reputation, credentials, etc. of the TCONE social entities whose votes indicated that the shown item (186_c_1) deserves to be downgraded rather than up-ranked and/or promoted; and so on.

A shown in the voting/commenting options column 186_d_ of FIG. 1G, a user of the illustrated tablet computer 100' may explicitly vote to indicate that he/she Likes the corresponding item, Dislikes the corresponding item and/or has additional comments (e.g., my 2 cents) to post about the corresponding item (e.g., 186_c_1). In the case where secondary users (those who add their 2 cents) decide to contribute respective subthread comments about a posted item (e.g., 186_c_1), then a "Comments re this" link and an indication of how many comments there are, lights up or becomes ungrayed in the area of the corresponding posted item (e.g., 186_c_1). Users may click on the so-ungrayed or otherwise shown hyperlink (not shown) so as to open up a comments thread window that shows the new comments and how they relate one to the next (e.g., parent/reply) in a comments hierarchy. The newly added comments of the subthreads (basically micro-blogs about the higher ranked item 186_c_1 of the forefront community board 186) originally start in a status of being underboard items (not truly posted on community subboard 186). However these underboard items may themselves be voted on to a point where they (a select subset of the subthread comments) are promoted into becoming higher ranked items (186_c_) of the forefront community board 186 or even items that are promoted from that community board 186 to a community board which is placed at a higher topic node in STAN_3 topic space. Promotion to a next higher hierarchical level (or demotion to a lower one) will be shortly described with reference to the automated process of FIG. 1H. In one embodiment, column 186_d_ displays a user selected set of options. By clicking or otherwise activating an expansion tool (e.g., starburst+) associated with column 186_d_ (shown in the magnified view under 186_d_), the user can modify the number of options displayed for each row and within column 186_d_ to, for example, show how many My-2-cents comments have already been posted (where this displaying of number of comments may be in addition to or as an alternative to showing number of comments in each corresponding posted item (e.g., 186_c_1)). The My-2-cents comments have already been posted can define one so-called, micro-blog directed at the correspondingly posted item (e.g., 186_c_1). However, there can be additional tweets, blogs, chats or other forum participation sessions directed at the correspondingly posted item (e.g., 186_c_1) and one of the further options (shown in the magnified view under 186_d_) causes a pop up window to automatically open up with links and/or data about those other or additional forum participation sessions that are directed at the correspondingly posted item (e.g., 186_c_1). The STAN user can click or otherwise activate any one or more of the links in the popped up window to thereby view (or otherwise perceive) the presentations made in those other streams or sessions if so interested. Alternatively or additionally the user may drag-and-drop the popped open links to a My-Cloud-Savings Bank tool 113_c_1_h_" (to be described elsewhere) and investigate them at a later time. In one embodiment, the user may drag-and-drop any of the displayed objects on his tablet computer 100 that can be opened into the My-Cloud-Savings Bank tool 113_c_1_h_" for later review thereof.

Expansion tool 186_b_+(e.g., a starburst+) allows the user to view the basis of, or re-define the basis by which the #1, #2, etc. rankings are provided in left column 186_b_ of community board 186. There is however, another tool 186_b_2 (Sorts) which allows the user to keep the ranking number associated with each board item (e.g., 186_c_1) unchanged but to also sort the sequence in which the rows are presented according to one or more sort criteria. For example, if the ranking numbers (e.g., #1, #2, etc.) in column 186_b_ are by popularity and the user wants to retain those rankings numbers, but at the same time the user wants his list re-sorted on a chronological basis (e.g., which postings were commented most recently by way of My-2-cents postings—see column 186_d_) and/or resorted on the basis of which have the greater number of such My-2-cents postings, then the user can employ the sorts-and-searches tool 186_b_3 of board 186 to resort its rows accordingly or to search through its content for identified search terms. Each community board, 186, 187, etc. has its own sorts-and-searches tool 186_b_3.

It should be recalled that window 185 unfurled (as highlighted by translucent unfurling beam 115_a_7) in response to the user picking a 'show community board' option associated with topic invitation(s) item 102_a_2". Although not shown, it is to be understood that the user may close or minimize that window 185 as desired and may pop open an associated other community board of another invitation (e.g., 102_n_').

Additionally, in one embodiment, each displayed set of front and back community boards (e.g., 185) may include a 'You are Here' map 185_b_ which indicates where the corresponding community board is rooted in STAN_3 topic space. Referring briefly to FIG. 4D, every node in the STAN_3 topic space 413' may have its own community board. Only one example is shown in FIG. 4D, namely, the grandfather community board 485 that is rooted to the grandparent node of topic node 416_c_ (and of 416_n_). The one illustrated community board 485 may also be called a grandfather "percolation" board so as to drive home the point that posted items (e.g., blog comments, tweets, etc.) that keep being promoted due to net positive votes in lower levels of the topic space hierarchy eventually percolate up to the community board 485 of a hierarchically higher up topic node (e.g., the grandpa or higher board). Accordingly, if users want to see what the general sentiment is at a more general topic node (one higher up in the hierarchy) rather than focusing only on the sentiments expressed in their local community boards (ones further down in the hierarchy) they can switch to looking at the community board of the parent topic node or the grandparent node or higher if they so desire. Conversely, they may also to drill down into lower and thus more tightly focused child nodes of the main topic space hierarchy tree.

Returning again to FIG. 1G, the illustrated 'You are Here' map 185_b_ is one mechanism by which users can see where the current community board is rooted in topic space. The 'You are Here' map 185_b_ also allows them to easily switch to seeing the community board of a hierarchically higher up or lower down topic node. (The 'You are Here' map 185_b_ also allows them to easily drag-and-drop objects as shall be explained in FIG. 1N.) In one embodiment, a single click on the desired topic node within the 'You are Here' map 185_b_ switches the view so that the user is now looking at the community board of that other node rather than the originally presented one. In the same embodiment, a double click or control right click or other such user interface activation instead takes the user to a localized view of the topic space map itself rather than showing just the community board of the picked topic node. As in other cases described herein, the heading of the 'You are Here' map 185*b* includes a expansion tool (e.g., 185*b*+) option which enables the user to learn more about what he or she is looking at in the displayed frame (185*b*) and what control options are available (e.g., switch to viewing a different community board, reveal more information about the selected topic node and/or its community board, show the local topic space relief map around the selected topic node, etc.).

Referring to the process flow chart of FIG. 1H, it will now be explained in more detail how comments in a local TCONE (e.g., an individual chat room populated by say, only 5 or 6 users) can be promoted to a community board (e.g., 186 of FIG. 1G) that is generally seen by a wider audience.

There are two process initiation threads in FIG. 1H. The one that begins with periodically invoked step 184.0 is directed to people-promoted comments. The one that begins with periodically invoked step 188.0 is directed to initial promotion of comments by computer software alone rather than by people votes.

Assuming an instance of step 184.0 has been instantiated by the STAN_3 system 410 when bandwidth so allows, the computer will jump to step 184.2 of a sampled TCONE to see if there are any items present there for possible promotion to a next higher level. However, before that happens, participants in the local TCONE (e.g., chat room, microblog, etc.) are chatting or otherwise exchanging informational notes with one another (which is why the online activity is referred to as a TCONE, or topic center-owned notes exchange). One of the participants makes a remark (a comment, a local posting, a tweet, etc.) and/or provides a link (e.g., a URL) to topic relevant other content. Other members of the same TCONE decide that the locally originated content is worthy of praise and promotion. So they give it a thumbs up or other such positive vote. The voting may be explicit wherein the other members have to activate an "I Like This" button (not shown) or equivalent. In one embodiment, the voting may be implicit in that the STAN_3 system 410 collects CVi's from the TCONE members as they focus on the one item and the system 410 interprets the same as implicit positive or negative votes about that item (based on user PEEP files). When votes are collected for evaluating an originator's remark for further promotion (or demotion), the originator's votes are not counted. It has to be the non-originating other members who decide. When such non-originating other members vote in step 184.1, their respective votes may be automatically enlarged in terms of score value or diminished based on the voter's reputation, current demeanor, credentials, etc. Different kinds of collective reactions to the originator's remark may be automatically generated, for example one representing just a raw popularity vote, one representing a credentials or reputations weighted vote, one representing just emotional 'heat' cast on the remark even if it is negative emotion just as long as it is strong emotion, and so on.

Then in step 184.2, the computer (or more specifically, an instantiated data collecting virtual agent) visits the TCONE, collects its more recent votes (older ones are typically decayed or faded with time) and automatically evaluates it relative to one or more predetermined threshold crossing algorithms. One threshold crossing algorithm may look only at net, normalized popularity. More specifically, the number of negatively voting members (within a predetermined time window) is subtracted from the number of positively voting members (within same window) and that result is divided by a baseline net positive vote number. If the actual net positive vote exceeds the baseline value by a predetermined percentage, then the computer determines that a first threshold has been crossed. This alone may be sufficient for promotion of the item to a local community board. In one embodiment, other predetermined threshold crossing algorithms are also executed and a combined score is generated. The other threshold crossing algorithms may look at credentials weighted votes versus a normalizing baseline or the count versus time trending waveform of the net positive votes to see if there is an upward trend that indicates this item is becoming 'hot'.

Assuming that in step 184.2, the computer decides the original remark is worthy of promotion, in next step 184.3 of FIG. 1H, the computer determines if the original remark is too long for being posted as short item on the community board. Different community boards may have respectively different local rules (recorded in computer memory, and usually including spam-block rules) as to what is too long or not, what level of vocabulary is acceptable (e.g., high school level, PhD level, other), etc. If the original remark is too long or otherwise not in conformance with the local posting rules of the local community board, the computer automatically tries to make it conform by abbreviating it, abstracting it, picking out only a more likely relevant snippet of it and so on. In one embodiment, after the computer automatically generates the conforming snippet, abbreviated version, etc., the local TCONE members (e.g., other than the originator) are allowed to vote to approve the computer generated revision before that revision is posted to the local community board. In one embodiment, the members may revise the revision and run it past the computer's conformance approving rules, where after the conforming revision (or original remark if it has not been so revised) is posted onto the local community board in step 184.4 and given an initial ranking score (usually a bottom one) that determines its initial placement position on the local community board.

Still referring to step 184.4, sometimes the local TCONE votes that cause a posted item to become promoted to the local community board are cast by highly regarded Tipping Point Persons (e.g., ones having special influencing credentials). In that case, the computer may automatically decide to not only post the comment (e.g., revised snippet, abbreviated version, etc.) on the local community board but to also simultaneously post it on a next higher community board in the topic space hierarchy, the reason being that if such TPP persons voted so positively on the one item, it deserves accelerated promotion.

Several different things can happen once a comment is promoted up to one or more community boards. First, the originator of the promoted remark might want to be automatically notified of the promotion (or demotion in the case where the latter happens). This is managed in step 189.5. The originator may have certain threshold crossing rules for determining when he or she will be so notified.

Second, the local TCONE members who voted the item up for posting on the local and/or other community board may be automatically notified of the posting.

Third, there may be STAN users who have subscribed to an automated alert system of the community board that received the newly promoted item. Notification to such users is managed in step 189.4. The respective subscribers may have corresponding threshold crossing rules for determining if and when (or even where) they will be so notified. The corresponding alerts are sent out in step 189.3 based on the then active alerting rules.

Once a comment (e.g., **186*c*1 of FIG. 1G) is posted onto a local or higher level community board (e.g., 186**), many different kinds of people can begin to interact with the posted comment and with each other. First, the originator of the comment may be proud of the promotion and may alert his friends, family and familiars via email, tweeting, etc., as to the posting. Some of those social entities may then want to take a look at it, vote on it, or comment further on it (via my 2 cents).

Second, the local TCONE members who voted the item up for posting on the local community board may continue to think highly of that promoted comment (e.g., **186*c*1**) and they too may alert their friends, family and familiars via email, tweeting, etc., as to the posting.

Third, now that the posting is on a community board shared by all TCONE's of the corresponding topic node (topic center), members in the various TCONE's besides the one where the comment originated may choose to look at the posting, vote on it (positively or negatively), or comment further on it (via my 2 cents). The new round of voting is depicted as taking place in step 184.5. The members of the other TCONE's may not like it as much or may like the posting more and thus it can move up or down in ranking depending on the collective votes of all the voters who are allowed to vote on it. For some topic nodes, only admitted participants in the TCONE's of that topic center are allowed to vote on items (e.g., **186*c*1**) posted on their local community board. Thus evaluation of the items is not contaminated by interloping outsiders. For other topic nodes, the governing members of such nodes may have voted to open up voting to outsiders as well as topic node members (those who are members of TCONE's that are primarily "owned" by the topic center).

In step 184.6, the computer may detect that the on-board positing (e.g., **186*c*1) has been voted into a higher ranking or lower ranking within the local community board or promoted (or demoted) to the community board of a next higher or lower topic node in the topic space hierarchy. At this point, step 184.6 substantially melds with step 188.6. For both of steps 184.6 and 188.6, if a posted item is persistently voted down or ignore over a predetermined length of time, a garbage collector virtual agent 184.7** comes around to remove the no-longer relevant comment from the bottommost rankings of the board.

Referring briefly again to the topic space mapping mechanism 413' of the STAN_3 system 410', it is to be appreciated that the topic space (413') is a living, breathing and evolving kind of data space. Most of its topic nodes are movable/variable topic nodes in that the governing users can vote to move the corresponding topic node (and its tethered thereto TCONE's) to a different position hierarchically and/or spatially within topic space. They may vote to cleave into two spaced apart topic nodes. They may vote to merge with another topic node and thus form an enlarged one topic node where before there had been two separate ones. For each topic node, the memberships of the tethered thereto TCONE's may also vote to bifurcate the TCONE, merge with other TCONE's, drift off to other topic nodes and so on. All these robust and constant changes to the living, breathing and constantly evolving, adapting topic space mean that original community boards of merging topic nodes become merged and re-ranked; original community boards of cleaving topic nodes become cleaved and re-ranked; and when new, substantially empty topic nodes are born as a result of a rebellious one or more TCONE's leaving their original topic node, a new and substantially empty community board is born for each newly born topic node.

People generally do not want to look at empty community boards because there is nothing there to study, vote on or further comment on (my 2 cents). With that in mind, even if no members of any TCONE's of a newly born topic node vote to promote one of their local comments per process flow 184.0, 184.1, 184.2, etc., the STAN_3 system 410 has a computer initiated, board populating process flow per steps 188.0, 188.2, etc. Step 188.2 is relatively similar to earlier described 184.2 except that here the computer relies on implicit voting (e.g., CFi's and/or CVi's) to automatically determine if an in-TCONE comment deserves promotion to a local subsidiary community board (e.g., 187 of FIG. 1G) even though no persons have explicitly voted with regard to that comment. In step 188.4, just as in step 184.4, the computer moves deserving comments into the local subsidiary community board (e.g., 187 of FIG. 1G) even though no persons have explicitly voted on it. In this way the computer-driven subsidiary community board (e.g., 187) is automatically populated with comments.

Some of the automated notifications that happen with people promoted comments also happen with computer-promoted comments. For example, after step 188.4, the originator of the comment is notified in step 189.5. Then in step 189.6, the originator is given the option to revise the computer generated snippet, abbreviation etc. and then to run the revision past the community board conformance rules. If the revised comment passes, then in step 189.7 it is submitted to non-originating others for revote on the revision. In this way, the originator does not get to do his own self promotion (or demotion) and instead needs the sentiment of the crowd to get the comment further promoted (or demoted if the others do not like it).

Referring next to FIG. 1I, shown here is a smartphone and/or tablet computer compatible user interface 100" and its associated method for presenting chat-now and alike, on-topic joinder opportunities to users of the STAN_3 system. Especially in the case of smart cellphones (smartphones), the screen area 111" can be relatively small and thus there is not much room for displaying complex interfacing images. The floor-number-indicating dial (Layervator dial) **113*a*" indicates that the user is at an interface layer designed for simplified display of chat or other forum participation opportunities 113*b*". A first and comparatively widest column 113*b*1 is labeled in abbreviated form as "Show Forum Participation Opportunities For:" and then below that active function indicator is a first column heading 113*b*1*h* indicating the leftmost column is for the user's current top 5 liked topics. (A thumbs-down icon (not shown) might indicate the user's current top 5 most despised topic areas as opposed to top 5 most like ones. The illustrated thumbs-up icon may indicate these are liked rather than despised topic areas.) As usual within the GUI examples given herein, a corresponding expansion tool (e.g., 113*b*1*h*+) is provided in conjunction with the first column heading 113*b*1*h* and this gives the user the options of learning more about what the heading means and of changing the heading so as to thereby cause the system to automatically display something else (e.g., My Hottest 3 Topics). Of course, it is within the contemplation of this disclosure to provided expansion tool function by alternative or additional means such as having the user right click on the heading, etc. In one embodiment, an iconic representation 113*b*1*i* of what the leftmost column 113*b*1 is showing may be displayed. In the illustrated example, one of a pair of hands belonging to iconic representation 113$b$1$i$ shows all 5 fingers to indicate the number 5** while the other hand provides a thumbs-up signal to indicate the 5 are liked ones. A thumbs-down signal might indicate the column features most disliked objects (e.g., Topics of My Three Least Favorite Family Members). A hand on the left showing 3 fingers instead of 5 might indicate correspondence to the number, three.

Under the first column heading 113$b$1$h$ in FIG. 1I there is displayed a first stack 113$c$1 of functional cards. The topmost stack 113$c$1 may have an associated stack number (e.g., number 1 shown in a left corner oval) and at the top of the stack there will be displayed a topmost functional card with its corresponding name. In the illustrated example, the topmost card of stack 113$c$1 has a heading indicating the stack contains chat room participation opportunities and a common topic shared by the cards in the stack is the topic known as "A1". The offered chat room may be named "A1/5" (for example). As usual within the GUI examples given here, a corresponding expansion tool (e.g., 113$c$1+) is provided in conjunction with the top of the stack 113$c$1 and this gives the user the options of learning more about what the stack holds, what the heading of the topmost card means, and of changing the stack heading and/or card format so as to thereby cause the system to automatically display other information in that area or similar information but in a different format (e.g., a user preferred alternate format).

Additionally, the topmost functional card of highest stack 113$c$1 (highest in column 113$b$1) may show one or more pictures (real or iconic) of faces 113$c$1$f$ of other users who have been invited into, or are already participating in the offered chat or other forum participation opportunity. While the displaying of such pictures 113$c$1$f$ may not be spelled out in every GUI example given herein, it is to be understood that such representation of each user or group of users may be routinely had by means of adjacent real or iconic pictures, as for example, with each user comment item (e.g., 186$c$1) shown in FIG. 1G. The displaying of such recognizable user face images (or other user identification glyphs) can be turned on or off depending on preferences of the computer user and/or available screen real estate.

Additionally, the topmost functional card of highest stack 113$c$1 includes an instant join tool 113$c$1$g$ ("G" for Go). If and when the user clicks or otherwise activates this instant join tool 113$c$1$g$ (e.g., by clicking on the circle enclosed forward play arrow), the screen real estate (111") is substantially taken over by the corresponding chat room interface function (which can vary from chat room to chat room and/or from platform to platform) and the user is joined into the corresponding chat room as either an active member or at least as a lurking observer. A back arrow function tool (not shown) is generally included within the screen real estate (111") for allowing the user to quit the picked chat or other forum participation opportunity and try something else. (In one embodiment, a relatively short time, e.g., less than 30 seconds; between joining and quitting is interpreted by the STAN_3 system 410 as constituting a negative vote (a.k.a. CVi) directed to what is inside the joined and quickly quit forum.)

Along the bottom right corner of each card stack there is provided a shuffle-to-back tool (e.g., 113$cn$). If the user does not like what he sees at the top of the stack (e.g., 113$c$), he can click or otherwise activate the "next" or shuffle-to-back tool 113$cn$ and thus view what next functional card lies underneath in the same deck. (In one embodiment, a relatively short time, e.g., less than 30 seconds; between being originally shown the top stack of cards 113$c$ and requesting a shuffle-to-back operation (113$cn$) is interpreted by the STAN_3 system 410 as constituting a negative vote (a.k.a. CVi) directed to what the system 410 chose to present as the topmost card 113$c$1. This information is used to retune how the system automatically decides what the user's current context and/or mood is, what his intended top 5 topics are and what his chat room preferences are under current surrounding conditions. Of course this is not necessarily accomplished by recording a single negative CVi and more often it is a long sequence of positive and negative CVi's that are used to train the system 410 into better predicting what the given user would like to see as the number one choice (first shown top card 113$c$1) on the highest shown stack 113$c$ of the primary column 113$b$1.)

More succinctly, if the system 410 is well tuned to the user's current mood, etc., the user is automatically taken by Layer-vator 113" to the correct floor 113$b$" merely by popping open his calm shell style smart phone (—as an example—or more generally by clicking or otherwise activating an awaken option button, not shown, of his mobile device 100") and at that metaphorical building floor, the user sees a set of options such as shown in FIG. 1I. Moreover, if the system 410 is well tuned to the user's current mood, etc., then the topmost card 113$c$1 of the first focused-upon stack 113$c$ will show a chat or other forum participation opportunity that almost exactly matches what the user had in mind (consciously or subconsciously). The user then quickly clicks or otherwise activates the play forward tool 113$c$1$g$ of that top card 113$c$1 and the user is thereby quickly brought into a just-starting or recently started chat or other forum session that happens to match the topic or topics the user currently has in mind. In one class of embodiments, users are preferentially not joined into chat or other forum sessions that have been ongoing for a long while because it can be problematic for all involved to have a newcomer enter the forum after a long history of user-to-user interactions has developed and new entrant would not likely be able to catch up and participate in a mutually beneficial way. Moreover, because real time exchange forums like chat rooms do not function well if there are too many people all trying to speak (electronically communicate) at once, chat room populations are generally limited to only a handful of social entities per room where the accepted members are typically co-compatible with one another on a personality or other basis. Of course there are exceptions to the rule. For example, if a well regarded expert on a given topic (whose reputation is recorded in a system reputation/credentials file) wants to enter an old and ongoing room and the preferences of the other members indicate that they would gladly welcome such an intrusion, then the general rule is automatically overridden.

The next lower functional card stack 113$d$ in FIG. 1I is a blogs stack. Here the entry rules for fast real time forums like chat rooms is automatically overridden by the general system rules for blogs. More specifically, when blogs are involved, new users generally can enter mid-thread because the rate of exchanges is substantially slower and the tolerance for newcomers is typically more relaxed.

The next lower block 113$e$ provides the user with further options "(more . . . )" in case the user wants to engage in different other forum types (e.g., tweet streams, emails or other) as suites his mood and within the column heading domain, namely, Show chat or other forum participation opportunities for: My now top 5 topics (113$b$1$h$). In one embodiment, the different other forum types (More . . . 113$e$) may include voice-only exchanges for a case where the user is (or soon will be) driving a vehicle and cannot use visual-based forum formats. Other possibilities include, but not limited to, live video conferences, formation of near field telephone chat networks with geographically nearby and like-minded other STAN users and so on. (An instant-chat now option will be described below in conjunction with FIG. 1K.) Although not shown throughout, it is to be understood that the various online chats or other online forum participation sessions described herein may be augmented in a variety of ways including, but not limited to machine-implemented processes that: (1) include within the displayed session frame, still or periodically re-rendered pictures of the faces or more of the participants in the online session; (2) include within the displayed session frame, animated avatars representing the participants in the online session and optionally representing their current facial or body gestures and/or representing their current moods and emotions; (3) include within the displayed session frame, emotion-indicating icons such as ones showing how forum subgroups view each other (3*a*) or view individual participants (3*b*) and/or showing how individual forum participants want to be viewed (3*c*) by the rest (see for example FIG. 1M, part 193.1*a*3); (4) include within the presented session frame, background music and/or background other sounds (e.g., seashore sounds) for signifying moods for one or more of the session itself or of subgroups or of individual forum participants; (5) include within the presented session frame, background imagery (e.g., seashore scenes) for thereby establishing moods for one or more of the session itself or of subgroups or of individual forum participants; (6) include within the presented session frame, other information indicating detected or perceived social dynamic attributes (see FIG. 1M); (7) include within the presented session frame, other information indicating detected or perceived demographic attributes (e.g., age range of participants; education range of participants; income range; topic expertise range; etc.); and (8) include within the presented session frame, invitations for joining yet other interrelated chat or other forum participation sessions and/or invitations for having one or more promotional offerings presented to the user.

In some cases the user does not intend to chat online or otherwise participate now in the presented opportunities (e.g., those in functional cards stack 113*c* of FIG. 1I) but rather merely to flip through the available cards and save links to a choice few of them for joining into them at a later time. In that case the user may take advantage of a send-to-my-other-device/group feature 113*c*1*h* where for example the user drags and drops copies of selected cards into an icon representing his other device (e.g., My Cellphone). A pop-out menu box may be used to change the designation of the destination device (e.g., My Second Cellphone or My Desktop or my Automobile Dashboard, My Cloud Bank rather than My Cellphone). Then, at a slightly later time (say 15 minutes later) when the user has his alternate device (e.g., My Second Cellphone) in hand, he can re-open the same or a similar chat-now interface (similar to FIG. 1I but tailored to the available screen capabilities of his alternate device) and activate one or more of the chat or other forum participation opportunities that he had hand selected using his first device (e.g., tablet computer 100") and sent to his more mobile second device (e.g., My Second Cellphone). The then presented, opportunity cards (e.g., 113*c*1) may be different because time has passed and the window of opportunity for entering the one earlier chat room has passed. However, a similar and later starting-up chat room (or other kind of forum session) will often be available, particularly if the user is focusing-upon a relatively popular topic. The system 410 will therefore automatically present the similar and later starting up chat room (or other forum session) so that the user does not enter as a late corner to an already ongoing chat session. The Copy-Opp-to-My CloudBank option is general savings area of the user's that is kept in the computing cloud and which may be accessed via any of the user's devices. As mentioned above, the rules for blogs and other such forums may be different from those of real time chat rooms and video web conferences.

In addition to, or as an alternative to the tool 113*c*1*h* option that provides the Copy-Opp-to-(fill in this with menu chosen option) function, other option may be provided for allowing that user to pick as the send-copy-to target(s), one or more other STAN users or on-topic groups (e.g., My A1 Topic Group, shown as a dashed other option). In this way, a first user who spots interesting chat or other forum participation opportunities (e.g., in his stack 113*c*) that are now of particular interest to him can share the same as a user-initiated invitation (see 102*j* (consolidated invites) in FIG. 1A, 1N) sent to a second or more other users of the STAN_3 system 410. In one embodiment, user-initiated invitations sent from a first STAN user to a specified group of other users (or to individual other users) is seen on the GUI of the receiving other users as a high temperature (hot!) invite if the sender (first user) is considered by them as an influential social entity (e.g., Tipping Point Person). Thus, as soon as an influencer spots a chat or other forum participation opportunity that is regarded by him as being likely to be an opportunity of current significance, he can use tool 113*c*1*h* to rapidly share his newest find (or finds) with his friends, followers, or other significant others.

If the user does not want to now focus-upon his usual top 5 topics (column 113*b*1), he may instead click or otherwise activate an adjacent next column of options such as 113*b*2 (My Next top 5 topics) or 113*b*3 (Charlie's top 5 topics) or 113*b*4 (The top 5 topics of a group that I or the system defined and named as social entities group number B4) and so on (the more. option 113*b*5). Of importance, in one embodiment, the user is not limited to automatically filled (automatically updated and automatically served up) dishes like My Current Top 5 Topics or Charlie's Current Top 5 Topics. These are automated conveniences for filling up the user's slide-out tray 102 with automatically updated plates or dishes (see again the automatically served-up plate stacks 102*aNow*, 102*b*, 102*c* of FIG. 1A). However, the user can alternatively or additionally create his own, not-automatically-updated, plates for example by dragging-and-dropping any appropriate topic or invitation object onto a plate of his choice. This aspect will be more fully explored in conjunction with FIG. 1N. Advance and/or upgraded subscription users may also create their own, script-based automated tools for automatically filling user-specific plates, automatically updating the invitations provided thereon and/or automatically serving up those plates on tray 102.

In shuffling through the various stacks of functional cards 113*c*, 113*d*, etc. in FIG. 1I, the user may come across corresponding chat or other forum participation situations in which the forum is: (1) a manually moderated one, (2) an automatically moderated one, (3) a hybrid moderated one which partly moderated by one or more forum (e.g., chat room) governing persons and partly moderated by automated moderation tools provided by the STAN_3 system 410 and/or by other providers or (4) an unmoderated free-for-all forum. In accordance with one embodiment, the user has an activateable option for causing automated display of the forum governance type. This option is indicated in dashed display option box 113*ds* with the corresponding governance style being indicated by a checked radio button. If the show governance type option is active, then as the user flips through the cards of a corresponding stack (e.g., 113*d*), a forum governance side bar (of form similar to 113*ds*) pops open for, and in indicated association with the top card where the forum governance side bar indicates via the checked radio button, the type of governance used within the forum (e.g., the blog or chat room) and optionally provides one or more metrics regarding governance attributes of that forum. In one embodiment, the slid-out governance side bar 113*ds* shows not only the type of governance used within the forum of the top card but also automatically indicates that there are similar other chat or other forum participation opportunities but with different governance styles. The one that is shown first and on top is one that the STAN_3 system 410 automatically determined to be one most likely to be welcomed by the user. However, if the user is in the mood for a different governance style, say free-for-all instead of the checked, auto-moderated middle one, the user can click or otherwise activate the radio button of one of the other and differently governed forums and in response thereto, the system will automatically serve up a card on top of the stack for that other chat or other forum participation opportunity having the alternate governance style. Once the user sees it, he can nonetheless shuffle it to the bottom of the stack (e.g., 113*d*) if he doesn't like other attributes of the newly shown opportunity.

In terms of more specifics, in the illustrated example of FIG. 1I, the forum governance style may be displayed as being at least one of a free-for-all style (top row of dashed box side bar 113*ds*) where there is no moderation, a single leader moderated one (bottom row of 113*ds*) wherein the moderating leader basically has dictatorial powers over what happens inside the chat room or other forum, a more democratically moderated one (not shown in box 113*ds*) where a voting and optionally rotated group of users function as the governing body and/or one where all users have voting voice in moderating the forum, and a fully automatically moderated one or a hybrid moderated one (middle row of 113*ds*).

Where such a forum governance side bar 113*ds* option is provided, the forum governance side bar may include one or more automatically computed and displayed metrics regarding governance attributes of that forum as already mentioned. As with other graphical user interfaces described herein, corresponding expansion tools (e.g., starburst with a plus symbol (+) inside) may be included for allowing the user to learn more about the feature or access further options for the feature. The expansion tool need not be an always-displayed one, but rather can be one that pops up when he user click or otherwise activates a hot key combination (e.g., control-right mouse type button).

Yet more specifically, if the radio-button identified governance style for the card-represented forum is a free-for-all type, one of the displayed metrics may indicate a current flame score and another may indicate a flame scores range and an average flame score for the day or for another unit of time. As those skilled in the art of social media may appreciate, a group of people within an unmoderated forum may sometimes fall into a mudslinging frenzy where they just throw verbally abusive insults at each other. This often is referred to as flaming. Some users of the STAN system may not wish to enter into a forum (e.g., chat room or blog thread) is currently experiencing a high level of flaming or that on average or for the current day has been experiencing a high level of flaming. The displayed flame score (e.g., on a scale of 0 to 10) quickly gives the user a feel for how much flaming may be occurring within a prospective forum before the user even presses the Click To Chat Now or other such entry button, and if the user does not like the indicated flame score, the user may elect to click or otherwise activate the shuffle down option on the stack and thus move to a next available card or perhaps to copy it to his cellphone (tool 113*c*1*h*) for later review.

In similar vein, if the room or other forum is indicated by the checked radio button to be a dictatorially moderated one, one of the displayed metrics may indicate a current overbearance score and another may indicate an overbearance scores range and the average overbearance score for the day or for another unit of time. As those skilled in the art of social media may appreciate, solo leaders of dictatorially moderated forums may sometimes let their power get to their heads and they become overly dictatorial, perhaps just for the hour or the day as opposed to normally. Other participants in the dictatorially moderated room may cast anonymous polling responses that indicate how overbearing or not the leader is for the day hour, day, etc. The displayed overbearance score (e.g., on a scale of 0 to 10) quickly gives the shuffling-through card user a feel for how overbearing the one man rule may be considered to be within a prospective forum before the user even presses the Click To Chat Now or other such entry button, and if the user does not like the indicated overbearance score, the user may elect to click or otherwise activate the shuffle down option on the stack and thus move to a next available card. In one embodiment, the dictatorial leader of the corresponding chat or other forum automatically receives reports from the system 410 indicating what overbearance scores he has been receiving and indicating how many potential entrants shuffled down past his room, perhaps because they didn't like the overbearance score.

Sometimes it is not the room leader who is an overbearance problem but rather one of the other forum participants because the latter is behaving too much like a troll or group bully. As those skilled in the art of social media may appreciate, some participants tend to hog the room's discussion (to consume a large portion of its finite exchange bandwidth) where this hogging is above and beyond what is considered polite for social interactions. The tactics used by trolls and/or bullies may vary and may sometimes be referred to as trollish or bullying or other types of similar behavior for example. In accordance with one aspect of the disclosure, other participants within the social forum may cast semi-anonymous votes which, when these scores cross a first threshold, cause an automated warning (113*d*2B, not fully shown) to be privately communicated to the person who is considered by others to be overly trollish or overly bullying or otherwise violating acceptable room etiquette. The warning may appear in a form somewhat similar to the illustrated dashed bubble 113*dw* of FIG. 1I, except that in the illustrated example, bubble 113*dw* is actually being displayed to a STAN user who happens to be shuffling through a stack (e.g., 113*d*) of chat or other forum participation opportunities and the illustrated warning bubble 113*dw* is displayed to him. If the shuffling through user does not like the indicated bully warning (or a metric (not shown) indicating how many bullies and how bullish they are in that forum), the user may elect to click or otherwise activate the shuffle down option on the stack and thus move to a next available card or another stack. In one embodiment, an oversight group that is charged with manually overseeing the room (even if it is an automatically moderated one) automatically receives reports from the system 410 indicating what troll/bully/etc. scores certain above threshold participants are receiving and indicating how many potential entrants shuffled down past this room (or other forum), perhaps because they didn't like the relatively high troll/bully/etc. scores. With regard to the private warning message 113*d*2B, in accordance with one aspect of the present disclosure, if after receiving one or more private warnings the alleged bully/troll/etc. fails to correct his ways, the system 410 automatically kicks him out of the online chat or other forum participation venue and the system 410 automatically discloses to all in the room who voted to boot the offender out and why. The reason for unmasking the complainers when an actual outcasting occurs is so that no forum participants engage in anonymous voting against a person for invalid reasons (e.g., they don't like the outcast's point of view and want him out even though he is not being a troll/etc.). (Another method for alerting participants within a chat or other forum participation session that others are viewing them unfavorably will be described in conjunction with FIG. 1M.)

When it comes to fully or hybrid-wise automatically moderated chat rooms or other so-moderated forum participation sessions, the STAN_3 system 410 provides two unique tools. One is a digressive topics rating and radar mapping tool (e.g., FIG. 1L) showing the digressive topics. The other is a Subtext topics rating and radar mapping tool (e.g., FIG. 1M) showing the Subtext topics.

Referring to FIG. 1L, shown here is an example of what a digressive topics radar mapping tool 113*xt* may look like. The specific appearance and functions of the displayed digressive topics radar mapping tool may be altered by using a Digressions Map Format Picker tool 113*xto*. In the illustrated example, displayed map 113*xt* has a corresponding heading 113*xx* and an associated expansion tool (e.g., starburst+) for providing help plus options. The illustrated map 113*xt* has a respectively selected format tailored for identifying who is the prime (#1) driver behind each attempt at digression to another topic that appears to be away from one or more central topics (113*x*0) of the room. The identified prime driver can be an individual or a group of social entities. More specifically, in this example a so-called Digresser B ("DB") will be seen as being a social entity who is apparently pushing for talking within an associated transcript frame 193.1*b* about hockey instead of about best beer in town. Within the correspondingly displayed radar map 113*xt*, this social entity DB is shown as driving towards a first exit portal 113*e*1 that optionally may connect to a first side chat room 113*r*1. More will be said on this aspect shortly. First however, a more birds-eye view of FIG. 1L is taken. Functional card 193.1*a* is understood to have been clicked or otherwise activated here by the user of computer 100"". A corresponding chat room transcript was then displayed and periodically updated in a current transcript frame 193.1*b*. The user, if he chooses, may momentarily or permanently step out of the forum (e.g., the online chat) by clicking or otherwise activating the Pause button within card 193.1*a*. The user may then employ the Copy-Opp-to-(fill in with menu chosen option) tool 113*c*1*h*' to save the link to the paused functional card 193.1*a* for future reference. In the illustrated case, the default option allows for a quick drag-and-drop of card 193.1*a* into the user's Cloud Bank (My Cloud Bank).

Adjacent to the repeatedly updated transcript frame 193.1*b* is an enlarged and displayed first Digressive Topics Radar Map 113*xt* which is also automatically repeatedly updated, albeit not necessarily as quickly as is the transcript frame 193.1*b*. A minimized second such map 114*xt* is also displayed. It can be enlarged with use of its associated expansion tool (e.g., starburst+) to thereby display its inner contents. The second map 114*xt* will be explained later below. Referring still to the first map 113*xt* and its associated chat room 193.1*a*, it may be seen within the exemplary and corresponding transcript frame 193.1*b* that a first group of participants have begun a discussion aimed toward a current main or central topic concerning which beer vending establishment is considered the best in their local town. However, a first digresser (DA) is seen to interject what seems to be a somewhat off-topic comment about sushi. A second digresser (DB) interjects what seems to be a somewhat off-topic comment about hockey. And a third digresser (DC) interjects what seems to be a somewhat off-topic comment about local history. Then a room participant named Joe calls them out for apparently trying to take the discussion off-topic and tries to steer the discussion back to the current main or central topic of the room.

At the center of the correspondingly displayed radar map tool 113*xt*, there are displayed representations of the node or nodes in STAN_3 topic space corresponding to the central theme(s) of the exemplary chat room (193.1*a*). In the illustrated example these nodes are shown as being hierarchically interconnected nodes although they do not have to be so displayed. The internal heading of inner circle 113*x*0 identifies these nodes as the current forefront topic(s). A user may click or otherwise activate the displayed nodes (circles on the hierarchical tree) to cause a pop-up window (not shown) to automatically emerge showing more details about that region (TSR) of STAN_3 topic space. As usual with the other GUI examples given herein, a corresponding expansion tool (e.g., starburst+) is provided in conjunction with the map center 113*x*0 and this gives the user the options of learning more about what the displayed map center 113*x*0 shows and what further functions the user may deploy in conjunction with the items displayed in the map center 113*x*0.

Still referring to the exemplary transcript frame 193.1*b* of FIG. 1L, after the three digressers (DA, DB, DC) contribute their inputs, a further participant named John jumps in behind Joe to indicate that he is forming a social coalition or clique of sorts with Joe and siding in favor of keeping the room topic focused-upon the question of best beer in town. Digresser B (DB) then tries to challenge Joe's leadership. However, a third participant, Bob jumps in to side with Joe and John. The transcript 193.1*b* may of course continue with many more exchanges that are on-topic or appear to go off-topic or try to aim at controlling the social dynamics of the room. The exemplary interchange in short transcript frame 193.1*b* is merely provided here as a simple example of what may occur within the socially dynamic environment of a real time chat room. Similar social dynamics may apply to other kinds of on-topic forums (e.g., blogs, tweet streams, live video web conferences etc.).

In correspondence with the dialogs taking place in frame 193.1*b*, the first Digressive Topics Radar Map 113*xt* is repeatedly updated to display prime driver icons driving towards the center or towards peripheral side topics. More specifically, a first driver(s) icon 113*d*0 is displayed showing a central group or clique of participants (Joe, John and Bob) metaphorically driving the discussion towards the central area 113*x*0. Clicking or otherwise activating the associated expansion tool (e.g., starburst+) of driver(s) icon 113*d*0 provides the user with more detailed information (not shown) about the identifications of the inwardly driving participants, what their full persona names are, what "heats" they are each applying towards keeping the discussion focused on the central topic space region (indicated within map center area 113*x*0) and so on.

Similarly, a second displayed driver icon **113*d*1 shows a respective one or more participants (in this case just digress DB) driving the discussion towards an offshoot topic, for example "hockey". The associated topic space region (TSR) for this first offshoot topic is displayed in map area 113*x*1. Like the case for the central topic area 113*x*0, the user of the data processing device 100"" can click or otherwise activate the nodes displayed within secondary map area 113*x*1 to explore more details about it (about the apparently digressive topic of "Hockey"). The user can utilize an associated expansion tool (e.g., starburst+) for help and more options. The user can click or otherwise activate an adjacent first exit door 113*e*1 (if it is being displayed, where such displaying does not always happen). Activating the first exit door 113*e*1 will take the user virtually into a first sidebar chat room 113*r*1. In such a case, another transcript like 193.1*b* automatically pops up and displays a current transcript of discussions ongoing in the first side room 113*r*1. In one embodiment, the first transcript 193.1*b* remains simultaneously displayed and repeatedly updated whenever new contributions are provided in the first chat room 193.1*a*. At the same time a repeatedly updated transcript (not shown) for the first side room 113*r*1 also appears. The user therefore feels as if he is in both rooms at the same time. He can use his mouse to insert a contribution into either room. Accordingly, the first transcript 193.1*b* will not indicate that the user of data processing device 100"" has left that room. In an alternate embodiment, when the user takes the side exit door 113*e*1, he is deemed to have left the first chat room (193.1*a*) and to have focused his attentions exclusively upon the Notes Exchange session within the side room 113*r*1**. It should go without saying at this point that it is within the contemplation of the present disclosure to similarly apply this form of digressive topics mapping to live web conferences and other forum types (e.g., blogs, tweet stream, etc.). In the case of live web conferencing (be it combined video and audio or audio alone), an automated closed-captions feature is employed so that vocal contributions of participants are automatically converted into a near real time wise, repeatedly and automatically updated transcript inserts generated by a closed-captions supporting module. Participants may edit the output of the closed-captions supporting module if they find it has made a mistake. In one embodiment, it takes approval by a predetermined plurality (e.g., two or more) of the conference participants before a proposed edit to the output of the closed-captions supporting module takes place and optionally, the original is also shown.

Similar to the way that the apparently digressive actions of the so-called, second digresser DB are displayed in the enlarged mapping circle **113*xt* as showing him driving (icon 113*d*1) towards a first set of off-topic nodes 113*x*1 and optionally towards an optionally displayed, exit door 113*e*1 (which optionally connects to optional side chat room 113*r*1), another driver(s) identifying icon 113*d*2 shows the first digresser DA driving towards off-topic nodes 113*x*2 (Sushi) and optionally towards an optionally displayed, other exit door 113*e*2 (which optionally connects to an optional and respective side chat room—not referenced). Yet a further driver(s) identifying icon 113*d*3 shows the third digresser, DC driving towards a corresponding set of off-topic nodes (history nodes—not shown) and optionally towards an optionally displayed, third exit door 113*e*3 (which optionally connects to an optional side chat room—denoted as Beer History) and so on. In one embodiment, the combinations of two or more of the driver(s) identifying icon 113*d*N (N=1,2,3, etc. here), the associated off-topic nodes 113*x*N, the associated exit door 113*e*N and the associated side chat room 113*r*N are displayed as a consolidated single icon (e.g., a car beginning to drive through partially open exit doors). It is to be understood that the examples given here of metaphorical icons such as room participants riding in a car (e.g., 113*d*0) towards a set of topic nodes (e.g., 113*x*0) and/or towards an exit door (e.g., 113*e*1) and/or a room beyond (e.g., 113*r*1) may be replaced with other suitable representations of the underlying concepts. In one embodiment, the user can employ the format picker tool 113*xto* to switch to other metaphorical representations more suitable to his or her tastes. The format picker tool 113*xto* may also provide the user with various options such as: (1) show-or-hide the central and/or peripheral destination topic nodes (e.g., 113*x*1); (2) show-or-hide the central and/or peripheral driver(s) identifying icons (e.g., 113*d*1); (3) show-or-hide the central and/or peripheral exit doors (e.g., 113*e*1); (4) show-or-hide the peripheral side room icons (e.g., 113*r*1); (5) show-or-hide the displaying of yet more peripheral main or side room icons (e.g., 114*xt*, 114*r*2); (6) show-or-hide the displaying of main and digression metric meters such as Heats meter 113H; and so on. The meaning of the yet more peripheral main or side room icons (e.g., 114*xt*, 114*r*2**) will be explained shortly.

Referring to next to the digression metrics Heats meter 113H of FIG. 1L, the horizontal axis **113*x*H indicates the identity of the respective topic node sets, 113*x*0, 113*x*1, 113*x*2 and so on. It could alternatively represent the drivers except that a same one driver (e.g., DB) could be driving multiple metaphorical cars (113*d*1, 113*d*5) towards different sideline destinations. The bar-graph wise represented digression Heats may denote one or more types of comparative pressures or heats applied towards either remaining centrally focused on the main topic(s) 113*x*0 or on expanding outwardly towards or shifting the room Notes Exchange session towards the peripheral topics 113*x*1, 113*x*2, etc. Such heat metrics may be generated by means of simple counting of how many participants are driving towards each set of topic space regions (TSR's) 113*x*0, 113*x*1, 113*x*2, etc. A more sophisticated heat metric algorithm in accordance with the present disclosure assigns a respective body mass to each participant based on reputation, credentials and/or other such influence shifting attributes. More respected, more established participants are given comparatively greater masses and then the corresponding masses of participants who are driving at respective speeds towards the central versus the peripheral destinations are indicated as momentums or other such metaphorical representations of physics concepts. A yet more sophisticated heat metric algorithm in accordance with the present disclosure factors in the emotional heats cast by the respective participants towards the idea of remaining anchored on the current main topic(s) 113*x*0 as opposed to expanding outwardly towards or shifting the room Notes Exchange session towards the peripheral topics 113*x*1, 113*x*2, etc. Such emotional heat factors may be weighted by the influence masses assigned to the respective players. The format picker tool 113*xto*** may be used to select one algorithm or the other as well as to select a desired method for graphically representing the metrics (e.g., bar graph, pie chart, and so on).

Among the digressive topics which can be brought up by various ones of the in-room participants, is a class of topics directed towards how the room is to be governed and/or what social dynamics take place between groups of two or more of the participants. For example, recall that DB challenged Joe's apparent leadership role within transcript **193.1*b*. Also recall that Bob tried to smooth the social friction by using a humbling phraseology: IMHO (which, when looked up in Bob's PEEP file, is found to mean: In My Humble Opinion and is found to be indicative of Bob trying to calm down a possibly contentious social situation). These governance and dynamics types of in-room interactions may fall under a subset of topic nodes 113x5 within STAN_3 topic space that are directed to group dynamics and/or group governance issues. This aspect will be yet further explored in conjunction with FIG. 1M. For now, it is sufficient to note that the enlarged mapping circle 113xt can display one or more participants (e.g., DB in virtual vehicle 113d5**) as driving towards a corresponding one or more nodes of the group dynamics and/or group governance topic space regions (TSR's).

Before moving on, the question comes up regarding how the machine system 410 automatically determines who is driving towards what side topics or towards the central set of room topics. In this regard, recall that at least a significant number of the room participants are STAN users. Their CFi's and/or CVi's are being monitored (112"") by the STAN_3 system 410 even while they are participating in the chat room or other forum. These CFi's and/or CVi's are being converted into best guess topic determinations as well as best guess emotional heat determinations and so on. Recall also that the monitored STAN users have respective user profile records stored in the machine system 410 which are indicative of various attributes of the users such as their respective chat co-compatibility preferences, their respective domain and/or topic specific preferences, their respective personal expression propensities, their respective personal habit and routine propensities, and so on (e.g., their mood/context-based CpCCp's, DsCCp's, PEEP's, PHAFUEL's or other such profile records). Participation in a chat room is a form of context in and of itself. There are at least two kinds of participation: active listening or other such attention giving to informational inputs and active speaking or other such attentive informational outputs. This aspect will be covered in more detail in conjunction with FIGS. 3A and 3D. At this stage it is enough to understand that the domain-lookup servers (DLUX) of the STAN_3 system 410 are repeatedly outputting in substantially real time, indications of what topic nodes each STAN user appears to be most likely driving towards based on the CFi's and/or CVi's streams of the respective users and/or based on their currently active profiles (CpCCp's, DsCCp's, PEEP's, PHAFUEL's, etc.) and/or based on their currently detected physical surrounds (physical context). So the system 410 that automatically provides the first Digressive Topics Radar Map 113xt (FIG. 1L) is already automatically producing signals representative of what central and/or sideline topics each participant is most likely driving towards. Those signals are then used to generate the graphics for the displayed Radar Map 113xt.

Referring again to the example of second digresser DB and his drive towards the peripheral Hockey exit door 113e1 in FIG. 1L, the first blush understanding by Joe, John and Bob of DB's intentions in transcript 193.1b may have been wrong. In one scenario it turns out that DB is very much interested in discussing best beer in town, except that he also is an avid hockey fan. After every game, he likes to go out and have a couple of glasses of good quality beer and discuss the game with like minded people. By interjecting his question, "Did you see the hockey game last night?", DB was making a crude attempt to ferret out like minded beer aficionados who also happen to like hockey, because may be these people would want to join him in real life (ReL) next week after the upcoming game for a couple of glasses of good quality beer. Joe, John and Bob mistook DB's question as being completely off-topic.

Although not shown is the transcript 193.1b of FIG. 1L, later on, another room participant may respond to DB's question by answering: "Yes I saw the game. It was great. I like to get together with local beer and hockey connoisseurs after each game to share good beer and good talk. Are you interested?". At this hypothesized point, the system 410 will have automatically identified at least two room participants (DB and Mr. Beer/Hockey connoisseur) who have in common and in their current focus, the combined topics of best beer in town and hockey. In response to this, the system 410 may automatically spawn an empty chat room 113r1 and simultaneously invite the at least two room participants (DB and Mr. Beer/Hockey connoisseur) to enter that room and interact with regards to their currently two top topics: good beer and good hockey. In one embodiment, the automated invitation process includes generating an exit door icon 113e1 at the periphery of displayed circle 113xt, where all participants who have map 113xt enlarged on their screens can see the new exit door icon 113e1 and can explore what lies beyond it if they so choose. It may turn out despite the initial protestations of Joe, John and Bob that 50% of the room participants make a bolt for the new exit door 113e1 because they all happen to be combined fans of good beer and good hockey. Once the bolters convene in new room 113r1, they can determine who their discussion leader will be (perhaps DB) and how the new chat room 113r1 should be governed. Joe, John and Bob may continue with the remaining 50% of the room participants in focusing-upon central themes indicated in central circle 113x0.

At around the same time that DB was gathering together his group of beer and hockey fans, there was another ongoing Instan-Chat™ room (114xt) within the STAN_3 system 410 whose central theme was the local hockey team. However in that second chat room, one or more participants indicated a present desire to talk about not only hockey, but also where is the best tavern to go to in town to a have a good glass of beer after the game. If the digressive topics map 114xt of FIG. 1L had been enlarged (as is map 113xt) it would have shown a similar picture, except that the central topic (114x0, not shown) would have been hockey rather than beer. And that optionally enlarged map 114xt would have displayed at a periphery thereof, an exit door 114e1 (which is shown in FIG. 1L) connecting to a side discussion room 113r1. When participants of the hockey room (114xt) enter the beer/hockey side room 113r1 by way of door 114e1 (or by other ways of responding to received invitations to go there), they may be surprised to meet up with entrants from other chat room 113xt who also currently have a same combined focus on the topics of best beer in town and best tavern to get together in after the game. In other words, side chat rooms like 113r1 can function as a form of biological connective tissue (connective cells) for creating a network of interrelated chat rooms that are logically linked to one another by way of peripheral exit doors such as 113e1 and 114e1. Needless to say, the hockey room (which correlates with enlargeable map 114xt) can have yet other side chat rooms 114r2 and so on.

Moreover, the other illustrated exit doors of the enlarged radar map 113xt can lead to yet other combine topic rooms. Digresser DA for example, may be a food guru who likes Japanese foods, including good quality Japanese beers and good quality sushi. When he posed his question in transcript 193.1b, he may have been trying to reach out to like minded other participants. If there are such participants, the system 410 can automatically spawn exit door 113e2 and its associated side chat room. The third digresser DC may have wanted to explain why a certain tavern near the hockey stadium has the best beer in town because they use casks made of an aged wood that has historical roots to the town. If he gather some adherents to his insights about an old forest near the town and how that interrelates to a given tavern now having the best beer, the system 410 may responsively and automatically spawn exit door 113*e*3 and its associated side chat room for him and his followers. Similarly, yet another automatically spawned exit door 113*e*4 may deal with do-it-yourself (DIY) beer techniques and so on. Spawned exit door 113*e*5 may deal with off topic issues such as how the first room (113*xt*) should be governed and/or how to manage social dynamics within the first room (113*xt*). Participants of the first room (113*xt*) who are interested in those kinds of topics may step out in to side room 113*r*5 to discuss the same there.

In one embodiment, the mapping system also displays topic space tethering links such as 113*tst*5 which show how each side room tethers as a driftable TCONE to one or more nodes in a corresponding one or more subregions (TSR's) (e.g., 113*x*5) of the system's topic space mecahnism (see 413' of FIG. 4D). Users may use those tethers (e.g., 113*tst*5) to navigate to their respective topic nodes and to thereby explore the corresponding topic space regions (TSR's) by for example double clicking on the representations of the tether-connected topic nodes.

Therefore it may be seen, in summing up FIG. 1L that the STAN_3 system 410 can provide powerful tools for allowing chat room participants (or participants of other forums) to connect with one another in real time to discuss multiple topics (e.g., beer and hockey) that are currently the focal points of attention in their minds.

Referring next to FIG. 1M, some participants of chat room 193.1*b*' may be interested in so-called, subtext topics dealing for example with how the room is governed and/or what social dynamics appear to be going on within that room (or other forum participation session). In this regard, the STAN_3 system 410 provides a second automated mapping tool 113Zt that allows such users to keep track of how various players within the room are interrelating to one another based on a selected theory of social dynamics. The Digressive Topics Radar Map 113*xt*' (see FIG. 1L) is displayed as minimized in the screen of FIG. 1M. The user may of course enlarge it to a size similar to that shown in FIG. 1L if desired in order to see what digressive topics the various players in the room (or other forum) appear to be driving towards.

Before explaining mapping tool 113Zt however, a further GUI feature of STAN_3 chat or other forum participation sessions is described for the illustrated screen shot of FIG. 1M. If a chat or other substantially real time forum participation session is ongoing within the user's set of active and currently displayed forums, the user may optionally activate a Show-Faces/Backdrops display module (for example by way of the FORMAT menu in his main, FIKe, EDIT, etc. toolbar). This activated module then automatically displays one or more user/group mood/emotion faces and/or face backdrop scenes. For example and as illustrated in FIG. 1M, one selectable sub-panel 193.1*a*' of the Show-Faces/Backdrops option displays to the user of tablet computer 100.M one or both of a set of Happy faces (left side of sub-panel 193.1*a*') with a percentage number (e.g., 75%) below it and a set of Mad/sad face(s) (right side of sub-panel 193.1*a*') with a percentage number (e.g., 10%) below it. This gives the user of tablet computer 100.M a rough sense of how other participants in the chat or other forum participation session (193.1*a*') are voting with regard to him by way of, for example, their STAN detected implicit or explicit votes (e.g., uploaded CVi's). In the illustrated example, 75% of participants are voting to indicate positive attitudes toward the user (of computer 100.M), 10% are voting to indicate negative attitudes, and 15% are either not voting or are not expressing above-threshold positive or negative attitudes about the user (where the threshold is predetermined). Each of the left and right sides of sub-panel 193.1*a*' has an expansion tool (e.g., starburst+) that allows the user of tablet computer 100.M to see more details about the displayed attitude numbers (e.g., 75%/10%), for example, why mode specifically are 10% of the voting participants feeling negatively about the user? Do they think he is acting like a room troll? Do they consider him to be a bully, a topic digresser? Something else?

In one embodiment, clicking or otherwise activating the expansion tool (e.g., starburst+) of the Mad/sad face(s) (right side of sub-panel 193.1*a*') automatically causes a multi-colored pie chart (like 113PC) to pop open where the displayed pie chart then breaks the 10% value down into more specific subtotals (e.g., 10%=6%+3%+1%). Hovering over each segment of the pie chart (like that at 113PC) causes a corresponding role icon (e.g., 113*z*6=troll, 113*z*2=primary leadership challenger) in below described tool 113Zt to light up. This tells the user more specifically, how other participants are viewing him/her and voting negatively (or positively) because of that view. Due to space constraints in FIG. 1M, the displayed pie chart 113PC is showing a 12% segment of room participants voting in favor of labeling the user of 100.M as the primary leadership challenger. However, in this example, a greater majority has voted to label the user named "DB" as the primary leadership challenger (113*z*2). With regard to voting, it should be recalled that the STAN_3 system 410 is persistently picking up CVi and/or other vote-indicating signals from in-room users who allow themselves to be monitored (where as illustrated, monitor indicator 112"" is "ON" rather than OFF or ASLEEP). Thus the system servers (not shown in FIG. 1M) are automatically and repeatedly decoding and interpreting the CVi and/or other vote-indicating signals to infer how its users are implicitly (or explicitly) voting with regard to different issues, including with regard to other participants within a chat or other forum participation session that the users are now engaged with. Therefore, even before a user (such as that of tablet computer 100.M) receives a warning like the one (113*d*2B) of FIG. 1I regarding perceived anti-harmony (or other) activity, the user can, if he/she activates the Show-Faces/Backdrops option, can get a sense of how others in the chat or other forum participation session are voting with regard to that user.

Additionally or alternatively, the user may elect to activate a Show-My-Face tool 193.1*a*3 (Your Face). A selected picture or icon dragged from a menu of faces can be representative of the user's current mood or emotional state (e.g., happy, sad, mad, etc.). Interpretation of what mood or emotional state the selected picture or icon represents can be based on the currently active PEEP profile of the user. More specifically, the active PEEP profile (not shown) may include knowledge base rules such as, IF Selected_Face=Happy1 AND Context=At_Home THEN Mood=Calm, Emotion=Content ELSE IF Selected_Face=Happy2 AND Time=Lunch THEN Mood=Glad, Emotion=Happy ELSE . . . The currently active PEEP profile may interact with others of currently active user profiles (see 301*p* of FIG. 3D) to define logical state values within system memory that are indicative of the user's current mood and/or emotional states as expressed by the user through his selecting of a representative face by means of the Show-My-Face tool 193.1*a*3. The currently picked face may then appear in transcript area 193.1*b*' each time that user contributes to the session transcript. For example, the face picture or icon shown at 193.1*b*3 may be the currently selected of the user named Joe. Similar face pictures or icons may appear inside tool 113Zt (to be described shortly). In addition to foreground faces, users may also select various backdrops (animated or still) for expressing their current moods, emotions or contexts. The selected backdrop appears in the transcript area as a backdrop to the selected face. For example, the backdrop (and/or a foredrop) may show a warm cup of coffee to indicate the user is in a warm, perky mood. Or the backdrop may show a cloud over the user's head to indicate the user is under the weather, etc.

Just as individuals may each select a representative face icon and fore/backdrop for themselves, groups of social entities may vote on how to represent themselves with an iconic group portrait or the like. This may appear on the user's computer 100.M as a Your Group's Face image (not shown) similar to the way the Your Face image 193.1*a*3 is displayed. Additionally, groups may express positive and/or negative votes as against each other. More specifically, if the Your Face image 193.1*a*3 was replaced by a Your Group's Face image (not shown), the positive and/or negative percentages in subpanel 193.1*a*2 may be directed to the persona of the Your Group's Face rather than to the persona of the Your Face image 193.1*a*3.

Tool 113Zt includes a theory picking sub-tool 113*zto*. In regard to the picked theory, there is no complete consensus as to what theories and types of room governance schemes and/or explanations of social dynamics are best. The illustrated embodiment allows the governing entities of each room to have a voice in choosing a form of governance (e.g., in a spectrum from one man dictatorial control to free-for-all anarchy, with differing degrees of democracy somewhere along that spectrum). In one embodiment, the system topic space mechanism (see 413' of FIG. 4D) provides special topic nodes that link to so-called governance/social dynamics templates for helping to drive tool 113*zto*. These templates may include the illustrated, room-archetypes template. The illustrated room-archetypes template assumes that there certain types of archetypical personas within each room, including, but not limited to, (1) a primary room discussion leader 113*z*1, (2) a primary challenger 113*z*2 to that leader's leadership, (3) a primary room drifter 113*z*3 who is trying to drift the room's discussion to a new topic, (4) a primary room anchor 113*z*4 who is trying to keep the room's discussion from drifting astray of the current central topic(s) (e.g., 113*x*0 of FIG. 1L), (5) one or more cliques or gangs of persons 113*z*5, (6) one or more primary trolls 113*z*6 and so on (where dots 113*z*8 indicate that the list can go on much farther and in one embodiment, the user can rotate through those additional archetypes).

The illustrated second automated mapping tool 113Zt provides an access window 113*z*TS into a corresponding topic space region (TSR) from where the picked theory and template (e.g., room-archetypes template) was obtained. If the user wishes to do so, the user can double click or otherwise activate any one of the displayed topic nodes within access window 113*z*TS in order to explore that subregion of topic space in greater detail. Also the user can utilize an associated expansion tool (e.g., starburst+) for help and more options. In exploring that portion of the governance/social dynamics area of the system topic space mechanism (see 413' of FIG. 4D), the user may elect to copy therefrom a different social dynamics template and may elect to cause the second automated mapping tool 113Zt to begin using that alternate template and its associated knowledge base rules. Moreover, the user can deploy a drag-and-drop operation 114*dnd* to drag a copy of the topic-representing circle into a name or unnamed serving plate of tray 102 where the dragged-and-dropped item automatically converts into an invitations generating object that starts compiling for its zone, invitations to on-topic chat or other forum participation opportunities. (This feature will be described in greater detail in conjunction with FIG. 1N.)

When determining who specifically is to be displayed by tool as the current room discussion leader (archetype 113*z*1), any of a variety of user selectable methods can be used ranging from the user manually identifying each based on his own subjective opinion to having the STAN_3 system 410 provide automated suggestions as to which participant or group of room participants fits into each role and allowing authorized room members to vote implicitly or explicitly on those choices.

The entity holding the room leadership role may be automatically determined by testing the transcript and/or other CFi's collected from potential candidates for traits such as current assertiveness. Each person's assertiveness may be accessed on an automated basis by picking up inferencing clues from their current tone of voice if the forum includes live audio or from the tone of speaking present in their text output, where the person's PEEP file may reveal certain phrases or tonality that indicate an assertive or leadership role being undertaken by the person. A person's current assertiveness attribute may be automatically determined based on any one or more of objectively measured factors including for example: (a) Assertiveness based on total amount of chat text entered by the person, where a comparatively high number indicates a very vocal person; (b) Assertiveness based on total amount of chat text entered compared to the amount of text entered by others in the same chat room, where a comparatively low number may indicate a less vocal person or even one who is merely a lurker/silent watcher in the room; (c) Assertiveness based on total amount of chat text entered compared to the amount of time spent otherwise surfing online, where a comparatively high number (e.g., ratio) may indicate the person talks more than they research while a low number may indicate the person is well informed and accurate when they talk; (d) Assertiveness based on the percentage of all capital letter words used by the person (understood to denote shouting in online text stream) where the counted words should be ones identified in a computer readable dictionary or other lists as being ones not likely to be capitalized acronyms used in specific fields; (e) Assertiveness or leadership role based on the percentage of times that this user (versus a baseline for the group) is the initial one in the chat room or is the first one in the chat room to suggest a topic change which is agreed to with little debate from others (indicating a group recognized leader); (f) Lower assertiveness or sub-leadership role based on the percentage of times this user is the one in the chat room agreeing to and echoing a topic change (a yes-man) after some other user (the prime leader) suggested it; (g) Assertiveness or leadership role based on the percentage of times this user's suggested topic change was followed by a majority of other users in the room; (h) Assertiveness or leadership role based on the percentage of times this user is the one in the chat room first urging against a topic change and the majority group sides with him instead of with the want-to-be room drifter; (i) Assertiveness or leadership role based on the percentage of times this user votes in line with the governing majority on any issue including for example to keep or change a topic or expel another from the room or to chastise a person for being an apparent troll, bully or other despised social archetype (where inline voting may indicate a follower rather than a leader and thus leadership role determination may require more factors than just this one); (j) Assertiveness or leadership role based on automated detection of key words or phrases that, in accordance with the user's PEEP or PHAFUAL profile files indicate social posturing within a group (e.g., phrases such as "please don't interrupt me", "if I may be so bold as to suggest", "no way", "everyone else here sees you are wrong", etc.).

The labels or Archetype Names (113zAN) used for each archetype role may vary depending on the archetype template chosen. Aside from "troll" (113z6) or "bully" (113z7) many other kinds of role definitions may be used such as but not limited to, lurker, choir-member, soft-influencer, strong-influencer, gang or clique leader, gang or clique member, topic drifter, rebel, digresser, head of the loyal opposition, etc. Aside from the exemplary knowledge base rules provided immediately above for automatically determining degree of assertiveness or leadership/followship, many alternate knowledge base rules may be used for automatically determining degree of fit in one type of social dynamics role or another. As already mentioned, it is left up to room members to pick the social dynamics defining templates they believe in and the corresponding knowledge base rules to be used therewith and to directly or indirectly identify both to the social dynamics theory picking tool 113zto, whereafter the social dynamics mapping tool 113Zt generates corresponding graphics for display on the user's screen 111. The chosen social dynamics defining templates and corresponding knowledge base rules may be obtained from template/rules holding content nodes that link to corresponding topic nodes in the social-dynamics topic space subregions (e.g., You are here 113zTS) maintained by the system topic space mechanism (see 413' of FIG. 4D), or they may be obtained from other system-approved sources (e.g., out-of-STAN other platforms).

The example given in FIG. 1M is just a glimpse of bigger perspective. Social interactions between people and playable-roles assumed by people may be analyzed at any of an almost limitless number of levels. More specifically, one analysis may consider interactions only between isolated pairs of people while another may consider interactions between pairs of pairs and/or within triads of persons or pairs of triads and so on. This is somewhat akin to studying physical matter and focusing the resolution to just simple two-atom compounds or three, four, . . . N-atom compounds or interactions between pairs, triads, etc. of compounds and continuing the scaling from atomic level to micro-structure level (e.g., amorphous versus crystalline structures) and even beyond until one is considering galaxies or even more astronomical entities. In similar fashion, when it comes to interactions between social entities, the granularity of the social dynamics theory and the associated knowledge base rules used therewith can span through the concepts of small-sized private chat rooms (e.g., 2-5 participants) to tribes, cultures, nations, etc. and the various possible interactions between these more-macro-scaled social entities (e.g., tribe to tribe). Large numbers of such social dynamics theories and associated knowledge base rules may be added to and stored in or modified after accumulation within the social-dynamics topic space subregions (e.g., 113zTS) maintained by the system topic space mechanism (see 413' of FIG. 4D) or by other system-approved sources (e.g., out-of-STAN other platforms) and thus an adaptive and robust method for keeping up with the latest theories or developing even newer ones is provided by creating a feedback loop between the STAN_3 topic space and the social dynamics monitoring and controlling tools (e.g., monitored by 113Zt and controlled by who gets warned or kicked out afterwards because tool 113Zt identified them as "troll", etc.—see 113d2B of FIG. 1I).

Still referring to FIG. 1M, at the center of the illustrated subtexts topics mapping tool (e.g., social dynamics mapping tool) 113Zt, a user-rotatable dial or pointer 113z00 may be provided for pointing to one or a next of the displayed social dynamics roles (e.g., number one bully 113z7) and seeing how one social entity (e.g., Bill) got assigned to that role as opposed to other members of the room. More specifically, it is assumed in the illustrated example that another participant named Brent (see the heats meter 113zH) could instead have been identified for that role. However the role-fitting heats meter 113zH indicates that Bill has greater heat at the moment for being pigeon-holed into that named role than does Brent. At a later point in time, Brent's role-matching heat score may rise above that of Bill's and then in that case, the entity identifying name (113zEN) displayed for role 113z7 (which role in this example has the role identifying name (Actor Name) 113zAN of #1 Bully) would be Brent rather than Bill.

The role-fitting heat score (see meter 113zH) given to each room member may be one that is formulated entirely automatically by using knowledge base rules and an automated knowledge base rules, data processing engine or it may be one that is subjectively generated by a room dictator or it may be one that is produced on the basis of automatically generated first scores being refined (slightly modulated) by votes cast implicitly or explicitly by authorized room members. For example, an automated knowledge base rules using, data processing engine (not shown) within system 410 may determine that "Bill" is the number one room bully. However a room oversight committee might downgrade Bill's bully score by an amount within an allowed and predetermined range and the oversight committee might upgrade Brent's bully score by an amount so that after the adjustment by the human overseers, Brent rather than Bill is displayed as being the current number one room bully.

Referring momentarily to FIG. 3D (it will be revisited later), in the bigger scheme of things, each STAN user (e.g., 301A') is his or her own "context" for the words or phrases (301w) that verbally or otherwise emerge from that user. The user's physical context 301x is also part of the context. The user's demographic context is also part of the context. In one embodiment, current status pointers for each user may point to complex combinations of context primitives (see FIG. 3H for examples of different kinds of primitives) in a user's context space map (see 316" of FIG. 3D s an example of a context mapping mechanism). The user's PEEP and/or other profiles 301p are picked based on the user's log-in persona and/or based on initial determinations of context (signal 3160) and the picked profiles 301p add spin to the verbal (or other) output CFi's 302' subsequently emerging from that user for thereby more clearly resolving what the user's current context is in context space (316" of FIG. 3D). More specifically and purely as an example, one user may output a CFi string sequence of the form, "IIRC". That user's then-active PEEP profile (301p) may indicate that such an acronym string ("IIRC") is usually intended by that user in the current surrounds and circumstances (301x plus 316o) to mean, "If I Recall Correctly" (IIRC). On the other hand, for another user and/or her then-active PEEP profile, the same acronym-type character string ("IIRC") may be indicated as usually being intended by that second user in her current surrounds (301$x$) to mean, International Inventors Rights Center (a hypothetical example). In other words, same words, phrases, character strings, graphic illustrations or other CFi-carried streams (and/or CVi streams) of respective STAN users can indicate different things based on who the person (301A') is, based on what is picked as their currently-active PEEP and/or other profiles (301$p$, i.e. including their currently active PHAFUEL profile), based on their detected current physical surrounds and circumstances 301$x$ and so on. So when a given chat room participant outputs a contribution stream such as: "What about X?", "How about Y?", "Did you see Z?", etc. where here the nearby other words/phrases relate to a sub-topic determined by the domain-lookup servers (DLUX) for that user and the user's currently active profiles indicate that the given user usually employs such phraseology when trying to steer a chat towards the adjacent sub-topic, the system 410 can make an automated determination that the user is trying to steer the current chat towards the sub-topic and therefore that user is in an assumed role of 'driving' (using the metaphor of FIG. 1L) or digressing towards that subtopic. In one embodiment, the system 410 includes a computer-readable Thesaurus (not shown) for social dynamics affecting phrases (e.g., "Please let's stick to the topic") and substantially equivalent ones of such phrases (in English and/or other languages) where these are automatically converted via a first lookup table (LUT) that logical links with the Thesaurus to corresponding meta-language codes for the equivalent phrases. Then a second lookup table (LUT2, not shown) that receives as an input the user's current mood, or other states, automatically selects one of the possible meta codes as the most likely meta-coded meaning or intent of the user under the existing circumstances. The third lookup table (LUT3, not shown) that receives the selected meta-coded meaning signal converts the latter into a pointing vector signal 312$v$ that can be used to ultimately point to a corresponding one or more nodes in a social dynamics subregion (Ss) of the system topic space mechanism (see 413' of FIG. 4D). However, as mentioned above, it is too soon to explain all this and these aspects will be detailed to a greater extent later below. In one embodiment, the user's, machine-readable profiles include not only CpCCp's (Current personhood-based Chat Compatibility Profiles), DsCCp's (domain specific co-compatibilities), PEEP's (personal emotion expression profiles), and PHAFUEL's (personal habits and . . . ), but also personal social dynamics interaction profiles (PSDIP's) where the latter include lookup tables (LUTs) for converting meta-coded meaning signals into vector signals that ultimately point to most likely nodes in a social dynamics subregion (Ss).

Examples of other words/phrases that may relate to room dynamics may include: "Let's get back to", "Let's stick with", etc and when these are found by the system 410 to be near words/phrases related to the then primary topic(s) of the room, the system 410 can determine with good likelihood that the corresponding user is acting in the role of a topic anchor who does not want to change the topic. At minimum, it can be one more factor included in knowledge base determination of the heat attributed to that user for the role of room anchor or room leader or otherwise.

Other roles that may be of value for determining where room dynamics are heading is by identifying entities who fit into the role of primary trend setters, where votes by the latter are given greater weight than votes by in-room personas who are not deemed to be as influential as are the primary trend setters. In one embodiment, the votes of the primary trend setters are further weighted by their topic-specific credentials and reputations (DsCCp profiles). In one embodiment, if the votes of the primary trend setters do not establish a supermajority (e.g., at least 60% of the weighted vote), the system either automatically bifurcates the room into two or more corresponding rooms each with its own clustered coalition of trend setters or at least it proposes such a split to the in-room participants and then they vote on the automatically provided proposition. In this way the system can keep social harmony within its rooms rather than letting debates over the next direction of the room discussion overtake the primary substantive topic(s) of discussion. In one embodiment, the demographic and other preferences identified in each user's active CpCCp (Current personhood-based Chat Compatibility Profile) are used to determine most likely social dynamics for the room. For example, if the room is mostly populated by Generation X people, then common attributes assigned to such Generation X people may be thrown in as a factor for automatically determining most likely social dynamics of the room. Of course, there can be exceptions; for example if the in-room Generation X people are rebels relative to their own generation, and so on.

One important aspect of trying to maintain social harmony in the STAN-system maintained forums is to try and keep a good balance of active listeners and active talkers. This does not mean that all participants must be agreeing with each other. Rather it means that the persons who are matched up for starting a new room are a substantially balanced group of active listeners and active talkers. Ideally, each person would have a 50%/50% balance as between preferring to be an active talker and being an active listener. But the real world doesn't work out as smoothly as that. Some people are very aggressive or vocal and have tendencies towards say, 90% talker and 10% (or less) active listener. Some people are very reserved and have tendencies towards say, 90% active listener and 10% (or less) active talker. If everyone is for most part a 90% talker and only a 1% listener, the exchanges in the room will likely not result in any advancement of understanding and insight; just a lot of people in a room all basically talking to themselves merely for the pleasure of hearing their own voices (even if in the form of just text). On the other hand, if everyone in the room is for most part a 90% listener (and not necessarily an "active" listener but rather merely a "lurker") and only a 1% talker, then progress in the room will also not likely move fast or anywhere at all. So the STAN_3 system 410 in one embodiment thereof, includes a listener/talker recipe mixing engine (not shown) that automatically determines from the then-active CpCCp's, DsCCp's, PEEP's, PHAFUEL's (personal habits and routines log), and PSDIP's (Personal Social Dynamics Interaction Profiles) of STAN users who are candidates for being collectively invited into a chat or other forum participation opportunity, which combinations of potential invitees will result in a relatively harmonious mix of active talkers (e.g., texters) and active listeners (e.g., readers). The preceding applies to topics that draw many participants (e.g., hundreds). Of course if the candidate population for peopling a room directed to an esoteric topic is sparse, then a beggars can't be choosers approach is adopted and the invited STAN users for that nascent room will likely be all the potential candidates except that super-trolls (100% ranting talker, 0% listener) may still be automatically excluded from the invitations list. In a more sophisticated invitations mix generating engine, not only are the habitual talker versus active/passive listeners tendencies of candidates considered but also the leader, follower, rebel and other such tendencies are also automatically factored in by the engine. A room that has just one leader and a passive choir being sung to by that one leader can be quite dull. But throw in the "spice" of a rebel or two (e.g., loyal or disloyal opposition) and the flavor of the room dynamics is greatly enhanced. Accordingly, the social mixing engine that automatically composes invitations to would-be-participants of each STAN-spawned room has a set of predetermined social mix recipes it draws from in order to make each party "interesting" but not too interesting (not to the point of fostering social breakdown and complete disharmony).

Figure 5C:
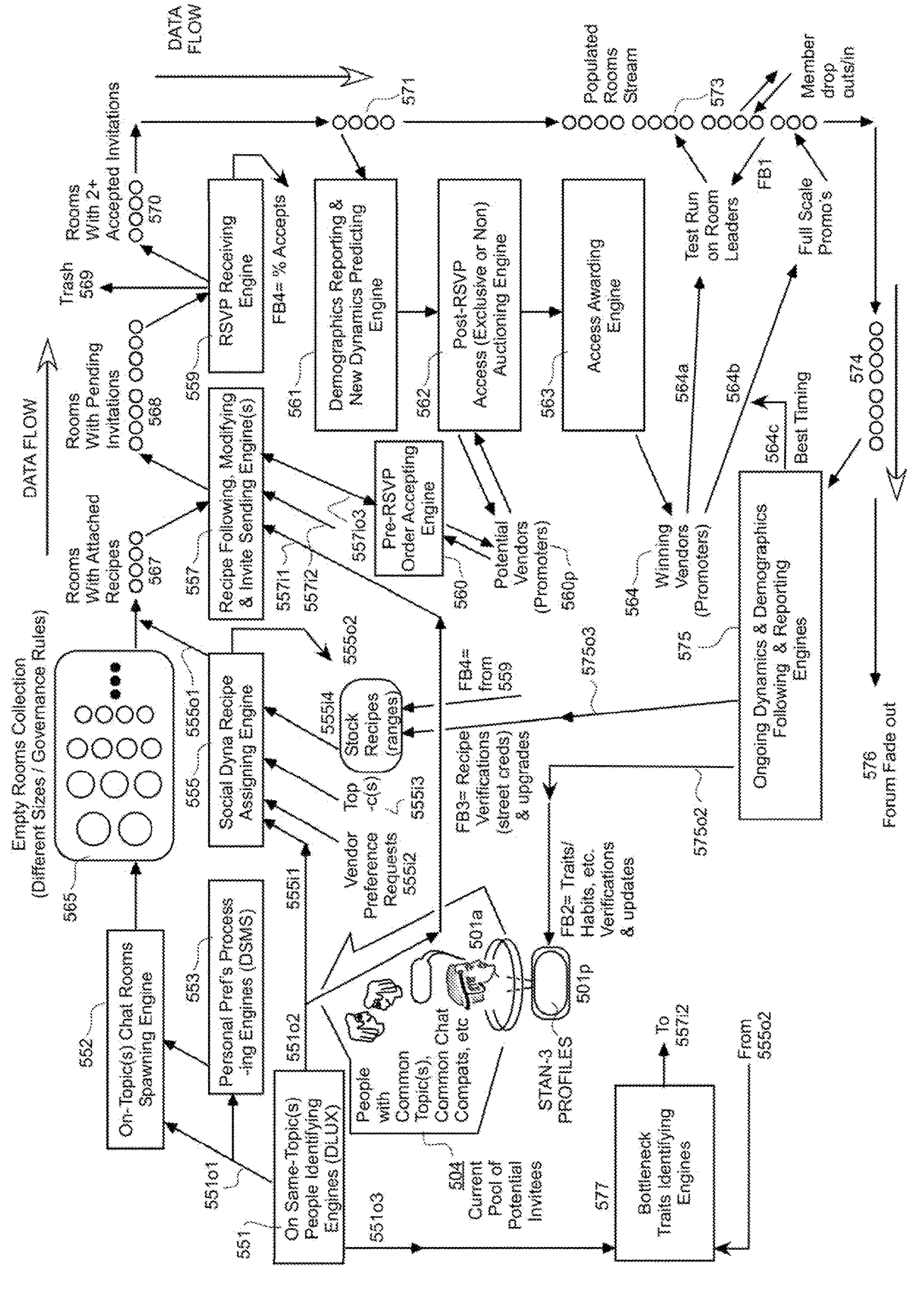
FIG. 5C is a block diagram of a social dynamics aware system that automatically populates chat or other forum participation opportunity spaces in an assembly line fashion with various types of social entities based on predetermined or variably adaptive social dynamic recipes.

Although in one embodiment, the social mixing engine (described elsewhere herein—see 555-557 of FIG. 5C) that automatically composes invitations to would-be-participants is structured to generate mixing recipes that make each in-room party ("party" in a manner of speaking) more "interesting", it is within the contemplation of the present disclosure that the nascent room mix can be targeted for additional or other purposes, such as to try and generate a room mix that would, as a group, welcome certain targeted promotional offerings (described elsewhere herein—see 555*i*2 of FIG. 5C). More specifically, the active CpCCp's (Current personhood-based Chat Compatibility Profiles) of potential invitees (into a STAN_3 spawned room) may include information about income and spending tendencies of the various players (assuming the people agree to share such information, which they don't have to). In that case, the social cocktail mixing engine (555-557) may be commanded to use a recipe and/or recipe modifications (e.g., different spices) that try to assemble a social group fitting into a certain age, income and/or spending categorizing range. In other words, the invited guests to the STAN_3 spawned room will not only have a better than fair likelihood of having one or more of their top N current topics in common and having good co-compatibilities with one another, but also of welcoming promotional offerings targeted to their age, gender, income and/or spending (and/or other) demographically common attributes. In one embodiment, if the users so allow, the STAN_3 system creates and stores in it database, personal histories of the users including past purchase records and past positive or negative reactions to different kinds of marketing promotion attempts. The system tries to automatically cluster together into each spawned forum, people who have similar such records so they form a collective group that has exhibited a readiness to welcome certain kinds of marketing promotion attempts. Then the system automatically offers up the about-to-be formed social group to correspondingly matching marketers where the latter bid for exclusive or nonexclusive access (but limited in number of permitted marketers and number of permitted promotions—see 562 of FIG. 5C) to the forming chat room or other such STAN_3 spawned forum. In one embodiment, before a planned marketing promotion attempt is made to the group as a whole, it is automatically run by in private before the then reigning discussion leader for his approval and/or commenting upon. If the leader provides negative feedback in private (see FB1 of FIG. 5C), then the planned marketing promotion attempt is not carried out. The group leader's reactions can be explicit or implicitly voted on (with CVi's) reactions. In other words, the group leader does not have to explicitly respond to any explicit survey. Instead, the system uses its biometrically directed sensors (where available) to infer what the leader's visceral and emotional reactions are to each planned marketing promotion attempt. Often this can be more effective than asking the leader to respond out right because a person's subconscious reactions usually are more accurate than their consciously expressed (and consciously censored) reactions.

Referring next to FIG. 1J, shown here is another graphical user interface (GUI) option where the user is presented with an image 190*a* of a street map and a locations identification selection tool 190*b*. In the illustrated example, the street map 190*b* has been automatically selected by the system 410 through use of the built in GPS location determining subsystem (not shown, or other such location determiner) of the tablet computer 100''' as well as an automated system determination of what the user's current context is (e.g., on vacation, on a business trip, etc.). If the user prefers a different kind of map than the one 190*b* the system has chosen based on these factors, the user may click or otherwise activate a show-other-map/format option 190*c*. As with others of the GUI's illustrated herein, one or more of the selection options presented to the user may include expansion tools (e.g., 190*b*+) for presenting more detailed explanations and/or further options to the user.

One or more pointer bubbles, 190*p*.1, 190*p*.2, etc. are displayed on or adjacent to the displayed map 190*a*. The pointer bubbles, 190*p*1., 190*p*.2, etc. point places on the map (e.g., 190*a*.1, 190*a*.3) where on-topic events are already occurring (e.g., on-topic conference 190*p*.4) and/or where on-topic events may soon be caused to occur (e.g., good meeting place for topic(s) of bubble 190*p*.1). The displayed bubbles, 190*p*.1, 190*p*.2, etc. are all, or for the most part, ones directed to topics that satisfy the filtering criteria indicated by the selection tool 190*b* (e.g., a displayed filtering criteria box). In the illustrated example, My Top 5 Topics implies that these are the top 5 topics the user is currently deemed to be focusing-upon by the STAN_3 system 410. The user may click or otherwise activate a more menus options arrow (down arrow in box 190*b*) to see and select other more popular options of his or of the system 410. Alternatively, if the user wants more flexible and complex selection tool options, the user use the associated expansion tool 190*b*+. Examples of other "filter by" menu options that can be accessed by way of the menus options arrow may include: My next 5 top topics, My best friends' 5 top topics, My favorite group's 3 top topics, and so on. Activation of the expansion tool (e.g., 190*b*+) also reveals to the user more specifics about what the names and further attributes are of the selected filter category (My Top 5 Topics, My best friends' 5 top topics, etc.). When the user activates one of the other "filter by" choices, the pointer bubbles and the places on the map they point to automatically change to satisfy the new criteria. The map 190*a* may also change in terms of zoom factor, central location and/or format so as to correspond with the newly chosen criteria and perhaps also in response to an intervening change of context for the user of computer 100'''.

Referring to the specifics of the top left pointer bubble, 190*p*.1 as an example, this one is pointing out a possible meeting place where a not-yet-fully-arranged, real life (ReL) meeting may soon take place between like-minded STAN users. First, the system 410 has automatically located for the user of tablet computer 100''', neighboring other users 190*a*.12, 190*a*.13, etc. who happen to be situated in a timely reachable radius relative to the possible meeting place 190*a*.1. Needless to say, the user of computer 100''' is also situated within the timely reachable radius 190*a*.11. By timely reachable, what is meant here is that the respective users have various modes of transportation available to them (e.g., taxi, bus, train, walking, etc.) for reaching the planned destination 190*a*.1 within a reasonable amount of time such that the meeting and its intended outcome can take place and such that the invited participants can thereafter make any subsequent deadlines indicated on their respective computer calendars/schedules.

In one embodiment, the user of computer 100''' can click or otherwise activate an expansion tool (e.g., a plus sign starburst like 190*b*+) adjacent to a displayed icon of each invited other user to get additional information about their exact location or other situation, to optionally locate their current mobile telephone number or other communication access mean and to thereby call/contact the corresponding user so as to better coordinate the meeting, including its timing, venue and planned topic(s) of discussion.

Once an acceptable quorum number of invitees have agreed to the venue, as to the timing and/or the topics; one of them may volunteer to act as coordinator (social leader) and to make a reservation at the chosen location (e.g., restaurant) and to confirm with the other STAN users that they will be there. In one embodiment, the system 410 automatically facilitates one or more of the meeting arranging steps by, for example automatically suggesting who should act as the meeting coordinator/leader (e.g., because that person can get to the venue before all others and he or she is a relatively assertive person), automatically contacting the chosen location (e.g., restaurant) via an online reservation making system or otherwise to begin or expedite the reservation making process and automatically confirming with all that they are committed to attending the meeting and agreeable to the planned topic(s) of discussion. In short; if by happenstance the user of computer 100''' is located within timely radius (e.g., 190*a*.11) of a likely to be agreeable to all venue 190*a*.1 and other socially co-compatible other STAN users also happen to be located within timely radius of the same location and they are all likely agreeable to lunching together, or having coffee together, etc. and possibly otherwise meeting with regard to one or more currently focused-upon topics of commonality (e.g., they all share in common three topics which topics are members of their personal top 5 current topics of focus), then the STAN_3 system 410 automatically starts to bring the group of previously separated persons together for a mutually beneficial get together. Instead of each eating alone (as an example) they eat together and engage socially with one another and perhaps enrich one another with news, insights or other contributions regarding a topic of common and currently shared focus. In one embodiment, various ones of the social cocktail mixing attributes discussed above in conjunction with FIG. 1M for forming online exchange groups also apply to forming real life (ReL) social gatherings (e.g., 190*p*.1).

Still referring to proposed meeting location 190*a*.1 of FIG. 1J, sometimes it turns out that there are several viable meeting places within the timely reachable radii (e.g., 190*a*.11) of all the likely-to attend invitees (190*a*.12, 190*a*.13, etc.). This may be particularly true for a densely populated business district (e.g., downtown of a city) where many vendors offer their facilities to the general public for conducting meetings there, eating there, drinking there, and so on. In this case, once the STAN_3 system 410 has begun to automatically bring together the likely-to attend invitees (190*a*.12, 190*a*.13, etc.), the system 410 has basically created a group of potential customers that can be served up to the local business establishments for bidding/auctioning upon by one or more means. In one embodiment, the bidding for customers takes the form of presenting enticing discounts or other offers to the would-be customers. For example, one merchant may present a promotional marketing offer as follows: If you schedule your meeting now at our Italian Restaurant, we will give you 15% off on our lunch specials. In one embodiment, a pre-auctioning phase takes place before the promotional offerings can be made to the nascent and not-yet-meeting group (190*a*.12, 190*a*.13, etc.). In that embodiment, the number of promotional offerings (190*q*.1, 190*q*.2) that are allowed to be displayed in offerings tray 104' (or elsewhere) is limited to a predetermined number, say no more than 2 or 3. However, if more than that number of local business establishments want to send their respective promotions to the nascent meeting group (190*a*.12, 190*a*.13, etc.), they first bid as against each other for the number 1, 2 and/or 3 promotional offerings spots (e.g., 190*q*.1, 190*q*.2) in tray 104' and the proceeds of that pre-auctioning phase go to the operators of the STAN_3 system 410 or to another organization that manages the auctioning process. The amount of bid that a local business establishment may be willing to spend to gain exclusive access to the number 1 promotional offering spot (190.*q*1) on tray 104' may be a function of how large the nascent meeting group is (e.g., 10 participants as opposed to just two); whether the members of the nascent group are expected to be big spenders and/or repeat customers and so on. In one embodiment, the STAN_3 system 410 automatically shares sharable information (information which the target participants have pre-approved as being sharable) with the potential offerrors/bidders so as to aid the potential offerrors/bidders (e.g., local business establishments) with making informed decisions about whether to bid or make a promotional offering and if so at what cost. Such a system can be win-win for both the nascent meeting group (190*a*.12, 190*a*.13, etc.) and the local restaurants or other local business establishments because the about-to-meet STAN users (190*a*.12, 190*a*.13, etc.) get to consider the best promotional offerings before deciding on a final meeting place 190*a*.1 and the local business establishments get to consider, as they fill up the seatings for their lunch business crowd or other event among a possible plurality of nascent meeting groups (not only the one fully shown as 190.*p*1, but also 190*p*.2 and others not shown) to thereby determine which combinations of nascent groups best fits with the vendors capabilities and desires. More specifically, a business establishment that serves alcohol may want to vie for those among the possible meeting groups (e.g., 190*p*.1, 190*p*.2, etc.) whose shamble profiles indicate their members tend to spend large amounts of money for alcohol (e.g., good quality beer as an example) during such meetings.

Still referring to FIG. 1J and the proposed in-person meeting bubble 190*p*.1, optional headings and/or subheadings that may appear within that displayed bubble can include: (1) the name of a proposed meeting venue or meeting area (e.g., uptown) together with an associated expansion tool that provides more detailed information; (2) an indication of which other STAN users are nearby together with an associated expansion tool that provides more detailed information about the situation of each; (3) an indication of which topics are common as currently focused-upon ones as between the proposed participants (user of 100'''' plus 190*a*.12, 109*a*.13, etc.) together with an associated expansion tool that provides more detailed information about the same; (4) an indication of which "subtext" topics (see above discussion re FIG. 1M) might be engaged in during the proposed meeting together with an associated expansion tool that provides more detailed information; and (5) a more button or expansion tool that provides yet more information if available and for the user to view if he so wishes.

A second nascent meeting group bubble 190*p*.2 is shown in FIG. 1J as pointing to a different venue location and as corresponding to a different nascent group (Grp No. 2). In one embodiment, the user of computer 100''' may have a choice of joining with the participants of the second nascent group (Grp No. 2) instead of the with the participants of the first nascent group (Grp No. 1) based on the user's mood, convenience, knowledge of which other STAN users have been invited to each, which topic or topics are planned to be discussed, and so on. In one variation, both of nascent meeting group bubbles 190*p*.1 and 190*p*.2 point to a same business district or other such general location and each group receives a different set of discount enticements or other marketing promotions from local merchants. More specifically, Grp No. 1 (of bubble 190*p*.1) may receive an enticing and exclusive offer from a local Italian Restaurant (e.g., free glass of champagne for each member of the group) while Grp No. 2 (of bubble 190*p*.2) receives a different offer of enticement or just a normal advertisement from a local Chinese Restaurant; but the user (of 100''') is more in the mood for Chinese food than for Italian now and therefore he says yes to invitation bubble 190*p*.2 and no to invitation bubble 190*p*.1. This of course is just an illustrative example of how the system can work.

Contents within the respective pointer bubbles (e.g., 190*p*.3, 190*p*.4, etc.) of each event may vary depending on the nature of the event. For example, if the event is already a definite one (e.g., scheduled baseball game in the location identified by 190*p*.3) then of course, some of the query data provided in bubble 190*p*.1 (e.g., who is likely to be nearby and likely to agree to attend?) may not be applicable. On the other hand, the alternate event may have its own, event-specific query data (e.g., who has RSVP'ed in bubble 190.5) for the user to look at. In one embodiment, clicking or otherwise activating venue representing icons like 190*a*.3 automatically provides the user with a street level photograph of the venue and it surrounding neighborhood (e.g., nearby landmarks) so as to help the user get to the meeting place.

Referring to FIG. 1K, shown here is another smartphone and tablet computer compatible user interface method 100'''' for presenting an M out of N common topics and optional location based chat or other joinder opportunities to users of the STAN_3 system. More specifically, in its normal mode of display when using this M out of N GUI presentation 100'''', the left columnful of information 192 would not be visible except for a deminimize tool that is the counter opposite of illustrated Hide tool 192.0. However, for the sake of better understanding what is being displayed in right column 193, the settings column 192 is also shown in FIG. 1K in deminimized form.

It can be a common occurrence for some users of the STAN_3 system 410 to find themselves alone and bored or curious while they wait for a next, in-real life (ReL) event; such as meeting with habitually-late friend at a coffee shop. In such a situation, the user will often have only his or her small-sized PDA or smart cellphone with them. The latter device may have a relatively small display screen 111''''. As such, the device compatible user interface (GUI 100'''' of FIG. 1K) is preferably kept simple and intuitive. When the user flips open or otherwise activates his/her device 100'''', a single Instan-Chat™ participation opportunities stack 193.1 automatically appears in the one displayed column 193 (192 is minimized). By clicking or otherwise activating the Chat Now button of the topmost displayed card of stack 193.1, the user is automatically connected with a corresponding and now-forming chat group or other such forum participation opportunity (e.g., live web conference). There is no waiting for the system 410 to monitor and figure out what topic or topics the user is currently most likely focused-upon based on current click streams or the like (CFi's, CVi's, etc.). The interests monitor 112'''' is turned off in this instance, but the user is nonetheless logged into the STAN_3 system 410. The system 410 remembers what top 5 topics were last the current top 5 topics of focus for the user and assumes that the same are also now the top 5 topics which the user remains currently focused-upon. If the user wants to see what those most recent top 5 topics are, the user can click or otherwise activate expansion tool 193.*h*+ for more information and for the option of quickly switching to a previous one of a set of system recalled lists of current top 5 topics that the user was previously focused-upon at earlier times. The user can quickly click on one of those and thus switch to a different set of top 5 topics. Alternatively, if the user has time, the user may manually define a new collection of current top 5 topics that the user feels he/she is currently focused-upon. In an alternate embodiment, the system 410 uses the current detected context of the user (e.g., sitting at favorite coffee shop) to automatically pick a likely current top 5 topics for the user. More specifically, if the GPS subsystem indicates the user is stuck on metered on ramp to a backed up Los Angeles highway, the system 410 may automatically determine that the user's current top 5 topics include one regarding the over-crowded roadways and how mad he is about the situation. On the other hand, if the GPS subsystem indicates the user is in the bookstore (and optionally more specifically, in the science fiction aisle of the store), the system 410 may automatically determine that the user's current top 5 topics include one regarding new books (e.g., science fiction books) that his book club friends might recommend to him. Of course, it is within the contemplation of the present disclosure that the number of top N topics to be used for the given user can be a value other than N=5, for example 1, 2, 3 or 10 as example alternatives.

Accordingly, if the user has approximately 5 to 15 minutes or more of spare time and the user wishes to instantly join into an interesting online chat or other forum participation opportunity, the one Instan-Chat™ participation opportunities stack 193.1 automatically provides the user with a simple interface for entering such a group participation forum with a single click or other such activation. In one embodiment, a context determining module of the system 410 automatically determines what card the user will most likely want to be first presented with this Instan-Chat™ participation interface when opening his/her smart cellphone (e.g., because the system 410 has detected that the user is in a car and stuck on the zero speed on-ramp to a backed-up Los Angeles freeway for example). Alternatively, the user may utilize the Layer-Vator tool 113'''' to virtually take himself to a metaphorical virtual floor that contains the Instan-Chat™ participation interface of FIG. 1K. In one embodiment, the Layer-Vator tool 113'''' includes a My 5 Favorite Floors menu option and the user can position the illustrated Instan-Chat™ participation interface floor as one of his top 5 favorite interface floors. The map-based interface of FIG. 1J can be another of the user's top 5 favorite interface floors. The multiple card stacks interface of FIG. 1I can be another of the user's top 5 favorite interface floors. The same can be true for the more generalized GUI of FIG. 1A. The user may also have a longer, My Next 10 Favorite Floors menu option as a clickable or otherwise activateable option button on his elevator control panel where the longer list includes one or more on-topic community boards such as that of FIG. 1G as a choosable floor to instantly go to.

Still referring to FIG. 1K, the user can quickly click or otherwise activate the shuffle down tool if the user does not like the topmost functional card displayed on stack 193.1. Similar to the interface options provided in FIG. 1I, the user can query for more information about any one group. The user can activate a "Show Heats" tool 193.1*p*. As shown at 193.1, the tool displays relative heats as between representative users already in or also invited to the forum and the heats they are currently casting on topics that happen to be the top 5, currently focused-upon topics of the user of device 100"". In the illustrated example, each of the two other users has above threshold heat on 3 of those top 5 topics, although not on the same 3 out of 5. The idea is that, if the system 410 finds people who share current focus on same topics, they will likely want to chat or otherwise engage with each other in a Notes Exchange session (e.g., web conference, chat, micro-blog, etc.).

Column 192 shows examples of default and other settings that the user may have established for controlling what quick chat or other quick forum participation opportunities will be presented for example visually in column 193. (In an alternate embodiment, the opportunities can be presented by way of a voice and/or music driven automated announcement system that responds to voice commands and/or haptic/muscle based and/or gesture-based commands of the user.) More specifically, menu box 192.2 allows the user to select the approximate duration of his intended participation within the chat or other forum participation opportunities. The expected duration can alter the nature of which topics are offered as possibilities, which other users are co-invited into or are already present in the forum and what the nature of the forum will be (e.g., short micro-tweets as opposed to lengthy blog entries). It may be detrimental to room harmony and/or social dynamics if some users need to exit in less than 5 minutes and plan on only superficial comments while others had hopes for a 30 minute in depth exchange of non-superficial ideas. Therefore, and in accordance with one aspect of the present disclosure, the STAN_3 system 410 automatically spawns empty chat rooms that have certain room attributes pre-attached to the room; for example, an attribute indicating that this room is dedicated to STAN users who plan to be in and out in 5 minutes or less as opposed to a second attribute indicating that this room is dedicated to STAN users who plan to participate for substantially longer than 5 minutes and who desire to have alike other users join in for a more in depth discussion (or other Notes Exchange session) directed the one or more out current top N topics of the those users.

Another menu box 192.3 in the usually hidden settings column 192 shows a method by which the user may signal a certain mood of his (or hers). For example, if a first user currently feels happy (joyous) and wants to share his/her current feelings with empathetic others among the currently online population of STAN users, the first user may click or otherwise activate a radio button indicating the user is happy and wants to share. It may be detrimental to room harmony and/or social dynamics if some users are not in a co-sympathetic mood, don't want to hear happy talk at the moment from another (because perhaps the joy of another may make them more miserable) and therefore will exit the room immediately upon detecting the then-unwelcomed mood of a fellow online roommate. Therefore, and in accordance with one aspect of the present disclosure, the STAN_3 system 410 automatically spawns empty chat rooms that have certain room attributes pre-attached to the room; for example, an attribute indicating that this room is dedicated to STAN users who plan to share happy or joyous thoughts with one another (e.g., I just fell in love with the most wonderful person in the world and I want to share the feeling with others). By contrast, another empty room that is automatically spawned by the system 410 for purpose of being populated by short term (quick chat) users can have an opposed attribute indicating that this room is dedicated to STAN users who plan to commiserate with one another (e.g., I just broke up with my significant other, or I just lost my job, or both, etc.). Such, attribute-pretagged empty chat or other forum participation spaces are then matched with current quick chat candidates who have correspondingly identified themselves as being currently happy, miserable, etc.; as having 2, 5, 10, 15 minutes, etc. of spare time to engage in a quick online chat or other Notes Exchange session of like situated STAN users where the other STAN users share one or more topics of currently focused-upon interest with each other.

As yet another example, the third menu box 192.4 in the usually hidden settings column 192 shows a method by which the user may signal a certain other attribute that he or she desires of the chat or other forum participation opportunities presented to him/her. In this merely illustrative case, the user indicates a preference for being matched into a room with other co-compatibles who are situated within a 5 mile radius of where that user is located. One possible reason for desiring this is that the subsequently joined together chatterers may want to discuss a recent local event (e.g., a current traffic jam, a fire, a felt earthquake, etc.). Another possible reason for desiring this is that the subsequently joined together chatterers may want to entertain the possibility of physically getting together in real life (ReL) if the initial discussions go well. This kind of quick-discussion group creating mechanism allows people who would otherwise be bored for the next N minutes (where N=1, 2, 3, etc. here), or unable to immediately vent their current emotions and so on; to join up when possible with other like-situated STAN users for a possibly, mutually beneficial discussion or other Notes Exchange session. In one embodiment, as each such quick chat or other forum space is spawned and peopled with STAN users who substantially match the pre-tagged room attributes, the so-peopled participation spaces are made accessible to a limited number (e.g., 1-3) promotion offering entities (e.g., vendors of goods and/or services) for placing their corresponding promotional offerings in corresponding first, second and so on promotion spots on tray 104"" of the screen presentation produced for participants of the corresponding chat or other forum participation opportunity. In one embodiment, the promotion offering entities are required to competitively bid for the corresponding first, second and so on promotion spots on tray 104"" as will be explained in more detail in conjunction with FIG. 5C.

Referring to FIG. 2, shown here is an environment 200 where the user 201A is holding a palmtop or alike device 199 such as a smart cellphone 199 (e.g., iPhone™, Android™, etc.). The user may be walking about a city neighborhood or the like when he spots an object 198 (e.g., a building, but it could be a person or combination of both) where the object is of possible interest. The STAN user (201A) points his handheld device 199 so that a forward facing electronic camera 210 thereof captures an image of the in real life (ReL) object/person 198.

In accordance with one aspect of the present disclosure, the camera-captured imagery (it could include IR band imagery as well as visible light band imagery) is transmitted to an in-cloud object recognizing module (not shown). The object recognizing module then automatically produces descriptive keywords and the like for logical association with the camera captured imagery (e.g., 198). Then the produced descriptive keywords are automatically forwarded to topic lookup modules (e.g., 151 of FIG. 1F) of the system 410. Then, corresponding, topic-related feedbacks (e.g., on-topic invitations/suggestions) are returned from the STAN_3 system 410 to the user's device 199 where the topic-related feedbacks are displayed on a back-facing screen 211 of the device (or otherwise presented to the user 201A) together with the camera captured imagery (or a revised/transformed version of the captured imagery). This provides the user 201A with a virtually augmented reality wherein real life (ReL) objects/persons (e.g., 198) are intermixed with experience augmenting data produced by the STAN_3 topic space mapping mechanism 413' (see FIG. 4D, to be explained below).

In the illustrated embodiment 200, the device screen 211 can operate as a 3D image projecting screen. The bifocular positionings of the user's eyes can be detected by means of one or more back facing cameras 206, 209 (or alternatively using the IR beam reflecting method of FIG. 1A) and then electronically directed lenticular lenses or the like are used within the screen 211 to focus bifocal images to the respective eyes of the user so that he has the illusion of seeing a 3D image without need for special glasses.

In the illustrated example 200, the user sees a 3D bent version of the graphical user interface (GUI) that was shown in FIG. 1A. A middle and normally user-facing plane 217 shows the main items (main reading plane) that the user is attentively focusing-upon. The on-topic invitations plane 202 may be tilted relative to the main plane 217 so that the user 201A perceives as being inclined relative to him and the user has to (in one embodiment) tilt his device so that an imbedded gravity direction sensor 207 detects the tilt and reorganizes the 3D display to show the invitations plane 202 as parallel facing to the user 201A in place of the main reading plane 217. Tilting the other way causes the promotional offerings plane 204 to become visually de-tilted and shown in as a user facing area. Tilting to the left automatically causes the hot top N topics radar objects 201*r* to come into the user facing area. In this way with a few intuitive tilt gestures (which gestures generally include returning the screen 211 to be facing in a plan view to the user 201A) the user can quickly keep an eye on topic space related activities as he wants (and when he wants) while otherwise keeping his main focus and attention on the main reading plane 217.

In the illustrated example 200, the user is shown wearing a biometrics detecting and/or reporting head band 201*b*. The head band 201*b* may include an earclip that electrically and/or optically (in IR band) couples to the user's ear for detecting pulse rate, muscles twitches (e.g., via EMG signals) and the like where these are indicative of the user's likely biometric states. These signals are then wirelessly relayed from the head band 201*b* to the handheld device 199 (or another nearby relaying device) and then uploaded to the cloud as CFi data used for processing therein and automatically determining the user's biometric states and the corresponding user emotional or other states that are likely associated with the reported biometric states. The head band 201*b* may be battery powered (or powered by photovoltaic means) and may include an IR light source (not shown) that points at the IR sensitive screen 211 and thus indicates what direction the user is tilting his head towards and/or how the user is otherwise moving his/her head, where the latter is determined based on what part of the IR sensitive screen 211 the headband produced (or reflected) IR beam strikes. The head band 201*b* may include voice and sound pickup sensors for detecting what the user 201A is saying and/or what music or other background noises the user may be listening to. In one embodiment, detected background music and/or other background noises are used as possibly focused-upon CFi reporting signals (see 298' of FIG. 3D) for automatically determining the likely user context (see conteXt space Xs 316" of FIG. 3D). For example if the user is exposed to soft symphony music, it may be automatically determined (e.g., by using the user's active PEEP file and/or other profile files, i.e. habits, responses to social dynamics, etc.) that the user is probably in a calm and contemplative setting. On the other hand, if very loud rock and roll music is detected (as well as the gravity sensor 207 jiggling because the user is dancing), then it may be automatically determined (e.g., again by using the user's active PEEP and/or other profile files—see 301*p* of FIG. 3D) that the user is likely to be at a vibrant party as his background context. All these clues or hints may be uploaded to the cloud for processing by the STAN_3 system 410 and for consequential determination of what promotional offerings or the like the user would likely welcome given the user's currently determined context. More generally, various means such as the user-worn head band 201*b* (but these various means can include other user-worn or held devices or devices that are not worn or held by the user) can discern, sense and/or measure one or more of: (1) physical body states of the user's and/or (2) states of physical things surrounding or near to the user. More specifically, the sensed physical body states of the user may include: (1 a) geographic and/or chronological location of the user in terms of one or more of on-map location, local clock settings, current altitude above sea level; (1*b*) body orientation and/or speed and direction and/or acceleration of the user and/or of any of his/her body parts relative to a defined frame; (1*c*) measurable physiological states of the user such as but not limited to, body temperature, heart rate, body weight, breathing rate, metabolism rates (e.g., blood glucose levels), body fluid chemistries and so on. The states of physical things surrounding or near to the user may include: (2*a*) ambient climactic states surrounding the user such as but not limited to, current air temperature, air flow speed and direction, humidity, barometric pressure, air carried particulates including microscopic ones and those visible to the eye such as fog, snow and rain and bugs and so on; (2*b*) lighting conditions surrounding the user such as but not limited to, bright or glaring lights, shadows, visibility-obscuring conditions and so on; (2*c*) foods, chemicals, odors and the like which the user can perceive or be affected by even if unconsciously; and (2*d*) types of structures and/or vehicles in which the user is situated or otherwise surrounded by such as but not limited to, airplanes, trains, cars, buses, bicycles, buildings, arenas, no buildings at all but rather trees, wilderness, and so on. The various sensor may alternatively or additionally sense changes in (rates of) the various physical parameters rather than directly sensing the physical parameters.

In one embodiment, the handheld device 199 of FIG. 2 further includes an odor or smells sensor 226 for detecting surrounding odors or in-air chemicals and thus determining user context based on such detections. For example, if the user is in a quite meadow surrounded by nice smelling flowers (whose scents 227 of FIG. 2) are detected, that may indicate one kind of context. If the user is in a smoke filled room, that may indicate a different likely kind of context.

Given presence of the various sensors described for example immediately above, in one embodiment, the STAN_3 system 410 automatically compares the more usual physiological parameters of the user (as recorded in corresponding profile records of the user) versus his/her currently sensed physiological parameters and the system automatically alerts the user and/or other entities the user has given permission for (e.g., the user's primary health provider) with regard to likely deterioration of health of the user and/or with regard to out-of-matching biometric ranges of the user. In the latter case, detection of out-of-matching biometric range physiological attributes for the holder of the interface device being used to network with the STAN_3 system 410 may be indicative of the device having been stolen by a stranger (whose voice patterns for example do not match the normal ones of the legitimate user) or indicative of a stranger trying to spoof as if he/she were the registered STAN user when in fact they are not, whereby proper authorities might be alerted to the possibility that unauthorized entities appear to be trying to access user information and/or alter user profiles. In the case of the former (e.g., changed health or other alike conditions, even if the user is not aware of the same), in one embodiment, the STAN_3 system 410 automatically activates user profiles associated with the changed health or other alike conditions, even if the user is not aware of the same, so that corresponding subregions of topic space and the like can be appropriately activated in response to user inputs under the changed health or other alike conditions.

Referring next to FIG. 3A, shown is a first environment 300A where the user 301A is at times supplying into a local data processing device 299, first signals 302 indicative of energetic output expressions $E_O$(t, x, f, {TS, XS, . . . }) of the user, where here, $E_O$ denotes energetic output expressions having at least a time t parameter associated therewith and optionally having other parameters associated therewith such as but not limited to, x: physical location (and optionally v: for velocity and a: for acceleration); f: distribution in frequency domain; Ts: associated nodes or regions in topic space; Xs: associated nodes or regions in a system maintained context space; Cs: associated points or regions in an available-to-user content space; EmoS: associated points or regions in an available-to-user emotional and behavioral states space; Ss: associated points or regions in an available-to-user social dynamics space; and so on. (See also and briefly the lower half of FIG. 3D and the organization of exemplary keywords space 370 in FIG. 3E).

Also in the shown first environment 300A, the user 301A is at times having a local data processing device 299 automatically sensing second signals 298 indicative of energetic attention giving activities $e_i$(t, x, f, {TS, XS, . . . }) of the user, where here, $e_i$ denotes energetic attention giving activities of the user 301A which activities $e_i$ have at least a time t parameter associated therewith and optionally have other parameters associated therewith such as but not limited to, x: physical location at which or to which attention is being given (and optionally v: for velocity and a: for acceleration); f: distribution in frequency domain of the attention giving activities; Ts: associated nodes or regions in topic space that more likely correlate with the attention giving activities; Xs: associated nodes or regions in a system maintained context space that more likely correlate with the attention giving activities (where context can include a perceived physical or virtual presence of on-looking other users if such presence is perceived by the first user); Cs: associated points or regions in an available-to-user content space; EmoS: associated points or regions in an available-to-user emotions and/or behavioral states space; Ss: associated points or regions in an available-to-user social dynamics space; and so on. (See also and briefly again the lower half of FIG. 3D).

Also represented for the first environment 300A and the user 301A is symbol 301*xp* representing the surrounding physical contexts of the user and signals (also denoted as 301*xp*) indicative of what some of those surrounding physical contexts are (e.g., time on the local clock, location, velocity, etc.). Included within the concept of the user 301A having a current (and perhaps predictable next) surrounding physical context 301*xp* is the concept of the user being knowingly engaged with other social entities where those other social entities (not explicitly shown) are knowingly there because the first user 301A knows they are attentively there, and such knowledge can affect how the first user behaves, what his/her current moods, social dynamic states, etc. are. The attentively present, other social entities may connect with the first user 301A by way of a near-field communications network 301*c* such as one that uses short range wireless communication means to interconnect persons who are physically close by to each other (e.g., within a mile).

Referring in yet more detail to possible elements of the first signals 302 that are indicative of energetic output expressions $E_O$(t, x, f, {TS, XS, . . . }) of the user, these may include user identification signals actively produced by the user (e.g., password) or passively obtained from the user (e.g., biometric identification). These may include energetic clicking and/or typing and/or other touching signal streams produced by the user 301A in corresponding time periods (t) and within corresponding physical space (x) domains where the latter click/etc. streams or the like are input into at least one local data processing device 299 (there could be more), and where the device(s) 299 has/have appropriate graphical and/or other user interfaces (G+UI) for receiving the user's energetic, focus-indicating streams 302. The first signals 302 which are indicative of energetic output expressions $E_O$(t, x, f, {TS, XS, . . . }) of the user may yet further include facial configurations and/or head gestures and/or other body gesture streams produced by the user and detected and converted into corresponding data signals, they may include voice and/or other sound streams produced by the user, biometric streams produced by or obtained from the user, GPS and/or other location or physical context steams obtained that are indicative of the physical context-giving surrounds (301*xp*) of the user, data streams that include imagery or other representations of nearby objects and/or persons where the data streams can be processed by object/person recognizing automated modules and thus augmented with informational data about the recognized object/person (see FIG. 2), and so on. In one embodiment, the determination of current facial configurations may include automatically classifying current facial configurations under a so-called, Facial Action Coding System (FACS) such as that developed by Paul Ekman and Wallace V. Friesen (Facial Action Coding System: A Technique for the Measurement of Facial Movement, Consulting Psychologists Press, Palo Alto, 1978; incorporated herein by reference). In one variation these codings are automatically augmented according to user culture or culture of proximate other persons, user age, user gender, user socio-economic and/or residence attributes and so on.

Referring to possible elements of the second signals 298 that are indicative of energetic attention giving activities $e_i$ (t, x, f, {TS, XS, . . . }) of the user, these can include eye tracking signals that are automatically obtained by one of the local data processing devices (299) near the user 301A, where the eye tracking signals may indicate how attentive the user is and/or they may identify one or more objects, images or other visualizations that the user is currently giving energetic attention to by virtue of his/her eye activities (which activities can include eyelid blinks, pupil dilations, changes in rates of same, etc. as alternatives to or as additions to eye focusing actions of the user). The energetic attention giving activities $e_i$ (t, x, f, {TS, XS, . . . }) of the user may alternatively or additionally include head tilts, nods, wobbles, shakes, etc. where some may indicate the user is listening to or for certain sounds, nostril flares that may indicate the user is smelling or trying to detect certain odors, eyebrow raises and/or other facial muscle tensionings or relaxations that may indicate the user is particularly amused or otherwise emotionally moved by something he/she perceives, and so on.

In the illustrated first environment 300A, at least one of the user's local data processing devices (299) is operatively coupled to and/or has executing within it, a corresponding one or more network browsing modules 303 where at least one of the browsing modules 303 is presenting (e.g., displaying) browser generated content to the user, where the browser-provided content 299*xt* can have one or more of positioning (x), timing (t) and frequency (f) attributes associated therewith. As those skilled in the art may appreciate, the browser generated content may include, but is not limited to, HTML, XML or otherwise pre-coded content that is converted by the browsing module(s) 303 into user perception-friendly content. The browser generated content may alternatively or additionally include video flash streams or the like. In one embodiment, the network browsing modules 303 are cognizant of where on a corresponding display screen or through another medium their content is being presented, when it is being presented, and thus when the user is detected by machine means to be then casting input and/or output energies of the attentive kind to the sources (e.g., display screen area) of the browser generated content (299*xt*, see also window 117 of FIG. 1A as an example), then the content placing (e.g., positioning) and timing and/or other attributes of the browsing module(s) 303 can be automatically logically linked to the cast user input and/or output energies (Eo(x,t, . . . ), ei(x,t, . . . ) based on time, space and/or other metrics and the logical links for such are relayed to an upstream net server 305 or directly to a further upstream portion 310 of the STAN_3 system 410. In one embodiment, the one or more browsing module(s) 303 are modified (e.g., instrumented) by means of a plug-in or the like to internally generate signals representing the logical linkings between browser produced content, its timing and/or its placement and the attention indicating other signals (e.g., 298, 302). In an alternate embodiment, a snooping module is added into the data processing device 299 to snoop out the content placing (e.g., positioning) or other attributes of the browser-produced content 299*xt* and to link the attention indicating other signals (e.g., 298, 302) to those associated placement/timing attributes (x,t) and to relay the same upstream to unit 305 or directly to unit 310. In another embodiment, the net server 305 is modified to automatically generate data signals that represent the logical linkings between browser-generated content (299*xt*) and one or more of the energies and context signals: $E_O$(x,t, . . . ), $e_i$(x,t, . . . ), $C_X$(x,t, . . . ), etc.

When the STAN_3 system portion 310 receives the combination (322) of the content-identifying signals (e.g., time, place and/or data of 299*xt*) and the signals representing user-expended energies and/or user-aware-of context ($E_O$(x, t, . . . ), $e_i$(x,t, . . . ), $C_X$(x,t, . . . ), etc.), the STAN_3 system portion 310 can treat the same in a manner similar to how it treats CFi's (current focus indicator records) of the user 301A and the STAN_3 system portion 310 can therefore produce responsive result signals 324 such as, but not limited to, identifications of the most likely topic nodes or topic space regions (TSR's) within the system topic space (413') that correspond with the received combination 322 of content and focus representing signals. In one embodiment, the number returned as likely, topic node identifications is limited to a predetermined number such as N=1,2,3, . . . and therefore the returned topic node identifications may be referred to as the top N topic node/region ID's in FIG. 3A.

As explained in the here-incorporated STAN_1 and STAN_2 applications, each topic node may include pointers or other links to corresponding on-topic chat rooms and/or other such forum participation opportunities. The linked-to forums may be sorted, for example according to which ones are most popular among different demographic segments (e.g., age groups) of the node-using population. In one embodiment, the number returned as likely, most popular chat rooms (or other so associated forums) is limited to a predetermined number such as M=1,2,3, . . . and therefore the returned forum identifying signals may be referred to as the top M online forums in FIG. 3A.

As also explained in the here-incorporated STAN_1 and STAN_2 applications, each topic node may include pointers or other links to corresponding v on-topic topic content that could be suggested as further research areas to STAN users who are currently focused-upon the topic of the corresponding node. The linked-to suggestable content sources may be sorted, for example according to which ones are most popular among different demographic segments (e.g., age groups) of the node-using population. In one embodiment, the number returned as likely, most popular research sources (or other so associated suppliers of on-topic material) is limited to a predetermined number such as P=1,2,3, . . . and therefore the returned resource identifying signals may be referred to as the top P on-topic other contents in FIG. 3A.

As yet further explained in the here-incorporated STAN_1 and STAN_2 applications, each topic node may include pointers or other links to corresponding people (e.g., Tipping Point Persons or other social entities) who are uniquely associated with the corresponding topic node for any of a variety of reasons including, but not limited to, the fact that they are deemed by the system 410 to be experts on that topic, they are deemed by the system to be able to act as human links (connectors) to other people or resources that can be very helpful with regard to the corresponding topic of the topic node; they are deemed by the system to be trustworthy with regard to what they say about the corresponding topic, they are deemed by the system to be very influential with regard to what they say about the corresponding topic, and so on. In one embodiment, the number returned as likely to be best human resources with regard to topic of the topic node (or topic space region: TSR) is limited to a predetermined number such as Q=1,2,3, . . . and therefore the returned resource identifying signals may be referred to as the top Q on-topic people in FIG. 3A.

The list of topic-node-associated informational items can go on and on. Further examples may include, most relevant on-topic tweet streams, most relevant on-topic blogs or micro-blogs, most relevant on-topic online or real life (ReL) conferences, most relevant on-topic social groups (of online and/or real life gathering kinds), and so on.

The produced responsive result signals 324 of the STAN_3 system portion 310 can then be processed by the net server 305 and converted into appropriate, downloadable content signals 314 (e.g., HTML, XML, flash or otherwise encoded signals) that are then supplied to the one or more browsing module(s) 303 then being used by the user 301A where the browsing module(s) 303 thereafter provide the same as presented content (299*xt*, e.g., through the user's computer or TV screen, audio unit and/or other media presentation device).

More specifically, the initially present content (299*xt*) on the user's local data processing device 299 may have been a news compilation web page that was originated from the net server 305, converted into appropriate, downloadable content signals 314 by the browser module(s) 303 and thus initially presented to the user 301A. Then the context-indicating and/or focus-indicating signals 301*xp*, 302, 298 obtained or generated by the local data processing devices (e.g., 299) then surrounding the user are automatically relayed upstream to the STAN_3 system portion 310. In response to these, unit 310 automatically returns response signals 324. The latter flow downstream and in the process they are converted into on-topic, new displayable information (or otherwise presentable information) that the user may first need to approve before final presentation (e.g., by the user accepting a corresponding invitation) or that the user is automatically treated to without need for invitation acceptance.

Yet more specifically, in the case of the news compilation web page (e.g., displayed in area 299*xt* at first time t1), once the system automatically determines what topics and/or sub-portions of initially available content the user 301A is currently focused-upon (e.g., energetically paying attention to and/or energetically responding to), the initially presented news compilation transforms shortly thereafter (e.g., within a minute or less) into a "living" news compilation that seems to magically know what the user 301A is currently focusing-upon and which then serves up correlated additional content which the user 301A likely will welcome as being beneficially useful to the user rather than as being unwelcomed and annoying. Yet more specifically, if the user 301A was reading a short news clip about a well known entertainment celebrity (movie star) or politician named X, the system 299-310 may shortly thereafter automatically pop open a live chat room where like-minded other STAN users are starting to discuss a particular aspect regarding X that happened to now be on the first user's (301A) mind. The way that the system 299-310 came to infer what was most likely on the first user's (301A) mind is by utilizing a host triangulating or mapping mechanisms that home in on the most likely topics on the user's mind based on pre-developed profiles (301*p* in FIG. 3D) for the logged-in first user (301A) in combination with the then detected context-indicating and/or focus-indicating signals 301*xp*, 302, 298 of the first user (301A).

Figure 3C:
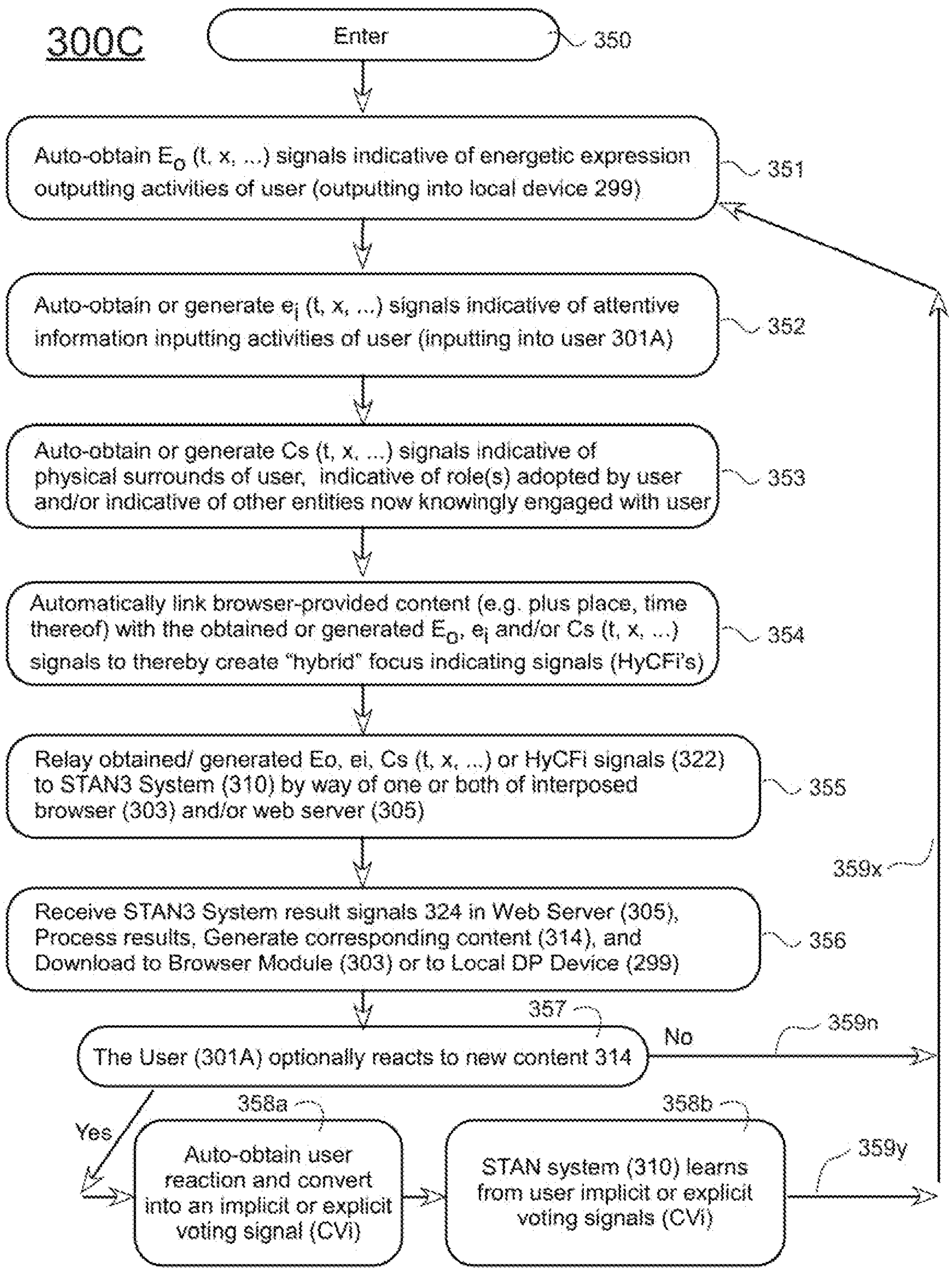
FIG. 3C provides a flow chart of method that can be used in the system of FIG. 3A.
Figure 3K:
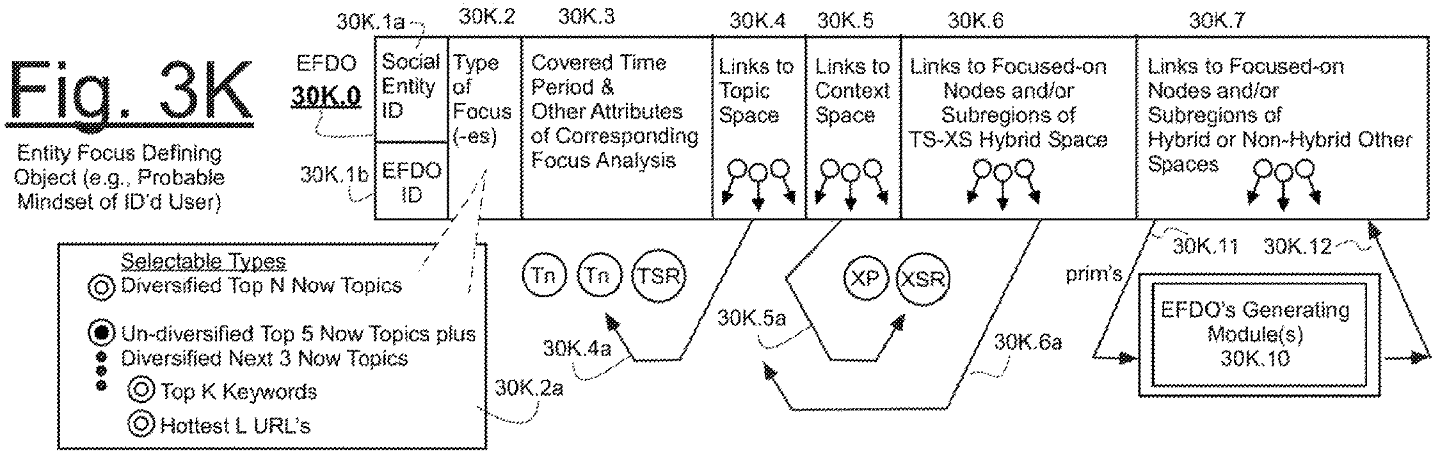
FIG. 3K shows data structures usable in defining nodes being focused-upon and/or space subregions (e.g., TSR's) being focused-upon within a predetermined time duration by an identified social entity.

Referring to the flow chart of FIG. 3C, a machine-implemented process 300C that may be used with the machine system 299-310 of FIG. 3A may begin at step 350. In next step 351, the system automatically obtains focus-indicating signals 302 that indicate certain outwardly expressed activities of the user such as, but not limited to, entering one or more keywords into a search engine input space, clicking or otherwise activating and thus navigating through a sequence of URL's or other such pointers to associated content, participating in one or more online chat or other online forum participation sessions that are directed to predetermined topic nodes of the system topic space (413'), accepting machine-generated invitations (see 102J of FIG. 1A) that are directed to such predetermined topic nodes, clicking on or otherwise activating expansion tools (e.g., starburst+) of on-screen objects (e.g., 101*r*', 101*s*' of FIG. 1B) that are pre-linked to such predetermined topic nodes, focusing-upon community boards (see FIG. 1G) that are pre-linked to such predetermined topic nodes, clicking on or otherwise activating on-screen objects (e.g., 190*a*.3 of FIG. 1J) that are cross associated with a geographic location and one or more such predetermined topic nodes, using the layer-vator (113 of FIG. 1A) to ride to a specific virtual floor (not shown) that is pre-linked to a small number (e.g., 1,2, 3, . . . ) of such predetermined topic nodes, and so on.

In next step 352, the system automatically obtains or generates focus-indicating signals 298 that indicate certain inwardly directed attention giving activities of the user such as, but not limited to, staring for a time duration in excess of a predetermined threshold amount at an on-screen area (e.g., 117*a* of FIG. 1A) or a machine-recognized off-screen area (e.g., 198 of FIG. 2) that is pre-associated with a limited number (e.g., 1,2, . . . 5) of topic nodes of the system 310; repeatedly returning to look at (or listen to) a given machine presentation of content where that frequently returned to presentation is pre-linked with a limited number (e.g., 1, 2, . . . 5) of such topic nodes and the frequency of repeated attention giving activities and/or durations of each satisfy predetermined criteria that are indicative for that user and his/her current context of extreme interest in the topics of such topic nodes, and so on.

In next step 353, the system automatically obtains or generates context-indicating signals 301*xp*. Here, such context-indicating signals 301*xp* may indicate one or more contextual attributes of the user such as, but not limited to: his/her geographic location, his/her economic disposition (e.g., working, on vacation, has large cash amount in checking account, has been recently spending more than usual and thus is in shopping spree mode, etc.), his/her biometric disposition (e.g., sleepy, drowsy, alert, jittery, calm and sedate, etc.), his/her disposition relative to known habits and routines (see briefly FIG. 5A), his/her disposition relative to usual social dynamic patterns (see briefly FIG. 5B), his/her awareness of other social entities giving him/her their attention, and so on.

In next step 354 (optional) of FIG. 3C, the system automatically generates logical linking signals that link the time, place and/or frequency of focused-upon content items with the time, place, direction and/or frequency of the context-indicating and/or focus-indicating signals 301*xp*, 302, 298. As a result of this optional step 354, upstream unit 310 receives a clearer indication of what content goes with which focusing-upon activities. However, since in one embodiment the CFi's received by the upstream unit 310 are time and/or place stamped and the system 299-310 may determine to one degree of resolution or another the location and/or timing of focused-upon content 299*xt*, it is merely helpful but not necessary that optional step 354 is performed.

In next carried out step 355 of FIG. 3C, the system automatically relays to the upstream portion 310 of the STAN_3 system 410 available ones of the context-indicating and/or focus-indicating signals 301*xp*, 302, 298 as well as the optional content-to-focus linking signals (generated in optional step 354). The relaying step 355 may involve sequential receipt and re-transmission through respective units 303 and 305. However, in some cases one or both of 303 and 305 may be bypassed. More specifically, data processing device 299 may relay some of its informational signals (e.g., CFi's, CVi's) directly to the upstream portion 310 of the STAN_3 system 410.

In next carried out step 356 of FIG. 3C, the STAN_3 system 410 (which includes unit 310) processes the received signals 322, produces corresponding result signals 324 and transmits some or all of them either to net server 305 or it bypasses net server 305 for some of the result signals 324 and instead transmits some or all of them directly browser module(s) 303 or to the user's local data processing device 299. The returned result signals 324 are then optionally used by one or more of downstream units 305, 303 and 299.

In next carried out step 357 of FIG. 3C, if the informational presentations (e.g., displayed content, audio presented content, etc.) changes as a result of machine-implemented steps 351-356, and the user 301A becomes aware of the changes and reacts to them, then new context-indicating and/or focus-indicating signals 301*xp*, 302, 298 may be produced as a result of the user's reaction to the new stimulus. Alternatively or additionally, the user's context and/or input/output activities may change due to other factors (e.g., the user 301A is in a vehicle that is traveling through different contextual surroundings). Accordingly, in either case, whether the user reacts or not, process flow path 359 is repeated taken so that step 356 is repeatedly followed by step 351 and therefore the system 410 automatically keeps updating its assessments of where the user's current attention is in terms of topic space (see Ts of next to be discussed FIG. 3D), in terms of context space (see Xs of FIG. 3D), in terms of content space (see Cs of FIG. 3D). At minimum, the system 410 automatically keeps updating its assessments of where the user's current attention is in terms of energetic expression outputting activities of the user (see output 302*o* of FIG. 3D) and/or in terms of energetic attention giving activities of the user (see output 298*o* of FIG. 3D).

Before moving on to the details of FIG. 3D, a brief explanation of FIG. 3B is provided. The main difference between 3A and 3B is that units 303 and 305 of 3A are respectively replaced by application-executing module(s) 303' and application-serving module(s) 305' in FIG. 3B. As those skilled in the art may appreciate, FIG. 3B is merely a more generalized version of FIG. 3A because a net browser is a species of computer application program and a net server is a species of a server computer that supports other kinds of computer application programs. Because the downstream heading inputs to application-executing module(s) 303' are not limited to browser recognizable codes (e.g., HTML, flash video streams, etc.) and instead may include application-specific other codes, communications line 314' of FIG. 3B is shown to optionally transmit such application-specific other codes. In one embodiment, of FIG. 3B, the application-executing module(s) 303' and/or application-serving module(s) 305' implement a user configurable news aggregating function and/or other information aggregating function wherein the application-serving module(s) 305' automatically crawl through or search within various databases as well as within the internet for the purpose of compiling for the user 301B, news and/or other information of a type defined by the user through his her interfacing actions with an aggregating function of the application-executing module(s) 303'. In one embodiment, the databases searched within or crawled through by the news aggregating functions and/or other information aggregating functions of the application-serving module(s) 305' include areas of the STAN_3 database subsystem 319, where these database areas (319) are ones that system operators of the STAN_3 system 410 have designated as being open to such searching through or crawling through (e.g., without compromising reasonable privacy expectations of STAN users). In other words, and with reference to the user-to-user associations (U2U) space 311 of the FIG. 3B as well as the user-to-topic associations (U2T) space 312, the topic-to-topic associations (T2T) space 313, the topic-to-content associations (T2C) space 314 and the context-to-other (e.g., user, topic, etc.) associations (X2UTC) space 316; inquiries 322' input into unit 310' may be responded to with result signals 324' that reveal to the application-serving module(s) 305' various data structures of the STAN_3 system 410 such as, but not limited to, parts of the topic node-to-topic node hierarchy then maintained by the topic-to-topic associations (T2T) mapping mechanism 413' (see FIG. 4D).

Figure 3L:
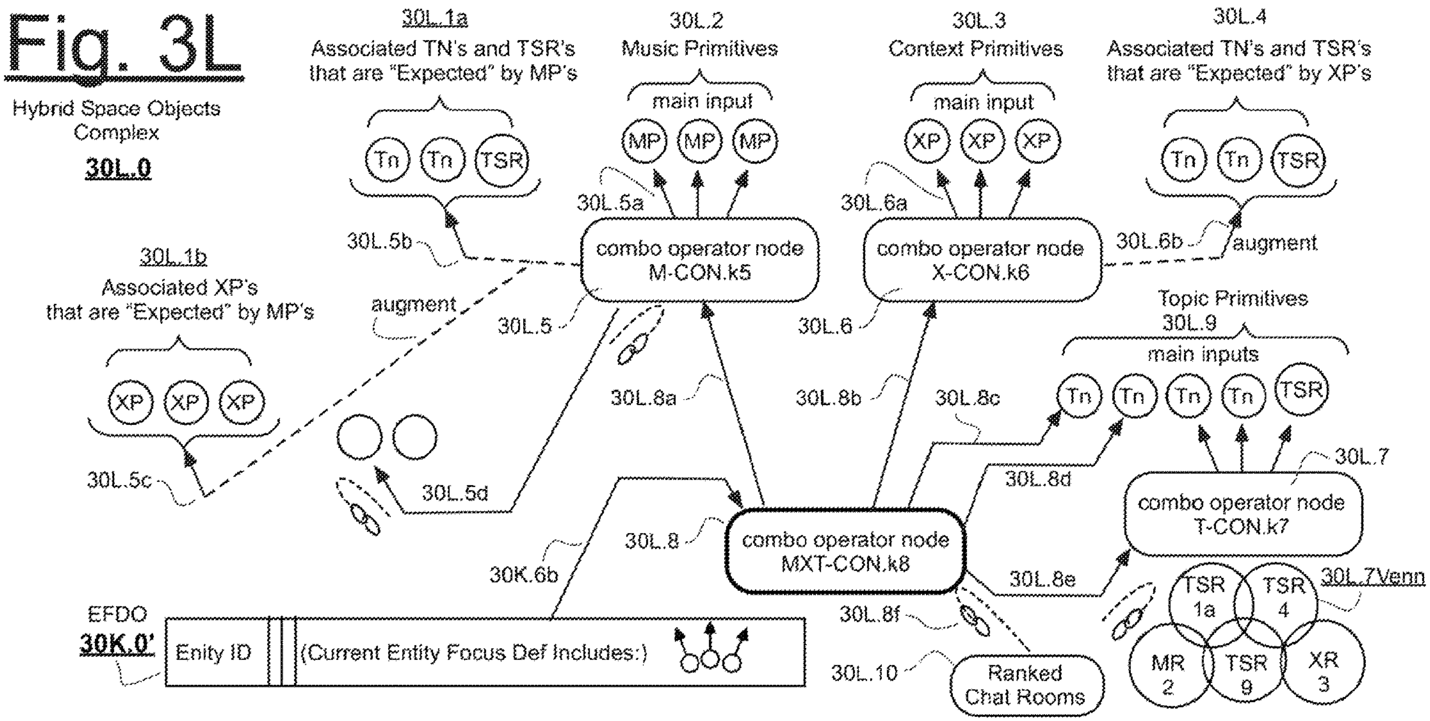
FIG. 3L shows an example of a data structure such as that of FIG. 3K logically linking to a hybrid operator node in hybrid space formed by the intersection of a music space, a context space and a portion of topic space.

Referring now to FIG. 3D and the exemplary STAN user 301A' shown in the upper left corner thereof, it should now be becoming clearer that every word 301*w* (e.g., "Please"), phrase (e.g., "How about . . . ?"), facial configuration (e.g., smile, frown, wink, etc.), head gesture 301*g* (e.g., nod) or other energetic expression output $E_O(x,t,f, \ldots)$ produced by the user 301A' is not just that expression being output $E_O(x,t,f, \ldots)$ in isolation but rather one that is produced with its author 301A' being a context therefor and with the surrounding context 301*x* of its author 301A' being a context therefor. Stated more simply, the user is the context of his/her actions and his/her contextual surroundings can also be part of the context. Therefore, and in accordance with one aspect of the present disclosure, the STAN_3 system 410 maintains as one of its many data-objects organizing spaces (which spaces are defined by stored representative signals stored in machine memory), a context nodes organizing space 316". In one embodiment, the context nodes organizing space 316" or context space 316" for short, includes context defining primitive nodes (see FIG. 3J) and combination operator nodes (see for example 374.1 of FIG. 3E). A user's current context can be viewed as an amalgamation of concurrent context primitives and/or sequences of such primitives (e.g., if the user is multitasking). More specifically, a user can be assuming multiple roles at one time where each role has a corresponding one or more activities or performances expected of it. This aspect will be explained in more detail in conjunction with FIG. 3L. The FIG. 3D which is now being described provides more of a bird's eye view of the system and that bird's eye view will be described first. Various possible details for the data-objects organizing spaces (or "spaces" in short) will be described later below.

Because various semantic spins can be inferred from the "context" or "contextual state" from under which each word 301*w* is originated (e.g., "Please"), from under which each facial configuration (e.g., raised eyebrows, flared nostrils) and/or head gesture (e.g., tilted head) 301*g* arises, from under which each sequence of words (e.g., "How about . . . ?") is assembled, from under which each sequence of mouse clicks or other user-to-machine input activations evolves, and so forth; proper resolution of current user context to one degree of specificity or another can be helpful in determining what semantic spin is more likely to be associated with one or more of the user's energetic input $e_i(x,t,f, \ldots)$ and/or output $E_O(x,t,f, \ldots)$ activities and/or which CFi and/or CVi signals are to be grouped with one another when parsing received CFi, CVi signal streamlets (e.g., 151*i*2 of FIG. 1F). Determination of semantic spin is not limited to processing of user actions per se (e.g., clicking or otherwise activating hyperlinks), it may also include processing of the sequences of subsequent user actions that result from first clickings and/or other activations, where a sequence of such actions may take the user (virtually) through a navigated sequence of content sources (e.g., web pages) and/or the latter may take the user (virtually) through a sequence of user virtual "touchings" upon nodes or upon subregions in various system-maintained spaces, including topic space (TS) for example. User actions taken within a corresponding "context" also transport the user (at least virtually) through corresponding heat-casting kinds of "touchings" on topic space nodes or topic space regions (TSR's), and so on. Thus; it is useful to define a context space (Xs) whose data-represented nodes and/or context space regions (XSR's) define different kinds of, in-his/her-mind contextual states of the user. The identified contextual states of the user, even if they are identified in a "fuzzy" way rather with deterministic accuracy or fine resolution can then indicate which of a plurality of user profile records 301*p* should be deemed by the system 410 to be the currently active profiles of the user 301A'. The currently active profiles 301*p* may then be used to determine in an automated way, what topic nodes or topic space regions (TSR's) in a corresponding defined topic space (Ts) of the system 410 are most likely to represent topics the user 301A' is most likely to be currently focused-upon. Of importance, the "in-his/her-mind contextual states" mentioned here should be differentiated from physical contextual states (301*x*) of the user. Examples of physical contextual states (301*x*) of the user can include the user's geographic location (e.g., longitude, latitude, altitude), the user's physical velocity relative to a predefined frame (where velocity includes speed and direction components), the user's physical acceleration vector and so on. Moreover, the user's physical contextual states (301*x*) may include descriptions of the actual (not virtual) surroundings of the user, for example, indicating that he/she is now physically in a vehicle having a determinable location, speed, direction and so forth. It is to be understood that although a user's physical contextual states (301*x*) may be one set of states, the user can at the same time have a "perceived" and/or "virtual" set of contextual states that are different from the physical contextual states (301*x*). More specifically, when watching a high quality 3D movie, the user may momentarily perceive that he or she is within the fictional environment of the movie scene although in reality, the user is sitting in a darkened movie theater. The "in-his/her-mind contextual states" of the user (e.g., 301A') may include virtual presence in the fictional environment of the movie scene and the latter perception may be one of many possible "perceived" and/or "virtual" set of contextual states defined by the context space (Xs) 316" shown in FIG. 3D.

In one embodiment, a fail-safe default or checkpoint switching system 301*s* (controlled by module 301*pvp*) is employed. A predetermined-to-be-safe set of default or checkpoint profile selections 301*d* is automatically resorted to in place of profile selections indicated by a current output 316*o* of the system's perceived-context mapping mechanism 316" if recent feedback signals from the user (301A') indicate that invitations (e.g., 102*i* of FIG. 1A), promotional offerings (e.g., 104*t* of FIG. 1A), suggestions (102J2L of FIG. 1N) or other communications (e.g., Hot Alert 115*g*' of FIG. 1N) made to the user by the system are meeting with negative reactions from the user (301A'). In other words, they are highly unwelcome, and probably so because the system 410 has lost track of what the user's current "perceived" and/or "virtual" set of contextual states are. And as a result the system is using an inappropriate one or more profiles (e.g., PEEP, PHAFUEL etc.) and interpreting user signals incorrectly as a result. In such a case, a switch over to the fail-safe or default set is automatically carried out. The default profile selections 301*d* may be pre-recorded to select a relatively universal or general PEEP profile for the user as opposed to one that is highly dependent on the user being in a specific mood and/or other "perceived" and/or "virtual" (PoV) set of contextual states. Moreover, the default profile selections 301*d* may be pre-recorded to select a relatively universal or general Domain Determining profile for the user as opposed to one that is highly dependent on the user being in a special mood or unusual PoV context state. Additionally, the default profile selections 301*d* may be pre-recorded to select relatively universal or general chat co-compatibility, PHAFUEL's (personal habits and routines logs), and/or PSDIP's (Personal Social Dynamics Interaction Profiles) as opposed to ones that are highly dependent on the user being in a special mood or unusual PoV context state. Once the fail safe (e.g., default) profiles 301*d* are activated as the current profiles of the user, the system may begin to home in again on more definitive determinations of current state of mind for the user (e.g., top 5 now topics, most likely context states, etc.). The fail-safe mechanism 301*s*/301*d* (plus the module 301*pvp* which module controls switches 301*s*) automatically prevents the context-determining subsystem of the STAN_3 system 410 from falling into an erroneous pit or an erroneous chaotic state from which it cannot then quickly escape from.

After the default state 301*d* has been established during system initialization or user PoV state reset, switch 301*s* is automatically flipped into its normal mode wherein context indicating signals 316*o*, produced and output from a context space mapping mechanism (Xs) 316", participate in determining which user profiles 301*p* will be the currently active profiles of the user 301A'. It should be recalled that profiles can have knowledge base rules (KBR's) embedded in them (e.g., 199 of FIG. 5A) and those rules may also urge switching to an alternate profile, or to alternate context, based on unique circumstances. In accordance with one embodiment, a weighted voting mechanism (not shown and understood to be inside module 301*pvp*) is used to automatically arrive at a profile selecting decision when the current context guessing signals 316*o* output by mechanism 316" conflict with knowledge base rule (KBR) decisions of currently active profiles that regard the next PoV context state that is to be assumed for the user. The weighted voting mechanism (inside the Conflicts and Errors Resolver 301*pvp*) may decide to not switch at all in the face of a detected conflict or to side with the profile selection choice of one or the other of the context guessing signals 316*o* and the conflicting knowledge base rules subsystem (see FIGS. 5A and 5B for example where KBR's thereof can suggest a next context state that is to be assumed).

It is to be noted here that interactions between the knowledge base rules (KBR's) subsystem and the current context defining output, 316*o* of context mapping mechanism 316" can complement each other rather than conflicting with one another. The Conflicts and Errors Resolver module 301*pvp* is there for the rare occasions where conflict does arise. However, a more common situation can be that where the current context defining output, 316*o* of context mapping mechanism 316" is used by the knowledge base rules (KBR's) subsystem to determine a next active profile. For example, one of the knowledge base rules (KBR's) within a currently active profile may read as follows: "IF Current Context signals 316*o* include an active pointer to context space subregion XSR2 THEN Switch to PEEP profile number PEEP5.7 as being the currently active PEEP profile, ELSE . . . ". In such a case therefore, the output 316*o* of the context mapping mechanism 316" is supplying the knowledge base rules (KBR's) subsystem with input signals that the latter calls for and the two systems complement each other rather than conflicting with one another. The dependency may flow the other way incidentally, wherein the context mapping mechanism 316" uses a context resolving KBR algorithm that may read as follows: "IF Current PHAFUEL profile is number PHA6.8 THEN exclude context subregion XSR3, ELSE . . . " and this profile-dependent algorithm then controls how other profiles will be selected or not.

From the above, it can be seen that, in accordance with one aspect of the present disclosure, context guessing signals 316*o* are produced and output from a context space mapping mechanism (Xs) 316" which mechanism (Xs) is schematically shown in FIG. 3D as having an upper input plane through which "fuzzy" triangulating input signals 316*v* (categorized CFi's 311' plus optional others, as will be detailed below) project down into an inverted-pyramid-like hierarchical structure and triangulate around subregions of that space (316") so as to produce better (more refined) determinations of active "perceived" and/or "virtual" (PoV) contextual states (a.k.a. context space region(s), subregions (XSR's) and nodes). The term "triangulating" is used here-at in loose sense for lack of better terminology. It does not have to imply three linear vectors pointing into a hierarchical space and to a subregion or node located at an intersection point of the three linear vectors. Vectors and "triangulation" is one metaphorical way of understanding what happens except that such a metaphorical view places the output ahead of the input. The signals that are input into the illustrated mapping mechanisms (e.g., 313", 316") of FIG. 3D are more correctly described as including one or more of "categorized" CFi's and CFi complexes, one or more of physical context state descriptor signals (301*x*') and guidances (e.g., KBR guidances) 301*p*' provided by then active user profiles. Best guess fits are then found between the input vector signals (e.g., 316*v*) applied to the respective mapping mechanisms (e.g., 316") and specific regions, subregions or nodes found within the respective mapping mechanisms. The result of such automated, best guess fitting is that a "triangulation" of sorts develops around one or more regions (e.g., XSR1, XSR2) within the respective mapping mechanisms (e.g., 316") and the sizes of the best-fit subregions tend to shrink as the number of differentiating ones of "categorized" CFi's and the like increase. In hindsight, the input vector signals (e.g., 316*v*) may be thought of as having operated sort of like fuzzy pointing beams or "fuzzy" pointer vectors 316*v* that homed in on the one or more regions (e.g., XSR1, XSR2) of metaphorical "triangulation" although in actuality the vector signals 316*v* did not point there. Instead the automated, best guess fitting algorithms of the particular mapping mechanisms (e.g., 316") made it seem in hindsight as if the vector signals 316*v* did point there.

Just as having a large number of differentiating "fuzzy" pointer vectors 316*v* (vector signals 316*v*) helps to metaphorically home in or resolve down to well bounded context states or context space subregions of smaller hierarchical scope near the base (upper surface) of the inverted pyramid; conversely, as the number of differentiating vector signals (e.g., 316*v*) decreases, the tendency is for the resolving power of the metaphorical "fuzzy" pointer vectors to decrease whereby, in hindsight, it appears as if the "fuzzy" pointer vectors 316*v* were pointing to and resolving around only coarser (less hierarchically refined) nodes and/or coarser subregions of the respective mapping mechanism space, where those coarser nodes and/or subregions are conceptually located near the more "coarsely-resolved" apex portion of the inverted hierarchical pyramids rather than near the more "finely-resolved" base layers of the corresponding inverted hierarchical pyramids depicted in FIG. 3D. In other words, cruder (coarser, less refined, poorer resolution) determinations of active context space region(s) (XSR's) are usually had when the metaphorical projection beams of the supplied current focus indicator signals (the categorized CFi's) point to hierarchically-speaking; broader regions or domains disposed near the apex (bottom point) of the inverted pyramid and finer (higher resolution) determinations are usually had when the metaphorical projection beams "triangulate" around hierarchically-speaking; finer regions or domains disposed near the base of the inverted pyramid.

As indicated, the input vector signals (e.g., 316*v*) are not actually "fuzzy" pointer vectors because the result of their application to the corresponding mapping mechanism (e.g., 316") is usually not known until after the mapping mechanism (e.g., 316") has processed the supplied vector signals (e.g., 316*v*) and has generated corresponding output signals (e.g., 316*o*) which do identify the best fitting nodes and/or subregions. In one embodiment, the output signals (e.g., 316*o*) of each mapping mechanism (e.g., context mapping mechanism 316") are output as a sorted list that provides the identifications of the best fitted-to and more hierarchically refined nodes and/or subregions first (e.g., at the top of the list) and that provides the identifications of the poorly fitted-to and less hierarchically refined nodes and/or subregions last (e.g., at the bottom of the list). The output, resolving signals (e.g., 316*o*) may also include indications of how well or poorly the resolution process executed. If the resolution process is indicated to have executed more poorly than a predetermined acceptable level, the STAN_3 system 410 may elect to not generate any invitations (and/or promotional offerings) on the basis of the subpar resolutions of current, focused-upon nodes and/or subregions within the corresponding space (e.g., context space (Xs) or topic space (Ts)).

The input vector signals (e.g., 316*v*) that are supplied to the various mapping mechanisms (e.g., to context space 316", to topic space 313") as briefly noted above can include various context resolving signals obtained from one or more of a plurality of context indicating signals, such as but not limited to: (1) "pre-categorized" first CFi signals 302*o* produced by a first CFi categorizing-mechanism 302", (2) pre-categorized second CFi signals 298*o* produced by a second CFi categorizing-mechanism (298"), (3) physical context indicating signals 301*x*' derived from sensors that sense physical surroundings and/or physical states 301*x* of the user, and (4) context indicating or suggesting signals 301*p*' obtained from currently active profiles 310*p* of the user 301A' (e.g., from executing KBR's within those currently active profiles 310*p*). This aspect is represented in FIG. 3D by the illustrated signal feeds going into input port 316*v* of the context mapping mechanism 316". However, to avoid illustrative clutter, that aspect (multiple input feeds) is not repeated for others of the illustrated mapping mechanisms including: topic space 313", content space 314", emotional/behavioral states space 315", the social dynamics subspace represented by inverted pyramid 312" and other state defining spaces (e.g., pure and hybrid spaces) as are also represented by inverted pyramid 312".

While not shown in the drawings for all the various mapping mechanisms, it is to be observed that in general, each mapping mechanism 312"-316" has a mapped result signals output (e.g., 312*o*) which outputs results signals (also denoted as 312*o* for example) that can define a sorted list of identifications of nodes and/or subregions within that space that are most likely for a given time period (e.g., "Now") to indicate a focused mindset of the respective social entity (e.g., STAN user) with regard to attributes (e.g., topics, context, keywords, etc.) that are categorized within that mapped space. Since these mapping mechanism result signals (e.g., 312*o*) correspond to specific social entity (e.g., an identified STAN user) and to a defined time duration, the result signals (e.g., 312$o$) will generally include and/or logically link to social entity identification signals (e.g., User-ID) that identify a corresponding one or more users or user groups and to time duration identification signals that identify a corresponding one or more time durations in which the identified nodes and/or subregions can be considered to valid.

At this point in the disclosure, an important observation that was made above is repeated with slightly different wording. The user (e.g., 301A') is part of the context from under which his or her various actions emanate. More specifically, the user's currently "perceived" and/or "virtual" (PoV) set of contextual states (what is activated in his or her mind) is part of the context from under which user actions emanate. Also, often, the user's current physical surroundings and/or body states (301$x$) are part of the context from under which user actions emanate. The user's current physical surroundings and/or current body states (301$x$) can be sensed by various sensors, including but not limited to, sensors that sense, discern and/or measure: (1) surrounding physical images, (2) surrounding physical sounds, (3) surrounding physical odors or chemicals, (3) presence of nearby other persons (not shown in FIG. 3D), (4) presence of nearby electronic devices and their current settings and/or states (e.g., on/off, tuned to what channel, button activated, etc.), (5) presence of nearby buildings, structures, vehicles, natural objects, etc.; and (6) orientations and movements of various body parts of the user including his/her head, eyes, shoulders, hands, etc. Any one or more of these various contextual attributes can help to add additional semantic spin to otherwise ambiguous words (e.g., 301$w$), facial gestures (e.g., 301$g$), body orientations, gestures (e.g., blink, nod) and/or device actuations (e.g., mouse clicks) emanating from the user 310A'. Interpretation of ambiguous or "fuzzy" user expressions (301$w$, 301$g$, etc.) can be augmented by lookup tables (LUTs, see 310$q$) and/or knowledge base rules (KBR's) made available within the currently active profiles 301$p$ of the user as well as by inclusion in the lookup and/or KBR processes of dependence on the current physical surrounds and states 301$x$ of the user. Since the currently active profiles 301$p$ are selected by the context indicating output signals 316$o$ of context mapping mechanism 316" and the currently active profiles 301$p$ also provide context-hinting clue signals 310$p$' to the context mapping mechanism 316", a feedback loop (whose state should converge on a more refined contextual state of the user 301A') is created whereby profiles 301$p$ drive the context mapping mechanism 316" and the latter contributes to selection of the currently active profiles.

The feedback loop is not an entirely closed and isolated one because the real physical surroundings and state indicating signals 301$x$' of the user are included in the input vector signals (e.g., 316$v$) that are supplied to the context mapping mechanism 316". Thus context is usually not determined purely due to guessing about the currently activated (e.g., lit up in an fMRI sense) internal mind states (PoV's, a.k.a. "perceived" and/or "virtual" set of contextual states) of the user 301A' based on previously guessed-at mind states. The real physical surrounding context signals 301$x$' of the user are often grounded in physical reality (e.g., What are the current GPS coordinates of the user? What non-mobile devices is he proximate to? What other persons is he proximate to? What is their currently determined context? and so on) and thus the output signals 316$o$ of the context mapping mechanism 316" are generally prevented from running amuck into purely fantasy-based determinations of the current mind set of the user. Moreover, fresh and newly received CFi signals (302$e$', 298') are repeatedly being admixed into the input vector signals 316$v$. Thus the profiles-to-context space feedback loop is not free to operate in a completely unbounded and fantasy-based manner.

With that said, it may still be possible for the context mapping mechanism 316" to nonetheless output context representing signals 316$o$ that make no sense (because they point to or imply untenable nodes or subregions in other spaces as shall be explained below). In accordance with one aspect of the present disclosure, the conflicts and errors resolving module 301$pvp$ automatically detects such untenable conditions and in response to the same, automatically forces a reversion to use of the default set of safe profiles 310$d$. In that case, the context mapping mechanism 316" restarts from a safe broad definition of current user profile states and then tries to narrow the definition of current user context to one or more, smaller, finer subregions (e.g., XSR1 and/or XSR2) in context space as new CFi signals 302$e$', 298$e$' are received and processed by CFi categorizing-mechanisms 302" and 298".

It will now be explained in yet more detail how input vector signals (like 316$v$) for the mapping mechanisms (e.g., 316", 313") are generated from raw CFi signals and the like. There are at least two different kinds of energetic activities the user (301A' of FIG. 3D) can be engaged in. One is energetic paying of attention to user receivable inputs (298'). The other is energetic outputting of user produced signals (e.g., click streams, intentionally communicative head nods and facial expressions, etc.). A third possibility is that the user (301A' of FIG. 3D) is not paying attention and is instead day dreaming while producing meaningless and random facial expressions, grunts and the like.

In accordance with the system 300.D of FIG. 3D, a first set of sensors 298$a$' (referred to here as attentive inputting tracking sensors) are provided and disposed to track various biometric indicators of the user, such as eyeball movement patterns, eye movement speeds and so on, to thereby detect if the user is actively reading text and/or focusing-upon then presented imagery. A crude example of this may be simply that the user's head is facing towards a computer screen. A more refined example of such tracking of various biometric indicators could be that of keeping track of user eye blinking rates (301g) and breathing rates and then referring to the currently active PEEP profile of the user 301A' for translating such biometric activities into indicators that the user is actively paying attention to material being presented to him or not. As already explained in the here-incorporated STAN-1 and STAN-2 applications, STAN users may have unique ways of expressing their individual emotional states where these expressions and their respective meanings may vary based on context and/or current topic of focus. As such, context-dependent and/or topic of focus-dependent lookup tables (LUT's) and/or knowledge base rules (KBR's) are typically included in the user's currently active PEEP profile (not explicitly shown, but understood to be part of profiles set 301$p$). Raw expressions of each given user are run through that individual user's then active PEEP profile to thereby convert those expressions into more universally understood counterparts.

Incidentally, just as each user may have one or more unique facial expressions or the like for expressing internal emotional states (e.g., happy, sad, angry, etc.), each user may also have one or more unique other kinds of expressions (e.g., unique keywords, unique topic names, etc.) that they personally use to represent things that the more general populace expresses with use of other, more-universally accepted expressions (e.g., popular keywords, popular topic names, etc.). In accordance with one aspect of the disclosure, one or more of the user profiles 301*p* can include expression-translating lookup tables (LUT's) and/or knowledge base rules (KBR's) that provide translation from abnormal CFi expressions produced by the respective individual user into more universally understood, normal CFi expressions. This expression normalizing process is represented in FIG. 3D by items 301*q* and 302*qe*'. Due to space constraints in FIG. 3D, the actual disposition of module 302*qe*' (the one that replaces 'abnormal' CFi-transmitted expressions with more universally-accepted counterparts) could not be shown. The abnormal-to-normal swap operation of module 302*qe*' occurs in that part of the data flow where CFi-carried signals are coupled from CFi generating units 302*b*' and 298*a*' to CFi categorizing-mechanisms 302" and 298". In addition to replacing 'abnormal' CFi-transmitted expressions with more universally-accepted counterparts, the system includes a spell-checking and fixing module 302*qe*2' which automatically tests CFi-carried textual material for likely spelling errors and which automatically generates spelling-wise corrected copies of the textual material. (In one embodiment, the original, misspelled text is not deleted because the misspelled version can be useful for automated identification of STAN users who are focusing-upon same misspelled content.)

In addition to replacing and/or supplementing 'abnormal' CFi-transmitted expressions with more universally-accepted and/or spell-corrected counterparts, the system includes a new permutations generating module 302*qe*3' which automatically tests CFi-carried material for intentional uniqueness by for example detecting whether plural reputable users (e.g., influential persons) have started to use the unique pattern of CFi-carried data at about the same time, this signaling that perhaps a new pattern or permutation is being adopted by the user community (e.g., by influential early-adopter or Tipping Point Persons within that community) and that it is not a misspelling or an individually unique pattern (e.g., pet name) that is used only by one or a small handful of users in place of a more universally accepted pattern. If the new-permutations generating module 302*qe*3' determines that the new pattern or permutation is being adopted by the user community, the new-permutations generating module 302*qe*3' automatically inserts a corresponding new node into keyword expressions space and/or another such space (e.g., hybrid keyword plus context space) as may be appropriate so that the new-permutation no longer appears to modules 302*qe*' and 302*qe*2' as being an abnormal or misspelled pattern. The node (corresponding to the early-adopted new CFi pattern) can be inserted into keyword expressions space and/or another such space (e.g., hybrid keyword plus context space) even before a topic node is optionally created for new CFi pattern. Later, if and when a new topic node is created for a topic related to the new CFi pattern, there already exists in the system's keyword expressions space and/or another such space (e.g., hybrid keyword plus context space), a non-topic node to which the newly-created topic node can be logically linked. In other words, the system can automatically start laying down an infrastructure (e.g., keyword primitives; which will be explained in conjunction with 371 of FIG. 3E) for supporting newly emerging topics even before a large portion of the user population starts voting for the creation of such new topic nodes (and/or for the creation of associated, on-topic chat or other forum participation sessions).

Each of the CFi generating units 302*b*' and 298*a*' includes a current focus-indicator(s) packaging subunit (not shown) which packages raw telemetry signals from the corresponding tracking sensors into time-stamped, location-stamped, user-ID stamped and/or otherwise stamped and transmission ready data packets. These data packets are received by appropriate CFi processing servers in the cloud and processed in accordance with their user-ID (and/or local device-ID) and time and location (and/or other stampings). One of the basic processings that the data packet receiving servers (or automated services) perform is to group received packets of respective users and/or data-originating devices according to user-ID (and/or according to local originating device-ID) and to also group received packets belonging to different times of origination and/or times transmission into respective chronologically ordered groups. The so pre-processed CFi signals are then normalized by normalizing modules like 302*qe*'-302*qe*2' and then fed into the CFi categorizing-mechanisms 302" and 298" for further processing.

The first set of sensors 298*a*' have already been substantially described above. A second set of sensors 302*b*' (referred to here as attentive outputting tracking sensors) are also provided and appropriately disposed for tracking various expression outputting actions of the user, such as the user uttering words (301*w*), consciously nodding or shaking or wobbling his head, typing on a keyboard, making hand gestures, clicking or otherwise activating different activateable data objects displayed on his screen and so on. As in the case of facial expressions that show attentive inputting of user accessible content (e.g., what is then displayed on the user's computer screen and/or played through his/her earphone), unique and abnormal output expressions (e.g., pet names for things) are run through expression-translating lookup tables (LUT's) and/or knowledge base rules (KBR's) of then active PEEP and/or other profiles for translating such raw expressions into more normalized, Active Attention Evidencing Energy (AAEE) indicator signals of the outputting kind. The normalized AAEE indicator signals 298*e*' of the inputting kind have already been described.

The normalized Active Attention Evidencing Energy (AAEE) signals, 302*e*' and 298*e*' are next inputted into corresponding first and second CFi categorizing mechanisms 302" and 298" as already mentioned. These categorizing mechanisms organize the received CFi signals (302*e*' and 298*e*') into yet more usable groupings and/or categories than just having them grouped according to user-ID and/or time or telemetry origination and/or location of telemetry origination.

This improved grouping process is best explained with a few examples. Assume that within the 302*e*' signals (AAEE outputting signals) of the corresponding user 301A' there are found three keyword expressions: KWE1, KWE2 and KWE3 that have been input into a search engine input box, one at a time over the course of, say, 9 minutes. (The latter can be automatically determined from the time stamps of the corresponding CFi data packet signals.) One problem for CFi categorizing mechanism 302" is how to resolve whether each of the three keyword expressions: KWE1, KWE2 and KWE3 is directed to a respective separate topic or whether all are directed to a same topic or whether some other permutation holds true (e.g., KWE1 and KWE3 are directed to one topic but the time-wise interposed KWE2 is directed to an unrelated second topic). This is referred to here as the CFi grouping and parsing problem. Which CFi's belong with each other and which belong to another group or stand by themselves? (By way of a more specific example, assume that KWE1="Lincoln" and KWE3="address" while KWE2="Goldwater" although perhaps the user intended a different second keyword such as "Gettysburg". Note: At the time of authoring of this example, a Google™ online search for the string, "lincoln goldwater address" produced zero matches while "lincoln gettysburg address" produced over 500,000 results.)

A second problem for the CFi categorizing mechanism 302" to resolve is what kinds of CFi signals is it receiving in the first place? How did it know that expressions: KWE1, KWE2 and KWE3 were in the "keyword" category? In the case of keyword expressions, that question can be resolved fairly easily because the exemplary KWE1, KWE2 and KWE3 expressions are detected as having been submitted to a search engine through a search engine dialog box or a search engine input procedure. But other CFi's can be more difficult to categorize. Consider for example, a nod of the user's head up and down by the user and/or a simultaneous grunting noise made by the user. What kind of intentional expression, if at all, is that? The answer depends at least partly on context and/or culture. If the current context state is determined by the STAN_3 system 410 to be one where the user 310A' is engaged in a live video web conference with persons of a Western culture, the up-and-down head nod may be taken as an expression of intentional affirmation (yes, agreed to) to the others if the nod is pronounced enough. On the other hand, if the user 301A' is simply reading some text to himself (a different context) and he nods his head up and down or side to side and with less pronouncement, that may mean something different, dependent on the currently active PEEP profile. The same would apply to the grunting noise.

In general, the CFi receiving and categorizing mechanisms 302"/298" first cooperatively assign incoming CFi signals (normalized CFi signals) to one or the other or both of two mapping mechanism parts, the first being dedicated to handling information outputting activities (302') of the user 301A' and the second being dedicated to handling information inputting activities (298') of the user 301A'. If the CFi receiving and categorizing mechanisms 302"/298" cannot parse as between the two, they copy the same received CFi signals to both sides. Next, the CFi receiving and categorizing mechanisms 302"/298" try to categorize the received CFi signals into predetermined subcategories unique to that side of the combined categorizing mechanism 302"/298". Keywords versus URL expressions would be one example of such categorizing operations. URL expressions can be automatically categorizing as such by their prefix and/or suffix strings (e.g., by having a "dot.com" character string embedded therein). Other such categorization parsing include but are not limited to: distinguishing as between meta-tag type CFi's, image types, sounds, emphasized text runs, body part gestures, topic names, context names (i.e. role undertaken by the user), physical location identifications, platform identifications, social entity identifications, social group identifications, neo-cortically directed expressions (e.g., "Let X be a first algebraic variable . . . "), limbicly-directed expressions (e.g., "Please, can't we all just get along?"), and so on. More specifically, in a social dynamics subregion of a hybrid topic and context space, there will typically be a node disposed hierarchically under limbic-type expression strings and it will define a string having the word "Please" in it as well as a group-inclusive expression such as "we all" as being very probably directed to a social harmony proposition. In one embodiment, expressions output by a user (consciously or subconsciously are automatically categorized as belonging to none, or at least one of: (1) neo-cortically directed expressions (i.e., those appealing to the intellect), (2) limbicly-directed expressions (i.e., those appealing to social interrelation attributes) and (3) reptilian core-directed expressions (i.e., those pertaining to raw animal urges such as hunger, fight/flight, etc.). In one embodiment, the neo-cortically directed expressions are automatically allocated for processing by the topic space mapping mechanism 313" because expressions appealing to the intellect are generally categorizable under different specific topic nodes. In one embodiment, the limbicly-directed expressions are automatically allocated for processing by the emotional/behavioral states mapping mechanism 315" because expressions appealing to social interrelation attributes are generally categorizable under different specific emotion and/or social behavioral state nodes. In one embodiment, the reptilian core-directed expressions are automatically allocated for processing by a biological/medical state(s) mapping mechanism (see exemplary primitive data object of FIG. 3O) because raw animal urges are generally attributable biological states (e.g., fear, anxiety, hunger, etc.).

The automated and augmenting categorization of incoming CFi's is performed with the aid of one or more CFi categorizing and inferencing engines 310' where the inferencing engines 310' have access to categorizing nodes and/or subregions within, for example, topic and context space (e.g., in the case of the social harmony invoking example given immediately above: "Please, can't we all just get along?") or more generally, access to categorizing nodes and/or subregions within the various system mapping mechanisms. The inferencing engines 310' receive as their inputs, last known state signals from various ones of the state mapping mechanisms. More specifically, the last determined to be most-likely context states are represented by xs signals received by the inferencing engines 310' from the output 316*o* of the context mapping mechanism 316"; the last determined to be most-likely focused-upon content materials are represented by cs signals received from the output 314*o* of the content mapping mechanism 314" (where 314" stores representations of content that is available to be focused-upon by the user 301A'); the previously determined to be most-likely CFi categorizations are received as "cfis" signals from the CFi categorizing mechanism 302"/298"; the last determined as probable emotional/behavioral states of the user 301A' are received as "es" signals from an output 315*o* of an emotional/behavioral state mapping mechanism 315", and so on.

In one embodiment, the inferencing engines 310' operate on a weighted assumption that the past is a good predictor of the future. In other words, the most recently determined states xs, es, cfis of the user (or of another social entity that is being processed) are used for categorizing the more likely categories for next incoming new CFi signals 302*e*' and 298*e*'. The "cs" signals tell the inferencing engines 310' what content was available to the user 310A' at the time one of the CFi's was generated (time stamped CFi signals) for being then perceived by the user. More specifically, if a search engine input box was displayed in a given screen area, and the user inputted a character string expression into that area at that time, then the expression is determined to most likely be a keyword expression (KWE). If a particular sound was being then output by a sound outputting device near the user, then a detected sound at that time (e.g., music) is determined to most likely be a music and/or other sound CFi the user was exposed to at the time of telemetry origination. By categorizing the received (and optionally normalized) CFi's in this manner it becomes easier to subsequently parse them, and group logically interrelated ones of them together before transmitting the parsed and grouped CFi's as input vector signals into appropriate ones of the mapping mechanisms.

Yet more specifically and by way of example, it will be seen below that the present disclosure contemplates a music-objects organizing space (or more simply a music space, see FIG. 3F). Current background music that is available to the user 301A' may be indicative of current user context and/or current user emotional/behavioral state. Various nodes and/or subregions in music space can logically link to 'expected' emotional/behavioral state nodes, and/or to 'expected' context state nodes/regions and/or to 'expected' topic space nodes/regions within corresponding data-objects organizing spaces (mapping mechanisms). An intricate web of cross-associations is quickly developed simply by detecting, for example, a musical melody being played in the background and inferring from that, a host of parallel possibilities. More to the point, if the user 301A' is detected as currently being exposed to soft calming music, the 'expected' emotional/behavioral state of the user is automatically assumed by the CFi categorizing and inferencing engines 310' (in one embodiment) to be a calm and quieting one. That colors how other CFi's received during the same time period and in the same physical context will be categorized. Each CFi categorization can assist in the additional and more refined categorizing and placing of others of the contemporaneous CFi's of a same user in proper context since the other CFi's were received from a same user and in close chronological and/or geographical interrelation to one another.

Aside from categorizing individual ones of the incoming CFi's, the CFi categorizing and inferencing engines 310' can parse and group the incoming CFi's as either probably belonging together with each other or probably not belonging together. It is desirable to correctly group together emotion indicating CFi's with their associated non-emotional CFi's (e.g., keywords) because that is later used by the system to determine how much "heat" a user is casting on one node or another in topic space (TS) and/or in other such spaces.

In terms of a specific example, consider again the sequentially received set of keyword expressions: KWE1, KWE2 and KWE3; where as one example, KWE1="Lincoln", KWE3="address" while KWE2 is something else and its specific content may color what comes next. More specifically, consider how topic and context may be very different in a first case where KWE2="Gettysburg" versus an alternate case where KWE2="car dealership". (Those familiar with contemporary automobile manufacture would realize that "Lincoln car dealership" probably corresponds to a sales office of a car distributor who sells on behalf of the Mecrury/Lincoln™ brand division of the Ford Motor Company. "Gettysburg Address" on the other hand, corresponds to a famous political event in American history. These are usually considered to be two entirely different topics.)

Assume also that about 90 seconds after KWE3 was entered into a search engine and results were revealed to the user, the user 301A' became "anxious" (as is evidenced by subsequently received physiological CFi's; perhaps because the user is in Fifth Grade and just realized his/her history teacher expects the student to memorize the entire "Gettysburg Address"). The question for the machine system to resolve in this example is which of the possible permutations of KWE1, KWE2 and KWE3 did the user become "anxious" over and thus project increased "heat" on the associated topic nodes? Was it KWE1 taken alone or all of KWE1, KWE2 and KWE3 taken in combination or a subcombination of that? For sake of example, let it be assumed that KWE2 (e.g., ="Goldwater") was a typographic error input by the user. He meant at the time to enter KWE3 instead, but through inadvertence, he caused an erroneous KWE2 to be submitted to his search engine. In other words, the middle keyword expression, KWE2 is just an unintended noise string that got accidentally thrown in between the relevant combination of just KWE1 and KWE3. How does the system automatically determine that KWE2 is an unintended noise string, while KWE1 and KWE3 belong together? The answer is that, at first, the machine system 410 does not know. However, embedded within a keyword expressions space (see briefly 370 of FIG. 3E) there will often be combinatorial sets of keyword expressions that are predetermined to make sense (e.g., node 373.1 of FIG. 3E) and missing from that space will be nodes and/or subregions representing combinatorial sets of keyword expressions (e.g., "KWE1, AND KWE2 AND KWE3") that are not predetermined to make sense (at the relevant time; because after this disclosure is published, the phrase, "lincoln goldwater address" might become attributable to the topic of STAN systems). Recall at this juncture in the present description that the inferencing engines 310' have access to the hierarchical data structures inside various ones of the system's data-objects organizing spaces (mapping mechanisms). Accordingly, the inferencing engines 310' first automatically entertain the possibility that the keyword permutation: "KWE1, AND KWE2 AND KWE3" can make sense to a reasonable or rational STAN user situated in a context similar to the one that the CFi-strings-originating user, 301A' is situated in. Accordingly, the inferencing engines 310' are configured to automatically search through a hybrid context-and-keywords space (not shown, but see briefly in its stead, node 384.1 of FIG. 3E) for a node corresponding to the entertained permutation of combined CFi's and it then discovers that the in-context node corresponding to the entertained permutation: "KWE1, AND KWE2 AND KWE3" is not there. As a consequence, the inferencing engines 310' automatically throw away the entertained permutation as being an unreasonable/irrational one (unreasonable at least to the machine system at that time; and if the machine system is properly modeling a reasonable/rational person similarly situated in the context of user 301A', the rejected keyword permutation will also be unreasonable to the similarly situated reasonable person).

In one embodiment, the inferencing engines 310' alternatively or additionally have access to one or more online search engines (e.g., Google™' Bing™) and the inferencing engines 310' are configured to submit some of their entertained keyword permutations to the one or more online search engines (and in one embodiment, in a spread spectrum fashion so as to protect the user's privacy expectations by not dishing out all permutations to just one search engine) and to determine the quality (and/or quantity) of matches found so as to thereby automatically determine the likelihood that the entertained keyword permutation is a valid one as opposed to being a set of unrelated terms.

Eventually, the inferencing engines 310' automatically entertain the keyword permutation represented by "KWE1 AND KWE3". In this example, the inferencing engines 310' find one or more corresponding nodes and/or subregions in keyword and context hybrid space (e.g., "Lincoln's Address") where some are identified as being more likely than others, given the demographic context of the user 301A' who is being then tracked (e.g., a Fifth Grade student). This tells the inferencing engines 310' that the "KWE1 AND KWE3" permutation is a reasonable one that should be further processed by the topic and/or other mapping mechanisms (313" or others) so as to produce a current state output signal (e.g., 3130) corresponding to that reasonable-to-the-machine keyword permutation (e.g., "KWE1 AND KWE3")

and corresponding to the then applicable user context (e.g., a Fifth Grade student who just came home from school and normally does his/her homework at this time of day). One of the outcomes of determining that "KWE1 AND KWE3" is a valid permutation while "KWE2 AND KWE3" is not (because KWE2 is accidentally interjected noise) is that the timing of emotion development (e.g., user 301A' becoming "anxious") began either with the results obtained from user-supplied keyword, KWE1 or the results obtained from KWE3 but not from the time of interjection of the accidentally interjected KWE2. That outcome may then influence the degree of "heat" and the timing of "heat" cast on topic space nodes and/or subregions that are next logically linked to the keyword permutation of "KWE1 AND KWE3". Thus it is seen how the CFi-permutations testing and inferencing engines 310' can help form reasonable groupings of keywords and/or other CFi's that deserve further processing while filtering out unreasonable groupings that will likely waste processing bandwidth in the downstream mapping mechanisms (e.g., topic space 313") without producing useful results (e.g., valid topic identifying signals 313*o*).

The categorized, parsed and reasonably grouped CFi permutations are then selected applied for further testing against nodes and/or subregions in what are referred to here as either "pure" data-objects organizing spaces (e.g., like topic space 313") or "hybrid" data-objects organizing spaces (e.g., 397 of FIG. 3E) where the nature of the latter will be better understood shortly. By way of at least a brief introductory example here (one that will be further explicated in conjunction with FIG. 3L), there may be a node in a music-context-topic hybrid space (see 30L.8 of FIG. 3L) that back links to certain subregions of topic space (see briefly 30L.8*c-e* of FIG. 3L). (Example: What musical score did the band play just before Abraham Lincoln gave his famous "Gettysburg Address"?) If the current user's focal state (see briefly focus-identifying data object 30K.0' of FIG. 3L) points to the hybrid, in-context music-topic node, it can be automatically determined from that, that the machine system 410 should also link back to, and test out, the topic space region(s) of that hybrid node to see if multiple hints or clues simultaneously point to the same back-linked topic nodes and/or subregions. If they do, the likelihood increases that those same back-linked topic nodes and/or subregions are focused-upon regions of topic space corresponding to what the user 301A' is focused-upon and corresponding focus scores for those nodes/subregions are then automatically increased. At the end of the process, the added together plus or minus scores for different candidate nodes and/or subregions in topic space are summed and the results are sorted to thereby produce a sorted list of more-likely-to-be focused-upon topic nodes and less likely ones. Thus, current user focus-upon a particular subregion of topic space can be determined by automated machine means. As mentioned above (with regard to 312*o*), the sorted results list will typically include or be logically linked to the user-ID and/or an identification of the local data processing device (e.g., smartphone) from which the corresponding CFi streamlet arose and/or to an identification of the time period in which the corresponding CFi streamlet (e.g., KWE1-KWE3) arose.

Still referring to FIG. 3D, only a few more frequently usable ones of many possible data-objects organizing spaces (e.g., mapping mechanisms) are shown therein. These include the often (but not always) important, topic space mapping mechanism 313", the usually just as important context space mapping mechanism 316", the then-available-content space mapping mechanism 314", the emotional/behavioral user state mapping mechanism 315", and a social interactions theories mapping mechanism 314", where the last inverted pyramid (312") in FIG. 3D can be taken to represent yet more such spaces.

Still referring a bit longer to FIG. 3D, it is to be understood that the automated matching of STAN users with corresponding chat or other forum participation opportunities and/or the automated matching of STAN users with suggested on-topic content is not limited to having to isolate nodes and/or subregions in topic space. STAN users can be automatically matched to one another and/or invited into same chat or other forum participation sessions on the basis of substantial commonality as between their raw or categorized CFi's of a recent time period. They can be referred to specific online content (for further research) on the basis of substantial matching between their raw or categorized CFi's of a recent time period and corresponding nodes and/or subregions in spaces other than topic space, such as for example, in keyword expressions space. Alternatively or additionally, STAN users can be automatically matched to one another and/or invited into same chat or other forum participation sessions on the basis of substantial commonality as between nodes and/or subregions of other-than-topic space spaces that their raw or categorized CFi's point towards. In other words, topic space is not the one and only means by way of which STAN users can be automatically joined together based on the CFi's up or in-loaded into the STAN_3 system 410 from their local monitoring devices. The raw CFi's alone may provide a sufficient basis for generating invitations and/or suggesting additional content for the users to look at. It will be seen shortly in FIG. 3E that nodes in non-topic spaces (e.g., keyword expressions space) can logically link to topic nodes and thus can indirectly point to associated chat or other forum participation sessions and/or associated suggestable content that is likely to be on-topic.

The types of raw or categorized CFi's that two or more STAN users have substantially in common are not limited to text-based information. It could instead be musical information (see briefly FIG. 3F) and the users could be linked to one another based on substantial commonality of raw or categorized CFi's directed music space and/or based on substantially same focused-upon nodes and/or subregions in music space (where said music space can be a data-objects organizing space that uses a primitives data structure such as that of FIG. 3F in a primitives layer thereof and uses operator node objects for defining more complex objects in music space in a manner similar to one that will be shortly explained for keyword expressions space). Alternatively or additionally, two or more STAN users can be automatically joined online with one another based on substantial cross-correlation of sound primitives (see briefly FIG. 3G) that are obtained from their respective CFi's. Alternatively or additionally, two or more STAN users can be automatically joined online with one another based on substantial cross-correlation of voice primitives (see briefly FIG. 3H) that are obtained from their respective CFi's. Alternatively or additionally, two or more STAN users can be automatically joined online with one another based on substantial cross-correlation of linguistic primitives (see briefly FIG. 3I) that are obtained from their respective CFi's. Alternatively or additionally, two or more STAN users can be automatically joined online with one another based on substantial cross-correlation of image primitives (see briefly FIG. 3M) that are obtained from their respective CFi's. Alternatively or additionally, two or more STAN users can be automatically joined online with one another based on substantial cross-correlation of body language primitives (see briefly FIG.

3N) that are obtained from their respective CFi's. Alternatively or additionally, two or more STAN users can be automatically joined online with one another based on substantial cross-correlation of physiological state primitives (see briefly FIG. 3O) that are obtained from their respective CFi's. Alternatively or additionally, two or more STAN users can be automatically joined online with one another based on substantial cross-correlation of chemical mixture objects defined by chemical mixture primitives (see briefly FIG. 3P) that are obtained from their respective CFi's.

Referring now to FIG. 3E, the more familiar, topic space mapping mechanism 313' is shown at the center of the diagram. For sake of example, other mapping mechanisms are shown to encircle the topic space hierarchical pyramid 313' and to cross link with nodes and/or subregions of the topic space hierarchical pyramid 313'. One of the other interlinked mapping mechanisms is a meta-tags data-objects organizing space 395. Although its apex-region primitives are not shown elsewhere in detail, the primitives of the meta-tags space 395 may include definitions of various HTML and/or XML meta-tag constructs. CFi streamlets that include various combinations, permutations and/or sequences of met-tag primitives may be categorized by the machine system 410 on the basis of information that is logically linked to relevant ones of the nodes and/or subregions of the meta-tags space 395. Yet another of the other interlinked mapping mechanisms is a keyword expressions space 370, where the latter space 370 is not illustrated merely as a pyramid, but rather the details of an apex portion and of further layers (wider and more away from the apex layers) of that keyword expressions space 370 are illustrated.

Before describing details of the illustrated keyword expressions space 370, a quick return tour is provided here through the hierarchical and plural tree branches-occupied structure (e.g., having the "A" tree, the "B" tree and the "C" tree intertwined with one another) of the topic space mechanism 313'. In the enlarged portion 313.51' of the space 313', a mid-layer topic node named, $Tn_{62}$ (see also the enlarged view in FIG. 3R) resides on the "A" tree; and more specifically on the horizontal branch number Bh(A)6.1 of the "A" tree but not on the "B" tree or the "C" tree. Only topic nodes Tn81 and Tn51 of the exemplary hierarchy reside on the "C" tree. Topic node Tn51 is the immediate parent of Tn62 and that parent links down to its child node, Tn62 by way of vertical connecting branch Bv(A)56.1 and horizontal connecting branch Bh(A)6.1. Other nodes (filled circle ones) hanging off of the "A" tree branch Bh(A)6.1 also reside on the "B" tree and hang off the latter tree's horizontal connecting branch Bh(B)6.1, where the B-tree branch is drawn as a dashed horizontal line.

Additionally, in FIG. 3E, topic node Tn61 is a parent to further children hanging down from, for example, "A" tree horizontal connecting branch Bh(A)7.11. One of those child nodes, Tn71, reflectively links to a so-called, operator node 374.1 in keyword space 370 by way of reflective logical link 370.6. Another of those child nodes, Tn74, reflectively links to another operator node 394.1 in URL space 390 by way of reflective logical link 370.7. As a result, the second operator node 394.1 in URL space 390 is indirectly logically linked by way of sibling relationship on horizontal connecting branch Bh(A)7.11 to the first mentioned operator node 374.1 that resides in the keyword expressions space 370.

Parent node Tn51 of the topic space mapping mechanism 313' has a number of chat or other forum participation sessions (forum sessions) 30E.50 currently tethered to it either on a relatively strongly anchored basis (whereby break off from, and drifting away from, that mooring is relatively difficult) or on a relatively weak anchored basis (whereby stretch away from and/or break off of the corresponding forum (e.g., chat room) from, and drifting away from that mooring point is relatively easier). Recall that chat rooms and/or other forums can vote to drift apart from one topic center (TC) and to more strongly attach one of their anchors (figuratively speaking) to a different topic center as forum membership and circumstances change. In general, topic space 313' can be a constantly and robustly changing combination of interlinked nodes and/or subregions whose hierarchical organizations, names of nodes, governance bodies controlling the nodes, and so on can change over time to correspond with changing circumstances in the virtual and/or non-virtual world.

The illustrated plurality of forum sessions 30E.50 are hosting a first group of STAN users 30E.49, where those users are currently dropping their figurative anchors onto those forum sessions 30E.50 and thereby 'touching' topic node Tn51 to one extent of cast "heat" energy or another depending on various "heat" generating attributes (e.g., duration of participation, degree of participation, emotions and levels thereof detected as being associated with the chat room participation and so on). Depending on the sizes and directional orientations of their halos, some of the first users 30E.49 may apply 'touching' heat to child node Tn61 or even to grandchildren of Tn51, such as topic node Tn71. Other STAN users 30E.48 may be simultaneously 'touching' other parts of topic space 313' and/or simultaneously 'touching' parts of one or more other spaces, where those touched other spaces are represented in FIG. 3E by pyramid symbol 30E.47. Representative pyramid symbol 30E.47 can represent keyword expressions space 370 or URL expressions space 390 or a hybrid keyword-URL expressions space (380) that contains illustrated node 384.1 or any other data-objects organizing space.

Referring to now to the specifics of the keyword expressions space 370 of the embodiment represented by FIG. 3E, a near-apex layer 371 of what in its case, would be illustrated as an upright pyramid structure, contains so-called, "regular" keyword expressions. An example of what may constitute such a "regular" keyword expression would be a string like, "???patent*" where here, the suffix asterisk symbol (*) represents an any-length wildcard which can contain zero, one or more of any characters in a predefined symbols set while here, each of the prefixing question mark symbols (?) represents a zero or one character wide wildcard which can be substituted for by none or any one character in the predefined symbols set. Accordingly, if the predefined symbols set includes the letters, A-Z and various punctuation marks, the "regular" keyword expression, "???patent*" may define an automated match-finding query that can be satisfied by the machine system finding one or more of the following expressions: "patenting", "patentable" "non-patentable", "un-patentable", nonpatentability" and so on. Similarly, an exemplary "regular" keyword expression such as, "???obvi*" may define an automated match-finding query that can be satisfied by the machine system finding one or more of the following expressions: "nonobvious", "obviated" and so on. A Boolean combination expression such as, "???patent*" AND "???obvi*" may therefore be satisfied by the machine system finding one or more expressions such as "patentably unobvious" and "patently nonobvious". These are of course, merely examples and the specific codes used for representing wild cards, combinatorial operators and the like may vary from application to application. The "regular" keyword expression definers may include mandates for capitalization and/or other typographic configurations (e.g., underlined, bolded and/or other) of the one or more of the represented characters and/or for exclusion (e.g., via a minus sign) of certain subpermutations from the represent keywords.

In one embodiment, the "regular" keyword expressions of the near-apex layer 371 are clustered around keystone expressions and/or are clustered according to Thesaurus™ like sense of the words that are to be covered by the clustered keyword primitives. By way of example, assume again that a first node 371.1 in primitives layer 371 defines its keyword expression (Kw1) as "lincoln*" where this would cover "Abe Lincoln", "President Abraham Lincoln" and so on, but where this first node 371.1 is not intended to cover other contextual senses of the "lincoln*" expression such as those that deal with the Lincoln™ brand of automobiles. Instead, the "lincoln*" expression according to that other sense would be covered by another primitive node 371.5 that is clustered in addressable memory space near nodes (371.6) for yet other keyword expressions (e.g., Kw6?*) related to that alternate sense of "Lincoln". Such Thesaurus™ like or semantic contextual like clustering is used in this embodiment for the sake of reducing bit lengths of digital pointers that point to the keyword primitives.

Assume for sake of example that a second node 371.2 is disposed in the primitives holding layer 371 fairly close, in terms of memory address number to the location where the first node 371.1 is stored. Assume moreover, that the keyword expression (Kw2) of the second node 371.2 covers the expression, "*Abe" and by so doing covers the permutations of "Honest Abe", "President Abe" and perhaps many other such variations. As a result, the Boolean combination calling for Kw1 AND Kw2 may be found in many of so-called, "operator nodes". An operator node, as the term is used herein, functions somewhat similarly to an ordinary node in a hierarchical tree structure except that it generally does not store directly within it, a definition of its intended, combined-primitives attribute. More specifically, if a first operator node 372.1 shown in sequences/combinations layer were an ordinary node rather than an operator node, that node would directly store within it, the expression, "lincoln*" AND "*Abe" (if the Abe Lincoln example is continued here). However, in accordance with one aspect of the present disclosure, node 372.1 contains references to one or more predefined functional "operators" (e.g., AND, OR, NOT, parenthesis, Nearby(number of words), After, Before, NotNearby( ) NotBefore, and so on) and pointers as substitutes for variables that are to be operated on by the referenced functional "operators". One of the pointers (e.g., 370.1) can be a long or absolute or base pointer having a relatively large number of bits and another of the pointers (e.g., 370.12) can be a short or relative or offset pointer having a substantially smaller number of bits. This allows the memory space consumed by various combinations of primitives (two primitives, three primitives, four, . . . 10, 100, etc.) to be made relatively small in cases where the plural ones of the pointed-to primitives (e.g., Kw1 and Kw2) are clustered together, address-wise in the primitives holding layer (e.g., 371). In other words, rather than using two long-form pointers, 370.1 and 370.2 to define the "AND"ed combination of Kw1 and Kw2, the first operator node 372.1 may contain just one long-form pointer, 370.1, and associated therewith, one or more short-form pointers (e.g., 370.12) that point to the same clustering region of the primitives holding layer (e.g., 371) but use the one long-form pointer (e.g., 370.1) as a base or reference point for addressing the corresponding other primitive object (e.g., Kw2 371.2) with a fewer number of bits because the other primitive object (e.g., Kw2 node 371.2) is clustered in a Thesaurus™ like or semantic contextual like clustering way to one or more keystone primitives (e.g., Kw1 node 371.1). While FIG. 3E shows pointers such as 370.1, 370.4, 370.5 etc. pointing upwardly in the hierarchical tree structure, it is to be understood that the illustrated hierarchical tree structure is navigatable in hierarchical down, up and/or sideways directions such that children nodes can be traced to from their respective parent nodes, such that parent nodes can be traced to from their respective child nodes and/or such that sibling nodes can be traced to from their co-sibling nodes.

Referring to FIG. 3Q, shown there is an exemplary but not limiting data structure for defining an operator node. In the example, a first field indicates the size of the operator node object (e.g., number of bits or words). A second field lists pointer types (e.g., long, short, operator or operand, etc.) and numbers and/or orders in the represented expression of each. A third field contains a pointer to an expression structure definition that defines the structure of the subsequent combination of operator pointers and operand pointers. The operator pointers logically link to corresponding operator definitions. The operand pointers logically link to corresponding operand definitions. An example of an operand definition can be one of the keyword expressions (e.g., 371.6) of FIG. 3E. An example of a operator definition might be: "AND together the next N operands". More specifically, the illustrated pointer to Operator definition #2 might indicate: OR together the next M operands (as pointed to by their respective pointers, Ptr. to Operand #2a, Ptr. to Operand #2b, etc.) and then AND the result with the preceding expression portion (e.g., Operator #1=NOT and Operand #1="Car?"). The organization of operators and operands can be defined by an organization defining object pointed to by the third field. As mentioned, this is merely a nonlimiting example.

Referring back to FIG. 3E, in accordance with another aspect of the present disclosure, primitive defining nodes (e.g., Kw2 node 371.2) include logical links to semantic or other equivalents thereof (e.g., to synonyms, to homonyms) and/or logical links to effective opposites thereof (e.g., to antonyms). A pointer in FIG. 3Q that points to an operand may be of a type that indicates: include synonyms and/or include homonyms and/or include or swap-in the effective opposites thereof (e.g., to antonyms). Thus, by pointing to just one keyword expression node (e.g., 371.2) an operator node object (e.g., 372.1) may automatically inherit synonyms and/or homonyms of the pointed-to one keyword. The concept of incorporating effective equivalents and/or effective opposites applies to other types of primitives besides just keyword expression primitives. More specifically, a URL expression primitive (e.g., 391.2) might be of a form such as: "wwwlincoln*" and it might further have a logical link to another URL primitive (not shown) that references web sites whose URL's satisfy the criteria: "www.*honest?abe*". Thus, a URL's combining operator node (e.g., 394.1) might inherency-wise make reference to web sites whose URL name includes, "Honest Abe" (as an example) as well as those whose URL name includes, "Abraham-Lincoln" (as an example).

As further shown in FIG. 3E, operator node objects (e.g., 373.1) can each refer to another operator node objects (e.g., 372.1) as well as to primitive objects (e.g., Kw3). Thus complex combinations of keyword expression patterns can be defined with a small number of operator node objects. The specifying within operator node objects (e.g., 374.1) of primitive patterns can include a specifying of sequence patterns (what comes before or after what), a specifying of overlap and/or timing interrelations (what overlaps chronologically or otherwise with what (or does not overlap) and to what extent of overlap or spacing apart) and a specifying of contingent score changing expressions (e.g., IF Kw3 is Near(within 4 words of) Kw4 Then reduce matching score or other specified score by indicated amount).

As further shown in FIG. 3E, operator node objects (e.g., 374.1) can uni-directionally or bi-directionally link logically to nodes and/or subregions in other spaces. More specifically, operator node object 374.1 is shown to logically link by way of bi-directional link 370.6 to topic node Tn71. Accordingly, if keywords operator node 374.1 is pointed directly to (by matching with it) or pointed to indirectly (by matching to its parent node or child node) by a categorized CFi or by a plurality of categorized CFi's or otherwise, then the categorized set of one or more CFi's thereby logically link by way of cross-space bi-directional link 370.6 to topic node Tn71. The cross-space bi-directional link 370.6 may have forward direction and/or back direction strength scores associated with it as well as a pointer's-halo size and halo fade factors associated with it so that it (the cross-space link e.g., 370.6) can point to a subregion of the pointed-to other space and not just to a single node within that other space if desired. See also FIGS. 3R and 3S for enlarged views of how the pointer's-halo size strengths can contribute to total scores of topic nodes (e.g., Tn74" of FIG. 3S) when a node is painted over by wide projection beams or narrow, focused pointer beams of respective beam intensities (e.g., narrow beam 370.6*sw*' in FIG. 3R versus 370.6*sw*" in FIG. 3S). As used herein, a so-called, pointer's-halo (e.g., the one cast by logical link 370.6" in FIG. 3S) is not to be confused with a STAN user's 'touching' halo although they have a number of similar attributes, such as having variable halo spreads in different hierarchical directions (and/or variable halo spreads in different spatial directions of a multidimensional space that has distance and direction attributes) and such as having variable halo intensities or scoring strengths (positive or negative) and/or variable halo strength fading factors along respective different directions and/or according to respective hierarchical or other radii away from the pointed-to or directly 'touched' point in the respective space (e.g., topic space).

Figure 3R:
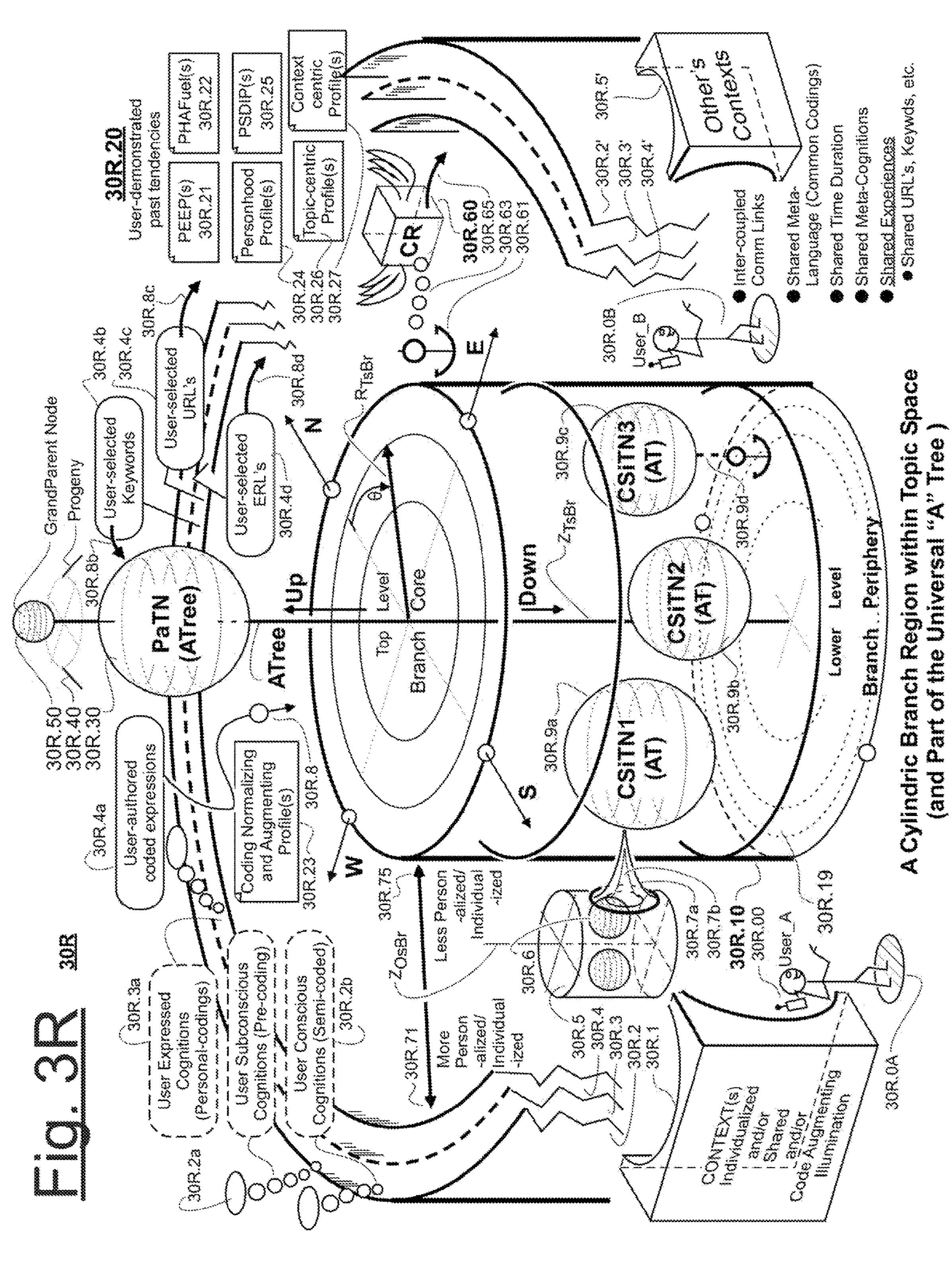
FIG. 3R illustrates a system for locating equivalent and near-equivalent nodes within a corresponding data organizing space.

In view of the above, it may be seen that the cross-spaces bi-directional link 370.6 of FIG. 3E may have various strength/intensity attributes logically attached to it for indicating how strongly topic node Tn71 links to operator node object 374.1 and/or how strongly operator node object 374.1 links to topic node Tn71 and/or whether parents (e.g., Tn61) or children (e.g., Tn81) and/or siblings (e.g., Tn74) of the pointed-to topic node Tn71 are also strongly, weakly or not at all linked to the node in the first space (e.g., 370) by virtue of a pointer's-halo cast by link 370.6 (halo not shown in FIG. 3E, see instead FIG. 3R). In other words, by matching (e.g., with use of a relative matching score that does not have to be 100% matching) one or more raw or categorized CFi's with corresponding nodes in keyword expressions space 370, the STAN_3 system 410 can then automatically discover what nodes (and/or what subregions) of topic space 313' and/or of another space (e.g., context space, emotions space, URL space, etc.) logically link to the received raw or categorized CFi's and how strongly. Linkage scores to different nodes and/or subregions in topic space can be added up for different permutations of CFi's and then the topic nodes and/or subregions that score highest can be deemed to be the most layer topic nodes/regions being focused-upon by the STAN user (e.g., user 301A') from whom the CFi's were collected. Moreover, linkage scores can be weighted by probability factors where appropriate. More specifically, a first probability factor may be assigned to keyword combination-and-sequence node 374.1 to indicate the likelihood that a received keyword expression cross-correlates well with node 374.1. At the same time, a respective other probability factor may be assigned to another keyword space node to indicate the likelihood that the same received keyword expression cross-correlates well with that other node (second keyword space node not shown, but understood to point to a different subregion of topic space than does cross-spaces link 370.6). Then, when likelihood scores are automatically computed for competing topic space nodes, the probability factor of each keyword space node is multiplied against the forward pointer strength factor of the corresponding cross-spaces logical link (e.g., that of 370.6) so as to thereby determine the additive (or subtractive) contribution that each cross-spaces logical link (e.g., 370.6) will paint onto the one or more topic nodes it projects its beam (narrow or wide spread beam) on.

The scores contributed by the cross-spaces logical links (e.g., 370.6) need not indicate or merely indicate what topic nodes/subregions the STAN user (e.g., user 301A') appears to be focusing-upon based on received raw or categorized CFi's. They can alternatively or additionally indicate what nodes and/or subregions in user-to-user associations (U2U) space the user (e.g., user 301A') appears to be focusing-upon and to what degree of likelihood. They can alternatively or additionally indicate what emotions or behavioral states in emotions/behavioral states space the user (e.g., user 301A') appears to be focusing-upon and to what degree of comparative likelihood. They can alternatively or additionally indicate what context nodes and/or subregions in context space (see 316" of FIG. 3D) the user (e.g., user 301A') appears to be focusing-upon and to what degree of comparative likelihood. They can alternatively or additionally indicate what context nodes and/or subregions in social dynamics space (see 312" of FIG. 3D) the user (e.g., user 301A') appears to be focusing-upon and to what degree of comparative likelihood. And so on.

Moreover, linkage strength scores to competing ones of topic nodes (e.g., Tn71 versus Tn74 in the case of FIG. 3E) need not be generated simply on the basis of keyword expression nodes (e.g., 374.1) linking more strongly or weakly to one topic node than to another (e.g., Tn71 versus Tn74). The cross-spaces linkage strength scores cast from URL nodes in URL space (e.g., the forward strength score going from URL operator node 394.1 to topic node Tn74) can be added in to the accumulating scores of competing ones of topic nodes (e.g., Tn71 versus Tn74). The respective linkage strength scores from Meta-tag nodes in Meta-tag space (395 of FIG. 3E) to the competing topic nodes (e.g., Tn71 versus Tn74) can be included in the machine-implemented computations of competing final scores. The respective linkage strength scores from hybrid nodes (e.g., Kw-Ur node 384.1 linking by way of logical link 380.6) to topic space and/or to another space can be included in the machine-implemented computations of competing final scores. In other words, a rich set of diversified CFi's received from a given STAN user (e.g., user 301A' of FIG. 3D) can lead to a rich set of cross-space linkage scores contributing to (or detracting from) the final scores of different ones of topic nodes so that specific topic nodes and/or subregions ultimately become distinguished as being the more layer ones being focused-upon due to the hints and clues collected from the given STAN user (e.g., user 301A' of FIG. 3D) by way of up or in-loaded CFi's, CVi's and the like as well as assistance provided by the then active personal profiles 301*p* of the given STAN user (e.g., user 301A' of FIG. 3D).

Cross-spaces logical linkages such as 370.6 are referred to herein as "reflective" when they link to a node (e.g., to topic node Tn71) that has additional links back to the same space (e.g., keyword space) from which the first link (e.g., 370.6) came from. Although not shown in FIG. 3E, it is to be understood that a topic node such as Tn71 will typically have more than one logical link (more than just 370.6) logically linking it to nodes in keyword expressions space (as an example) and/or to nodes in other spaces outside of topic space. Accordingly, when a given user's (e.g., user 301A') CFi's are matched 100% or less to a first node (e.g., 374.1) in keyword expressions space, that keyword node will likely link to a topic node (e.g., Tn71) that links back to yet other nodes (other than 374.1) in keyword expressions space 370. Therefore, if a cross-correlation is desired as between keyword expressions that have a same topic node or topic space subregion (TSR) in common, the bi-directional nature of cross-spaces links such as 370.6 may be followed to the common nodes in topic space and then a tracing back via other linkages from that region of topic space 313' to keyword expressions space 370 may be carried out by automated machine-implemented means so as to thereby identify the topic-wise cross-correlated other keyword expressions. A similar process may be carried out for identifying URL nodes (e.g., 391.2) that are topic-wise cross-correlated to one another and so on. A similar process may be carried out for identifying URL nodes (e.g., 394.1) that are cross-correlated to each other by way of a common hybrid space node (e.g., 384.1) or by way of a common keyword space node. More generally, cross-correlations as between nodes and/or subregions in one space (e.g., keyword space 370) that have in common, one or more nodes and/or subregions in a second space (e.g., topic space 313' of FIG. 3E) may be automatically discovered by backtracking through the corresponding cross-space linkages (e.g., start at keyword node 374.1, forward track along link 370.6 to topic node Tn71, then chain back to a different node in keyword space 370 by tracking along a different cross-space linkage that logically links node Tn71 to keyword expressions space). In one embodiment, the automated cross-correlations discovering process is configured to unearth the stronger ones of the backlinks from say, common node Tn71 to the space (e.g., 370) where cross-correlations are being sought. One use for this process is to identify better keyword combinations for linking to a given topic space region (TSR) or other space subregion. More specifically, if the Fifth Grade student of the above example had used "Honest Abe" as the keyword combination for navigating to a topic node directed to the Gettysburg Address, a search for stronger cross-correlated keyword combinations may inform the student that the keyword combination, "President Abraham Lincoln" would have been a better search expression to be included in the search engine strategy.

Referring to FIG. 3J, it may be recalled that the demographic attributes of the exemplary Fifth Grade student (studying the Gettysburg Address) can serve as a filtering basis for narrowing down the set of possible nodes in topic space which should be suggested in response to a vague search keyword of the form, "lincoln*". It becomes evident to the STAN_3 system 410 that the given STAN user (e.g., Fifth Grade student) more likely intends to focus-upon "Abraham Lincoln" and not "Local Ford/Mercury/Lincoln Car Dealerships" because the user is part of the context and the user's demographic attributes are thus part of the context. In the example, the user's education level (e.g., Fifth Grade), the user's habits-driven role (e.g., in student mode immediately after school) and the user's age group can operate as hints or clues for narrowing down the intended topic.

More generally and in accordance with the present disclosure, a context data-objects organizing space (a.k.a. context space or context mapping mechanism, e.g., 316'' of FIG. 3D) is provided within the STAN_3 system 410 to be composed of context space primitive objects (e.g., 30J.0 of FIG. 3J) and operator node objects (not shown) that logically link with such context primitives (e.g., 30J.0). In one embodiment, each context primitive has a data structure with a number of context defining fields where these fields may include one or more of: (1) a first field 30J.1 indicating a formal name of a role assumed by an actor (e.g., STAN user) that is likely to be operating under a corresponding context. Examples of roles may include socio-economic designations such as (but not limited to) full-time student, part-time teacher, employee, employer, manager, subordinate, and so on. The role designation may include an active versus inactive indicating modifier such as, "retired college professor" as compared to "acting general manager" for example. Instead of, or in addition to, naming a formal role, the first field 30J.1 may indicate a formal name of an activity corresponding to the actor's context or role (e.g., managing chat room as opposed to chat room manager).

Another of the fields in each context primitive defining object 30J.0 can be (2) a second field 30J.2 to informal role names or role states or activity names. The reason for this second field 30J.2 is because the formal names assigned to some roles (e.g., Vice President) can often be for sake of ego rather than reality. Someone can be formally referred to as Vice President or manager of Data Reproduction when in fact they operate the company's photocopying machine. Therefore cross-links 30J.2 to the informal but more accurate definitions of the actor's role may be helpful in more accurately defining the user's context. The pointed-to informal role can simply be another context primitive defining object like 30J.0. Assigned roles (as defined by field 30J.1) will often have one or more normally expected activities or performances that correspond to the named formal role. For example, a normally expected activity of someone in the context of being a "manager" might be "managing subordinates". Therefore, when a user is in the context of being an acting manager (as defined by field 30J.1), corresponding third field 30J.3 may include a pointer pointing to an operator node object in context space or in an activities space that combines the activity "managing" with the object of the activity, "subordinates". Each of those primitives ("managing" and "subordinates") may logically link to nodes in topic space and/or to nodes in other spaces. Although each user who operates under an assumed role (context) is "expected" to perform one or more of the expected activities of that role, it may be the case that the individual user has habits or routines wherein the individual user avoids certain of those "expected" performances. Such exceptions to the general rule are defined (in one embodiment) within the individual user's currently active PHA-FUEL profile (e.g., FIG. 5A).

A fourth field 30J.4 may include pointers pointing to one or more expected-wise cross-correlated nodes in topic space. The pointers of fourth field 30J.4 may alternatively or additionally point to knowledge base rules (KBR's) that exclude or include various nodes and/or subregions of topic space. More specifically, if the role or user context is Fifth Grade Student, one of the pointed-to KBR's may exclude or substantially downgrade in match score, topic nodes directed to purchase, driving or other uses of automobiles.

A fifth field 30J.5 of each context primitive may include pointers to, and/or knowledge base rules (KBR's) for including and/or excluding subregions of a demographics space (not shown). The logical links between context space (e.g., 316") and demographics space (not shown) should be bi-directional ones such that the providing of specific demographic attributes will link with different linkage strength values (positive or negative) to nodes and/or subregions in context space (e.g., 316") and such that the providing of specific context attributes (e.g., role name equals "Fifth Grade Student") link with different linkage strength values (positive or negative) to nodes and/or subregions in demographics space (e.g., age is probably less than 15 years old, height is probably less than 6 feet and so on).

A sixth field 30J.6 of each context primitive 30J.0 may include pointers to, and/or knowledge base rules (KBR's) for including and/or excluding likely subregions of a forums space (not shown, in other words, a space defining different kinds of chat or other forum participation opportunities).

A seventh field 30J.7 of each context primitive 30J.0 may include pointers to, and/or knowledge base rules (KBR's) for including and/or excluding likely subregions of a users space (not shown). More specifically, a primitive 30J.0 whose formal role is "Fifth Grade Student" may have pointers and/or KBR's in seventh field 30J.7 pointing to "Fifth Grade Teachers" and/or "Fifth Grade Tutors" and/or "Other Fifth Grade Students". In one embodiment, the seventh field 30J.7 specifies other social entities that are likely to be currently giving attention to the person who holds the role of primitive 30J.0. More specifically, a social entity with the role of "Fifth Grade Teacher" may be specified as a role who is likely giving current attention to the inhabitant who holds the role of primitive 30J.0 (e.g., "Fifth Grade Student"). The context of a STAN user can often include a current expectation that other users are casting attention on that first user. people may cat differently when alone as opposed to when they believe others are watching them.

Each context primitive 30J.0 may include pointers to, and/or knowledge base rules (KBR's) for including and/or excluding likely subregions of yet other spaces (other data-objects organizing spaces) as indicated by eighth area 30J.8 of data structure 30J.0.

Referring to FIG. 3R as well as FIG. 3Q, in one embodiment, the operator node objects and/or cross-spaces links (e.g., 370.6', 370.7') emanating therefrom may be automatically generated by so-called, keyword expressions space consolidator modules (e.g., 370.8'). Such consolidator modules (e.g., 370.8') automatically crawl through their respective spaces looking for nodes and/or logical links that can be consolidated from many into one without loss of function. More specifically, if keyword node 374.1 of FIG. 3E hypothetically had four cross-space links like 370.6, each pointing to a respective one of topic nodes Tn71 to Tn74 with same strength, then those four hypothetical (not shown) cross-space links could be consolidated into a single, wide beam projecting link (see 370.6" of FIG. 3S) without loss of function. A consolidator module (e.g., 370.8') would find such overlap and/or redundancy and consolidate the many links into a functionally equivalent one and/or the many nodes into a functionally equivalent one node where possible. Such consolidation would reduce memory consumption and increase data processing speed because the keyword-to-topic nodes matching servers would have a fewer number of nodes and/or cross-spaces links to trace through.

Figure 3S:
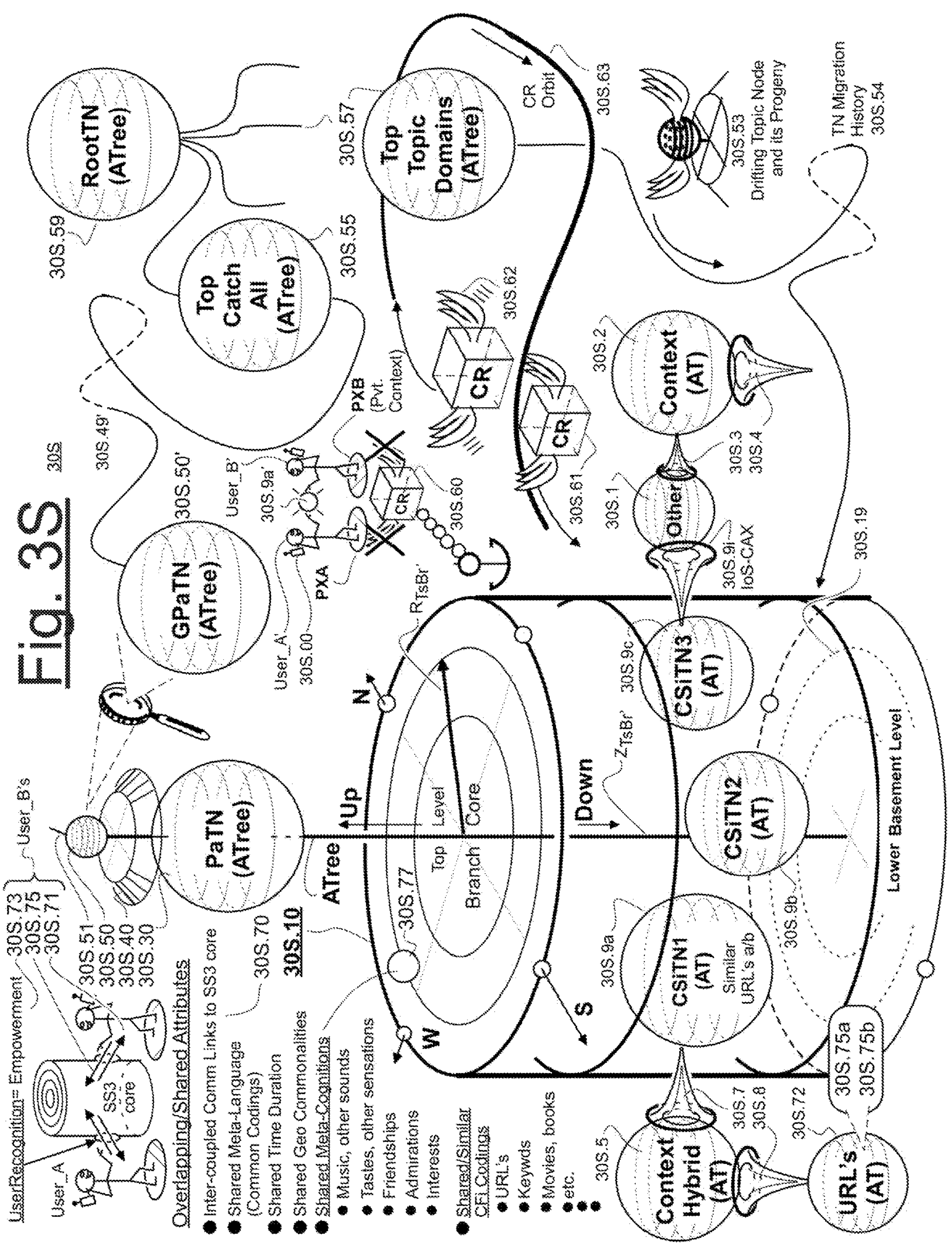
FIG. 3S illustrates a system that automatically scans through a hybrid context-other space (e.g., context-keyword expressions space) in order to identify context appropriate topic nodes and/or subregions that score highest for correspondence with CFi's received under the assumed context.
Figure 3T:
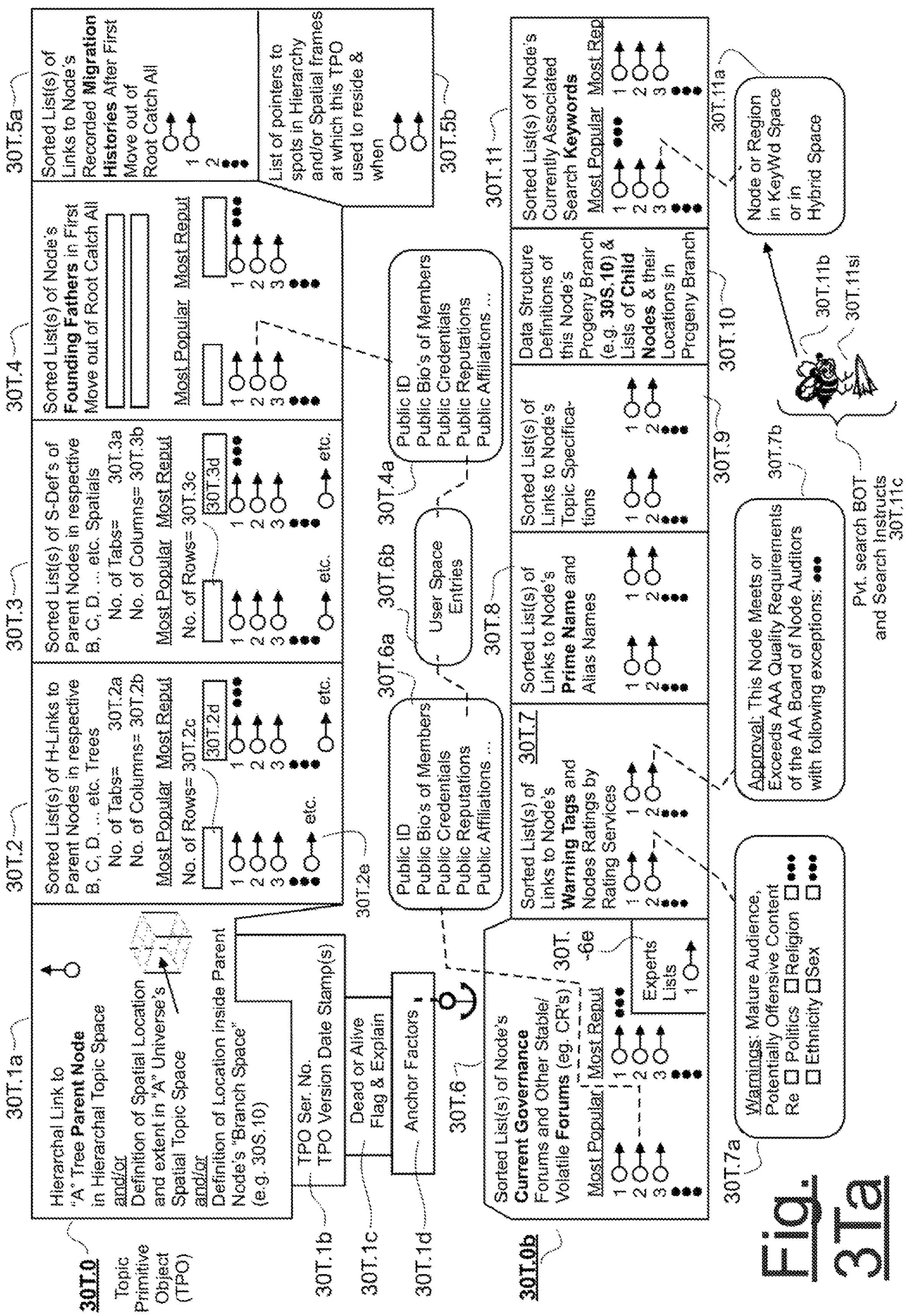
FIG. 3Ta and FIG. 3Tb show an example of a data structure that may be used for representing a corresponding topic node in the system of FIGS. 3R-3S.
Figure 3T:
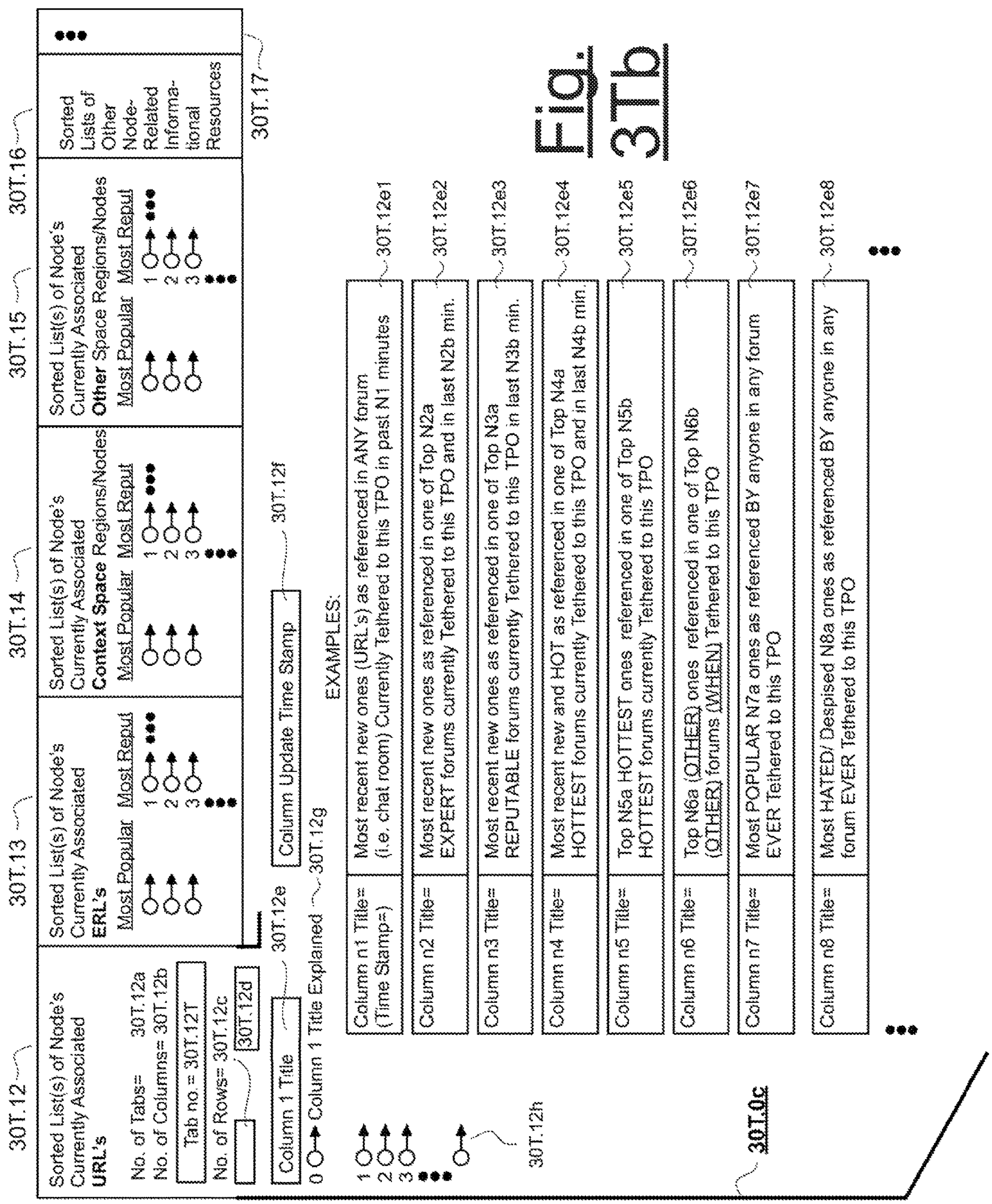
Figure 3X:
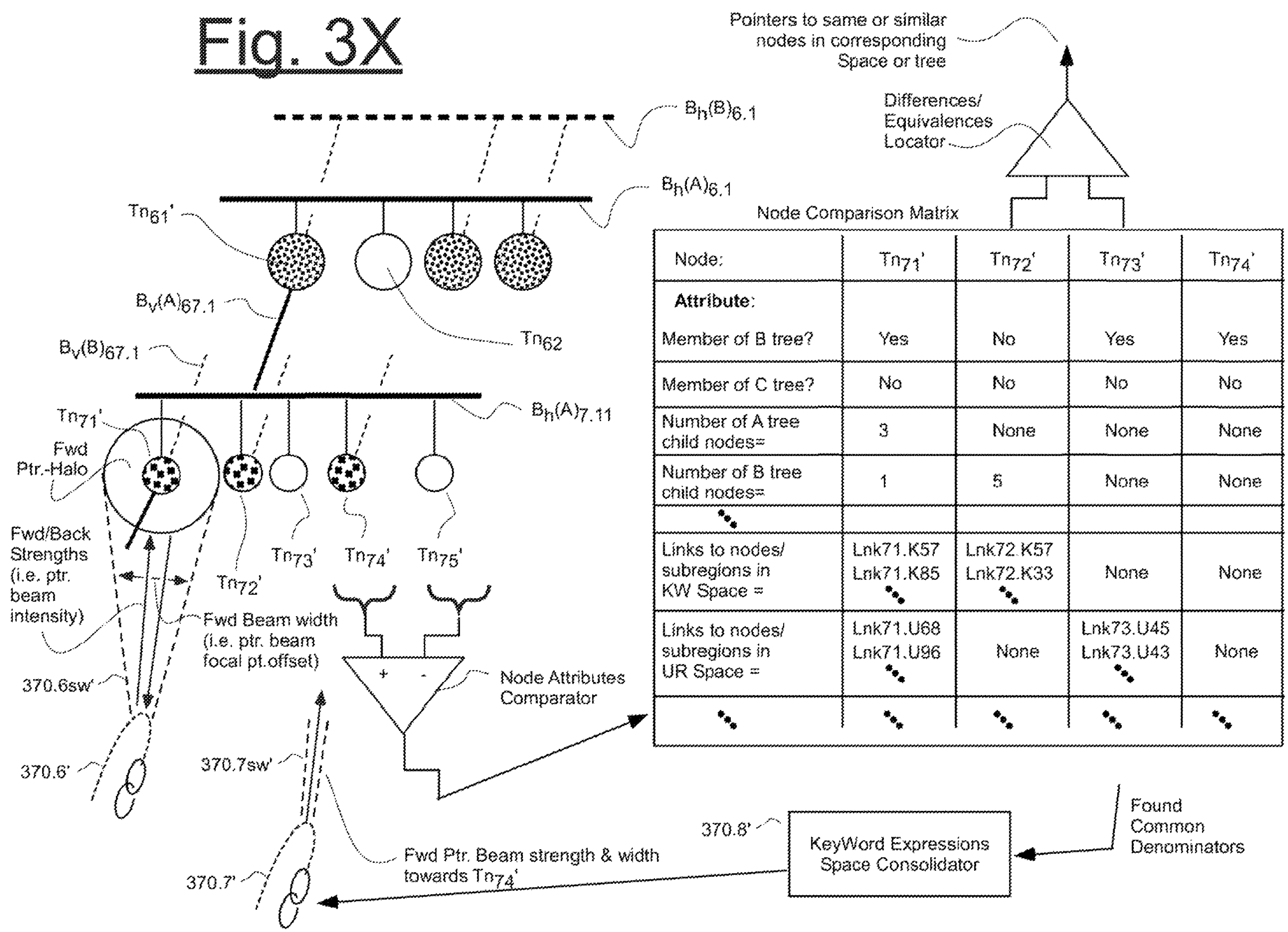
FIG. 3X illustrates a system for locating equivalent and near-equivalent and near-equivalent (same or similar) nodes within a corresponding data organizing space.

Referring to FIG. 3S as well as FIG. 3E, in one embodiment, the automated determination of what topic nodes the logged-in user is more likely to be currently focusing-upon is carried out with the help of a hybrid space scanner 30S.50 that automatically searches through hybrid spaces that have "context" as one of their hybridizing factors. More specifically, in the case where a given set of keywords are received via respective CFi's and grouped together (e.g., Kw1 AND Kw3 in the example of FIG. 3S), the hybrid space scanner 30S.50 is configured to responsively automatically search through a hybrid keywords and context states space for a hybrid node (e.g., 30S.8) that substantially matches (not necessarily 100%) both the grouped together keywords (e.g., Kw1 AND Kw3) and the current context states (e.g., Xsr5) of the corresponding STAN user. More to the point, if the STAN user currently has the context state (e.g., Xsr5) of being in the role of a Fifth Grade student doing his homework right after coming home from school (because habitually, per his/her currently active PHAFUEL profile 30S.10) that is what the user usually does and/or if the STAN user currently has the context state (e.g., Xsr5) of being in a studious mood because his/her currently active PEEP profile (e.g., 30S.20) so indicates, and/or if the STAN user currently has the context state (e.g., Xsr5) of being a Fifth Grade student because his/her currently active Personhood/Demographics profile (e.g., 30S.30) so indicates, then the resulting context determining signals 30S.36 of mapping mechanism 316'" will be collected by the hybrid space scanner 30S.50 to thereby enable the scanner to focus-upon the corresponding portion of the hybrid context and keywords space. The keyword expressions 30S.4 received under this context (e.g., Xsr5) will also be automatically collected by the hybrid space scanner 30S.50 to thereby enable the scanner to focus-upon the corresponding portion of the hybrid context and keywords space that contains relevant hybrid node 30S.8. Then cross-spaces logical link 370.7" is traced along to corresponding nodes and/or subregions (e.g., Tn74" and Tn75") in topic space. That followed logical link 370.7" will likely point to a context-appropriate set of nodes in topic space, for example those related to "Lincoln's Gettysburg Address" and not to a local Ford/Lincoln™ automobile dealership because under the context of being a Fifth Grade student, the logical connection to an automobile dealership is excluded, or at least much reduced in score in terms of a topic likely to be then be on the user's mind.

Referring to FIG. 3F, in one embodiment, one of the data-objects organizing spaces maintained by the STAN_3 system 410 is a music space that includes as its primitives, a music primitive object 30F.0 having a data structure composed of pointers and/or descriptors including first ones defining musical melody notes and/or musical chords and/or relative volumes or strengths of the same relative to each other. The music primitive object 30F.0 may alternatively or additionally define percussion waves and their interrelationships as opposed to musical melody notes. The music primitive object 30F.0 may identify associated musical instruments or types of instruments and/or mixes thereof. The music primitive object 30F.0 may identify associated nodes and/or subregions in topic space, for example those that identify a corresponding name for a musical piece having the notes and/or percussions identified by the music primitive object 30F.0 and/or identify a corresponding set of lyrics that go with the musical piece and/or identify corresponding historical or other events that are logically associated to the musical piece. The music primitive object 30F.0 may identify associated nodes and/or subregions in context space, for example those that identify a corresponding location or situation or contextual state that is likely to be associated with the corresponding musical segment. The music primitive object 30F.0 may identify associated nodes and/or subregions in multimedia space, for example those that identify a corresponding movie film or theatrical production that is likely to be associated with the corresponding musical segment. The music primitive object 30F.0 may identify associated nodes and/or subregions in emotional/behavioral state space, for example states that are likely to be present in association with the corresponding musical segment. And moreover, the music primitive object 30F.0 may identify associated nodes and/or subregions in yet other spaces where appropriate.

Referring to FIG. 3G, in one embodiment, one of the data-objects organizing spaces maintained by the STAN_3 system 410 is a sound waveforms space that includes as its primitives, a sound primitive object 30G.0 having a data structure composed of pointers and/or descriptors including first ones defining sound waveforms and relative magnitudes thereof as well as, or alternatively overlaps, relative timings and/or spacing apart pauses between the defined sound segments. The sound primitive object 30G.0 may identify associated portions of a frequency spectrum that correspond with the represented sound segments. The sound primitive object 30G.0 may identify associated nodes and/or subregions in topic space that correspond with the represented sound segments. The links to context space, multimedia space and so on may provide functions substantially similar to those described above for music space.

Referring to FIG. 3H, in one embodiment, one of the data-objects organizing spaces maintained by the STAN_3 system 410 is a voice primitive represent object 30H.0 having a data structure composed of pointers and/or descriptors including first ones defining phoneme attributes of a corresponding voice segment sound and relative magnitudes thereof as well as, or alternatively overlaps, relative timings and/or spacing apart pauses between the defined voice segments. The voice primitive object 30H.0 may identify associated portions of a frequency spectrum that correspond with the represented voice segments. The voice primitive object 30H.0 may identify associated nodes and/or subregions in topic space that correspond with the represented voice segments. The links to context space, multimedia space and so on may provide functions substantially similar to those described above for music space.

Referring to FIG. 3I, in one embodiment, one of the data-objects organizing spaces maintained by the STAN_3 system 410 is a linguistics primitive(s) representing object 30I.0 having a data structure composed of pointers and/or descriptors including first ones defining root entomological origin expressions (e.g., foreign language origins) and/or associated mental imageries corresponding to represented linguistics factors and optionally indicating overlaps of linguistic attributes, spacing aparts of linguistic attributes and/or other combinations of linguistic attributes. The linguistics primitive(s) representing object 30I.0 may identify associated portions of a frequency spectrum that correspond with represented linguistic attributes (e.g., pattern matching with other linguistic primitives or combinations of such primitives). The linguistics primitive(s) representing object 30I.0 may identify associated nodes and/or subregions in topic space that correspond with the represented linguistics primitive(s). Also for the linguistics primitive(s) representing object 30I.0, the included links to context space, multimedia space and so on may provide functions substantially similar to those described above for music space.

Referring to FIG. 3M, in one embodiment, one of the data-objects organizing spaces maintained by the STAN_3 system 410 is an image(s) representing primitive object 30M.0 having a data structure composed of pointers and/or descriptors including first ones defining a corresponding image object in terms of pixilated bitmaps and/or in terms of geometric vector-defined objects where the defined bitmaps and/or vector-defined image objects may relative transparencies and/or line boldness factors relative to one another and/or they may overlap one another (e.g., by residing in different overlapping image planes) and/or they may be spaced apart from one another by object-defined spacing apart factors and/or they may relate chronologically to one another by object-defined timing or sequence attributes so as to form slide shows and/or animated presentations in addition to or as alternatives to still image objects. The image(s) representing primitive object 30M.0 may identify associated portions of spatial and/or color and/or presentation speed frequency spectrums that correspond with the represented image(s). The image(s) representing primitive object 30M.0 may identify associated nodes and/or subregions in topic space that correspond with the represented image(s). Also for the image(s) representing primitive object 30M.0, the included links to context space, multimedia space and so on may provide functions substantially similar to those described above for music space.

Referring to FIG. 3N, in one embodiment, one of the data-objects organizing spaces maintained by the STAN_3 system 410 is a body and/or body parts(s) representing primitive object 30N.0 having a data structure composed of pointers and/or descriptors including first ones defining a corresponding and configured (e.g., oriented, posed, still or moving, etc.) body and/or body parts(s) object in terms of identification of the body and/or specific body part(s) and/or in terms of sizes, types, spatial dispositions of the body and/or specific body part(s) relative to a reference frame and/or relative to each other. The body and/or body parts(s) representing primitive object 30N.0 may identify associated portions of spatial and/or color and/or presentation speed frequency spectrums that correspond with the represented body or part(s). The body and/or body parts(s) representing primitive object 30N.0 may identify associated force vectors or power vectors corresponding to the represented body or part(s) as may occur for example during exercising, dancing or sports activities. The body and/or body parts(s) representing primitive object 30N.0 may identify associated nodes and/or subregions in topic space that correspond with the represented body and/or specific body part(s) and their still or moving states. Also for the body and/or body parts(s) representing primitive object 30N.0, the included links to emotion space, context space, multimedia space and so on may provide functions substantially similar to those described above for music space.

Referring to FIG. 3O, in one embodiment, one of the data-objects organizing spaces maintained by the STAN_3 system 410 is a physiological, biological and/or medical condition/state representing primitive object 30*o*.0 having a data structure composed of pointers and/or descriptors including first ones defining a corresponding biological entity and/or biological entity parts(s) object in terms of identification of the biological entity and/or biological entity parts(s) and/or in terms of sizes, macroscopic and/or microscopic resolution levels, systemic types, metabolic states or dispositions of the biological entity and/or biological entity parts(s) for example relative to a reference biological entity (e.g., a healthy subject) and/or relative to each other. The physiological, biological and/or medical condition/state representing primitive object 30*o*.0 may identify associated condition names, degrees of attainment of such conditions (e.g., pathologies). The physiological, biological and/or medical condition/state representing primitive object 30*o*.0 may identify associated dispositions within reference demographic spaces and/or associated dispositions within spatial and/or color and/or metabolism rate spectrums that correspond with the represented biological entity and/or biological entity parts(s). The physiological, biological and/or medical condition/state representing primitive object 30*o*.0 may identify associated force or stress or strain vectors or energy vectors (e.g., metabolic energy flows and/or rates in or out) corresponding to the represented biological entity and/or biological entity parts(s) as may occur for example during various metabolic states including those when healthy or sick or when exercising, dancing or engaging sports activities. The physiological, biological and/or medical condition/state representing primitive object 30*o*.0 may identify associated nodes and/or subregions in topic space that correspond with the represented biological entity and/or biological entity parts(s) and their still or moving states. Also for the physiological, biological and/or medical condition/state representing primitive object 30*o*.0, the included links to emotion space, context space, multimedia space and so on may provide functions substantially similar to those described above for music space.

Referring to FIG. 3P, in one embodiment, one of the data-objects organizing spaces maintained by the STAN_3 system 410 is a chemical compound and/or mixture and/or reaction representing primitive object 30P.0 having a data structure composed of pointers and/or descriptors including first ones defining a corresponding chemical compound and/or mixture and/or reaction in terms of identification of the corresponding chemical compound and/or mixture and/or reaction and/or in terms of mixture concentrations, particle sizes, structures of materials at macroscopic and/or microscopic resolution levels, reaction environment (e.g., presence of catalysts, enzymes, etc.), temperature, pressure, flow rates, etc.. The chemical compound and/or mixture and/or reaction representing primitive object 30P.0 may identify associated condition/reaction state names, degrees of attainment of such conditions (e.g., forward and backward reaction rates). The chemical compound and/or mixture and/or reaction representing primitive object 30P.0 may identify associated other entities such as biological entities as disposed for example within reference demographic spaces (e.g., likelihood of negative reaction to pharmaceutical compound and/or mixture) and/or associated dispositions of the compound and/or reactants within spatial and/or reaction rate spectrums. The chemical compound and/or mixture and/or reaction representing primitive object 30P.0 may identify associated power vectors or energy vectors (e.g., reaction energy flows and/or rates in or out) corresponding to the represented chemical compound and/or mixture and/or reaction as may occur for example under various reaction conditions. The chemical compound and/or mixture and/or reaction representing primitive object 30P.0 may identify associated nodes and/or subregions in topic space that correspond with the represented chemical compound and/or mixture and/or reaction. Also for the chemical compound and/or mixture and/or reaction representing primitive object 30P.0, the included links to emotion space, biological condition/state space, context space, multimedia space and so on may provide functions substantially similar to those described above for music or other spaces.

Referring to FIG. 3R, in one embodiment, the STAN_3 system 410 includes a node attributes comparing module that automatically crawls through a given data-objects organizing space (e.g., topic space) and automatically compares corresponding attributes of two or more nodes (e.g., topic nodes) in that space for sameness (e.g., duplication), degree of sameness or degree of differences, where the results are recorded into a nodes comparison database such as in the form, for example, of the illustrated nodes comparison matrix of FIG. 3R. In one embodiment, the attributes that are compared may include any one or more of: hierarchical or nonhierarchical trees or graphs to which the compared nodes (e.g., Tn74' and Tn75') belong. Note that the universal hierarchical "A" tree is not tested for because all nodes of the given space must be members of that universal tree. The attributes that are compared as between the two or more nodes (e.g., Tn74' versus Tn75') may further include the number of child nodes that the compared node has, the number of out-of-tree logical links that the compared node has, and if such out-of-tree logical links point to specific external spaces, an indication of what those specific external spaces are (e.g., keyword expressions space, URL space, context space, etc.) and optionally an identification of the specific nodes and/or subregions in the specific external spaces that are being pointed to. It is to be understood that this is a non-limiting set of examples of the kinds of information that is recorded into the node-versus-node comparison matrix.

In one embodiment, the STAN_3 system 410 further includes a differences/equivalences locating module that automatically crawls through the respective node-versus-node comparison matrix of each space (e.g., topic space, context space, keyword expressions space, URL expressions space, etc.) looking for nodes that are substantially the same and/or very different from one another and generating further records that identify the substantially same and/or substantially different nodes (e.g., substantially different sibling nodes of a same tree branch). The generated and stored records that are automatically produced by the differences/equivalences locating module are subsequently automatically crawled through by other modules and used for generating various reports and/or for identifying usual situations (e.g., possible error conditions that warrant further investigation). One of the other modules that crawl through the differences/equivalences records can be the local space consolidating module (e.g., 370.8' in the case of the keyword expressions space).

Referring to FIG. 5C, in one embodiment, the STAN_3 system 410 includes a chat or other forum participation sessions generating service 503' that automatically sends out invitations for, and thus tries to populate corresponding chat or other forum participation sessions with "interesting" mixtures of participants. More specifically, and referring to module 551, social entities that have a same topic node and/or topic space region (TSR) being currently focused-upon are automatically identified by module 551. The commonality isolating function of module 551 need not be limited to sameness of topic nodes and/or topic space subregions. The commonality isolating function of module 551 can alternatively or additionally group STAN using social entities according to personhood co-compatibilities for now joining with each other in chat or other online forum participation sessions or even in real life (ReL) meeting sessions. The commonality isolating function of module 551 can alternatively or additionally group STAN using social entities according to substantial sameness of currently focused-upon nodes and/or subregions in various other spaces, including but not limited to, music space, emotion space, context space, keyword expressions space, URL expressions space, linguistics space, image space, body or biological state spaces, and chemical substance and/or mixture and/or reaction space. More specifically, if two or more people (or other social entities) are listening to substantially same music pieces at substantially same times and having similar emotional reactions to the music (as indicated by substantial similarity of nodes and/or subregions in emotions/behavior state space) and/or they are experiencing the substantially same music pieces in substantially similar contextual settings (as indicated by substantial similarity of nodes and/or subregions in context space) and/or those social entities are otherwise having substantially similar and sharable experiences which they may wish to then exchange notes or observations about, then the commonality isolating module 551 may automatically group them (their identifications) into corresponding pooling bins (504).

Once the identifications (e.g., signals 551_o_2) of the identified social entities are pooled together into respective pooling areas (e.g., 504), another module 553 fetches a copy of the identifications (as signals 551_o_1) and uses the same to scan the currently active, sessions preferences profiles (e.g., 501_p_) of those social entities where the sessions preferences profiles (501_p_) indicate currently active preferences of the pooled persons (or other social entities), such as for example, the maximum or minimum size of a chat room that they would be willing to participate in (in terms of how many other participants are invited into and join that chat room), the level of expertise or credentials of other participants that they desire, the personality types of other participants whom they wish to avoid or whom they wish to join with, and so on. The preferences collecting module 553 forwards its results to a chat rooms spawning engine 552. The spawning engine 552 then uses the combination of the preferences collected by module 553 and the demographic data obtained for the identified social entities collected in the waiting pool 504 to predict what sizes and how many of each of now-empty, chat or other forum participation opportunities are probably needed to satisfy the wishes of gathered identifications in the waiting pool 504.

Representations of the various types, sizes and numbers of the empty chat or other forum participation opportunities are automatically recorded into launching area 565. Each of the empty forum descriptions in launching area 565 is next to be populated with an "interesting" mix of co-compatible personalities so that a socially "interesting" interchange will hopefully develop when invitees (those waiting in pool 504) are invited to join into the, soon-to be launched forums (565) and a statistically predictable subpopulation of them accept the invitations. To this end, an automated social dynamics, recipe assigning engine 555 is deployed. The recipe assigning engine 555 has access to predefined room-filling recipes 555_i_4 which respectively define different mixes of personality types that usually can be invited into a chat room or other forum participation session where that mixture of personality types will usually produce well-received results for the participants. In one embodiment, promoters (e.g., vendors) who plan to make promotional offerings later downstream in the process, get to supply some of their preferences as requests 555_i_2 into the recipe assigning/formulating engine 555. In one embodiment, a listing of the current top topics identified by module 551 are fed into recipe assigning/formulating engine 555 as input 555_i_3 so that assigning/formulating engine 555 can pick out or formulate recipes based on those current top topics. As the recipe assigning/formulating engine 555 begins to generate corresponding room make-up recipes, it will start to detect that certain participant personality types are more desired than others and it will feed this information as signal 555_o_2 to one or more bottleneck traits identifying engines 577. The bottleneck traits identifying engines 577 compare what they have (551_o_3) in the waiting pool 504 versus what is needed by the initially generated recipes and the bottleneck traits identifying engines 577 then responsively transmit bottleneck warning signals 557_i_2 to a next-in-the-assembly line, recipes modifying engine 557. As in the case, for example, of high production restaurant kitchen, the inventory of raw materials on hand may not always perfectly match what an idealized recipe calls for; and the chef (or in this case, the automated recipes modifying engine 557) has to make adjustments to the recipes so that a good-enough result is produced from ingredients on hand as opposed to the ideally desired ingredients. In the instant case, the ingredients on hand are the entity identifications waiting in pool area 504. The automated recipes modifying engine 557 has been warned by signal 557_i_2 that certain types of social entities (e.g., room leaders) are in short supply. So the recipes modifying engine 557 has to make adjustments accordingly. The recipe assigning module 555 assigns an idealized recipe from its recipes compilation 555_i_4 to the pre-sized and otherwise pre-designed empty chat rooms or empty other forums flowing out of staging area 565 to thereby produce corresponding forums 567 having idealized recipes logically attached to them. The automated recipes modifying engine 557 then looks into the ingredients pool 504 then on hand and makes adjustments to the recipes as necessary to deal with possible bottlenecks or shortages in desired personality types. The rooms 568 with correspondingly modified recipes attached to them are then output assembly line wise along a data flow storing path (delaying and buffering path) to await acceptances by respective entities in pool 504 for invitations sent to them by the automated recipes modifying and invitations sending engine 557.

Some chat rooms or other forums will receive an insufficient number of the right kinds of acceptances (e.g., a critically needed room leader does not sign up). If that happens, an RSVP receiving engine 559 trashes the room (flow 569) and sends apologies to the invitees that the party had to be canceled due to unforeseen circumstances. On the other hand, with regard to rooms for which a sufficient number of the right kinds of acceptances (e.g., critically needed room leaders and/or rebels and/or social butterflies and/or Tipping Point Persons) are received so as to allow the intent of the room recipe to substantially work, those rooms (or other forums) 570 continue flowing down the assembly buffer line (memory system that functions as if it were a conveyor belt) for processing next by engine 561. At the same time, a feedback signal, FB4 is output from the RSVP's receiving engine 559 and transmitted to a recipes perfecting engine (not shown) that is operatively coupled to recipes holding area 555_i_4. The FB4 feedback signal (e.g., percentage of acceptances and/or types of acceptances) are used by the recipes perfecting engine (of module 555_i_4) to tweak the existing recipes so they better conform to actual results as opposed to theoretical predictions of results (e.g., which room recipes are most successful in getting the right kinds and numbers of positive RSVP's). The recipes perfecting engine (of module 555_i_4) receives yet other feedback signals (e.g., FB3, 575_o_3-described below) which it can use alone or in combination with FB4 for tweaking the existing recipes and thus improving them based on obtained in-field data (on FB4, etc.).

Engine 561 is referred to as the demographics reporting and new social dynamics predicting engine. It collects the demographics data of the social entities (e.g., people) who actually accepted the invitations and forwards the same to auctioning engine 562. It also predicts the new social dynamics that are expected to occur within the chat room (or other forum) based on who actually joined as opposed who was earlier expected to join (expected by upstream engine 557).

The auctioning engine 562 is referred to as a post-RSVP auctioning engine 562 because it tries to auction off (or sell off) populated rooms to potential promotion offerors (vendors) 560*p* based on who actually joined the room and on what social dynamics are predicted to occur within the room by predicting engine 561. Naturally, chat or other forum participation sessions that have influential Tipping Point Persons or the like joined in to them and/or are predicted to have very entertaining or otherwise "interesting" social dynamics taking place in them, can be put up for auction or sale at minimum bid amounts that are higher than chat rooms or the like that are expected to be less "interesting". The potential promotion offerors (vendors) 560*p* transmit their bids or sale acceptances to engine 562 after having received the demographics and/or social dynamics predicting reports from engine 562. Identifications of the auction winners or accepting buyers (from among buying/bidding population 560*p*) are transmitted to access awarding engine 563.

As an alternative to bidding or buying exclusive or non-exclusive access rights to post-RSVP forums that have already begun to have active participation therein, the potential promotion offerors (vendors) 560*p* may instead interact with a pre-RSVP's engine 560 that allows them to buy exclusive or non-exclusive access rights for making promotional offerings to spawned rooms even before the RSVP's are accepted. In one embodiment, the system 410 establishes fixed prices for such pre-RSVP purchases of rights. Since the potential promotion offerors (vendors) 560*p* take a bigger risk in the case where RSVP's are not yet received (e.g., because the room might get trashed 569), the pre-RSVP purchase prices are typically lower than the minimum bid prices established for post-RSVP rooms.

In one embodiment, the auction winners 564 can pitch their promotional offerings to one or a few in-room representatives (e.g., the room discussion leader) in private before attempting to pitch the same to the general population of the chat room or other forum. Feedback (FBI) from the test run of the pitch (564*a*) on the room representative (e.g., leader) is sent to the access-rights owning promoters (564). They can use the feedback signals (FBI) to determine whether or not to pitch the same to the room's general population (with risk of losing goodwill if the pitch is poorly received) and/or when to pitch the same to the room's general population and/or to determine whether modifying tweaks are to be made to the pitch before it is broadcast (564*b*) to the room's general population. It is to be—285—noted that as time progresses on the room assembly and conveying line, various room participants may drop out and/or new ones may join the room. Thus the makeup and social dynamics of the room at a time period represented by 574 may not be the same as at a time period represented by 573.

In one embodiment, a further engine 575 (referred to here as the ongoing social dynamics and demographics following and reporting engine) periodically checks in on the in-process chat rooms (or other forums) 571, 573, 574 and it generates various feedback signals that can be used elsewhere in the system for improving system reliability and performance. One such feedback (FB2, a.k.a. signal 57502) looks at the way that participants actually behave in the rooms. These actual behavior reports are transmitted to another engine (not shown) which compares the actual behavior reports 575*o*2 against the traits and habit recorded in the respective user's current profiles 501*p*. The profiles versus actual behavior comparing engine (not shown, associated with signals 575*o*2) either reports variances as between actual behavior and profile-predicted behavior or automatically tweaks the profiles 501*p* to better reflect the observed actual behavior patterns. Another feedback signal (FB3) sent back from engine 575 to the variance reporting/correcting engine (not shown) is one relating to the verification of the alleged street credentials of certain Tipping Point Persons or the like. These credential verification signals are derived from votes (e.g., (CVi's) cast by in-room participants other than the persons whose credentials are being verified. Another feedback signal (57503) sent back from engine 575 goes to the recipes tweaking engine (not shown) of holding area 555*i*4. These downstream feedback signals (575*o*3) indicate how the spawned room performs later downstream, long after it has been launched but before it fades out (576). The downstream feedback signals (575*o*3) may be used to improve recipes for longevity as opposed to good performance merely soon after launch (570) of the rooms (of the TCONEs).

The statistics developed by the ongoing social dynamics and demographics following and reporting engine 575 may be used to signal (564) the best timings for pitching promotional offerings to respective rooms. by properly timing when a promotional offering is made and to whom, the promotional offering can be caused to be more often welcomed by those who receive it (e.g., "Pizza: Big Neighborhood Discount Offer, While it lasts, First 10 Households, Press here for more"). In one embodiment, the ongoing social dynamics and demographics following and reporting engine 575 is operatively coupled to receive context state reports generated by the context space mapping mechanism (316") for each of potential recipients of promotional offerings. Accordingly, the engine 575 can better predict when is the best timing 564*c* to pitch the offering based on latest reports about the user's contextual state (and/or other mapped states, e.g., physiological/emotional/habitual states=hungry and in mood for pizza).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

In terms of some of the novel concepts that are presented herein, the following recaps are provided:

Per FIG. 1A, an automated and machine-implemented mechanism is provided for allowing the inviting together or the automatically bringing together of people or groups of people based for example on uncovering what topics are currently relevant to them and by presenting them with appropriately categorized invites where the determination of currently relevant topics and/or appropriate times and places to present the invites are based on one or more of: automatically determining user location and/or context by means of embedded GPS or the like, automatically determining proximity with other people and/or their computers, automatically determining what virtually or physically proximate people are allowing broadcast of their Top 5 Now Topics where at least one matches with that of a potential invitee; wherein current topic focus is detected by means of received CFi signals, and/or heats of CFi's, and/or keyword usage, and/or hyperlink usages, and/or perused online material, and/or environmental clues (odors, pictures, physiological responses, music, context, etc.)

Per FIG. 1A, an automated and machine-implemented mechanism is provided for allowing the inviting together or the automatically bringing together of people or groups of people based on current Topic focus being derived from user(s) based on their automatically detected choices or actions or indicators presumed from their choices or actions and/or interactions.

In one embodiment, each STAN user can designate a top 5 topics of that user as broadcast-able topic identifications. The identifications are broadcast on a peer to peer basis and/or by way of a central server. As a result, if a first user is in proximity of other people who have one or more of their broadcast-able topic identifications matching at least one of the first user's broadcast-able topic identifications, then the system automatically alerts the respective users of this condition. In one embodiment, the system allows the matched and proximate persons to identify themselves to the others by, for example, showing the others via wireless communication a recent picture of themselves and/or their relative locations to one another (which resolution of location can be tuned by the respective users). This feature allows users who are in a crowded room to find other users who currently have same focus in topic space and/or other spaces supported by the STAN_3 system 410. Current focus is to be distinguished from reported "general interest" in a given topic. Just because someone has general interest, that does not mean they are currently focused-upon that topics and/or on specific nodes and/or subregions in other spaces maintained by the STAN_3 system 410. More specifically, just because a first user is a fisherman by profession, and thus it's a key general interest of his when considered over long periods of time, in a given moment and given context, it might not be one of his Top 5 Now Topics of focus and therefore the fisherman may not then be in a mood or disposition to want to engage in online or in person exchanges regarding the fishing profession at that moment and/or in that context. It is to be understood that the present disclosure arbitrarily calls it the top 5 now, but in reality it could instead be the top 3 or the top 7. The number N in the designation of top N Now (or then) topics may be a flexible one that varies based on context and most recent CFi's having substantial heat attached to them. In one embodiment, the broadcastable top 5 topic focuses can be put in a status message transmitted via the user's instant messenger program, and/or it can be posted on the user's Facbook™ or other alike platform profile.

In one embodiment, the system 410 supports automated scanning of NearFiledCodes and/or 2D barcodes as part of up or in-loaded CFi's where the automatically scanned codes demonstrate that the user is in range of corresponding merchandise or the like and thus "can" scan the 2d barcode, or any other object-identifying code (2d optical or not) that will show he or she is proximate to and thus probably focused on an object or environment in which the barcode or other scannable information is available.

In one embodiment, the system 410 automatically provides offers and notifications of events occurring now or soon which are triggered by socio-topical acts and/or proximity to corresponding locations.

In one embodiment, the system 410 automatically provides various Hot topic indicators, such as, but not limited to, showing each user's favorite groups of hot topics, showing personal group hot topics. In one embodiment, each user can give the system permission to automatically update the person's broadcastable or shareable hot topics whenever a new hot topic is detected as belonging to the user's current top 5. In one embodiment, the user needs to give permission to show, how long he will share this interest in the new hot topic (e.g., if more or less than the life of the CFi detections period), and/or the user needs to give permission with regard to who the broadcastable information will be broadcast or multi-cast or uni-cast to (e.g., individual person(s), group(s), or all persons or no persons (i.e. hide it)). If a given hot topic falls off the user's top 5 hot topic broadcastables list, it won't show in permitted broadcast. In one embodiment, an expansion tool (e.g., starburst+) is provided under each hot topic graphing bar and the user can click on it to see the corresponding broadcast settings.

In one embodiment, the system 410 automatically provides for showing intersections of heat interests, and thus provides a quick way of finding out which groups have same CFi's, or which CFi's they have in common.

In one embodiment, the system 410 automatically provides for showing topic heat trending data, where the user can go back in time, and see how top hot topics heats trended or changed over given time frames.

In one embodiment, the system 410 automatically provides for use of a single thumb's up icon as an indicator of how the corresponding others in a chat or other forum participation session are looking at the user of the computer 100. If the perception of the others is neutral or good, the thumb icon points up, if its negative, the thumb icon points down and optionally it reciprocates up and down in that configuration show more negative valuation. Similarly, positive valuation by the group can be indicated with a reciprocating thumb's up configuration. So if a given user is not deemed to be rocking the boat (so to speak), then the system shows him a thumb's up icon. On the other hand, if the user is generating a negative raucous in the forum then the thumb points down.

In one embodiment, the system 410 automatically scans a local geographic area of predetermined scope surrounding a first user and automatically designates STAN users within that local geographic area as a relevant group of users for the first user. Then the system can display to the first user the top N now topics and/or the top N now other nodes and/or subregions of other spaces of the so designated group, thereby allowing the first user to see what is "hot" in his/her immediate surroundings. The system can also identify within that designated group, people in the immediate surroundings that have similar recent CFi's to the first user's top 5 CFi's. The geographic clusterings shown in FIG. 4E can be used for such purposes.

Referring to FIG. 4E, in one embodiment, a geographic clusterings map is displayed for a user-defined geographic area, where the first user to whom the clusterings map is displayed may optionally be located somewhere on that map and his/her position is also indicated. In one embodiment, the system automatically indicates which persons in nearby geographic clusterings have shared Top 5 Now Topics with the first user and moreover, if they have co-compatible personhood attribute such that the system then puts up a suggestive invite to join with them if they have current "availability" for such suggested joinder. The system may also display an availability score for each of the nearby other users. For example, let's say the first user has a top 5 similar to theirs and the first user is broadcasting them. Let's say the co-compatible users can't then meet physically, but they can chat; perhaps only by means of a short (e.g., 5 minute) chat. Accordingly there are different types of availabilities that can be indicated from real life (ReL) meeting availability for long chats to only virtual availability for short chats.

In one embodiment, the system 410 automatically determines if availability is such that users can have meetings based on local events, or on happenstance clusterings or groupings of like focused people. These automated determinations may be optionally filtered to assure proper personhood co-compatibilities and/or dispositions in user-defined proper vicinities. In an embodiment, the system provides the user with zoom in and out function for the displayed clusterings map.

In one embodiment, the system 410 automatically determines if availability is such that users can have meetings based on one or more selection criteria such as: (1) Time available (e.g., for a 5, 10, 15 MINS chat); (2) physical availability to travel x miles within available time so as to engage in a real life (ReL) meeting having a duration of at least y minutes; (3) level of attentions-giving capability. For example, if a first user is multi-tasking, such as watching TV and trying to follow a chat at same time and so not really going to be very attentively involved in the chat, just passive vs. him totally looking at this) then the attentions-giving capability may be indicated along a spectrum of possibilities from only casual and haphazard attention giving to full-blown attention giving. In one embodiment, the system asks the user what his/her current level of attentions-giving capability is. In the same or an alternate embodiment the system automatically determines the user's current level of attentions-giving capability based on environmental analysis (e.g., is the TV blasting loudly in the background, are people yelling in the background or is the background relatively quiet and at a calm emotional state?). In one embodiment, the system 410 automatically determines if availability is such that users can have meetings based on user mood and/or based on user-to-user distances in real life (ReL) space and/or in various virtual spaces such as, but not limited to, topic space, context space, emotional/behavioral states space, etc.

In one embodiment, the system 410 not only automatically serves up automatically labeled serving plates and/or user-labeled serving plates (e.g., 102*b*" of FIG. 1N) but also mixed, on-plate scoops of node and/or subregion focused media suggestions of different types (e.g., forum invites and/or further content suggestions based on different defined types of pure or hybrid space nodes and/or subregions; such as hybrid context-plus-other nodes). Since such scoops can hold many different types of invites, and suggestions, in one embodiment, the STAN_3 system 410 allows the user to curate the scoops for use in specialty-serving automated online newspapers or reporting documents. The scoops may be auto-curated based on type of receiving device (e.g., smartphone versus tablet) that will receive the curated invites and/or suggestions as well as what the device holding user wants or expects in terms of covered nodes and/or subregions of topic space and/or of other spaces.

Referring to FIG. 2, in one embodiment, the mobile or other data processing device used by the STAN user is operatively coupled to an array of microphones, for example 8 or more microphones and the arrays are disposed to enable the system 410 to automatically figure out which of received sounds correspond to speech primitives emanating from the user's mouth and which of received sounds correspond to music or other external sounds based on directional detection of sound source and based on categorization of body part and/or device disposed at the detected position of sound source.

Still referring to FIG. 2, in one embodiment, the augmented reality function provides an ability to point the mobile device at a person present in real life (ReL) and to them automatically see their Top 5 Now Topics and/or their Top N Now (or Then) other focused-upon nodes and/or subregions in other system maintained spaces.

In one embodiment, the system 410 allows for temporary assignment of pseudonames to its users. For example, a user might be producing CFi's directed to a usually embarrassing area of interest (embarrassing for him or her) such as comic book collector, beer bottle cap collector, etc. and that user does not want to expose his identity in an online chat or other such forum for fear of embarrassment. In such cases, the STAN user may request a temporary pseudoname to be used when joining the chat or other forum session directed to that potentially embarrassing area of interest. This allows the user to participate even though the other chat members cannot learn of his usual online or real life (ReL) identity. However, in one variation, his reputation profile(s) are still subject to the votes of the members of the group. So he still has something to lose if he or she doesn't act properly.

In one embodiment, the system 410 provides social ice-breaker mechanism that smooths the ability of strangers who happen to have much in common to find each other and perhaps meet online and/or in real life (ReL). There are several ways of doing this: (1) a Double blind icebreaker mechanism— each person (initially identified only by his/her temproary pseudoname) invites one or more other persons (also each initially identified only by his/her temproary pseudoname) who appear to the first person to be be topic-wise and/or otherwise co-compatible. If two or more of the pseudoname-identified persons invite one another, then and only then, do the non-pseudoname identifications (the more premanent identifications) of those people who invited each other get revealed simultaneously to the cross-inviters. In one embodiment, this temporary pseudoname-based Double blind invitations option remains active only for a predetermined time period and then shuts off. Cross-identification of Double blind invitators occurs only if the Double blind invitations mode is still active (typically 15 minutes or less).

Another way of the breaking the ice with aid of the STAN_3 system 410 is referred to here as the (2) Single Blind Method: A first user sends a message under his/her assigned temporary pseudoname to a target recipinet while using the target's non-pseudoname identification (the more premanent identification). The system-forwarded message to the non-pseudoname-wise identified target may declare something such as: "I am open to talking online about potentially embarassing topic X if you are also. Please say yes to start out online conversation". If the recipient indicates acceptance, the system automatically invites both into a private chat room or other forum where they both can then chat about the suggested topic. If the targetted recipient says no or ignores the invite for more than a predetermined time duration (e.g., 15 minutes), the option lapses and an automated RSVP is sent to the Single Blind initiator indicating that the target is unable to accept at this time but tahnk you for suggestig it. In this way the Single Blind initiator is not hurt by a flat out rejection.

In one embodiment, the system 410 automatically broadcasts, or multi-casts to a select group, a first user's Top 5 Now Topics via Twitter™ or an alike short form messaging system so that all interested (e.g., Twitter following) people can see what the first user is currently focused-upon. In one variation, the system 410 also automatically broadcasts, or multi-casts the associated 'heats" of the first user's Top 5 Now Topics via Twitter™ or an alike short form messaging system so that all interested (e.g., Twitter following) people can see the extent to which the first user is currently focused-upon the identified topics. In one variation, the Twitter™ or alike short form messaging of the first user's Top 5 Now Topics occurs only after a substantial change is automatically detected in the first user's 'heat' energies as cast upon one or more of their Top 5 Now Topics, and in one further variation of this method, the system first asks the first user for permission based on the new topic heat before broadcasting, or multi-casting the information via Twitter™ or an alike short form messaging system.

In one embodiment, the system 410 not only automatically broadcasts, or multi-casts to a select group, a first user's Top 5 Now Topics via Twitter™ or an alike short form messaging system, for example when the first user's heats substantially change, but also the system posts the information as a new status of the first user on a group readable status board (e.g., FaceBook™ wall). Accordingly, people who visit that group readable, online status board will note the change as it happens. In one embodiment, users are provided with a status board automated crawling tool that automatically crawls through online status boards of all or a preselected subset (e.g., geographically nearby) of STAN users looking for matches in top N Now topics of the tool user versus top N Now topics of the status board owner. This is one another way that STAN users can have the system automatically find for them other users who are now probably focused-upon same or similar nodes and/or subregions in topic space and/or in other system-maintained spaces. When a match is found, the system 410 may automatically send a match-found alert to the cellphone or other mobile device of the tool user. In other words, the tool user does not have to be then logged into the STAN_3 system 410. The system automatically hunts for matches even while the tool user is offline. This can be helpful particularly in the case of esoteric topics that are sporadically focused-upon by only a relatively small number (e.g., less than 1000, less than 100, etc.) of people per week or month or year.

In one embodiment, before posting changed information (e.g., re the first user's Top 5 Now Topics) to the first user's group readable, online status board, the system 410 first asks for permission to update the top 5, indicating to the first user for example that this one topic will drop off the list of top 5 and this new one will be added in. If the first user does not give permission (e.g., the first user ignores the permission request), then the no-longer hot old ones will drop off the posted list, but the new hot topics that have not yet gotten permission for being publicized via the first user's group readable, online status board will not show. On the other hand, currently hot topics (or alike hot nodes and/or subregions in other spaces) that have current permission for being publicized via the first user's group readable, online status board, will still show.

In one embodiment, the system 410 automatically collects CFi's on behalf of a user that specify real life (ReL) events that are happening in a local area where the user is situtated and/or resides. These automatically collected CFi's are run through the domain-lookup servers (DLUX) of the system to determine if the events match up with any nodes and/or subregions in any system maintained space (e.g., topic space) that are recently being focused-upon by the user (e.g., within the last week, 2 weeks or month). If a substantial match is detected, the user is automatically notified of the match. The notification can come in the form of an on-screeen invitation, an email, a tweet and so on. Such notification can allow the user to discover further information about the event (upcoming or in recent past) and to optionally enter a chat or other forum participation session directed to it and to discuss the event with people who are geographically proximate to the user. In one embodiment, the user can tune the notifications according to 'heat' energy cast by the user on the corresponding nodes and/or subregions of the system maintained space (e.g., topic space), so that if an event is occurring in a local area, and the event is related to a topic or other node that the user had recently cast a significantly high value of above-threshold "heat" on that node and/or subregion, then the user will be automatically notified of the event and the heat value(s) associated with it. The user can then determine based on heat value(s) whether he/she wants to chat with others about the event. In one embodiment, time windows are specified for pre-event activities, during-the-event activities and post-event activities and these predetermined windows are used for generating different kinds of notifications, for example, so that the user is notified one or more times prior to the event, one or more times during the event and one or more times after the event in accordance with the predetermined notification windows. In one embodiment, the user can use the pre-event window notifications for receiving promotional offerings for "tickets" to the event if applicable, for joining pre-event parties or other such pre-event social activities and/or for receiving promotional offerings directed to services and/or products realted to the event.

In one embodiment, the system 410 automatically maintains an events data-objects organizing space. Primitives of such a data-objects organizing space may have a data structure that defines event-related attributes such as: "event name", "event duration", "event time", "event cost", "event location", "event maximum capacity" (how many people can come to event) and current subscription fill percentage (how many seats and which are soled out), links to event-related nodes and/or subregions in various system maintained other spaces (e.g., topic space), and so on.

In one embodiment, the system 410 further automatically maintains an online registration service for one or more of the events recorded in its events data-objects organizing space. The online registration service is automated and allows STAN users to pre-register for the event (e.g., indicate to other STAN users that they pain to attend). The automated registration service may publicize various user status attributes relevant to the event such as "when registered" or when RSVP'd with regard to the event, or when the user has actaully paid for the event, and so on. With the online registration service tracking the event-related status of each user and reporting the same to others, users can then responsively entering a chat room (e.g., when there is reported significant change of status, for example a Tipping Point Person agreed to attend) and the users can there discuss the event and aspects realted to it.

In one embodiment, the system 410 automatically maintains trend analysis services for one or more of its system maintained spaces (e.g., topic space, events space) and the trend analysis services automatically provide trending reports by tracking how recently significant status changes occurred, frequency of significant status changes, velocity of such changes, and virality of such changes (how quickly news of the changes and/or discussions about the changes spread through forums of corresponding nodes and/or sub-regions of system maintained spaces (e.g., topic space) related to the changes.

The above is nonlimiting and by way of a further examples, it is understood that the configuring of user local devices (e.g., 100 of FIG. 1A, 199 of FIG. 2) in accordance with the disclosure can include use of a remote computer and/or remote database (e.g., 419 of FIG. 4A) to assist in carrying out activation and/or reconfiguaration of the user local devices. Various types of computer-readable tangible media or machine-instructing means (including but not limited to, a hard disk, a compact disk, a flash memory stick, a downloading of manufactured and not-merely-transitory instructing signals over a network and/or the like may be used for instructing an instructable local or remote machine of the user's to carry out one or more of the Social-Topical Adaptive Networking (STAN) activities described herein. As such, it is within the scope of the disclosure to have an instructable first machine carry out, and/to provide a software product adapted for causing an instructable second machine to carry out machine-implemented methods including one or more of those described herein.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. § 120 and/or 35 U.S.C. § 251.

The invention claimed is:

1. A system for automatically generating content recommendations to users of a social networking system, the system comprising:

a non-transitory memory to store a plurality of data objects arranged in a dynamically changing topic space populated by hierarchically organized nodes and one or more processors configured to:

receive via a network an input associated with a first user of the social networking system, wherein the first user is capable of using one of a plurality of profiles;

determine context information of the first user and automatically repeatedly update the context information of the first user;

apply at least a portion of the context information to the nodes and associations between nodes to select a set of data objects;

associate each data object in the set of data objects with at least one card of a plurality of cards;

determine at least one user engagement factor associated with the first user and rank the plurality of cards into a ranking order based on-the at least one user engagement factor; and responsive to the input associated with the first user, send instructions to display interactive content corresponding to the plurality of cards wherein the instructions include the ranking order.

2. The system of claim 1, wherein the context information comprises one or more of geographical location information of the first user, demographic information of the first user, and behavioral information of the first user.

3. The system of claim 2, wherein to apply at least a portion of the context information comprises to filter at least a portion of the nodes by at least one demographic feature selected from the demographic information.

4. The system of claim 3, wherein the at least one demographic feature selected from the demographic information comprises at least one of an educational level of the first user, an age group of the first user, and a vocation of the first user.

5. The system of claim 2, wherein the behavioral information comprises at least one of a mood of the first user, an economic activity of the first user, a habit of the first user, or a routine of the first user.

6. The system of claim 1, wherein the at least one user engagement factor comprises at least one of:

i) a quantity of time the first user has spent engaging with content corresponding to a given node; and ii) a degree of interactive engagement the first user has had with content corresponding to the given node.

7. The system of claim 1, wherein the set of data objects relate to one or more of people, topics, and events.

8. The system of claim 7, wherein a portion of the set of data objects relating to people represent additional users of the social networking system.

9. The system of claim 1, wherein the instructions that include the ranking order comprise instructions to visually arrange the interactive content for the display interface based on the ranking order.

10. The system of claim 9, wherein the instructions to visually arrange the interactive content for the display interface based on the ranking order comprise instructions to visually arrange the interactive content such that content corresponding to a highest ranked card of the ranking order is first presented to the first user via the display interface, and content corresponding to additional cards of the plurality of cardsis at least partially hidden from the first user.

11. The system of claim 1, wherein to apply at least a portion of the context information to at least a portion of the nodes and associations between nodes to select a set of data objects comprises to select at least one given data object of the set of data objects based on a correlation between a topic, event, and/or person relevant to the at least a portion of the context information and a given topic, event, and/or person corresponding to the at least one given data object.

12. The system of claim 1, wherein the instructions to display interactive content comprise instructions to provide to the display interface one or more visual objects selectable by a user of the client computing system.

13. The system of claim 12, wherein the one or more visual objects selectable by a user of the client computing system comprise a selectable filter control for the set of data objects.

14. The system of claim 12, wherein the one or more visual objects are configured such that each, upon selection by the user, activates a pointer or link corresponding to a data object associated with that visual object.

15. The system of claim 14, wherein the pointer or link comprises a Uniform Resource Locator.

16. The system of claim 1, wherein the input associated with the first user comprises a filter option.

17. The system of claim 1, wherein an association between nodes is configured in the memory as a logical interconnection representing a direct connection between two of the nodes.

18. The system of claim 1, wherein to select the set of data objects comprises to exclude one or more individual users from the set of data objects based on user options.

19. The system of claim 1, wherein the one or more processors are further configured to transmit instructions to display a visual indication of one or more trending topics on the display interface.

20. The system of claim 1, wherein the input associated with the first user comprises a keyword-based search expression.

21. The system of claim 1, wherein the hierarchically organized nodes are arranged additionally in a spatial manner.

* * * * *